_US005774748A_

United States Patent [19]
Ito et al.

[11] Patent Number: 5,774,748
[45] Date of Patent: Jun. 30, 1998

[54] ZOOM LENS BARREL AND CAMERA HAVING SUCH A BARRET

[75] Inventors: Takayuki Ito; Hiroshi Nomura; Kazuyoshi Azegami; Takamitsu Sasaki; Yasushi Tabata; Norio Numako; Yoshinari Tanimura; Takuma Sato; Masaaki Kishimoto; Kosei Kosako, all of Tokyo, Japan

[73] Assignee: Asahi Kogaku Kogyo Kabushiki Kaisha, Tokyo, Japan

[21] Appl. No.: 653,369

[22] Filed: Jul. 5, 1996

[30] Foreign Application Priority Data

| Jul. 7, 1995 | [JP] | Japan | 7-172216 |
| Jan. 5, 1996 | [JP] | Japan | 8-365 |
| Feb. 15, 1996 | [JP] | Japan | 8-38333 |
| Feb. 20, 1996 | [JP] | Japan | 8-32365 |
| Feb. 21, 1996 | [JP] | Japan | 8-34038 |
| Feb. 21, 1996 | [JP] | Japan | 8-34039 |
| Feb. 21, 1996 | [JP] | Japan | 8-34040 |
| Feb. 21, 1996 | [JP] | Japan | 8-34041 |
| Feb. 21, 1996 | [JP] | Japan | 8-34042 |
| Feb. 21, 1996 | [JP] | Japan | 8-34062 |
| Feb. 21, 1996 | [JP] | Japan | 8-34063 |
| Feb. 21, 1996 | [JP] | Japan | 8-34118 |
| Feb. 21, 1996 | [JP] | Japan | 8-34120 |
| Feb. 21, 1996 | [JP] | Japan | 8-34125 |
| Feb. 22, 1996 | [JP] | Japan | 8-34823 |
| Feb. 29, 1996 | [JP] | Japan | 8-43158 |

[51] Int. Cl.⁶ .................... G03B 5/00; G03B 13/04; G03B 17/04
[52] U.S. Cl. .................... 396/80; 396/84; 396/87; 396/90; 396/349; 396/448
[58] Field of Search .................... 396/79–82, 84–87, 396/90, 348, 349, 448; 348/358; 359/696–698, 823, 824

[56] References Cited

U.S. PATENT DOCUMENTS 3,850,507  11/1974  Uesugi .
3,930,720   1/1976  Uesugi .
4,729,644   3/1988  Ueyama .
4,885,600  12/1989  Iwasa et al. .
4,974,949  12/1990  Tanaka .
5,157,429  10/1992  Haraguchi et al. .
5,162,831  11/1992  Haraguchi et al. .
5,181,060   1/1993  Kobayashi et al. .

(List continued on next page.)

FOREIGN PATENT DOCUMENTS

| 63-287833 | 11/1988 | Japan . |
| 63-287835 | 11/1988 | Japan . |
| 63-303327 | 12/1988 | Japan . |
| 3200907 | 9/1991 | Japan . |
| 3248110 | 11/1991 | Japan . |
| 6313829 | 11/1994 | Japan . |
| 6313830 | 11/1994 | Japan . |
| 6313831 | 11/1994 | Japan . |
| 6313834 | 11/1994 | Japan . |
| 6317828 | 11/1994 | Japan . |
| 7159667 | 6/1995 | Japan . |
| 840520 | 7/1960 | United Kingdom . |
| 1481072 | 7/1977 | United Kingdom . |
| 1537588 | 1/1979 | United Kingdom . |
| 1595350 | 8/1981 | United Kingdom . |
| 2245714 | 1/1992 | United Kingdom . |
| 2309528 | 7/1997 | United Kingdom . |

OTHER PUBLICATIONS

A United Kingdom Search Report.
One United Kingdom Search Report.

*Primary Examiner*—W. B. Perkey
*Attorney, Agent, or Firm*—Greenblum & Bernstein P.L.C.

[57] ABSTRACT

A zoom lens camera includes a whole unit moving device to move a front lens group and a rear lens group together as a whole in an optical axis direction, and a relative moving means to vary a distance between the front lens group and the rear lens group. The whole unit moving means is driven during a zooming operation, and at least the whole unit moving means or the relative moving means is driven during a focusing operation to focus on a subject to be photographed.

153 Claims, 97 Drawing Sheets

U.S. PATENT DOCUMENTS

| | | |
|---|---|---|
| 5,189,559 | 2/1993 | Kaneko . |
| 5,223,873 | 6/1993 | Tsuboi ........................................ 396/82 |
| 5,257,053 | 10/1993 | Kobayashi et al. . |
| 5,267,085 | 11/1993 | Sasaki et al. . |
| 5,305,038 | 4/1994 | Mogamiya . |
| 5,323,199 | 6/1994 | Yoshida . |
| 5,345,285 | 9/1994 | Hasushita et al. . |
| 5,345,338 | 9/1994 | Ueda et al. . |
| 5,392,159 | 2/1995 | Sasaki et al. . |
| 5,440,369 | 8/1995 | Tabata et al. . |
| 5,463,442 | 10/1995 | Harigaya et al. . |
| 5,485,315 | 1/1996 | Nomura et al. . |
| 5,498,944 | 3/1996 | Nakata . |

| SHORT-CIRCUITED RESISTOR(S) | ZOOM CODE | Vo | THRESHOLD VOLTAGE |
|---|---|---|---|
| — | 0 | 0.56 × VDD | |
| | | | 0.53 × VDD (Va) |
| R2 | 5 | 0.50 × VDD | |
| | | | 0.48 × VDD (Vb) |
| R0 | 4 | 0.45 × VDD | |
| | | | 0.42 × VDD (Vc) |
| R1 | 3 | 0.40 × VDD | |
| | | | 0.35 × VDD (Vd) |
| R1 AND R2 | 6 | 0.30 × VDD | |
| | | | 0.24 × VDD (Ve) |
| R0 AND R1 | 1 | 0.19 × VDD | |
| | | | 0.09 × VDD (Vf) |
| R0, R1 AND R2 | 2 | 0.00 | |

ZOOM LENS BARREL AND CAMERA HAVING SUCH A BARRET

BACKGROUND OF THE INVENTION

1. Field of the Invention

The present invention relates to a zoom lens camera, and a method of focusing and driving a zoom lens. More particularly, the present invention relates to a zoom lens camera having a front lens group and a rear lens group which can be moved independently to effect focusing and zooming.

2. Description of the Related Art

The term "zoom lens" refers to a lens in which a variation in focal length can be achieved without varying the focal point. In the zoom lens of the prior art, irrespective of whether the camera is a single lens reflex camera or a lens shutter camera, when a zoom operating means is operated to vary the focal length, a plural number of lens groups are moved in a predetermined positional relationship, such that the focal point does not move. A focusing lens group is normally positioned at an infinity photographing position, and when a focus operating means is operated, the focusing lens group moves to a subject in-focus position before a shutter is released.

However, in a zoom compact camera, since the image of a subject to be photographed is observed through a zoom finder optical system, rather than through a zoom photographing optical system as in the case of a single lens reflex camera, it is not always necessary to move a zoom photographing lens to a position at which the image of the subject is focused, when the zoom operating means is operated. However, in the lens shutter camera of the prior art, a plural number of lens groups are moved along a predetermined zoom locus during the zooming operation, and during the shutter release operation, one of the plural number of lens groups, namely the focusing lens, is moved to a position where an in-focus condition is attained. In such a manner, since the movement and operation zooming and focusing are completely separate, it is necessary to provide a cam member having non-linear shaped cam grooves to obtain a zoom locus for the lens groups for each zoom lens system. If the cam member is produced from a molded material, it is necessary to produce a molding die for each cam profile, thus increasing the manufacturing cost. In addition, in a conventional zoom lens barrel using a cam mechanism, a focusing lens group is supported at the center of an annular shutter block which is moved in accordance with the cam profile upon zooming. Upon focusing, the focusing lens group is moved relative to the annular shutter block in accordance with object distance information. The conventional annular shutter block, which has an advancing mechanism (i.e., a focusing mechanism) for the focusing lens group, and an opening and closing mechanism (i.e., an exposure mechanism) for the shutter blades, is a large element within the lens barrel, thereby preventing the miniaturization of the lens barrel in the radial direction.

Additionally, if at least the front lens group and the rear lens group are independently movable, many problems arise.

In a camera provided with a zoom lens to perform zooming through an extension of the lens barrel from the camera body, while the lens barrel is in an extended state from the camera body, a device such as a clutch is provided, for the purpose of preventing damage to the lens barrel or the driving device of the lens barrel. The clutch is provided for a situation a strong external force or impact is made in the direction of the camera body, to the front of the lens barrel. When an external force exceeding a predetermined force is applied to the lens barrel, the clutch permits the retraction (withdrawal) of the lens barrel into the camera body, i.e., permitting the rearward movement thereof, so that damage to the lens barrel or the driving device of the lens barrel may be avoided.

In regard to a two lens group type of camera provided with a front lens group and a rear lens group, the distance between the front lens group and the rear lens group is longer at the wide-angle end (i.e., the "wide" end) position, and is shorter at the telephoto end (i.e., the "tele" end) position. Therefore, in a camera provided with a structure in which zooming is carried out through a movement of the front lens group with respect to the rear lens group, especially at the "wide" end position, the rear lens group is moved rearwardly to a position furthest away from the front lens group, namely to the position closest to the film. Therefore, in a camera provided with the type of zoom lens which is extended from the camera body to perform zooming, while the lens barrel is extended from the camera body, especially when the lens barrel is extended to the "tele" end position, if a strong external force or impact in the direction of the camera body is made to the front of the lens barrel, the lens barrel or the driving device of the lens barrel may itself be protected by the clutch as described above. However, if the lens barrel is forced to withdraw into the camera body, and the rear lens group is positioned rearwardly from the front lens group, the rear lens group may collide with the film, and therefore the film, the rear lens group, or the driving device of the rear lens group may possibly be damaged.

If an external force is applied to the lens barrel, resulting in unintended movement of the zoom lens, a possibility exists that the front lens group and the rear lens group may be moved from the housed lens position. If focusing is operated in such a state, there will be a case that the lens groups may not be moved to the in-focus position. In addition, despite the fact that the rear lens group is moved rearwardly from the predetermined position due to the external force, if the lens barrel is withdrawn to the housed position, the rear lens group may collide with an aperture frame or the film.

Additionally, if the lens barrel is moved due to an external force, a lens driving system, such as a gear train, a lead screw, or a cam groove and a cam pin, may cause so-called "biting". In such a case, difficulties will be experienced in moving the lens under the torque of the conventional motor. In order to solve such a problem, the torque of the motor may be increased; however this results in an increase in the size of the motor.

For the purpose of minimizing size, the zoom lens assembly of the compact camera has a lens barrel with a plurality of generally concentric sections or stages, namely the barrel is extended in two, three or more stages. In such a zoom lens, there is a possibility that backlash exists in the device used to extend the lens barrel, namely in the motor, the gear train, etc. Therefore, during zooming, because of the backlash, it may not be possible to move the lenses to a desired position. If the focusing lens group is moved under such conditions, the possibility exists that proper focusing can not be achieved.

In a camera having a powered (i.e., motor-driven) zoom lens, if the lens is stopped after zooming, it may not be possible to stop the lens at a desired position, due to inertia or the like. In addition, the possibility exists that the lens groups may be moved from the stopped (desired) position due to the lens barrel being pushed or pulled. In such a case, if the focusing lens group is moved, the subject will not be focused because the lens group may not be positioned at the focusing position.

Due to the circumstances described above, it is desirable that all the lens group in a zoom lens camera, not only the focusing lens group, are moved during focusing, and therefore all the lens groups are surely positioned at the desired focal length position, such that accurate focusing may be performed.

However, if all of the lens groups, including the focusing lens group, are serially driven, (i.e., driven one at a time), a long period of time is required to complete the movement of the lens groups. When the release button is operated, focusing is performed and the shutter is actuated. Therefore, it is desirable to provide a zoom lens camera in which release time lag is shortened.

In addition, in the prior art structure where the lens groups are moved as a whole during zooming and in which the rear lens group is moved during focusing, if the focal length (i.e., the distance to the film surface), is varied when the lens groups are moved as a whole, the amount of movement during focusing of the rear lens group will be varied accordingly. Therefore, in a portion of the focal length range in which the amount of movement of the rear lens group for focal adjustment is large, the time necessary for focusing will accordingly be longer than that of other focal length positions in which the amount of movement of the rear lens group is smaller.

In a zoom lens camera in which the lens barrel is withdrawn into the camera body during housing, it is desirable to provide a lens barrier. When the lens barrel is withdrawn to the furthest position, the lens barrier is closed, and when the lens barrel is extended to the position capable of photographing, the lens barrier is open. However, regarding the zoom lens barrel in which the front lens group and the rear lens group are moved separately, it is difficult to provide a device to open and close the lens barrier in synchronization with the movement of the lenses or the lens barrel.

Further, in a conventional camera, if the entirety of lens groups of a zoom lens camera is moved where a zoom finder is provided which changes a magnification in accompaniment with the zooming process, the magnification of the zoom finder will change each time focusing is performed, and thus will cause the observation of the subject through the finder to be troublesome.

SUMMARY OF THE INVENTION

In view of the above problems, a primary object of the present invention is to provide a zoom lens and a method for controlling the same in which a cam mechanism for zooming is unnecessary and which controls the position of the lenses in accordance with information regarding focal length information and detected object distance information.

Another object of the present invention is to provide a zoom lens camera capable of focusing in a short period of time, and which moves the entirety of lens groups during zooming, moves at least one lens group during focusing, and to provide a zoom lens camera capable of focusing in a short period of time regardless of focal length.

Another object of the present invention is to provide a method of driving a zoom lens and a zoom lens barrel where if the lens barrel is extended from the camera body, if a strong external force or impact is applied to the lens barrel forcing the lens barrel to be withdrawn, damage to the film, the rear lens group, or the driving device of the lens due to a collision between the rear lens group and the film surface, is avoided.

A further object of the present invention is to provide a zoom lens camera, in which if the rear lens group is moved due to an external force or the like, it remains capable of focusing accurately, and also capable of housing the lenses without damaging the lenses, the camera body, or the which moves the front lens group and the rear lens group together as a whole during zooming, and moves the front lens group and the rear lens group independently during focusing.

The present invention also advantageously provides a zoom lens camera capable of returning the lens groups to a prior position after focusing, and which moves the entirety of lens groups during zooming and focusing.

Another object of the present invention is to provide a zoom lens camera capable of detecting a lens position accurately and also capable of focusing accurately, and which moves the entirety of lens groups during zooming, and also moves the focusing lens group during focusing.

A further object of the present invention is to provide a camera capable of driving the lens barrel when the lens barrel is pushed by an external force and/or when biting occurs, and which moves the lenses or the lens barrel by a motor, without the need for an enlarged motor.

Yet still another object of the present invention is to provide a zoom lens camera which does not vary the magnification of the zoom finder during focusing, performs zooming and varies the magnification of the zoom finder through a movement of the entirety of lens groups, and moves the entirety of lens groups during focusing.

The present invention regards a compact camera, where zooming is an operation to set the focal length by a zoom operating device, and that the distance between the front and rear lens groups, or the position of the focusing lens is at an accurate position according to the designated focal length and the subject distance, when the focus operating device is operated and before the shutter is released.

Therefore, in an aspect of the present invention, there is provided an optical zoom lens system having at least a front lens group and a rear lens group, arranged in this order from an object side; whole lens system moving means to move the front lens group and the rear lens group as a whole in an optical axis direction without changing a distance therebetween; a relative moving device to move the front lens group and the rear lens group relatively to thereby vary the distance therebetween; a zoom operating device to set a focal length of the optical zoom lens system; a zoom finder which varies a field of view in accordance with the focal length set by the zoom operating means; and a focus operating device for commencing a focusing operation. In addition, a feature of the present invention is the capability of focusing on a subject by operating both the whole unit driving motor and the relative driving motor, in at least one part of the focal length range set by the zoom operating device, when the focus operating device is operated. In regard to the lens system, a fixed lens can be provided at either the front or the rear of the movable front or rear lens groups. Either of the front lens group or the rear lens group can be positive or negative.

During operating of the focus operating device, if the focusing is performed by moving both the whole unit driving motor and the relative driving motor, the lens position may be controlled freely, reducing the amount of movement during focusing, or reducing the amount of information regarding movement during focusing, simplifying the control thereof. From a mechanical point of view, a countermeasure against backlash may be facilitated, such that accurate positioning of each lens group may be obtained easily, and it is further possible to minimize the size of the camera when the lens is housed.

For example, the amount of movement of the whole unit driving motor and the relative driving motor during an operation of the focus operating device, are respectively obtained according to the focal length information, from the zoom operating device, and the subject distance information.

Regarding movement of the front and rear lens groups during operating of the zoom operating device, for example, it is possible to move only the whole unit driving motor or to move both the whole unit driving motor and the relative driving motor. In any case, during operating of the focus operating device, both the whole unit driving motor and the relative driving motor are further driven.

In another aspect of the present invention, at least a lens system having a movable front lens group positioned on the object side and a movable rear lens group positioned on the image side, a whole unit driving motor to move the front lens group and the rear lens group as a whole, a relative driving motor to vary the distance between the front lens group and the rear lens group, a zoom operating device to set the focal length through the lens system, and a focus operating device to start the focusing, are provided. The present aspect has the features of being capable of varying the focal position of the lens system including the front and rear lens groups in an optical axis direction, through movement of the front and rear lens groups by operating at least the whole unit driving motor means, when the zoom operating device is operated, and further, of being capable of subject focusing by operating both the whole unit driving motor and the relative driving motor, in at least one part of the focal length range, when the focus operating device is operated.

In regard to the focus operating device, it is most practical to use the release switch to actuate the focus operating device which releases the shutter after focusing, but the focus operating device can be activated by means other than the release switch.

In yet another aspect of the present invention, a positive front lens group positioned on the object side and a negative rear lens group positioned on the image side, a whole unit driving motor to move the front lens group and the rear lens group as a whole, a rear lens group relative driving motor for relative movement of the rear lens group with respect to the front lens group, to vary the distance between the front lens group and the rear lens group, a zoom operating device to set the focal length by the front and rear lens groups, and a focus operating device to start the focusing, are provided. The present aspect has a feature of being capable of subject focusing by moving both the whole unit driving motor and the rear lens group relative driving motor, in at least one part of the focal length range set by the zoom operating device, when the focus operating device is operated.

In yet another aspect of the present invention, there is provided a positive front lens group positioned on the object side and a negative rear lens group positioned on the image side, a whole unit driving motor to move the front lens group and the rear lens group as a whole, a rear lens group relative driving motor for a relative movement of the rear lens group with respect to the front lens group to vary the distance between the front lens group and the rear lens group, a zoom operating device to set the focal length by the front and rear lens groups, and a focus operating device to start the focusing, are provided. This aspect of the present invention has the feature of being capable of varying the focal position of the lens system including the front and rear lens groups in the optical axis direction, through movement of the front and rear lens groups by operating at least the whole unit driving motor, when the zoom operating device is operated, and further, of being capable of focusing on the subject by operating both the whole unit driving motor and the relative driving motor, in at least one part of the focal length range, when the focus operating device is operated.

In the present invention if the front lens group is designated as a positive lens, and if the rear lens group is designated as a negative lens, the overall length of the camera is shortened. Regarding the locus of zooming of such a positive-negative (in the order from the object) type of lens system, during zooming from the shortest focal length end to the longest focal length end, both lens groups are moved towards the object with the distance therebetween decreasing. Accordingly the amount of movement of the front lens group is less than that of the rear lens group, and since the positive lens may be formed in such a manner that the radius thereof is shorter than that of the negative lens. Therefore by making the structure such that the relative movement of the rear lens group is made with respect to the front lens group, miniaturization of the camera may be realized, and the mechanism thereof may also be simplified. In addition, if the rear lens group is designed as the lens group to be moved by the relative driving means, the lens barrel has a superior mechanical strength.

In another aspect of the present invention, a zoom lens camera is provided with an optical zoom lens system having at least a front lens group and a rear lens group, arranged in this order from an object side. A whole lens system moving device is provided to move the front lens group and the rear lens group as a whole in an optical axis direction without changing a distance therebetween. A relative moving device is provided to move the front lens group and the rear lens group relatively to thereby vary the distance therebetween. A zoom operating device is provided to set a focal length of the optical zoom lens system. A zoom finder which varies a field of view in accordance with the focal length set by the zoom operating device, is also provided. A focus operating device is provided for commencing a focusing operation, and a controller is provided for focusing on an object to be photographed by moving both the whole lens system moving device and the relative moving device upon an operation of the focus operating device at at least one focal length set by the zoom operating means.

In a further aspect of the present invention, a zoom lens camera is provided with an optical zoom lens system having at least a front lens group and a rear lens group, arranged in this order from an object side. A whole lens system moving device is provided to move the front lens group and the rear lens group as a whole in an optical axis direction without changing a distance therebetween. In addition, a relative moving device is provided to move the front lens group and the rear lens group relatively to thereby vary the distance therebetween. A zoom operating device to set a focal length of the optical zoom lens system is also provided. A zoom finder is provided to vary a field of view in accordance with the focal length set by the zoom operating device. A zoom controller means is provided, which moves at least the whole lens system device means so that a focal point of the optical zoom lens system varies in an optical axis direction of the optical zoom lens system when the zoom operating device is operated, and a focus operating device is provided for focusing on an object to be photographed by moving both the whole lens system moving device and the relative moving device at at least one focal length set by the zoom operating device.

In another aspect of the present invention a zoom lens camera is provided having a positive front lens group and a negative rear lens group, arranged in this order from an object side. A whole lens system moving device is provided to move the front lens group and the rear lens group as a whole in an optical axis direction without changing a distance therebetween. A relative moving device is provided to move the front lens group and the rear lens group relatively to thereby vary the distance therebetween. A zoom operating device is provided to set a focal length of the optical zoom lens system having the front lens group and the rear lens group. A zoom finder is provided to vary a field of view in accordance with the focal length set by the zoom operating device. A focus operating device for commencing a focusing operation, and a controller for focusing on an object to be photographed by moving both the whole lens system moving device and the relative moving device upon an operation of the focus operating device at at least one focal length set by the zoom operating device, are also provided.

In yet another aspect of the present invention, a zoom lens camera is provided having a positive front lens group and a negative rear lens group, arranged in this order from an object side. A whole lens system moving device to move the front lens group and the rear lens group as a whole in an optical axis direction without changing a distance therebetween, is also provided. A relative moving device is provided to move the front lens group and the rear lens group relatively to thereby vary the distance therebetween. A zoom operating device is provided to set a focal length of the optical zoom lens system having the front lens group and the rear lens group. A zoom finder is provided to vary a field of view in accordance with the focal length set by the zoom operating device. A zoom controller which moves at least the whole lens system moving device so that a focal point of the optical zoom lens system varies in an optical axis direction of the optical zoom lens system when the zoom operating device is operated, and a focus operating device for focusing on an object to be photographed by moving both the whole lens system moving device and the relative moving device at at least one focal length set by the zoom operating device, are also provided.

In a further aspect of the present invention a control method for a zoom lens camera is provided, the camera having an optical zoom lens system having at least a front lens group and a rear lens group, arranged in this order from an object side. A whole lens system moving device is provided to move the front lens group and the rear lens group as a whole in an optical axis direction without changing a distance therebetween. A relative moving device is provided to move the front lens group and the rear lens group relatively to thereby vary the distance therebetween. A zoom operating device to set a focal length of the optical zoom lens system, and a focus operating device for commencing a focusing operation, are also provided. The method includes the steps of setting a focal length of the zoom lens by the zoom operating device, commencing a focusing operation by the focus operating device, and focusing on an object to be photographed by moving both the whole lens system moving device and the relative moving device upon an operation of the focus operating device at at least one focal length set by the zoom operating device.

In yet another aspect of the present invention a control method for a zoom lens camera is provided, the camera being provided with an optical zoom lens system having at least a front lens group and a rear lens group, arranged in this order from an object side. A whole lens system moving device is provided to move the front lens group and the rear lens group as a whole in an optical axis direction without changing a distance therebetween. A relative moving device to move the front lens group and the rear lens group relatively to thereby vary the distance therebetween, and a zoom operating device to set a focal length of the optical zoom lens system, are also provided. The method to includes the steps of moving at least the whole lens system moving device so that a focal point of the optical zoom lens system varies in an optical axis direction of the optical zoom lens system when the zoom operating means is operated, and moving both the whole lens system moving device and the relative moving device at at least one focal length set by the zoom operating device to focus on an object to be photographed.

In yet another aspect of the present invention a control method for a zoom lens camera is provided, the camera having a positive front lens group and a negative rear lens group, arranged in this order from an object side. A whole lens system moving device is provided to move the front lens group and the rear lens group as a whole in an optical axis direction without changing a distance therebetween. A relative moving device is provided to move the front lens group and the rear lens group relatively to thereby vary the distance therebetween. A zoom operating device to set a focal length of an optical zoom lens system consisting of the front lens group and the rear lens group, and a focus operating device for commencing a focusing operation, are also provided. The method having the steps of setting a focal length of the zoom lens by the zoom operating device, commencing a focusing operation by the focus operating device, and focusing on an object to be photographed by moving both the whole lens system moving device and the relative moving device upon the operation of the focus operating device at at least one focal length set by the zoom operating device.

In a further aspect of the present invention a control method for a zoom lens camera is provided, the camera having a positive front lens group and a negative rear lens group, arranged in this order from an object side. A whole lens system moving device is provided to move the front lens group and the rear lens group as a whole in an optical axis direction without changing a distance therebetween. A relative moving device to move the front lens group and the rear lens group relatively to thereby vary the distance therebetween, and a zoom operating device to set a focal length of an optical zoom lens system consisting of the front lens group and the rear lens group, are also provided. The method having the steps of moving at least the whole lens system moving device so that a focal point of the optical zoom lens system varies in an optical axis direction of the optical zoom lens system when the zoom operating device is operated, and moving both the whole lens system moving device and the relative moving device at at least one focal length set by the zoom operating device to focus on an object to be photographed.

In yet another aspect of the present invention a zoom lens camera is provided consisting of a lens system having at least a movable front lens group and a movable rear lens group, in this order in an optical axis direction. A whole unit moving device is provided to move the front lens group and the rear lens group as a whole. A relative moving device is provided to vary a distance between the front lens group and the rear lens group. A zoom operating device to set a focal length using the lens system, and a focus operating device for commencing a focusing operation, are also provided. The focusing is executed by any of the following three modes:

a first mode to execute focusing by only driving the whole unit moving device without driving the relative moving device, in one part of a focal length range set by the zoom operating device;

a second mode to execute focusing by driving both the whole unit moving device and the relative moving device, in another part of the focal length range, other than the one part used in the first mode; and a third mode to execute focusing by only driving the relative moving means without driving the whole unit moving means, in any part of the focal length range, other than the parts used in the first and second modes.

If the focusing operation is executed through the three modes, the position of a lens before focusing may be controlled freely, and further may be controlled easily.

According to the second mode, it may be performed such that the absolute position of the rear lens group will not change with respect to the camera body.

The first, second and third modes may be executed respectively at least when the focal length is set, through the zoom operating device, at the "wide" end position, the "tele" end position, or at the intermediate focal length position other than the "wide" end and "tele" end.

The zoom operating device sets the focal lengths from "wide" end to the "tele" end as a plural number of focal length stages varying step by step.

In a further aspect of the present invention, a zoom lens camera having at least a movable front lens group and a movable rear lens group is provided, consisting of a whole unit moving device to move the front lens group and the rear lens group as a whole in an optical axis direction. A rear lens group moving device is also provided to move the rear lens group towards or away from the front lens group. A lens position detecting device is provided for detecting positions of the front lens group and the rear lens group, using the front lens group as a reference. A storage device for storing lens positions detected through the lens position detecting device, and a controller to drive the whole unit moving and the rear lens group moving to move the front lens group and the rear lens group, are also provided. Before an exposure operation, the controller drives the whole unit moving device to detect positions of the front and rear lens groups, stored by the storage device, via the lens position detecting device.

In a further aspect of the present invention, a zoom lens camera having at least a movable front lens group and a movable rear lens group is provided, consisting of a whole unit moving device to move the front lens group and the rear lens group as a whole forwardly and rearwardly in an optical axis direction. A relative moving device for moving the front lens group and the rear lens group towards or away from each other, and a controller to drive the whole unit moving device during a zooming operation, and to drive the whole unit moving device and the relative moving means during a focus adjusting operation, are also provided. The controller executes the focus adjusting operation by driving both the whole unit moving device and the relative moving device simultaneously during the focus adjusting operation.

In yet another aspect of the present invention, a zoom lens camera having at least a movable front lens group and a movable rear lens group is provided, consisting of a lens moving device to move the front lens group and the rear lens group as a whole during a zooming operation, the lens moving device also moves the front lens group and the rear lens group independently during a focus adjusting operation. The lens moving device moves the front lens group and rear lens group independently at various speeds depending upon an amount by which the front lens group and the rear lens group needs to move during the focus adjusting operation.

In another aspect of the present invention, a zoom lens camera having at least a movable front lens group and a movable rear lens group is provided with a lens moving device to move the front lens group and the rear lens group together as a whole during a zooming operation, the lens moving device also moving the front lens group and the rear lens group towards or away from each other during a focus adjusting operation. When the front lens group and the rear lens group are moved as a whole during the zooming operation, depending upon a position after the movement, the lens moving device relatively moves the rear lens group with respect to the front lens group to a predetermined position.

In another aspect of the present invention a zoom lens camera having at least a movable front lens group and a movable rear lens group is provided having a whole unit moving device to move the front lens group and the rear lens group together as a whole in an optical axis direction. A rear lens group moving device to move the rear lens group towards or away from the front lens group, and a controller to drive the rear lens group moving device at least before or after the front lens group and the rear lens group are moved by the whole unit moving device, to move the rear lens group to an initial position, are also provided.

In another aspect of the present invention, a zoom lens camera having at least a movable front lens group and a movable rear lens group is provided, having a lens moving device to move the front lens group and the rear lens group as a whole during a zooming operation, the lens moving device also moving the front lens group and the rear lens group towards or away from each other during a focus adjusting operation. During a release operation the lens moving device moves the front lens group and the rear lens group towards or away from each other, and after completion of the release operation the front lens group and the rear lens group are moved to be returned to a position at which the front lens group and rear lens group were prior to the release operation.

In another aspect of the present invention, a zoom lens camera having a front lens group and a rear lens group, is provided. During a zoom operation the front lens group and the rear lens group are moved without varying a distance therebetween, and during a release operation the rear lens group is moved away from the front lens group, and after completion of the release operation the rear lens group is moved towards the front lens group to be returned to a position at which the rear lens group was prior to the release operation.

In a further aspect of the present invention, a zoom lens camera having at least a movable front lens group and a movable rear lens group is provided, having a whole unit moving device to move the front lens group and the rear lens group as a whole in an optical axis direction. A relative moving device for moving the front lens group and the rear lens group towards or away from each other, and a controller, are also provided. During a zooming operation the whole unit moving device is driven by the controller, and during a focus adjusting operation the relative moving means is driven by the controller to move the front lens group and the rear lens group to a predetermined position. The controller also drives the relative moving device to move the front lens group and the rear lens group to a focalizing position. After the front lens group and the rear lens group have been moved to the focalizing position, the controller drives the whole unit moving device and the relative moving device in a reverse direction to move the front lens group and the rear lens group to a position at which the front lens group and the rear lens group were prior to being moved.

In a further aspect of the present invention, a zoom lens camera having at least a movable front lens group and a movable rear lens group is provided, having a whole unit moving device to move the front lens group and the rear lens group as a whole in an optical axis direction. A rear lens group moving device is provided to move the rear lens group towards or away from the front lens group. A lens position detecting device is provided for detecting positions of the front lens group and the rear lens group, using the front lens group as a reference. A storage device for storing lens positions detected through the lens position detecting device, and a controller to drive the whole unit moving device and the rear lens group moving device to move the front lens group and the rear lens group, are also provided. Before an exposure operator, the controller drives the whole unit moving device to the positions of the front and rear lens groups, stored in the storage device, via the lens position detecting means.

In a further aspect of the present invention, a zoom lens camera having at least a movable front lens group and a movable rear lens group is provided, having a whole unit moving device to move the front lens group and the rear lens group as a whole in an optical axis direction. A lens position detecting device for detecting positions of the front lens group and the rear lens group, by using the front lens group as a reference, through a detecting device consisting of detective portions and non-detective portions positioned alternately along a direction in which the front and rear lens groups move, and a controller to drive the whole unit moving device, are also provided. When the whole unit moving device is stopped, the controller firstly drives the whole unit moving device in a predetermined direction, secondly drives the whole unit moving device after the lens position detecting device detects lens positions, and finally stops the whole unit moving device. When the whole unit moving device is driven, the controller firstly drives the whole unit moving device in a direction of the detective portion to detect lens positions through the lens position detecting device.

In a further aspect of the present invention, a zoom lens camera having lens groups capable of moving forwardly and rearwardly in an optical axis direction is provided with a lens moving device to move the lens groups, and a controller to drive the lens moving device. When the lens groups are to be driven in a first direction, firstly in a reverse direction of the first direction, and secondly in the first direction.

In a further aspect of the present invention, a zoom lens camera having at least a movable front lens group and a movable rear lens group is provided, having a whole unit moving device to move the front lens group and the rear lens group as a whole in an optical axis direction. Also provided are a rear lens group moving device for moving the rear lens group towards or away from the front lens group, and a controller to drive the whole unit moving device, during a focus adjusting operation, to move the front lens group and the rear lens group forwardly to a predetermined position. The controller also drives the rear lens group moving device to move the rear lens group rearwardly away from the front lens group. When the front lens group and the rear lens group are positioned at a position withdrawn further into a camera body than a predetermined position, the controller firstly drives the whole unit moving device to move the front lens group and the rear lens group forwardly, and secondly drives the rear lens group moving device to move the rear lens group rearwardly.

In a further aspect of the present invention, a zoom lens camera having at least a movable front lens group and a movable rear lens group is provided, having a whole unit moving device to move the front lens group and the rear lens group together forwardly and rearwardly as a whole in an optical axis direction. A relative moving device for moving the front lens group and the rear lens group towards or away from each other is also provided. A zoom finder, a finder interlock to vary a magnification of the zoom finder in synchronization with the whole unit moving device, and a controller to drive the whole unit moving device and the relative moving device to be focalized during a focus adjusting operation, are also provided. An amount by which the whole unit moving device drives, through the controller, during the focus adjusting operation, is an amount such that a magnification of the zoom finder through the finder interlock is not varied.

In a further aspect of the present invention, a zoom lens camera having at least a movable front lens group and a movable rear lens group is provided, having a whole unit moving device to move the front lens group and the rear lens group as a whole in an optical axis direction, a zoom finder having a variable magnification in synchronization with the whole unit moving device, and a controller. During a zooming operation, the controller drives the whole unit moving device to move the front lens group and the rear lens group to stop at one of a plurality of standby positions, the plurality of standby positions being set in steps. During a focus adjusting operation, the controller firstly drives the whole unit moving device by a predetermined amount to move the front lens group and the rear lens group to a focalizing position, and secondly drives the whole unit moving device to return the front lens group and the rear lens group to a standby position. A predetermined amount by which the whole unit moving device is driven during the focus adjusting operation is an amount so as not to vary a magnification of the zoom finder.

In another aspect of the present invention, a zoom lens camera having at least a movable front lens group and a movable rear lens group is provided, having a whole unit moving device to move the front lens group and the rear lens group together as a whole in an optical axis direction. Also provided are a relative moving device for moving the front lens group and the rear lens group towards or away from each other, a zoom finder having a variable magnification synchronized with the whole unit moving device, and a controller. During a zooming operation, the controller drives the whole unit moving device to move the front lens group and the rear lens group to stop at one of a plurality of standby positions, which are being set in steps. During a focus adjusting operation, the controller firstly drives the whole unit moving device by a predetermined amount and drives the relative moving device to move the front lens group and the rear lens group to a focalizing position. The controller then drives the whole unit moving device and the relative moving device, to return the front lens group and the rear lens group to a standby position. The predetermined amount by which the whole unit moving device is driven during the focus adjusting operation is an amount which does not vary the magnification of the zoom finder during the focus adjusting operation.

The present disclosure relates to subject matter contained in Japanese Patent Application Nos. 07-172216 (filed on Jul. 7, 1995), 08-365 (filed on Jan. 5, 1996), 08-43158 (filed on Feb. 29, 1996), 08-32365 (filed on Feb. 20, 1996), 08-34038, 08-34039, 08-34040, 08-34041, 08-34042, 08-34062, 08-34063, 08-34118, 08-34120, 08-34125 (filed on Feb. 21, 1996), 08-34823 (filed on Feb. 22, 1996), and 08-28333 (filed on Feb. 15, 1996), which are expressly incorporated herein by reference in their entireties.

BRIEF DESCRIPTION OF THE DRAWINGS

The invention will be described below in detail with reference to the accompanying drawings, in which similar parts are indicated by like reference numerals throughout the drawing, and wherein.

DESCRIPTION OF THE PREFERRED EMBODIMENTS

The present invention will now be described with reference to the attached drawings.

Figure 1:
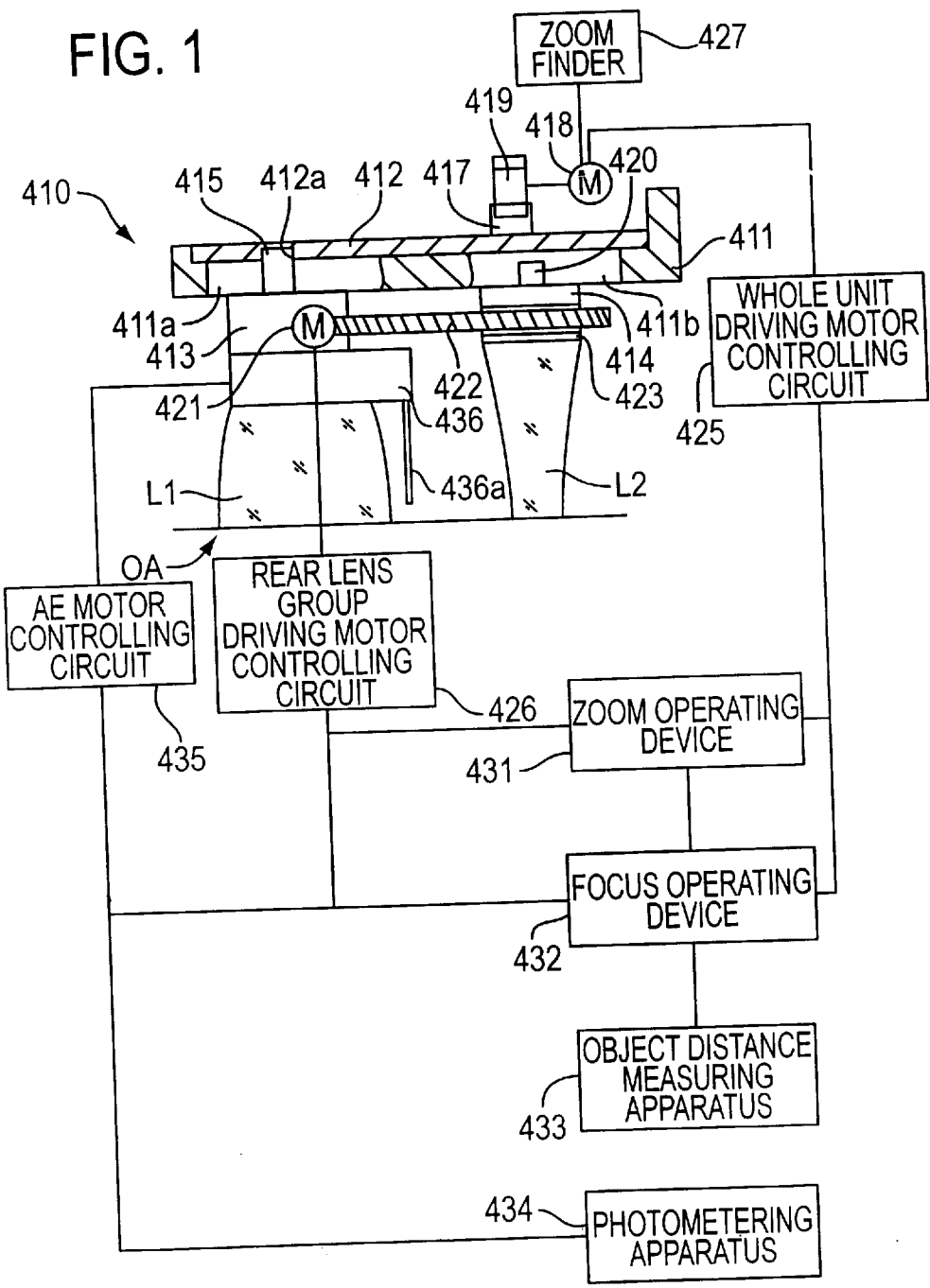
FIG. 1 is a schematic view and a block diagram of an example of a mechanical structure of a camera, to realize a method of focusing for a zoom lens camera of the present invention.

FIG. 1 is an (essentially) schematic representation of various elements which comprise a zoom lens camera according to the present invention. More specific details of such a camera are described hereinafter with reference to FIGS. 8–103. Thus, although they may describe similar and/or identical parts, the reference numerals used in FIG. 1 are not identical to those used in the other figures.

As shown in FIG. 1, a zoom lens barrel 410 is provided with a front lens group L1 of positive power and a rear lens group L2 of negative power shown in FIG. 1. On an outer periphery of a stationary ring 411, a driving ring 412 is rotatively supported, and on an inner periphery thereof, a front lens group supporting ring 413, which supports the front lens group L1, and a rear lens group supporting ring 414, which supports the rear lens group L2, are engaged. On the stationary ring 411, a linear guide groove 411a is formed parallel to an optical axis OA of the zoom lens barrel 410, and a radial pin 415, provided on the front lens group supporting ring 413, is engaged with a lead groove 412a formed on an inner peripheral surface of the driving ring 412. The radial pin 415 passes through the linear guide groove 411a to engage with the lead groove 412a. On an outer periphery of the driving ring 412, a gear 417 is fixedly engaged with a gear 419 of a whole unit driving (whole unit moving) motor 418.

On the stationary ring 411, a linear guide groove 411b is formed parallel to the optical axis of the zoom lens barrel 410. A radial pin 420, provided on the rear lens group supporting ring 414, engages with the linear guide groove 411b. On the front lens group supporting ring 413, a rear lens group driving (rear lens group moving) motor 421 and a driving screw 422 driven rotatively by the rear lens group driving motor 421, are provided. The driving screw 422 engages with an anti-rotating nut 423 provided on the rear lens group supporting ring 414.

In the above described structural arrangement, when the driving ring 412 is rotatively driven by the whole unit driving motor 418, in accordance with the relationship between the lead groove 412a and the linear guide groove 411a, the front lens group supporting ring 413 (i.e., the front lens group L1) moves in the optical axis direction. Since the rear lens group supporting ring 414 (i.e., the rear lens group L2) is secured to the front lens group supporting ring 413 through the driving screw 422 and the nut 423, the rear lens group supporting ring 414 moves together with the front lens group supporting ring 413 in the optical axis direction. Thus it can be understood that the whole unit driving motor 418 moves both lens groups, i.e., the front and rear lens groups, together as a whole.

On the other hand, when the driving screw 422 is rotatively driven by the rear lens group driving motor 421, the rear lens group supporting ring 414 (i.e., the rear lens group L2) moves relatively to the front lens group supporting ring 413 (i.e., the front lens group L1). Thus it can be understood that the rear lens group driving motor 421 is a motor which varies the distance between the rear lens group L2 and the front lens group L1.

The whole unit driving motor 418 and the rear lens group driving motor 421 are respectively controlled and driven by respective motor controlling means 425 and 426. The whole unit driving motor 418 is also connected to a zoom finder 427 so that a field of view of the finder varies when the whole unit driving motor 418 is actuated.

In the main body of the camera, a zoom operating means 431, a focus operating means 432, an object distance measuring device 433 and a photometering means 434 are provided. The zoom operating means 431 provides a zooming command, namely commands to move from a "wide" position to a "tele" position, or vice versa, to the zoom lens barrel 410, i.e., the front lens group L1 and the rear lens group L2. The zoom operating means 431 consists of, for example, a switch according to a momentary mechanical system. The focus operating means 432 consists of, for example, of a release button. When the focus operating means 432 is depressed by a half-depression (half-step), object distance measurement information is input to the object distance measuring device 433 and photometering information is input to the photometering means 434. When the focus operating means 432 is fully depressed (full step), the focusing operation commences, and a shutter 436, mounted to the front lens group supporting ring 413, is operated via a shutter controlling means 435. The shutter 436 opens a shutter blade 436a for a predetermined time according to the photometering information output from the photometering means 434.

In the zoom lens camera as above described, when the zoom operating means 431 is operated, the whole unit driving motor 418 is driven via at least the motor controlling means 425, and the front lens group L1 and the rear lens group L2 are moved as a whole. The rear lens group driving motor 421 may also be driven via the motor controlling means 426. With the above structural arrangement, it should be understood that the movement of the front lens group L1 and the rear lens group L2 by the zoom operating means 431 is not operated under the conventional concept of zooming in which the focal point does not move. When the zoom operating means 431 is operated, the following two modes are available, namely:

1. A mode to move the front lens group L1 and the rear lens group L2, in the optical axis direction, without varying the distance therebetween, by driving only the whole unit driving motor 418; and,
2. A mode to move the front lens group L1 and the rear lens group L2, in the optical axis direction, while varying the distance therebetween, by driving both the whole unit driving motor 418 and the rear lens group driving motor 421.

In mode 1, during the zooming operation it is impossible to focus on the subject. However, this is not a problem in a lens-shutter type camera, since the image is not observed through the photographing optical system, and it is sufficient that the subject is only focused when the shutter is released. In mode 2, during the zooming operation, the front lens group L1 and the rear lens group L2 are moved without consideration of whether the focal point moves, and when the shutter is released, focusing (focus adjusting) is carried out by moving both the whole unit driving motor 418 and the rear lens group driving motor 421.

On the other hand, when the whole unit driving motor 418 is actuated by the zoom operating means 431, the zoom finder 427 is driven so that the finder field of view thereof is changed in accordance with the focal length set. Specifically, as the set focal length changes from a short focal length to a longer focal length, the finder field of view (angle) changes from a wider field of view to a narrower field of view. The finder field of view of course corresponds to a photographing image size. This kind of zoom finder is well known and is therefore not shown.

In the present invention, as mentioned above, when the zoom operating means 431 is operated to set a focal length, the finder field of view (photographing image area) at the set focal length is observed through the zoom finder 427.

Further when the focus operating means 432 is operated in at least one part of the focal length range set by the zoom operating means 431, the whole unit driving motor 418 and the rear lens group driving motor 421 are driven and subject focusing is performed. The movement of the front lens group L1 and the rear lens group L2 by the whole unit driving motor 418 and the rear lens group driving motor 421 is determined, not only based on subject distance information provided from the object distance measuring device 433, but also in accordance with focal length information set by the zoom operating means 431. In such a manner, when the focus operating means 432 is operated, by moving both the whole unit driving motor 418 and the rear lens group driving motor 421, the position of the lenses can be flexibly controlled, i.e., the position of the lenses has a degree of flexibility.

In theory, during an operation of the zoom operating means 431, the magnification of the finder and the focal length information are only varied without driving the whole unit driving motor 418 or the rear lens group driving motor 421. When the focus operating means 432 is operated, both the whole unit driving motor 418 and the rear lens group driving motor 421 are moved simultaneously according to the focal length information and the subject distance information obtained by the object distance measuring device 433 to move the front lens group L1 and the rear lens group L2 to positions determined according to the focal length and the subject distance information.

Figure 2:
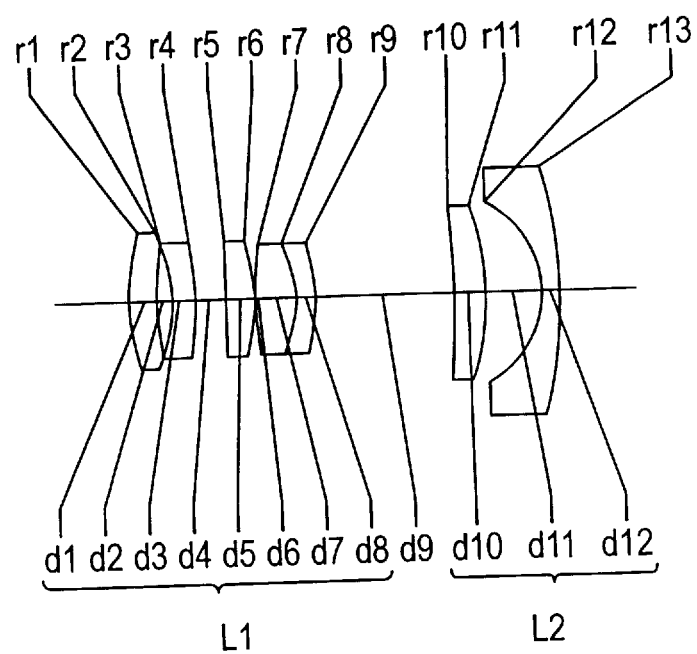
FIG. 2 is a schematic view of a structure of an example of a zoom lens system according to the method of focusing of the present invention.

The following discussion will illustrate several examples of a front lens group L1, a rear lens group L2, and a controlling of movement thereof. Table 1 shows lens data regarding the front lens group L1 and the rear lens group L2, and FIG. 2 is a drawing showing the structure of the lens groups. The lens data only shows a concrete example of the optical system which is applicable to a two-lens group type zoom lens according to the present invention. The front lens group L1 consists of four lens groups having five lens elements, and the rear lens group L2 consists of two lens groups having two lens elements (duplet).

In the following tables and the drawings (FIGS. 3 through 7), FNO represents the F number, f represents the focal length, ω represents the half angle of view, fB represents the back focal distance, ri represents the curvature of radius of each lens surface, di represents the thickness of a lens or the distance between lenses, n represents the refractive index of the d-line, and ν represents the Abbe number.

[TABLE 1]

FNO = 1:3.9–10
F = 39–102 (mm)
χ = 28.4° −12.0°
B = 9.47–63.1 (mm)

| Surface No. | ri | di | n | ν |
|---|---|---|---|---|
| 1 | 20.550 | 2.10 | 1.48749 | 70.2 |
| 2 | 42.627 | 1.65 | — | — |
| 3 | −15.428 | 1.66 | 1.83400 | 37.2 |
| 4 | −30.458 | 3.06 | — | — |
| 5 | 631.122 | 2.80 | 1.51633 | 64.1 |
| 6 | −16.980 | 0.10 | — | — |
| 7 | 91.952 | 3.42 | 1.53996 | 59.5 |
| 8 | −11.244 | 1.60 | 1.80400 | 46.6 |
| 9 | −23.784 | 12.56–2.59 | — | — |
| 10* | −42.469 | 2.50 | 1.58547 | 29.9 |
| 11 | −26.490 | 5.04 | — | — |
| 12 | −10.416 | 1.50 | 1.71299 | 53.9 |
| 13 | −48.829 | — | — | — |

Aspherical Surface Data:

$K = 0.0, A4 = 5.96223 \cdot 10^{-5}, A6 = 2.52645 \cdot 10^{-7}, A8 = 2.89629 \cdot 10^{-9}$

*denotes an aspherical surface having rotational symmetry

The shape of the aspherical surface having rotational symmetry can be generally expressed as follows:

$$x = Ch^2/\{1+[1-(1+K)C^2h^2]^{1/2}\} + A4h^4 + A6h^6 + A8h^8 + A10h^{10} + \ldots$$

wherein, h represents a height above the axis,
X represents a distance from a tangent plane of an aspherical vertex,
C represents a curvature of the aspherical vertex(1/r),
K represents a conic constant,
A4 represents a fourth-order aspherical factor,
A6 represents a sixth-order aspherical factor,
A8 represents an eighth-order aspherical factor,
A10 represents a tenth-order aspherical factor.

Data regarding zooming is shown in Table 2. In Table 2, TL represents the distance from the primary surface to the image surface, $d_{1G-2G}$ represents the distance between the front lens group L1 and the rear lens group L2. The values of TL and $d_{1G-2G}$ represent absolute positions of the first lens group L1 and the second lens group L2 when zooming while keeping the in-focus condition with respect to an object at infinite distance, and the lens positions are realized by a cam mechanism in a conventional zoom compact camera. Specifically, upon setting a focal length by a zoom switch, the first lens group L1 and the second lens group L2 move to positions defined in Table 2 which are determined by the focal length set.

However, according to the zoom lens camera of the present invention, upon setting a focal length by the zoom operating means 431, the first lens group L1 and the second lens group L2 do not move to positions defined in Table 2.

In Table 2, XA (f) represents the total movement distance of the first lens group L1 and the second lens group L2 at a respective focal length by the whole unit moving motor 418 from reference positions thereof. The reference positions (XA(f)=0) are defined by the positions of the lens groups L1 and L2 when the lens groups are located at the shortest focal length (39 mm) while focusing on an object at infinity.

In Table 2, XB(f) represents the total movement distance of the second lens group L2 with respect to the first lens group L1 at a respective focal length by the relative moving motor 421 from a reference position of the rear lens group L2. The reference position (XB(f)=0) is defined as the position of the second lens group L2 when the lens groups L1, L2 are located at the longest focal length (102 mm) while focusing on an object at infinity.

The point is that the movement distances XA(f) and XB(f) are not given just by setting a focal length, but are given when the focus operating means 432 is operated. Note that "0" in XA(f) and XB(f) represents reference positions and does not refer to stand-by positions of the lens groups L1, L2 before the motors 418 and 421 are actuated. In other words, "0" in XA(f) and XB(f) does not mean that the motors 418 and 421 are not driven when the focus operating means is operated. Mechanically, to realize a precise position control of the lens groups, it is preferred that the lens groups are positioned at waiting positions which are represented by negative values (positions moved in directions opposite from the reference position) in Table 2 and are moved to positions shown in Table 2 upon operation of the focus operating means from the waiting positions.

[TABLE 2]

| f | TL | $d_{1G-2G}$ | XA(f) | XB(f) |
|---|---|---|---|---|
| 39 | 47.45 | 12.56 | 0 | 9.97 |
| 45 | 50.36 | 10.44 | 2.91 | 7.85 |
| 70 | 66.66 | 5.42 | 19.21 | 2.83 |
| 95 | 85.56 | 3.05 | 38.11 | 0.46 |
| 102 | 91.11 | 2.59 | 43.66 | 0 |

As described above, in the zoom lens camera according to the present invention, the first lens group L1 and the second lens group L2 move to positions determined by set focal length information and detected object distance information by actuating the motors 418 and 421 using the zoom operating means 431 and the focus operating means 432. Accordingly, it is possible to make zooming control and focusing control without using the cam mechanism by storing lens position data, consisting of a combination of stepped focal length information and stepped object distance information, in a memory, and digitally controlling the motors 418 and 421 in accordance with the stored lens position data. Therefore, how to control the motors 418 and 421 in accordance with the information in combination with the set focal length information and the detected object distance information is not within the scope of the main subject of the present invention. The following discussion illustrates five advantageous examples of how to control the motors 418 and 421 (lens groups L1 and L2). It is possible to selectively employ these controls in accordance with the zoom lens of the present invention.

In the following examples XA represents movement due to the whole unit driving means (whole unit driving motor), XB represents movement due to the relative driving means (rear lens group driving motor), (f) represents the function of the focal length, (u) represents the function of the subject distance, and ΔXA and ΔXB respectively represent movement during focusing due to the whole unit driving means and the relative movement driving means. Namely, XAmax represents the maximum movement during zooming and additional focusing due to the whole unit driving means, XA(f)max represents the maximum movement during zooming due to the whole unit driving means, ΔXF(u) represents the movement based only on subject distance regardless of the focal length, XBmax represents the maximum movement during zooming and additional focusing due to the relative driving means, and XB(f)max represents the maximum movement during zooming due to the relative driving means.

[Example 1]

Figure 3:
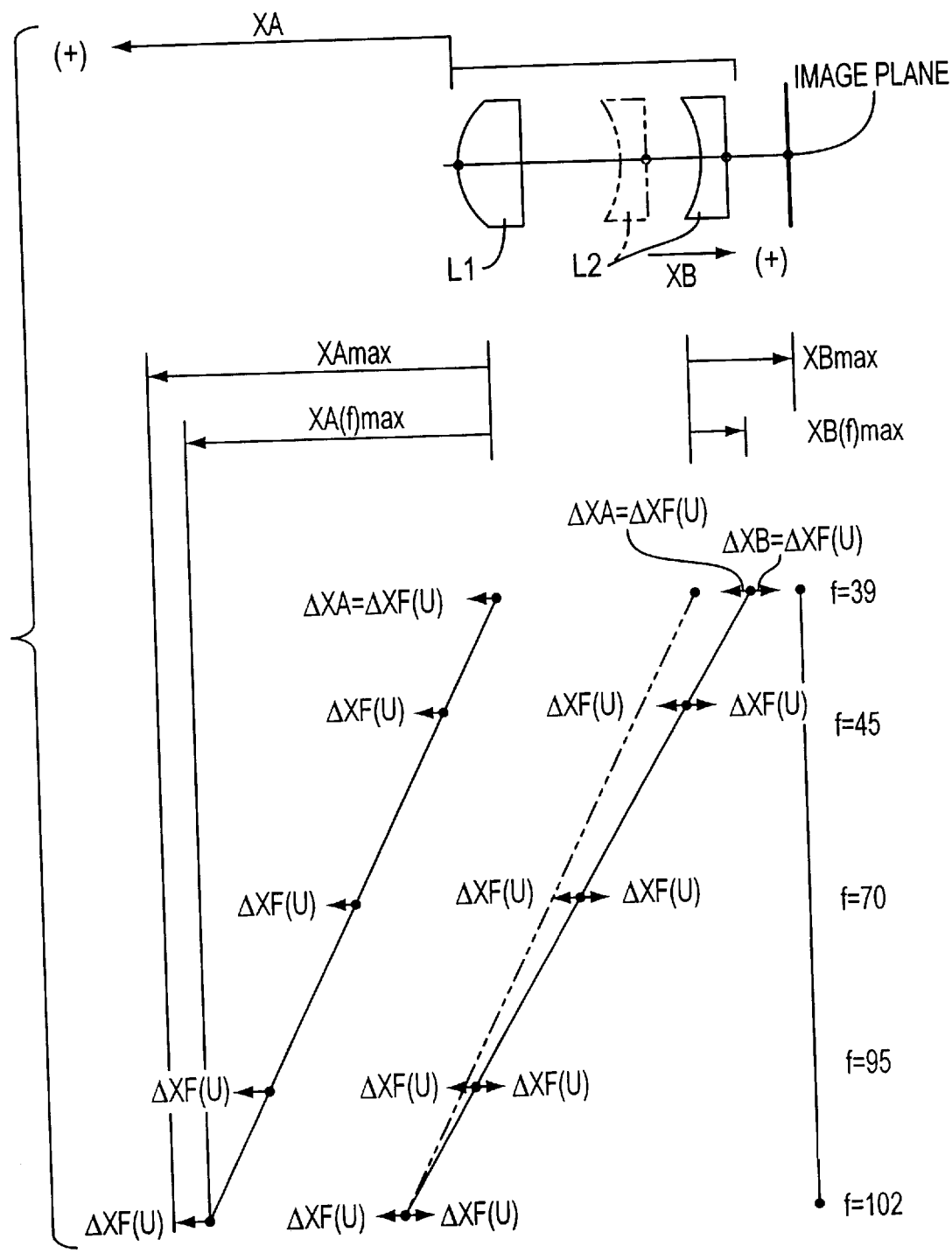
FIG. 3 is a graphic representation of an example of lens movement control according to the method of focusing of the present invention.

FIG. 3 is a first example of a front lens group L1 and a rear lens group L2. In FIGS. 3 through 7, the length of the arrows of ΔXA and ΔXB are exaggeratedly drawn compared with the arrows of XA and XB.

In the present example, throughout the whole focal length range, set by the zoom operating means 431, the total movement XA and the relative movement of the rear lens group XB are given by the following relationships:

$$XA = XA(f) + \Delta XF(u)$$

$$XB = XB(f) + \Delta XF(u)$$

In other words, XA and XB are defined by the addition of a similar quantity of ΔXF(u), without having any relationship to the focal length. When the same amount of ΔXF(u) is added to XA and XB, in regard to the function of the subject distance (u), the distance of the rear lens group L2 from the image surface does not vary. The position of the rear lens group L2 indicated by the broken line (two-dotted) represents its position without an operation of the rear lens group driving motor.

In the present example, if the shortest subject distance u=700 mm, when f=39 mm, then ΔXF(u)=1.17, and as f increases, the value of ΔXF(u) will increase slightly, but when f=102 mm, then ΔXF(u)=1.25 and therefore the amount of increase is very little. Considering the depth of focus, it is possible to control the movement (i.e., the movement of the lenses to the desired position) of the lenses only by the subject distance information, regardless of the focal length information from the zoom operation means 431.

In the present example, the following relationships are given:

$$XAmax = XA(f)max + \Delta XF(u)max$$

$$XBmax = XB(f)max + \Delta XF(u)max$$

[Example 2]

Figure 4:
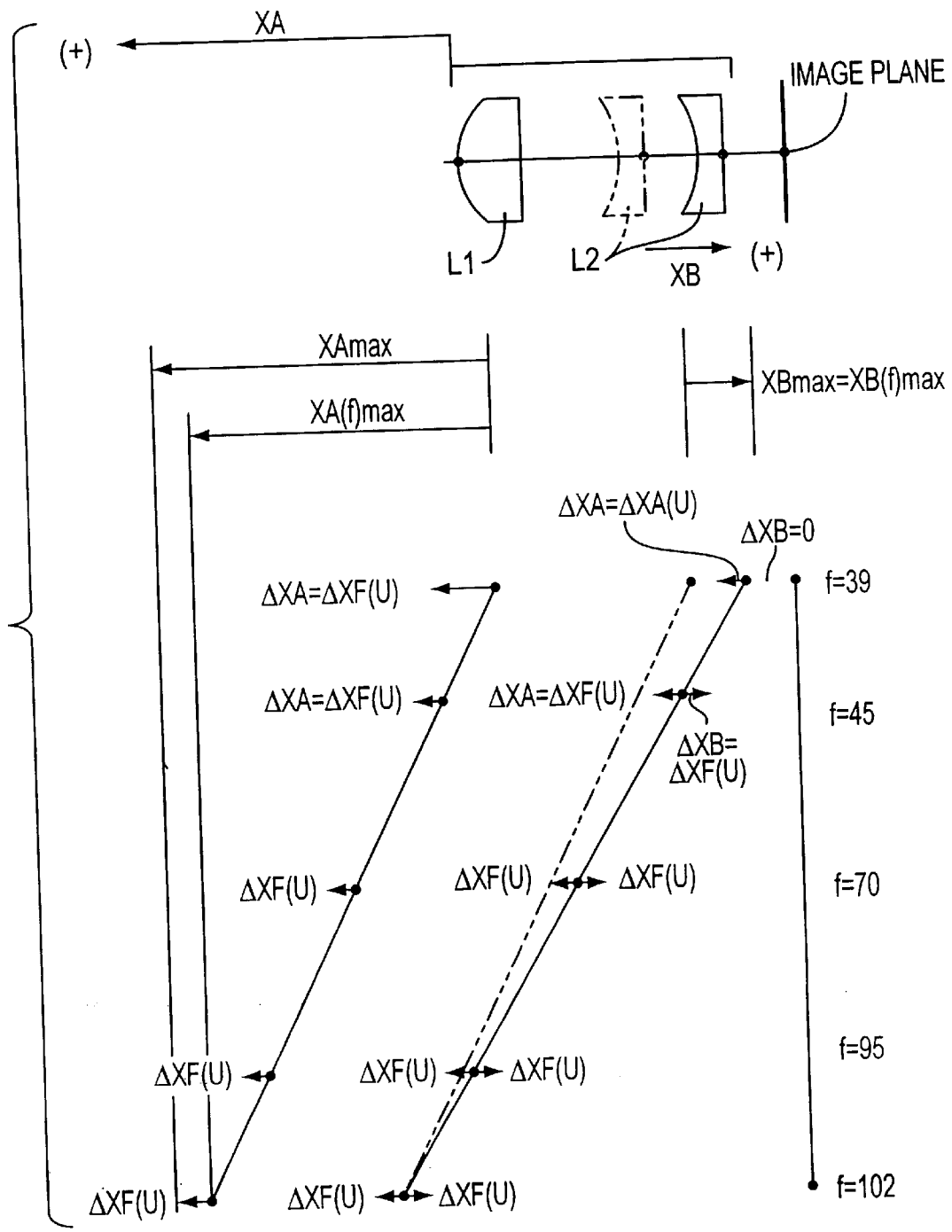
FIG. 4 is a graphic representation of another example of lens movement control according to the method of focusing of the present invention.

FIG. 4 shows a second example of a front lens group L1 and a rear lens group L2.

In the present example, around the short focal length end, set by the zoom operating means 431, the following relationships are defined:

$$XA = XA(f) + \Delta XA(u)$$

$$XB = XB(f) + 0 \text{ (i.e., regarding subject distance, the rear lens group L2 should not move relative to the front lens group L1)}$$

At other focal lengths, the following relationships are defined:

$$XA = XA(f) + \Delta XF(u)$$

$$XB = XB(f) + \Delta XF(u)$$

In the present example, if the shortest subject distance u=700 mm, when f=39 mm, then ΔXA(u)=1.72. Regarding other focal lengths, the values of ΔXF(u) are approximately determined as follows:

when f=45 mm, then ΔXF(u)=1.17;
when f=70 mm, then ΔXF(u)=1.20;
when f=95 mm, then ΔXF(u)=1.24; and,
when f=102 mm, then ΔXF(u)=1.25.

Therefore, at focal lengths other than around the short focal length end, it is possible to control the position of the lenses only by the subject distance information, regardless of the focal length information.

In the present example, the following relationships are defined:

$$XAmax=XA(f)max+\Delta XF(u)max$$

$$XBmax=XB(f)max$$

Therefore, the relative movement of the rear lens group can be minimized. In this example, XB(f)max is less than XB(f)max in Example 1.

[Example 3]

Figure 5:
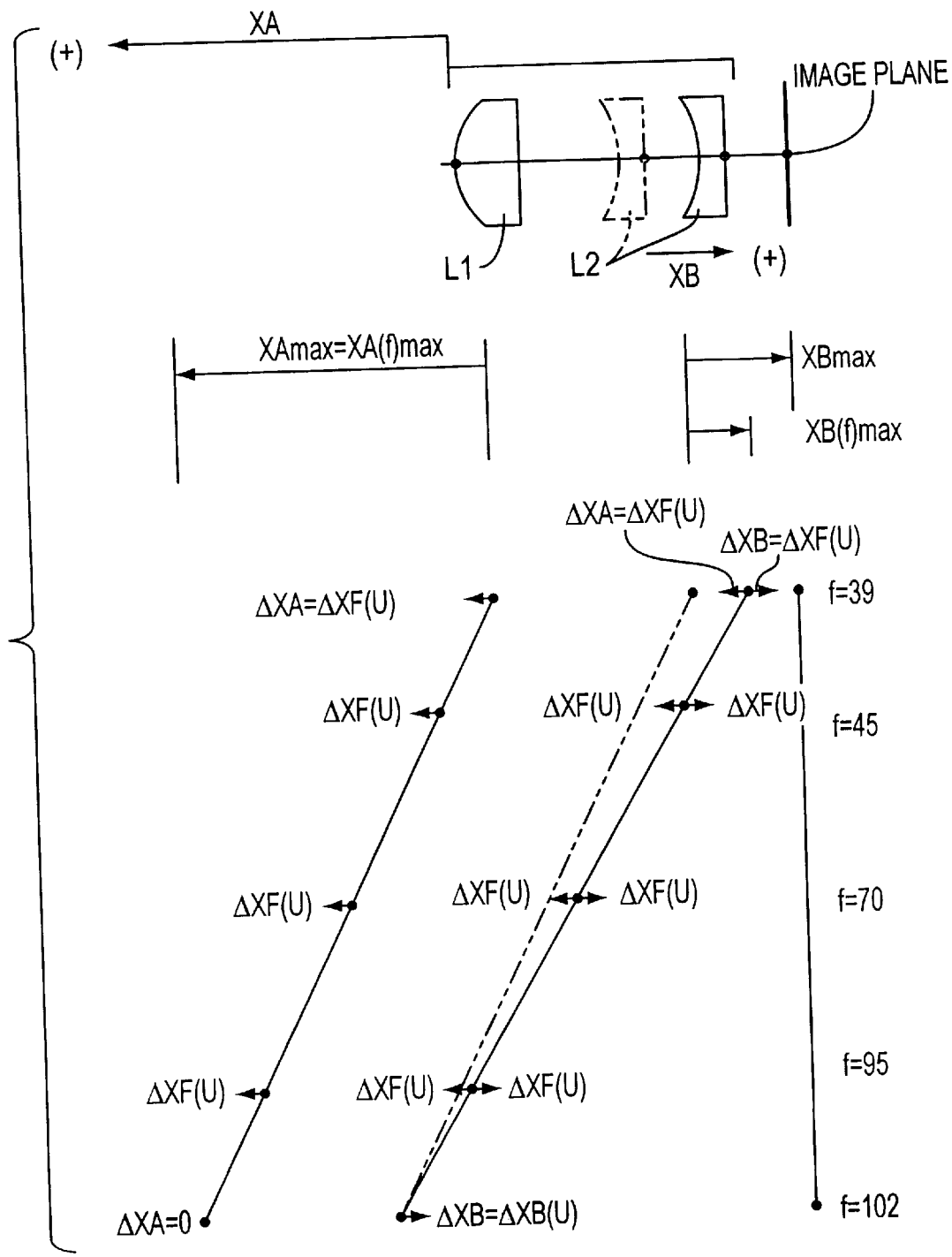
FIG. 5 is a graphic representation of another example of lens movement control according to the method of focusing of the present invention.

FIG. 5 shows a third example of a front lens group L1 and a rear lens group L2.

In the present example, around the long focal length end, set by the zoom operating means 431, the following relationships are defined:

$$XA=XA(f)+0 \text{ (i.e., regarding subject distance, the front lens group L1 should not move)}$$

$$XB=XB(f)+\Delta XB(u)$$

At other focal lengths, the following relationships are defined:

$$XA=XA(f)+\Delta XF(u)$$

$$XB=XB(f)+\Delta XF(u)$$

In the present example, if the shortest subject distance u=700 mm, the values of ΔXF(u) are approximately determined as follows:

when f=39 mm, then ΔXF(u)=1.17;
when f=45 mm, then ΔXF(u)=1.17;
when f=70 mm, then ΔXF(u)=1.20; and,
when f=95 mm, then ΔXF(u)=1.24.
However, when f=102 mm, then ΔXB(u)=1.35.

Therefore, at focal lengths other than around the long focal length end, it is possible to control the position of the lenses only by the subject distance information, regardless of the focal length information.

In the present example, the following relationships are defined:

$$XAmax=XA(f)max$$

$$XBmax=XB(f)max+\Delta XB(u)max$$

Therefore, the total movement by the whole unit driving motor is minimized.

[Example 4]

Figure 6:
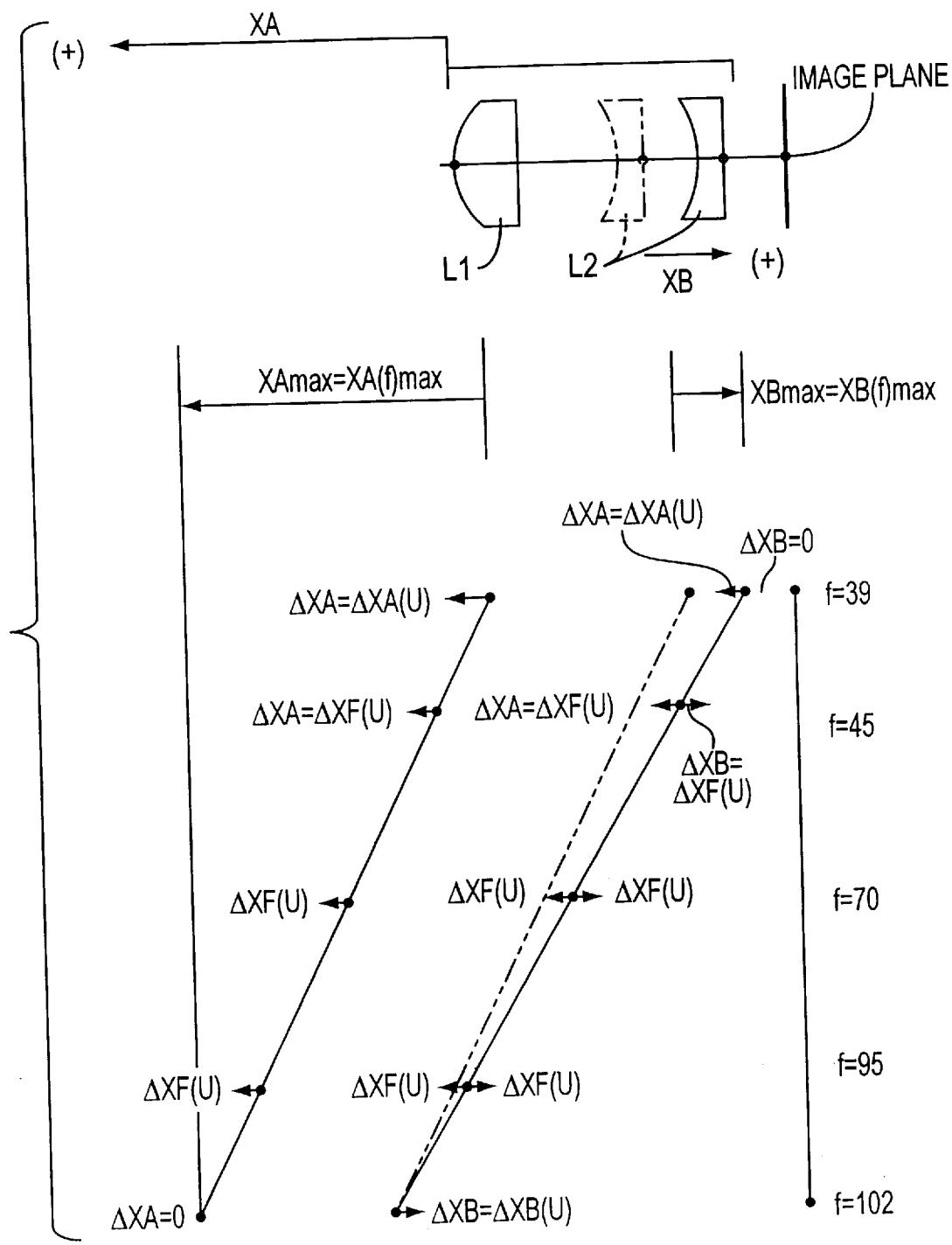
FIG. 6 is a graphic representation of another example of lens movement control according to the method of focusing of the present invention.

FIG. 6 shows a fourth example of a front lens group L1 and a rear lens group L2.

In the present example, around the short focal length end, set by the zoom operating means 431, the following relationships are defined:

$$XA=XA(f)+\Delta XA(u)$$

$$XB=XB(f)+0 \text{ (i.e., regarding subject distance, the rear lens group L2 should not move relative to the front lens group L1)}$$

Around the long focal length end, set by the zoom operating means 431, the following relationships are defined:

$$XA=XA(f)+0 \text{ (i.e., regarding subject distance, the front lens group L1 should not move)}$$

$$XB=XB(f)+\Delta XB(u)$$

And at other focal lengths, the following relationships are defined:

$$XA=XA(f)+\Delta XF(u)$$

$$XB=XB(f)+\Delta XF(u)$$

In the present example, if the shortest subject distance u=700 mm, the position of the lenses, other than at around the short or long focal length ends, are approximately determined as follows:

when f=39 mm, then ΔXA(u)=1.72;
when f=45 mm, then ΔXF(u)=1.17;
when f=70 mm, then ΔXF(u)=1.20;
when f=95 mm, then ΔXF(u)=1.24; and,
when f=102 mm, then ΔXB(u)=1.35.

Therefore, at focal lengths other than around the short or long focal length ends, it is possible to control the position of the lenses only by the subject distance information, regardless of the focal length information.

In the present example, the following relationships are defined:

$$XAmax=XA(f)max$$

$$XBmax=XB(f)max$$

Therefore, the movement of both lens groups is minimized, as well as the relative movement of the rear lens group.

[Example 5]

Figure 7:
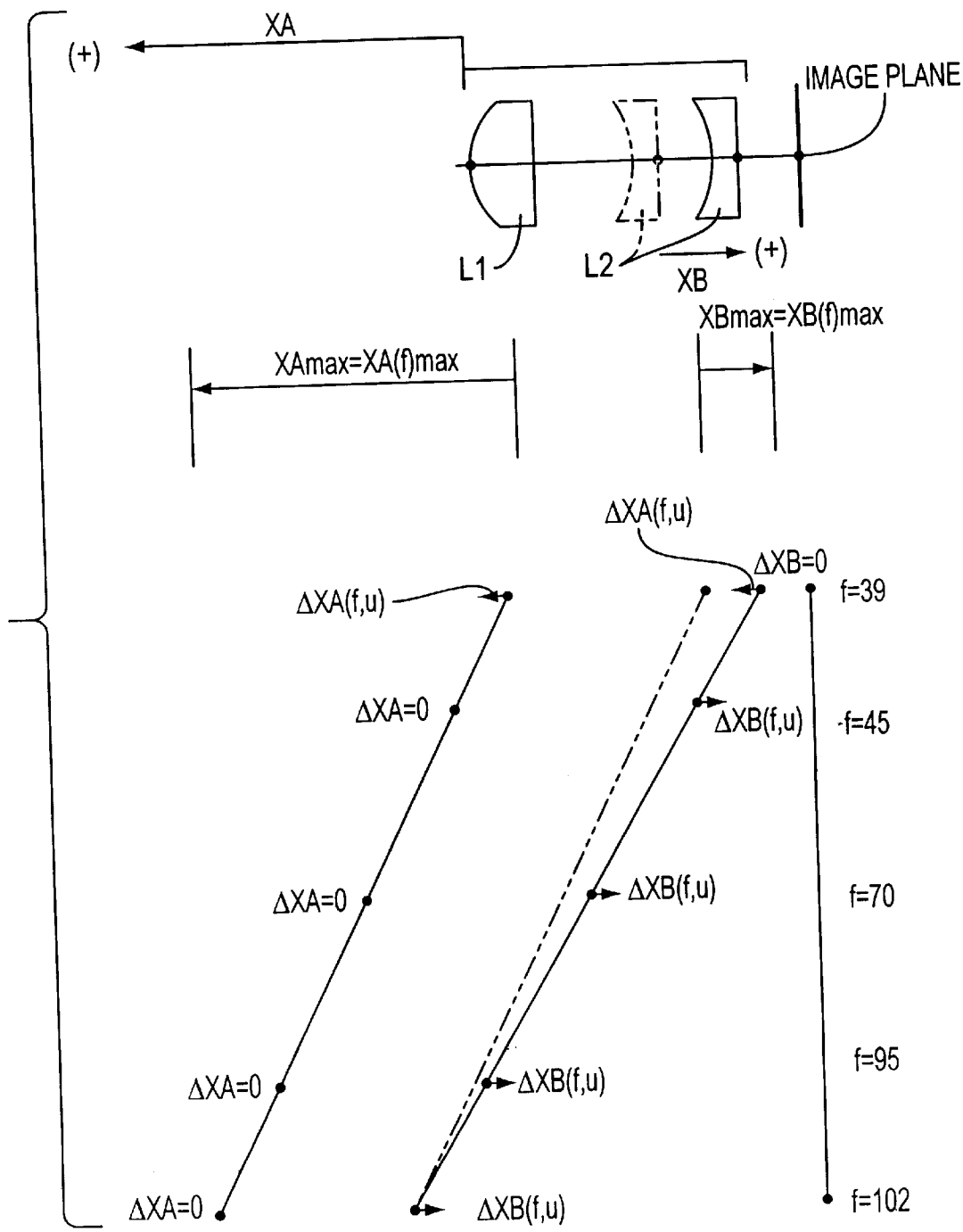
FIG. 7 is a graphic representation of another example of lens movement control according to the method of focusing of the present invention.

FIG. 7 shows a fifth example of a front lens group L1 and a rear lens group L2.

In the present example, around the short focal length end, set by the zoom operating means 431, the following relationships are defined:

$$XA=XA(f)+\Delta XA(u)$$

$$XB=XB(f)+0 \text{ (i.e., regarding subject distance, the rear lens group L2 should not move against the front lens group L1)}$$

At other focal lengths, the following relationships are defined:

$$XA=XA(f)+0 \text{ (i.e., regarding subject distance, the front lens group}$$

L1 should not move)

$$XB = XB(f) + \Delta XB(f,u)$$

In the present example, if the shortest subject distance u=700 mm, the position of the lenses around the long focal length end is approximately determined as follows:

when f=39 mm, then ΔXA(u)=1.72;

when f=45 mm, then ΔXF(u)=1.90;

when f=70 mm, then ΔXF(u)=1.42;

when f=95 mm, then ΔXF(u)=1.35; and, when f=102 mm, then ΔXB(u)=1.35.

Therefore, at the short focal length end, it is possible to control the position of the lenses only by the subject distance information, and at other focal lengths it is possible to control the position of the lenses by the focal length information and the subject distance information.

In the present example, the following relationships are defined:

$$XAmax = XA(f)max$$

$$XBmax = XB(f)max$$

Therefore, the movement of both lens groups is minimized, as well as the relative movement of the rear lens group. The position of the lenses, however, may differ according to the focal length.

The mechanical structure of the zoom lens shown in FIG. 1 illustrates a simple example thereof. Various mechanical structures may actually be made, and thus the present invention shall not refer to the mechanical structure itself.

As above described, according to the method of focusing the zoom lens camera in the present invention, when the focus operating means is operated, focusing is performed in such a manner, the whole unit driving means which drives the front and the rear lens group as a whole, and the relative driving means which varies the distance between the front lens group and the rear lens group, move together, and thereby flexible control of the lens position will be facilitated.

To realize the zoom lens and the method of lens driving shown in FIGS. 2 through 7, several embodiments of the present invention will now be described with reference to FIGS. 8 to 23.

Figure 26:
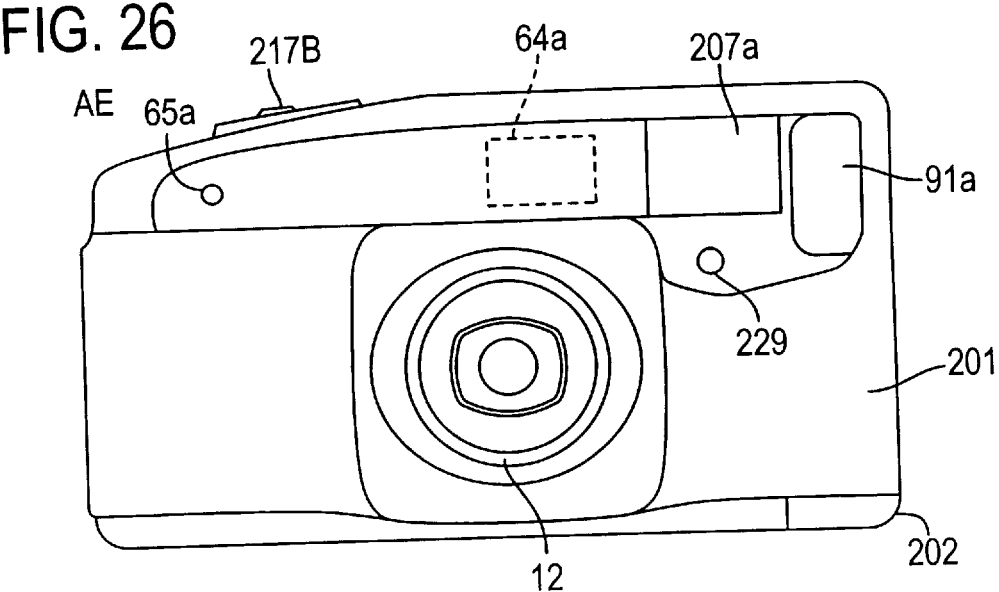
FIG. 26 is a front elevational view of an example of an embodiment of a zoom lens camera according to the present invention.

The following embodiments of the present invention are applied to a lens shutter type of zoom lens camera, as shown in FIG. 26. The concept of the present zoom lens camera will now be described with reference to FIG. 20.

Figure 20:
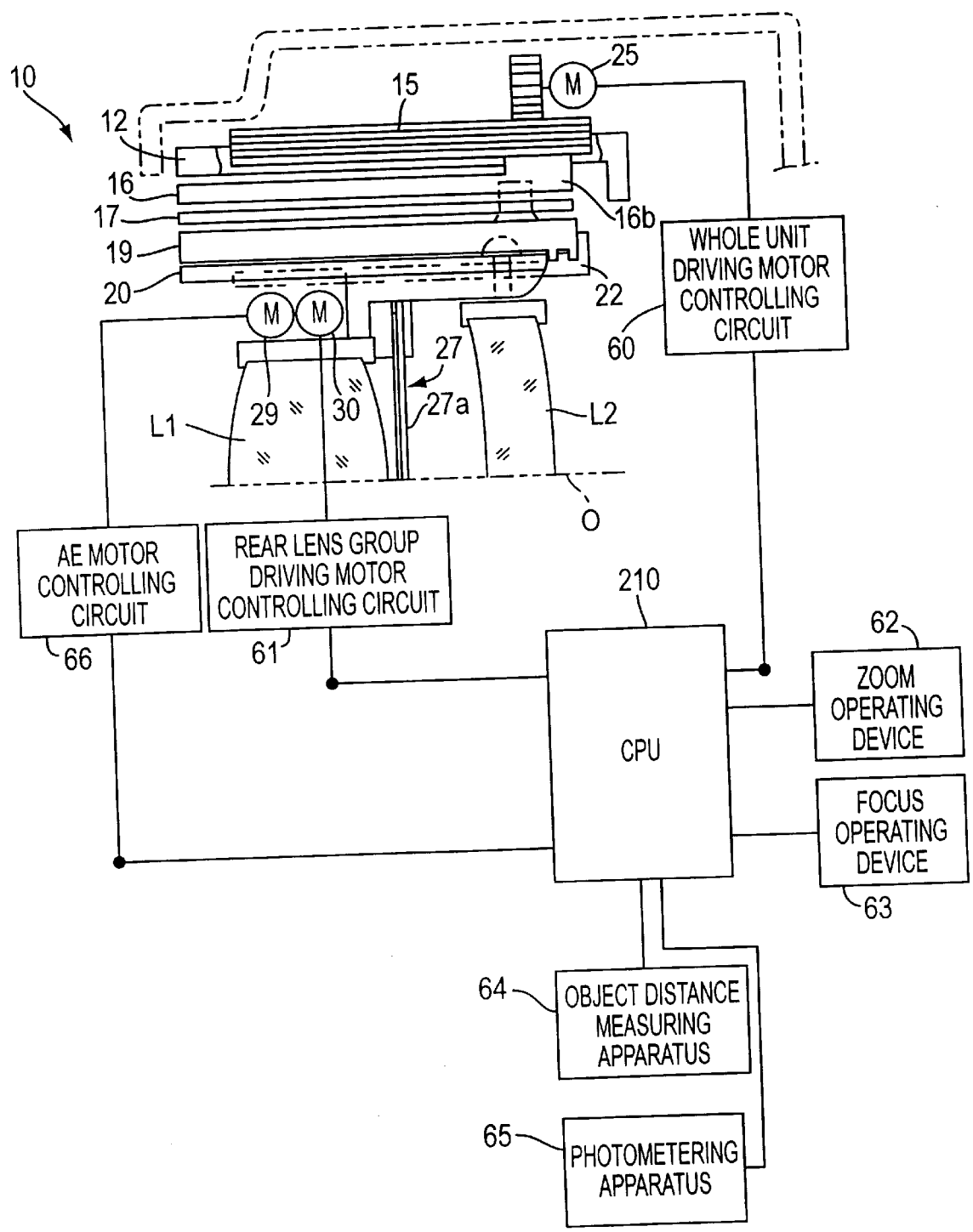
FIG. 20 is a block diagram of a controlling system to control an operation of the zoom lens barrel of the present invention.

FIG. 20 shows a zoom lens barrel 10, provided in the present zoom lens camera, of a three-stage delivery type having three moving barrels, namely a first moving barrel 20, a second moving barrel 19 and a third moving barrel 16. Two lens groups are provided, namely a front lens group L1 having positive power and a rear lens group L2 having negative power.

In the main body of the camera, a whole unit driving motor controlling means 60, a rear lens group driving motor controlling means 61, a zoom operating means 62, a focus operating means 63, a object distance measuring apparatus 64, a photometering system 65, an AE (i.e., automatic exposure) motor controlling means 66, and a CPU (i.e., central processing unit) 210, are provided. The CPU 210 controls the above means or apparatus. Although the specific object distance measuring apparatus 64 which is used to provide information regarding the object-to-camera distance does not form part of the present invention, one such suitable system is disclosed in commonly assigned U.S. patent application Ser. No. 08/605,759, filed on Feb. 22, 1996, the entire disclosure of which is expressly incorporated by reference herein. Although the systems disclosed in such application are of the so-called "passive" type, other known autofocus systems (e.g., active rangefinding systems such as those based on infrared light and triangulation) may be used. Similarly, a photometering system as disclosed in the noted U.S. patent application Ser. No. 08/605,579 could be implemented as photometering system 65.

Figure 28:
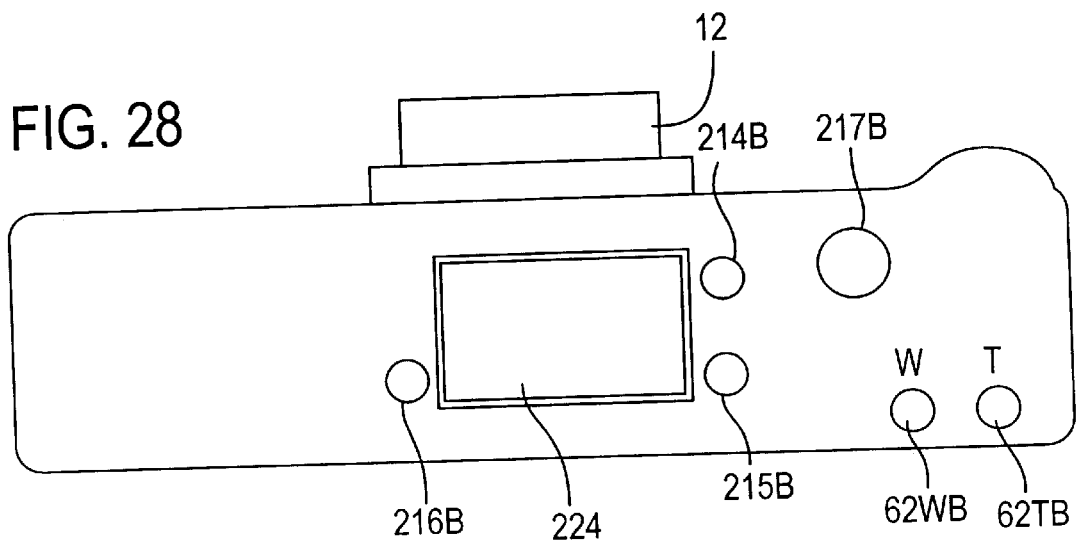
FIG. 28 is a plan view of the zoom lens camera shown in FIG. 26.

When the zoom operating means 62, for example in the form of a zoom lever provided on the camera body (i.e., a "wide" zoom button 62WB and a "tele" zoom button 62TB, as shown in FIG. 28), is operated, the CPU 210 outputs commands to the whole unit driving motor controlling means 60 to move the front lens group L1 and the rear lens group L2, rearwardly or forwardly without consideration of the focal length and a focal point thereof.

In the following explanation, forward and rearward movements of the lenses L1 and L2 by the whole unit driving motor control means 60 (the motor 25) are referred to as the movement toward "tele" and the movement toward "wide", respectively, since forward and rearward movements of the lenses L1 and L2 occur when the zoom operating means 62 is operated to "tele" and "wide" positions.

The image magnification of the visual field of the finder 427 (FIG. 1), varies sequentially to the variation of the focal length through the operation of the zoom operating means 62. Therefore, the photographer may perceive the variation of the set focal length through the operation of the zoom operating means 62, by observing the variation of image magnification of the visual field of the finder. In addition, the focal length, as set by the operation of the zoom operating means 62, may be indicated by a value displayed on an LCD (i.e., liquid crystal display) panel 224, as shown in FIG. 28.

When the focus operating means 63 is operated, the CPU 210 drives the whole unit driving motor 25, driven via the whole unit driving motor controlling means 60, and additionally drives a rear lens group driving motor 30, driven via the rear lens group driving motor controlling means 61, so that the front and rear lens groups L1 and L2 are moved to a position corresponding to a set focal length and a detected object distance, and whereby the zoom lens is focused on the subject.

Specifically, the shutter release means 63 is provided with a release button 217B. A photometering switch SWS and a release switch SWB are synchronized with the release button 217B. When the release button 217B is half-depressed (half step), through the CPU 210, the photometering switch SWS is turned ON, and the respective object distance measuring and photometering commands are input to the object distance measuring apparatus 64 and the photometering apparatus 65.

When the release button 217B is fully depressed (full step), the CPU 210 causes the release switch SWR to be turned ON, and according to the result of the object distance measuring device and a set focal length, the whole unit driving motor 25 and the rear lens group driving motor 30 are driven. Thus, the focusing process, in which the front lens group L1 and the rear lens group L2 move to the focusing position, is executed. Further, an AE motor 29 of an AF/AE (i.e., autofocus/autoexposure) shutter unit 21 (FIG. 21) is driven via the AE motor controlling means 66, and a shutter 27 is actuated. During the shutter action, upon the input of the photometering information output from the photometering apparatus 65, the CPU 210 drives the AE motor 29 and opens shutter blades 27a of the shutter 27 for a specified period of time. In the zoom lens camera of the present embodiment, immediately after the shutter blades 27a are closed, by driving the rear lens group driving motor 30, the rear lens group L2 moves forwardly to the initial position thereof. The shutter release means 63, though not shown, includes switching means to execute the focusing process by the CPU 210.

When the zoom operating means 62 is operated, the CPU 210 drives the whole unit driving motor 25, and the front lens group L1 and the rear lens group L2 move together as a whole in the optical axis direction. Simultaneous with such a movement, the rear lens group driving motor 30 may also be driven via the rear lens group driving motor controlling means 61. However, this operation is not performed under the conventional concept of zooming in which the focal length is varied sequentially without moving the position of the focal point.

Motors 29 and 30 are identical, and comprise DC motors having a minimum torque of 1.5 gram*cm at a rated voltage (i.e., 1.5 V); motor 25 comprises a DC motor which has a minimum torque of 12.0 gram*cm. at a rated voltage (i.e., 2.4 V). One example of motors 29 and 30 are motors manufactured by Sanyo Seimitsu Co., Ltd. of Japan, under motor code No. M-01166600; and an example of motor 25 is a motor which is also manufactured by Sanyo Seimitsu Co., Ltd. of Japan, under motor code No. M-01154200.

An example of the embodiment of the zoom lens barrel according to the above concept will now be described with reference to FIGS. 18 and 19.

The overall structure of the zoom lens barrel 10 in the present invention will firstly be described.

The zoom lens barrel 10 is provided with the first moving barrel 20, the second moving barrel 19, the third moving barrel 16, and a fixed lens barrel block 12. The third moving barrel 16 is engaged with a cylindrical part of the fixed lens barrel block 12, and moves in the optical axis direction upon being rotated. The third moving barrel 16 is provided on an inner periphery thereof with a linear guide barrel 17, which is restricted in rotation. The linear guide barrel 17 and the third moving barrel 16 move together as a whole in the optical axis direction, with the third moving barrel 16 rotating relative to the linear guide barrel 17. The first moving barrel 20 moves in the optical axis direction with rotation thereof being restricted. The second moving barrel 19 moves in the optical axis direction, while rotating relative to the linear guide barrel 17 and the first moving barrel 20. The whole unit driving motor 25 is secured to the fixed lens barrel block 12. A shutter mounting stage 40, on which the AE motor 29 and the rear lens group driving motor 30 are mounted, is secured to the first moving barrel 20. The front lens group L1 and the rear lens group L2 are respectively supported by a lens supporting barrel 34 and a lens supporting barrel 50.

On the inner periphery of the fixed lens barrel block 12, a female helicoid 12a, and a plurality of linear guide grooves 12b formed parallel to an optical axis O, are provided. An aperture plate 14 having an aperture 14a which defines a portion of the film to be exposed, is provided, as shown in FIG. 18.

Figure 14:
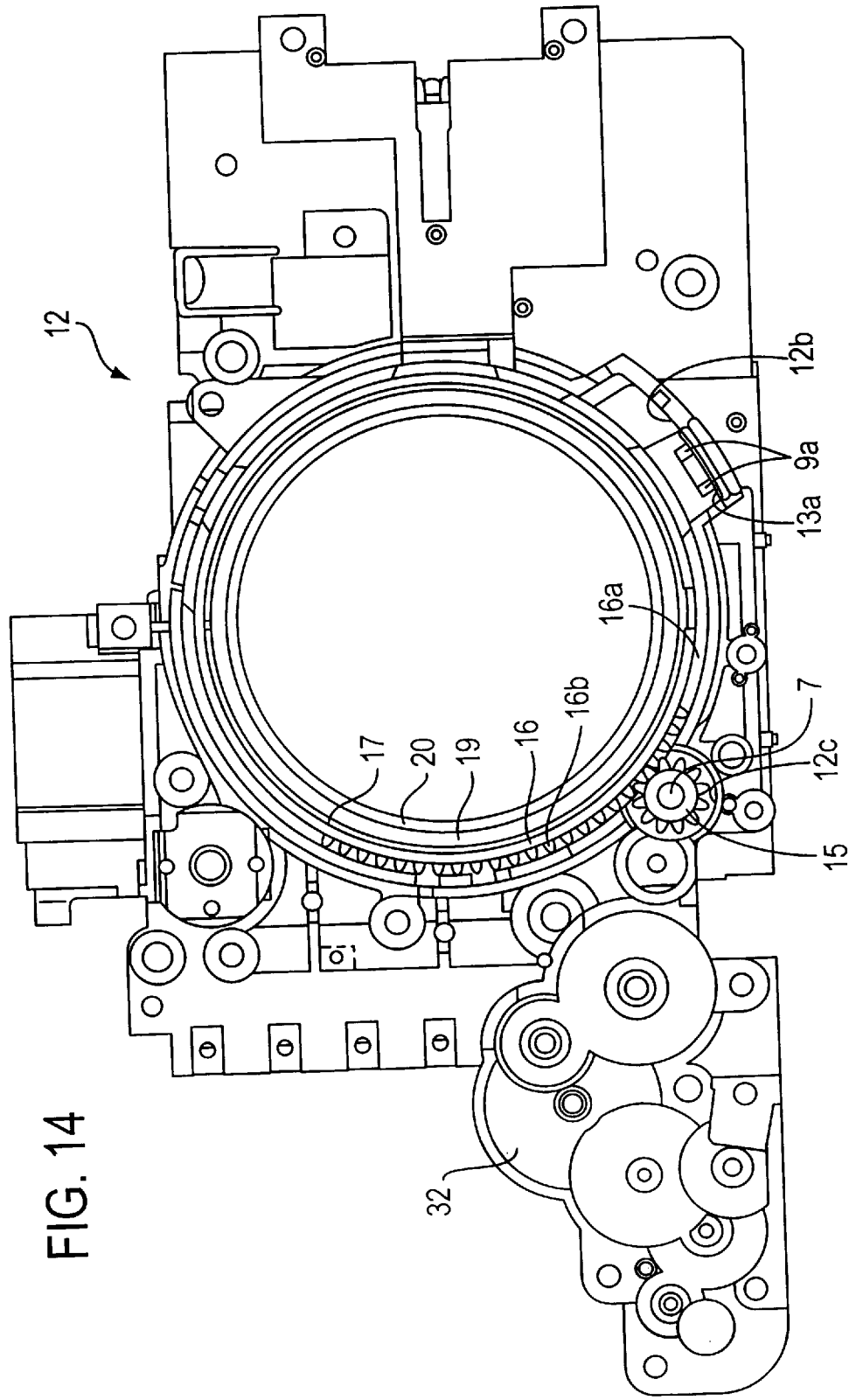
FIG. 14 is a front elevational view of a fixed lens barrel block of the zoom lens barrel of the present invention.

In the fixed lens barrel block 12, a gear housing 12c, expanding in the radial direction, and extending in the optical axis direction, is provided as shown in FIG. 14. In the gear housing 12c, a driving pinion 15, extending in the optical axis direction, is rotatively held. The ends of a shaft 7 of the driving pinion 15 are rotatively supported, by a supporting hollow 4 provided in the fixed lens barrel block 12, and by a supporting hollow 31a provided on a gear supporting plate 31, respectively. The teeth of the driving pinion 15 project into the inner periphery of the fixed lens barrel block 12.

At the bottom part of one of the linear guide grooves 12b, namely 12b', the code plate 13a having a predetermined pattern is fixed, as shown in FIG. 14. The linear guide groove 12b' is provided so that it may be positioned at an approximate diagonal position of the photographing plane in regard to the fixed lens barrel block 12. The code plate 13a is provided along substantially the whole of the length of the fixed lens barrel block 12 (i.e., in the optical axis direction). The code plate 13a is part of a flexible printed circuit board 13 positioned outside the fixed lens barrel block 12. On the flexible printed circuit board 13, a photointerrupter 1 is secured, which in combination with a rotating plate 2 comprises an encoder for detecting a rotation of the whole unit driving motor 25. The rotating plate 2 is fixed on a shaft of the whole unit driving motor 25 as shown in FIG. 19.

Figure 13:
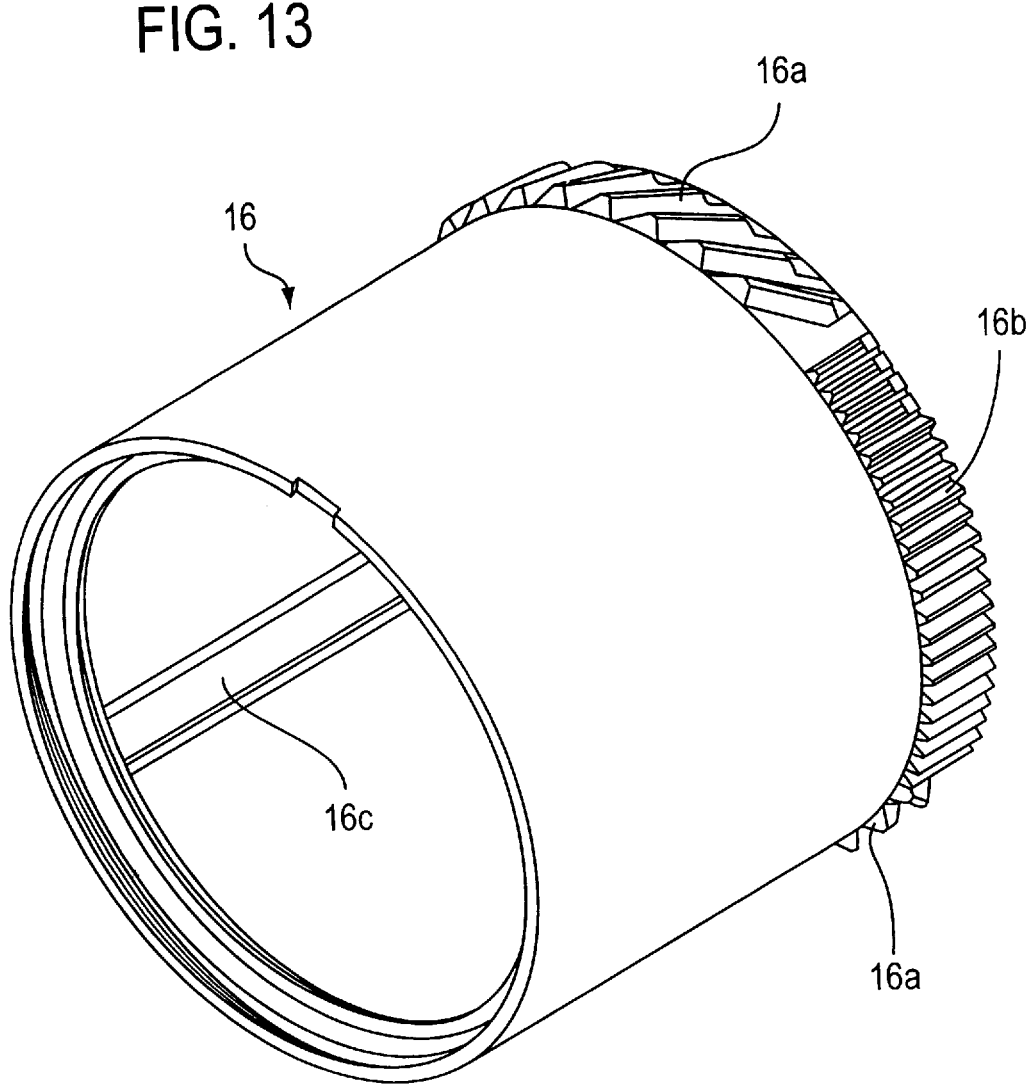
FIG. 13 is a schematic perspective view of an outline of a third moving barrel of the zoom lens barrel of the present invention.

On an inner periphery of the third moving barrel 16, a plurality of linear guide grooves 16c, formed parallel to the optical axis, are provided. At an outer periphery of the rear end of the third moving barrel 16, a male helicoid 16a, which engages with the female helicoid 12a of the fixed lens barrel block 12, and an outer peripheral gear 16b, which engages with the driving pinion 15, are provided as shown in FIG. 13. The driving pinion 15 has an axial length sufficient to be capable of engaging with the outer peripheral gear 16b throughout the entire range of movement of the third moving barrel 16 in the optical axis direction.

The linear guide barrel 17 is provided, on a rear part of an outer periphery thereof, with a rear end flange 17d. The rear end flange 17d has a plurality of engaging projections 17c projecting away from the optical axis in the radial direction. An anti-dropping flange 17e is provided just in front of the rear end flange 17d. The anti-dropping flange 17e has a radius smaller than the rear end flange 17d. In the circumferential direction of the anti-dropping flange 17e, a plurality of notches 17f are formed. On an inner periphery of the rear end of the third moving barrel 16, a plurality of engaging projections 16d, projecting towards the optical axis in a radial direction are provided, as shown in FIG. 18. By inserting the engaging projections 16d into the notches 17f, the engaging projections 16d are positioned between the flanges 17d and 17e, and by the relative rotation of the linear guide barrel 17, the engaging projections 16d are engaged with the linear guide barrel 17. On the rear end surface of the linear guide barrel 17, an aperture plate 23 having an aperture 23a approximately the same shape as the aperture 14a, is fixed.

The relative rotation of the linear guide barrel 17, with respect to the fixed lens barrel block 12, is restricted by the slidable engagement of the plurality of engaging projections 17c with the corresponding linear guide grooves 12b, formed parallel to the optical axis O. One of the engaging projections 17c, namely 17c' (a linear guide key), is fixed to a contact terminal, i.e., a brush 9, which is in slidable contact with the code plate 13a, fixed to the bottom of the linear guide groove 12b', to generate signals corresponding to focal length information during zooming. The engaging projection 17c' is positioned approximately diagonal to the photographing plane.

Figure 103:
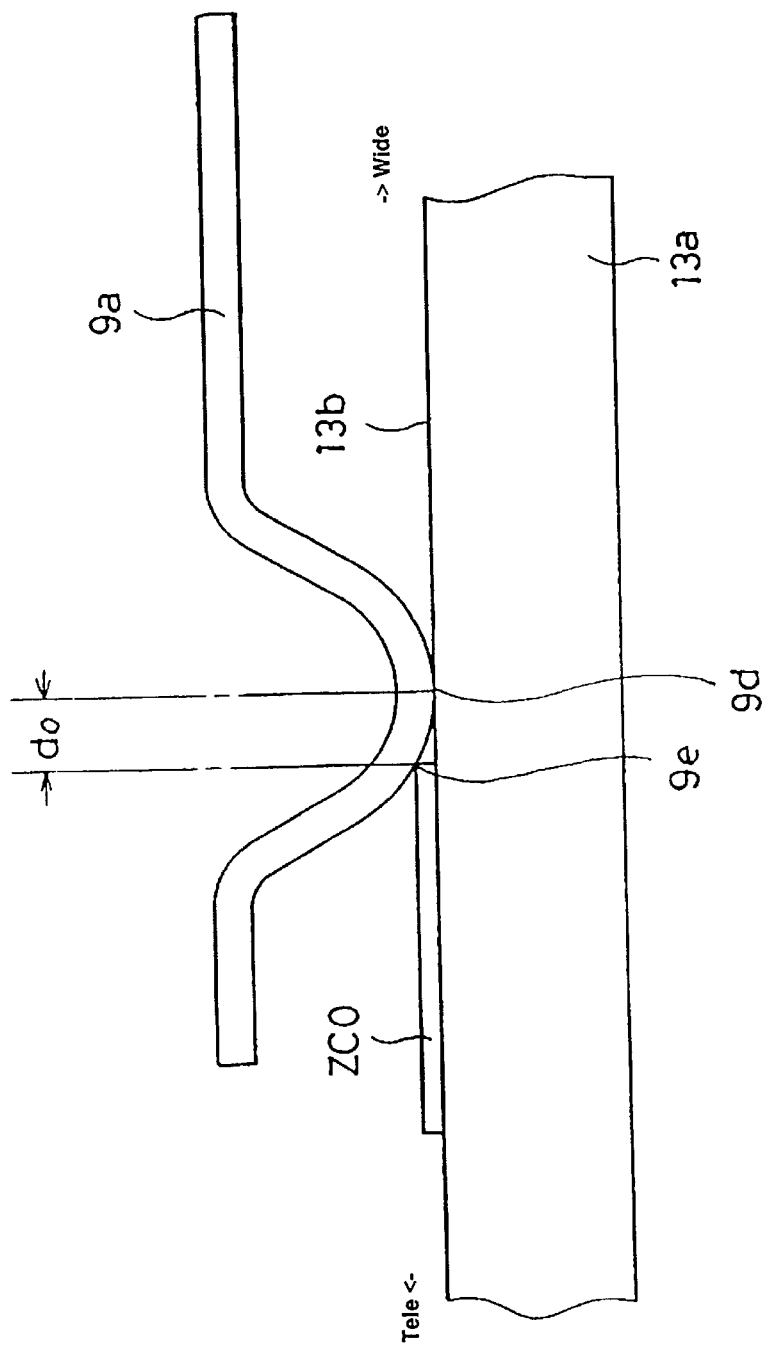
FIG. 103 is an enlarged side view illustrating a relationship between the zoom code and the brushes.

The contacting terminal 9 is provided with a pair of brushes (electric armatures) 9a, which are approximately perpendicular to a fixing part 9b and in slidable contact with the code plate 13a, and a pair of positioning holes 9d (see FIG. 103). The pair of brushes 9a are electrically continuous with each other via the fixing part 9b.

Figure 30:
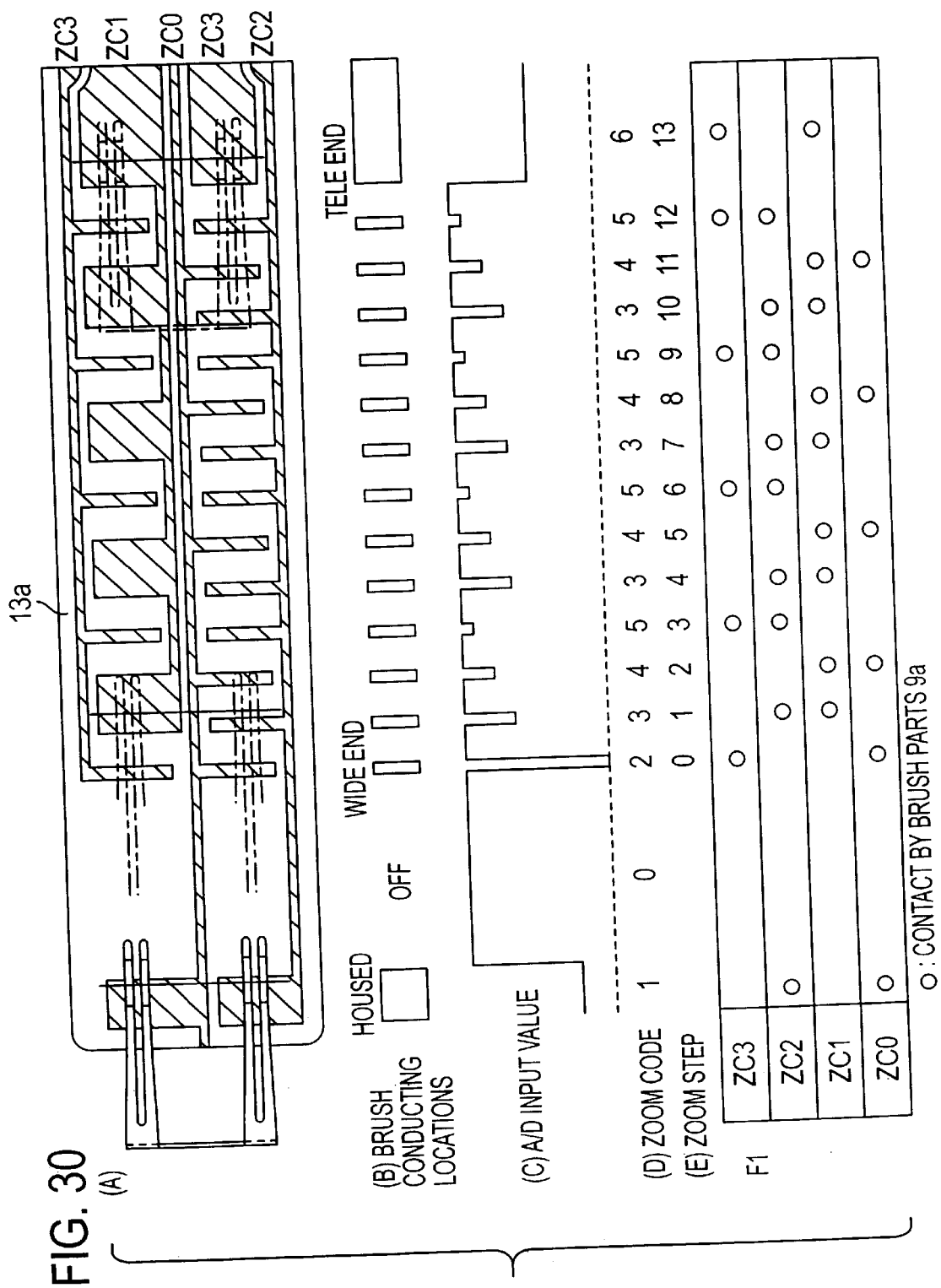
FIG. 30 is a schematic view of a structure of a zoom code plate and brushes, and a structure of detection of a position of a zoom code in contact with the brushes, as a detecting device to detect a position of the lenses of the zoom lens camera of the present invention.

As illustrated in FIG. 30, on the code plate 13a, four types of electrode patterns ZC0, ZC1, ZC2 and ZC3 are provided aligned in a direction perpendicular to the longitudinal direction of the code plate 13a. The electrode patterns ZC0, ZC1, ZC2 and ZC3 form a predetermined pattern in combination, so that a predetermined signal (i.e., voltage) may be output, when the pair of brushes 9a slide along the longitudinal direction of the code plate 13a, conducting through the electrode patterns ZC0, ZC1, ZC2 and ZC3 designated in advance corresponding to the slide position.

On the inner periphery of the linear guide barrel 17 a plurality of linear guide grooves 17a are formed parallel to the optical axis O. A plurality of lead grooves 17b are formed on the linear guide barrel 17 to extend through, and pass through, the peripheral wall of the linear guide barrel 17. The lead grooves 17b are formed oblique (inclined) to the optical axis.

The second moving barrel 19 engages with the inner periphery of the linear guide barrel 17. On the inner periphery of the second moving barrel 19, a plurality of lead grooves 19c are provided in a direction inclined oppositely to the lead grooves 17b. On the outer periphery of the rear end of the second moving barrel 19 a plurality of follower projections 19a, having a trapezoidal cross-sectional shape projecting away from the optical axis in a radial direction, are provided. Follower pins 18 are positioned in the follower projections 19a. Each follower pin 18 consists of a ring member 18a, and a center fixing screw 18b which supports the ring member 18a in the follower projection 19a. The follower projections 19a are in slidable engagement with the lead grooves 17b of the linear guide barrel 17, and the follower pins 18 are in slidable engagement with the linear guide grooves 16c of the third moving barrel 16. With such an arrangement, when the third moving barrel 16 rotates, the second moving barrel 19 moves linearly in the optical axis direction, while rotating.

Figure 8:
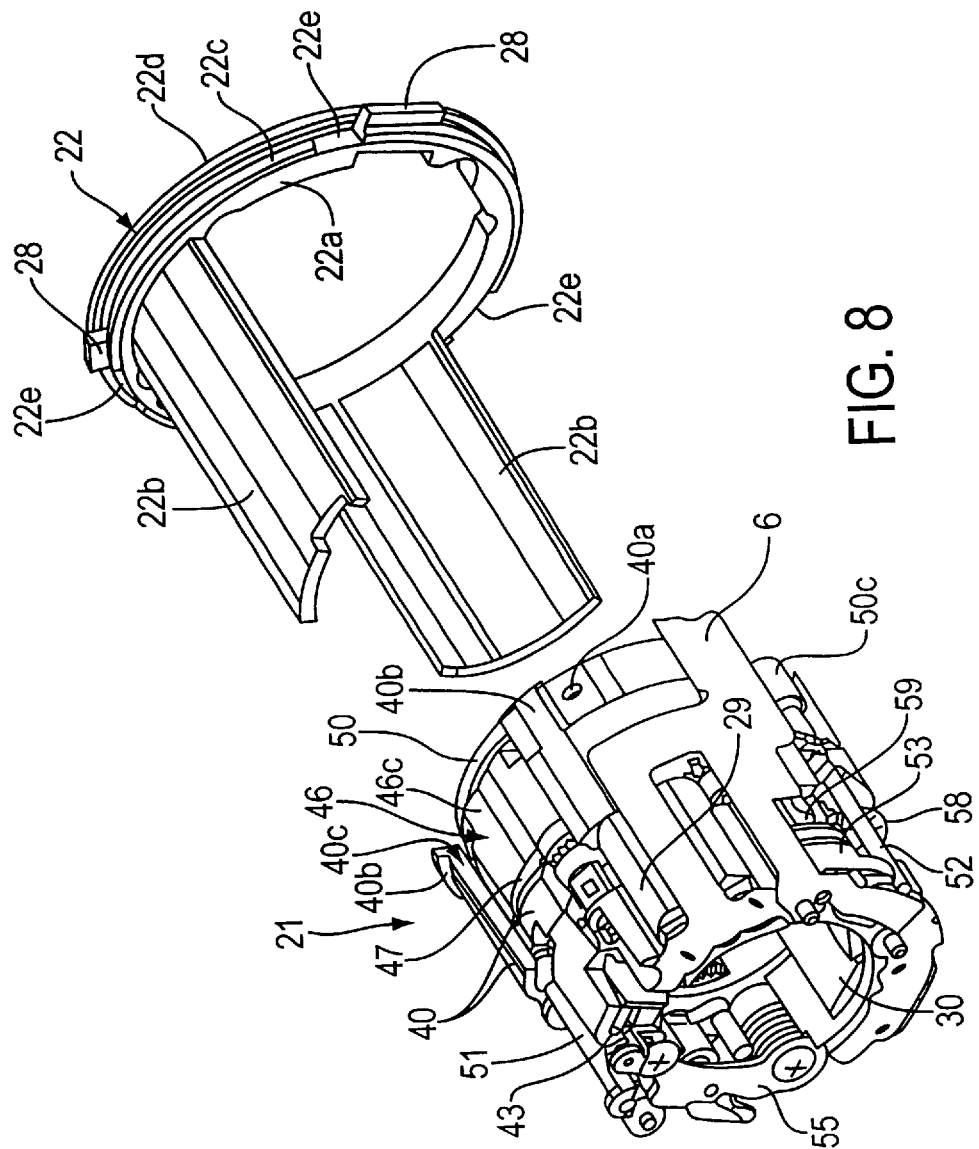
FIG. 8 is an enlarged schematic perspective view which shows part of a zoom lens barrel according to the present invention.
Figure 9:
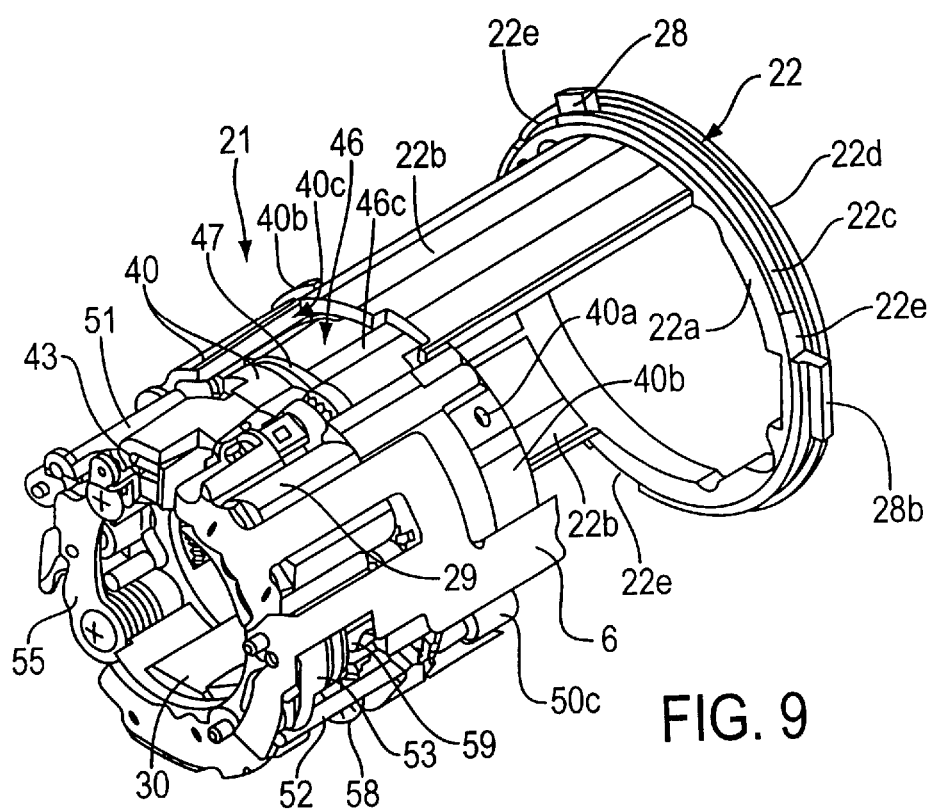
FIG. 9 is a schematic perspective view of the zoom lens barrel shown in FIG. 8, in a different condition.

On the inner periphery of the second moving barrel 19, the first moving barrel 20 is engaged. In the first moving barrel 20, a plurality of follower pins 24, provided on an outer periphery of the rear thereof, are engaged with the corresponding inner lead grooves 19c, and at the same time the first moving barrel 20 is guided linearly by a linear guide member 22. As shown in FIGS. 8 and 9, the linear guide member 22 is provided with an annular member 22a, a pair of guide legs 22b, which project from the annular member 22a in the optical axis direction, and a plurality of engaging projections 28 which project from the annular member 22a away from the optical axis in a radial direction. The engaging projections 28 slidably engage with the linear guide grooves 17a. The guide legs 22b are inserted between the inner peripheral face of the first moving barrel 20 and the AF/AE shutter unit 21.

The annular member 22a of the linear guide member 22 is connected to the rear of the second moving barrel 19, such that the linear guide member 22 and the second moving barrel 19 are capable of moving along the optical axis direction as a whole. In addition are capable of relative rotation around the optical axis. On the outer periphery of the rear of the linear guide member 22 a rear end flange 22d is provided having a plurality of engaging projections 28b which project away from the optical axis in the radial direction. In front of the rear end flange 22d there is provided an anti-dropping flange 22c, having a radius smaller than the rear end flange 22d. Along the circumferential direction of the anti-dropping flange 22c, a plurality of notches 22e are formed, as shown in FIG. 8. On the inner periphery of the rear of the second moving barrel 19, a plurality of engaging projections 19b, projecting towards the optical axis in a radial direction, are provided as shown in FIG. 18. By inserting the engaging projections 19b into the notches 22e, the engaging projections 19b are positioned between the flanges 22c and 22d, and by relative rotation of the linear guide member 22, the engaging projections 19b are engaged with the linear guide member 22. With the above structure, when the second moving barrel 19 rotates clockwise or counterclockwise, the first moving barrel 20 moves linearly, forwardly and rearwardly in the optical axis direction, but is restricted from rotating.

Figure 10:
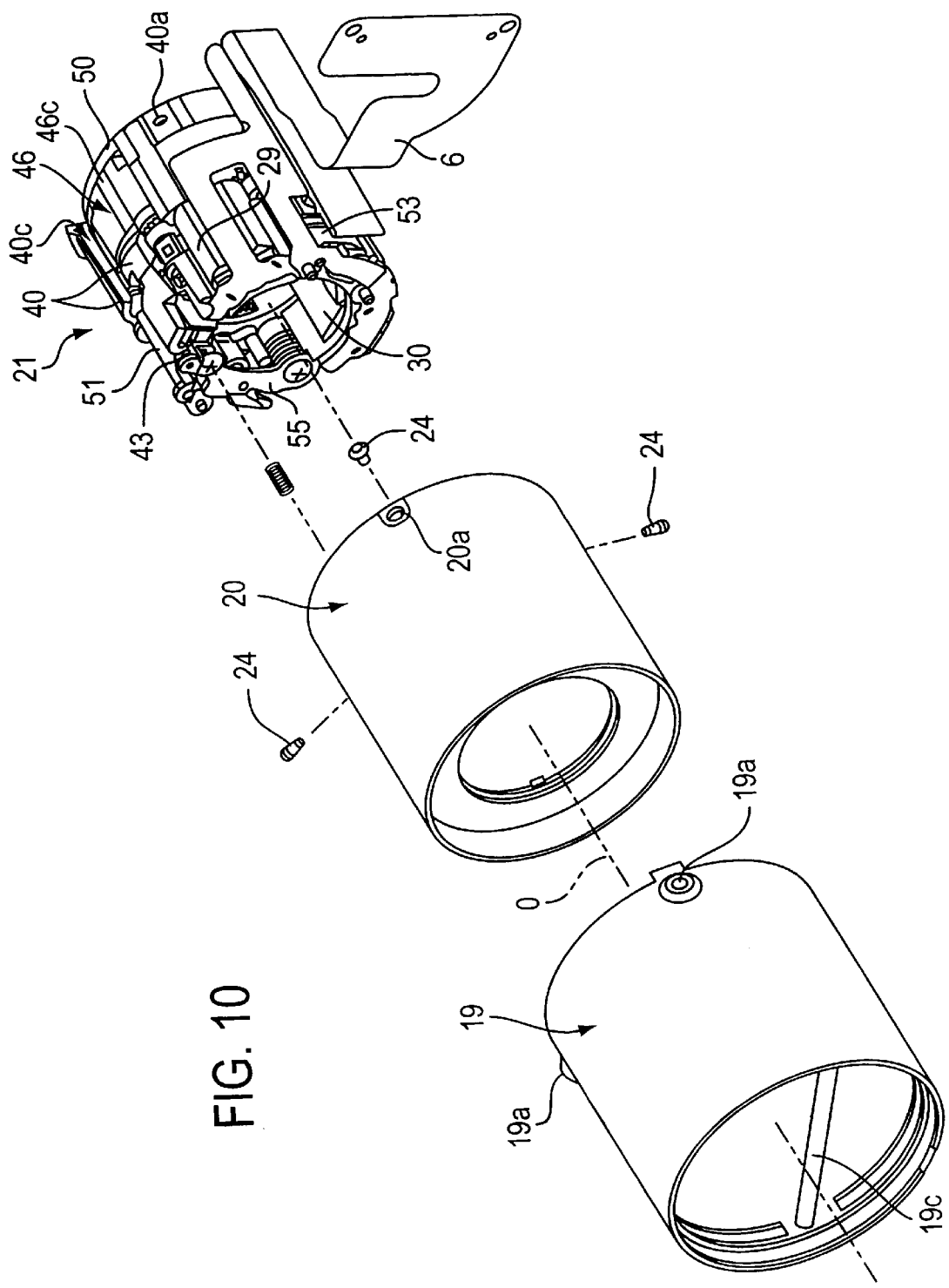
FIG. 10 is an enlarged exploded perspective view of a part of the zoom lens barrel of the present invention.
Figure 11:
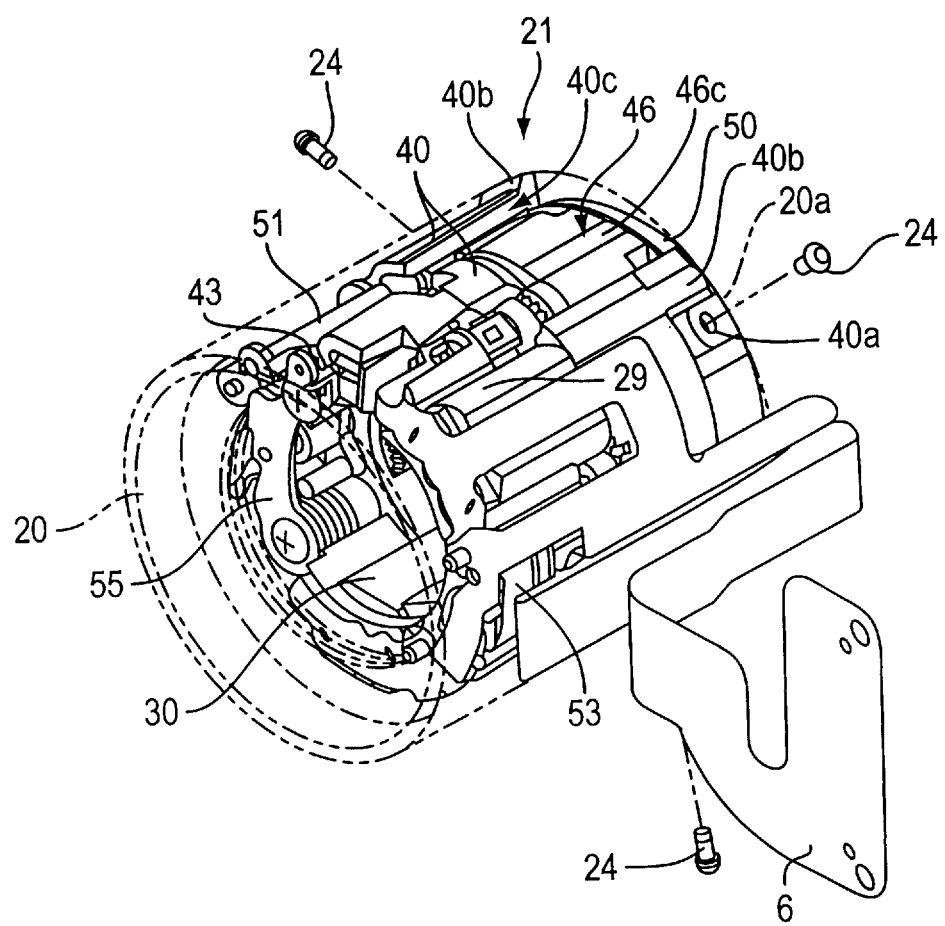
FIG. 11 is a schematic perspective view illustrating a state where an AF/AE shutter unit of the zoom lens barrel of the present invention is mounted to a first moving barrel.
Figure 12:
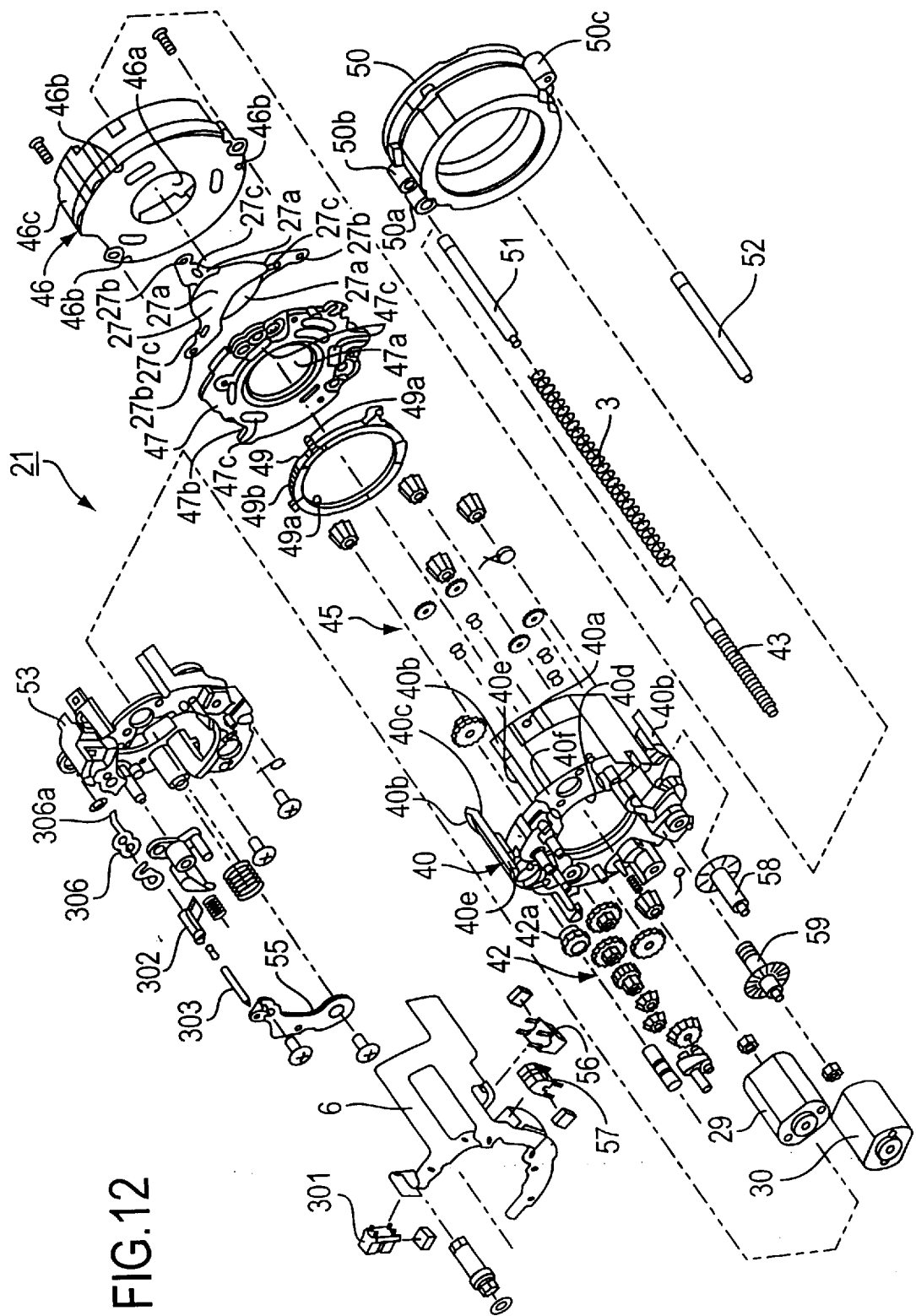
FIG. 12 is an exploded perspective view illustrating main parts of the AF/AE shutter unit of the zoom lens barrel of the present invention.

At the front of the first moving barrel 20, a barrier apparatus 35 having barrier blades 48a and 48b is mounted, and on an inner peripheral face of the first moving barrel 20 the AF/AE shutter unit 21 having the shutter 27, consisting of three shutter blades 27a, is engaged and fixed (FIG. 12). The AF/AE shutter unit 21 is provided with a plurality of fixing hollows 40a formed at even angular intervals on the outer periphery of the shutter mounting stage 40 as shown in FIG. 10. The plurality of follower pins 24 serve as a fixing means for the AF/AE shutter unit 21. The follower pins 24 are inserted and fixed in hollows 20a, formed on the first moving barrel 20, and in the fixing hollows 40a. With this arrangement the shutter unit 21 is secured to the first moving barrel 20 as shown in FIG. 11. For example, the follower pins 24 may be fixed by an adhesive or by screws. For reference, numeral 41 (FIG. 19) is a decorative plate secured to the front of the first moving barrel 20.

Figure 19:
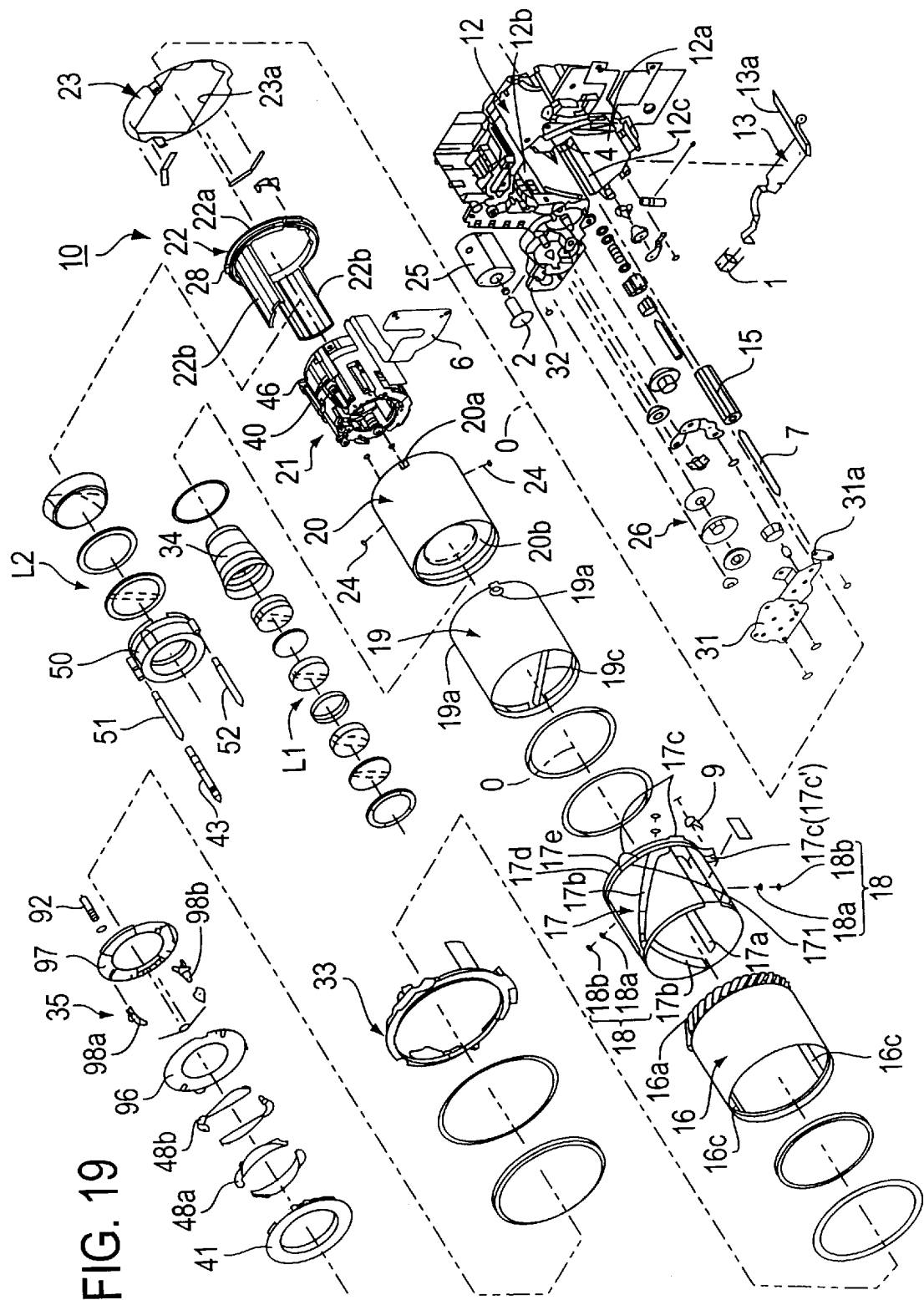
FIG. 19 is an exploded perspective view of the overall structure of the zoom lens barrel of the present invention.

As illustrated in FIGS. 12 and 19, the AF/AE shutter unit 21 is provided with the shutter mounting stage 40, a shutter blade supporting ring 46 fixed on the rear of the shutter mounting stage 40, and the lens supporting barrel 50 (i.e., for the rear lens group L2) supported in a state of being capable of movement relative to the shutter mounting stage 40. On the shutter mounting stage 40, the front lens group L1, the AE motor 29, and the rear lens group driving motor 30, are supported. The shutter mounting stage 40 is provided, with an annular member 40f having a photographing aperture 40d. The shutter mounting stage 40 is also provided with three legs 40b which project rearwards from the annular member 40f. Three slits are defined between the three legs 40b, and two of the slits comprise linear guides 40c, which slidably engage with the respective pair of guide legs 22b of the linear guide member 22, so as to guide the movement of the linear guide member 22.

The shutter mounting stage 40 supports an AE gear train 45, which transmits rotation of the AE motor 29 to the shutter 27, a lens driving gear train 42, which transmits rotation of the rear lens group driving motor 30 to a screw shaft 43, photointerrupters 56 and 57, connected to the flexible printed circuit board 6, and rotating plates 58 and 59, having a plurality of radially formed slits provided in the circumferential direction. An encoder for detecting a rotation of the rear lens group driving motor 30 consists of the photointerrupter 57 and the rotating plate 59, and an encoder for detecting a rotation of the AE motor 29 consists of the photointerrupter 56 and the rotating plate 58.

The shutter 27, a supporting member 47 which pivotally supports the three shutter blades 27a of the shutter 27, and a circular driving member 49, which provides rotative power to the shutter blades 27a, are positioned between the shutter mounting stage 40 and a shutter blade supporting ring 46, secured to the shutter mounting stage 40. The circular driving member 49 is provided with three operating projections 49a spaced at even angular intervals, which respectively engage with each of the three shutter blades 27a. As shown in FIG. 12, the shutter blade supporting ring 46 is provided, at a front end thereof, with a photographing aperture 46a and with three supporting hollows 46b positioned at even angular intervals around the photographing aperture 46a. On an outer periphery of the shutter blade supporting ring 46 there is provided a deflection restricting member 46c, which is exposed from the linear guides 40c and which slidable supports the inner peripheral faces of the pair of guide legs 22b.

The supporting member 47 positioned in front of the shutter blade supporting ring 46 is provided with a photographing aperture 47a, aligned with the photographing aperture 46a, and with three shafts 47b (only one of which is illustrated in FIG. 12) at respective positions opposite the three supporting hollows 46b. Each of the three shutter blades 27a are respectively provided with a shaft hole 27b into which one end of each respective shaft 47b is inserted, with a blocking part (not shown) which prevents unwanted light from entering the photographing apertures 46a and 47a at the other end, and with a slot 27c, through which the operating projection 49a is inserted, between the one end and the other end thereof. The supporting member 47 is fixed to the shutter blade supporting ring 46 in such a manner that each shaft 47b, which supports a corresponding shutter blade 27a, is engaged with a corresponding supporting hollow 46b of the shutter blade supporting ring 46.

On the outer periphery of the circular driving member 49, gears 49b are provided to receive the rotation from the gear train 45. The supporting member 47 is provided, at the position close to the three shafts 47b, with three arc grooves 47c, which are arched in the circumferential direction. The three operating projections 49a of the circular driving ring 49 engage with the slots 27c of the respective shutter blades 27a through the three arc grooves 47c. The shutter blade supporting ring 46 is inserted from the rear of the shutter mounting stage 40, to support the circular driving ring 49, the supporting member 47 and the shutter 27, and is fixed on the shutter mounting stage 40 by screws.

At the rear of the shutter blade supporting ring 46, the lens supporting barrel able to move relative with respect to the shutter mounting stage 40 via slide shafts 50 and 51. The shutter mounting stage 40 and the lens supporting barrel 50 are urged, by a coil spring 3 fitted to the slide shaft 51, to move in opposite directions away from each other. Therefore, play between the is reduced. In addition, a driving gear 42a provided in the gear train 42 is restricted to move in the axial direction, and on the inner periphery thereof, an internal thread (not shown) is formed. The screw shaft 43, one end of which is fixed to the lens supporting barrel 50, engages the internal thread, and a feed screw structure is provided consisting of the driving gear 42a and the screw shaft 43. In such a manner, when the driving gear 42a rotates clockwise or counterclockwise due to driving by the rear lens group driving motor 30, the screw shaft 43 respectively moves forwardly or rearwardly with respect to the driving gear 42a and the lens supporting barrel 50. In other words, the rear lens group L2 supported by the lens supporting barrel 50, moves relative to the front lens group L1.

At the front of the shutter mounting stage 40, pressers 53 and 55, which press against respective motors 29 and 30, are screwed to the shutter mounting stage 40. The motors 29, 30 and the photointerrupters 56, 57 are connected to the flexible printed circuit board 6. One end of the flexible printed circuit board 6 is fixed to the shutter mounting stage 40. When the first, second and third moving barrels 20, 19 and 16, and the AF/AE shutter unit 21 and the like are assembled, the aperture plate 23 is fixed to the rear of the linear guide barrel 17. At the front of the fixed lens barrel block 12, an anti-dropping member 33, having a circular shape, is engaged.

At the front of the first moving barrel 20, which is positioned at the front most part of the zoom lens barrel 10, the barrier apparatus 35, having pairs of barrier blades 48a and 48b, serving respectively as follower barrier blades and main barrier blades, are provided. Towards the rear of the decorative plate 41, an annular plate 96 is fixed, and between the decorative plate 41 and the annular plate 96, the barrier blades 48a and 48b are connectively engaged. In addition, at the front of the first moving barrel 20, between a front surface 20b and the annular plate 96, a barrier driving ring 96, having a pair of barrier driving levers 98a and 98b, is rotatively provided. The barrier driving ring 97, is rotated clockwise or counterclockwise, by a barrier interlocking gear 92 which drives rotatively upon receiving a rotation of the rear lens group driving motor 30, and via the barrier driving levers 98a and 98b opens or closes the main barrier blades 48b together with the follower barrier blades 48a.

While in the above description of the present invention, the zoom lens consisted of two groups, namely the front lens group L1 and the rear lens group L2, it should be understood that the present invention is not limited to the embodiment disclosed above. In addition, in the above embodiment, the front lens group L1, and the rear lens group L2, supported by the lens supporting barrel 50, are provided as components of the AF/AE shutter unit 21, and the rear lens group driving motor 30 is mounted to the shutter unit 21. With such a structure, although the supporting structure and the driving structure of the rear lens group L2 are simplified, the present zoom lens may also be realized in such a manner by making the rear lens group L2 a member apart from the AF/AE shutter unit is provided with the shutter mounting stage 40, the circular driving member 49, the supporting member 47, the shutter blades 27, the shutter blade supporting ring 46 and the like, and that the rear lens group L2 is supported by a supporting member other than the AF/AE shutter unit 21.

In the zoom lens camera of the present invention, the operation by rotation of the whole unit driving motor 25 and the rear lens group driving motor 30 will now be described.

Figure 16:
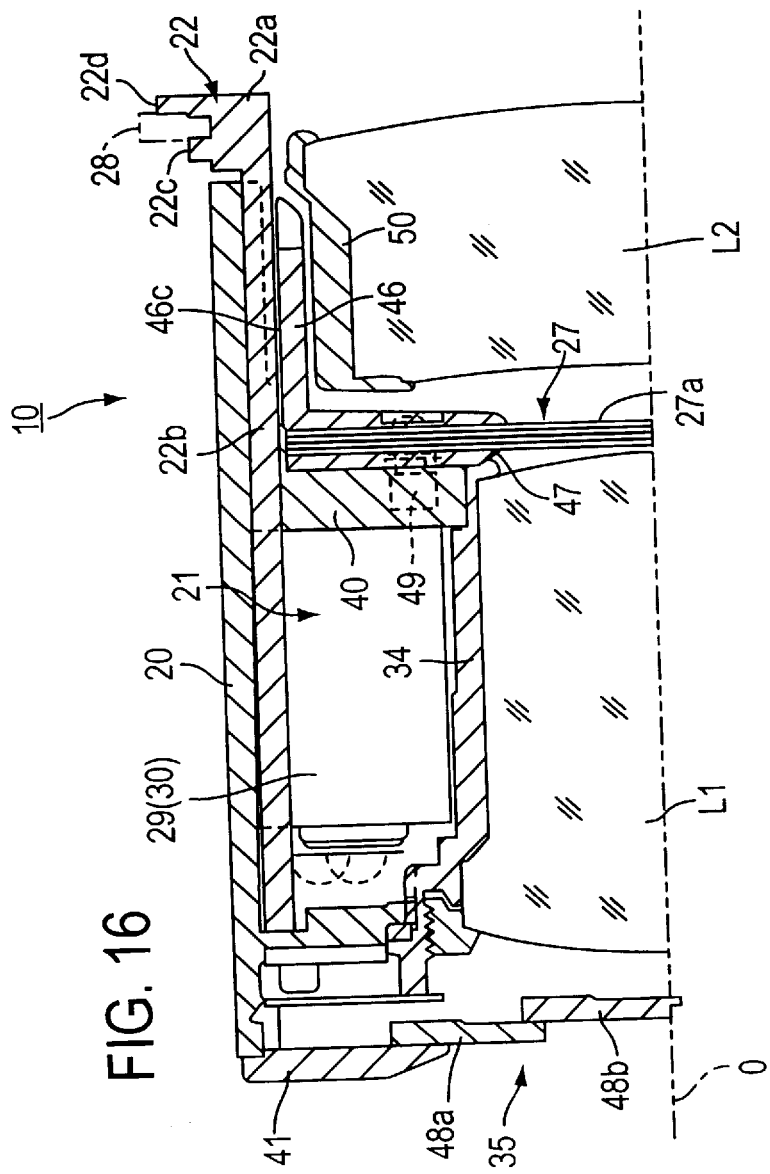
FIG. 16 is a sectional view of an upper part of the zoom lens barrel of the present invention, when in a housed state, illustrating essential parts.
Figure 17:
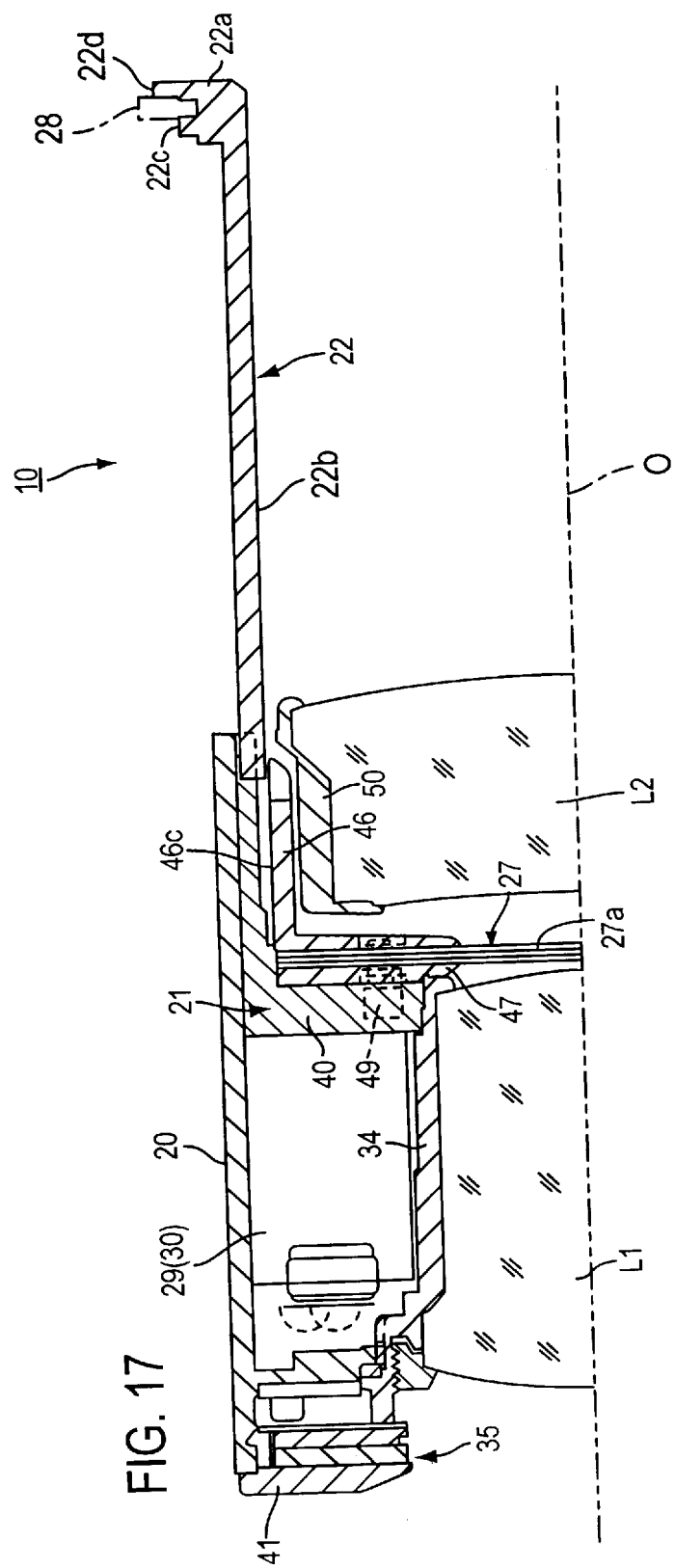
FIG. 17 is a sectional view of an upper part of the zoom lens barrel of the present invention, illustrating essential parts in a maximum extended state.

As shown in FIG. 16, when the zoom lens barrel 10 is at the most retracted (withdrawn) position, i.e., the lens-housed condition, when the power switch is turned ON, the whole unit driving motor 25 rotates by a small amount in the clockwise direction. This rotation is transmitted, via a gear train 26 which is supported by a supporting member 32, to the driving pinion 15. The third moving barrel 16 is rotated in the optical axis direction (i.e., is extended), the second moving barrel 19 and the first moving barrel 20 are extended by a small amount in the optical axis direction, along with the third moving barrel 16, which places the camera in a state capable of photographing, with the zoom lens positioned at the widest position,, i.e., the wide end. At this time, due to the fact that the amount of movement of the linear guide barrel 17, with respect to the fixed lens barrel block 12, is detected through the relative sliding movement between the code plate 13a and the contacting terminal 9, the focal length of the zoom lens, i.e., the front and rear lens group L1 and L2, is also detected.

In the photographable state as above described, when the zoom "tele" switch is turned ON, the whole unit driving motor 25 drives clockwise, and rotates the third moving barrel 16 in the direction in which it is extended via the driving pinion 15 and the outer peripheral gear 16b. Therefore, the third moving barrel 16 is extended from the fixed lens barrel block 12, according to the relationship between the female helicoid 12a and the male helicoid 16a, and at the same time, the linear guide barrel 17, which moves without relative rotation to the fixed lens barrel block 12, because of the engaging projections 17c and the linear guide grooves 12b, moves forwardly in the optical axis direction together with the third moving barrel 16. At this time, the simultaneous engagement of the follower pins 18 with the lead groove 17b and the linear guide groove 16c causes the second moving barrel 19 to move forward relative to the third moving barrel 16 in the optical axis direction, while rotating relative to and in the same direction as the third moving barrel 16. The first moving barrel 20, which is guided linearly by the linear guide member 22 and the follower pins 24 which are guided by the lead grooves 19c, moves forwardly in the optical axis direction together with the AF/AE shutter unit 21, from the second moving barrel 19, without relative rotation to the fixed lens barrel block 12. During such movements, because the position of the linear guide barrel 17 as it moves with respect to the fixed lens barrel block 12 is detected through the relative slide between the code plate 13a and the contacting terminal 9, the focal length can be set by the zoom operation means 62.

When the zoom "wide" switch is made ON, the whole unit driving motor 25 drives counterclockwise, and the third moving barrel 16 is rotated in the direction in which it is retracted retracted into the fixed lens barrel block 12 together with the linear guide barrel 17. At the same time, the second moving barrel 19 is retracted into the third moving barrel 16, while rotating in the same direction as that of the third moving barrel 16, and the first moving barrel 20 is retracted into the rotating second moving barrel 19 together with the AF/AE shutter unit 21. During the above retraction driving, as in the case of extending driving as above described, the rear lens group driving motor 30 is not driven.

Figure 15:
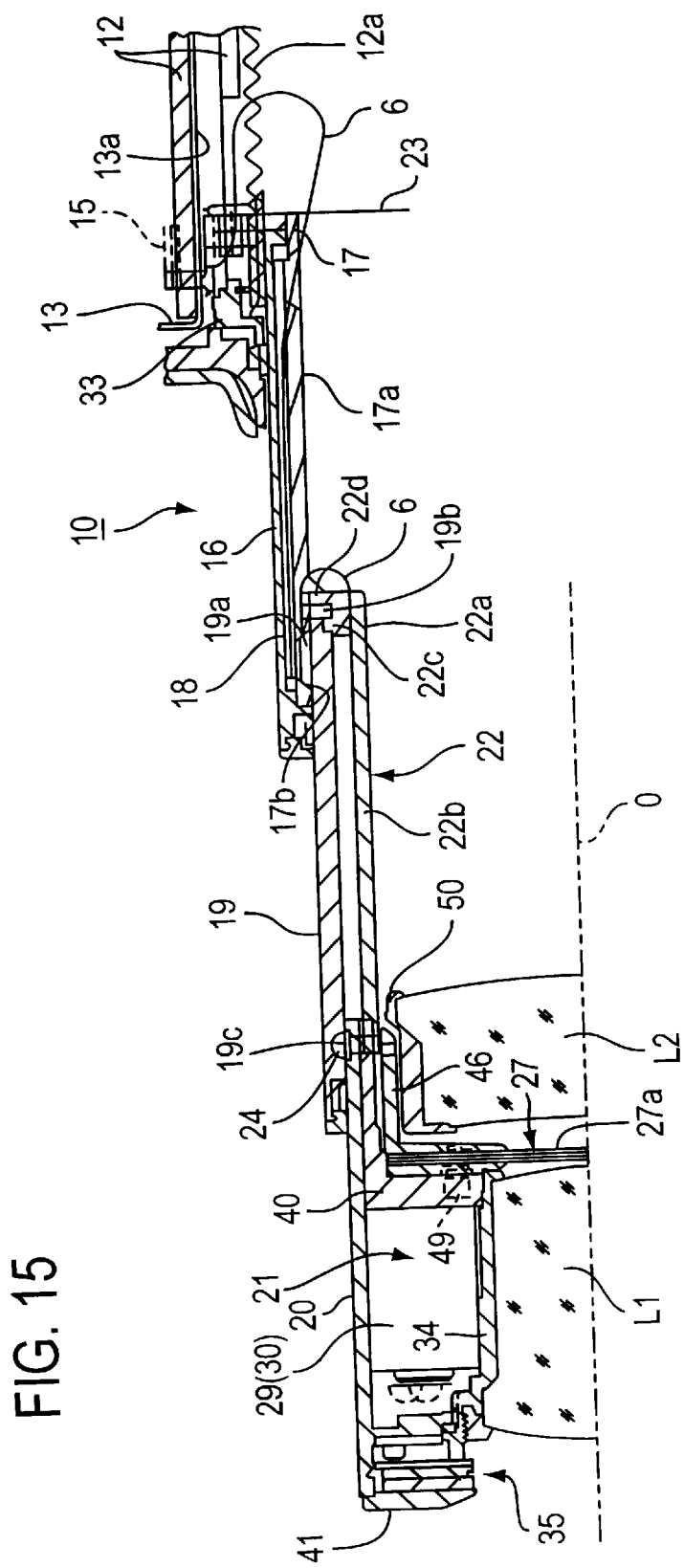
FIG. 15 is a sectional view of an upper part of the zoom lens barrel of the present invention in a most extended state.

While the zoom lens 10 is driven during the zooming operation, since the rear lens group driving motor 30 is not driven, the front lens group L1 and the rear lens group L2 move as a whole, maintaining a constant distance between each other, as shown in FIG. 15. The focal length inputted via the zoom code plate 13a is indicated on the LCD panel 224.

At any focal length set by the zoom operating means 62, when the release button 217B is depressed by a half-step, the CPU 210 obtains focusing information from the object distance measuring apparatus 64 and photometering information from the photometering apparatus 65. In such a state, when the release button 217B is fully depressed, the CPU 210 moves the whole unit driving motor 25 and the rear lens group driving motor 30 by an amount corresponding to the focal length information set in advance by the operator and by the subject distance information from the object distance measuring apparatus to the specified focal length, and bringing the subject into focus. Further, via the AE motor controlling means 66, the AE motor 29 drives the circular driving member 49 according to subject luminance information obtained from the photometering apparatus 65, and drives the shutter 27 in order to satisfy the required exposure. After the a shutter release operation, the whole unit driving motor 25 and the rear lens group driving motor 30 are both driven immediately, and the front lens group L1 and the rear lens group L2 are moved to the position prior to shutter release.

Figure 18:
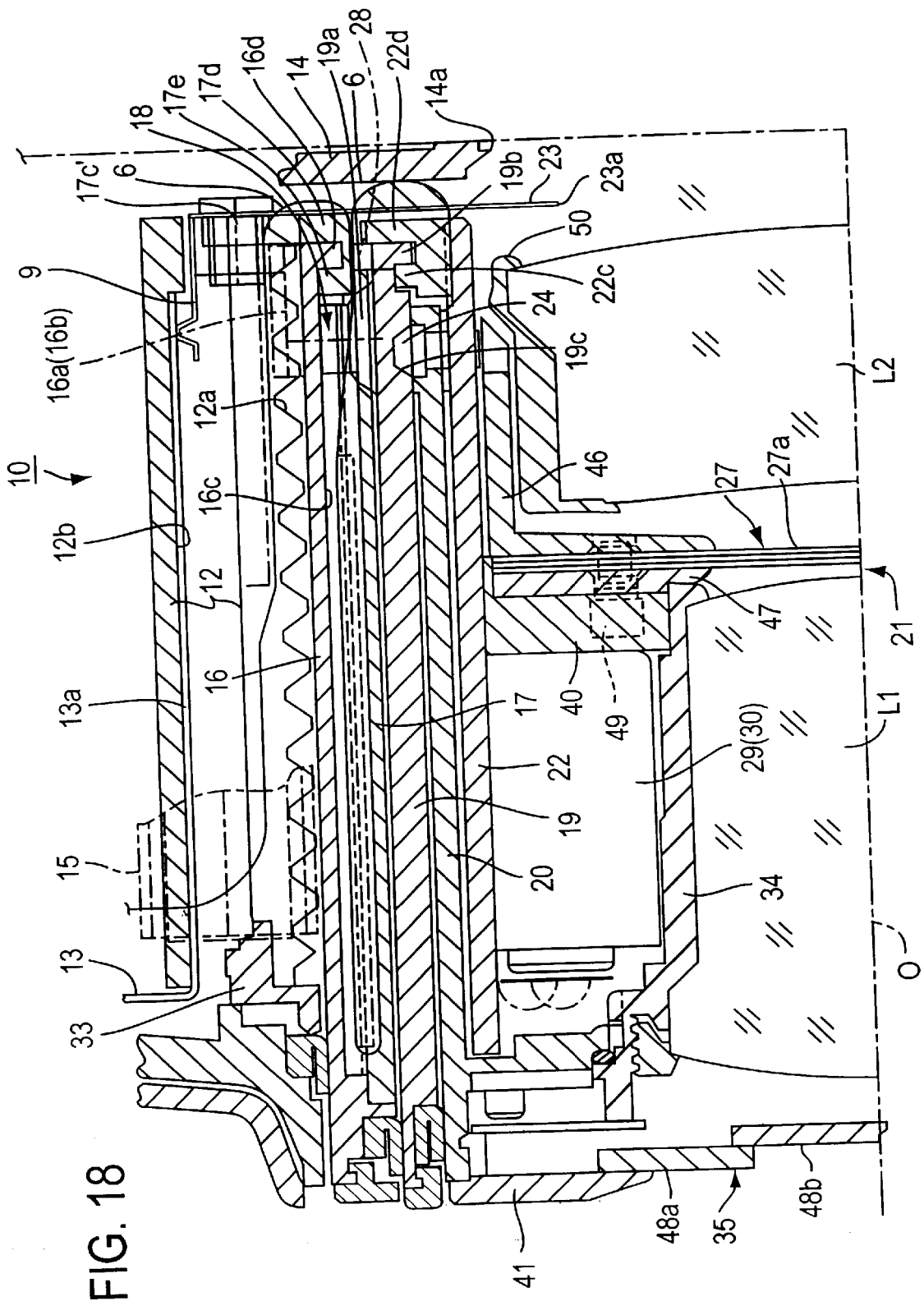
FIG. 18 is a sectional view of an upper part of the zoom lens barrel of the present invention in a housed state.

When a power switch 212 is turned OFF and the electric power is disconnected, the zoom lens 10 is retracted to the lens housed position as shown in FIG. 18 by the whole unit driving motor 25. Before the withdrawal movement, the whole unit driving motor 25 is driven, and the rear lens group L2 moves to the home position.

In regard to the movement control of the front lens group L1 and the rear lens group L2 which is performed when the release button 217B is fully depressed, the rear lens group driving motor 30 moves the rear lens group L2 rearwardly away from the front lens group L1, by an amount corresponding to the subject distance information obtained from the object distance measuring apparatus 64 and the focal length information set by the zoom operating means 31. At the same time, the whole unit driving motor 25 moves the front lens group L1 by an amount corresponding to the subject distance information obtained from the object distance measuring apparatus 64 and the focal length information set by the zoom operating means 31. Due to the movement of the front lens group L1 and the rear lens group L2, the focal length is set and subject focusing is performed. After completion of the shutter release, the rear lens group driving motor 30 and the whole unit driving motor 25 are driven immediately, so that both lens groups L1 and L2 are returned to the position they were at prior to the shutter release.

When the zoom operating means 62 is operated to the "wide" position, the whole unit driving motor 25 drives counterclockwise, and the third moving barrel 16 is rotated in the retraction direction, and is retracted into a cylinder 11 of the fixed lens barrel block 12, together with the linear guide barrel 17. At the same time, the second moving barrel 19 is retracted into the third moving barrel 16, with a rotation similar to that of the third moving barrel 16, and the first moving barrel 20 is retracted into the rotating second moving barrel 19 together with the AF/AE shutter unit 21. During the above retraction driving, and as in the case of extension driving as above mentioned, the rear lens group driving motor 30 is not driven. When the power switch is OFF, the zoom lens 10 is retracted to the housed position as shown in FIG. 18, by driving the whole unit driving motor 25 accordingly.

A detailed description in regard to lens drive control, which is one of the characteristics of the zoom lens barrel of the zoom lens camera of the present embodiment of the present invention, will now be described with reference to FIGS. 24 and 25.

Figure 24:
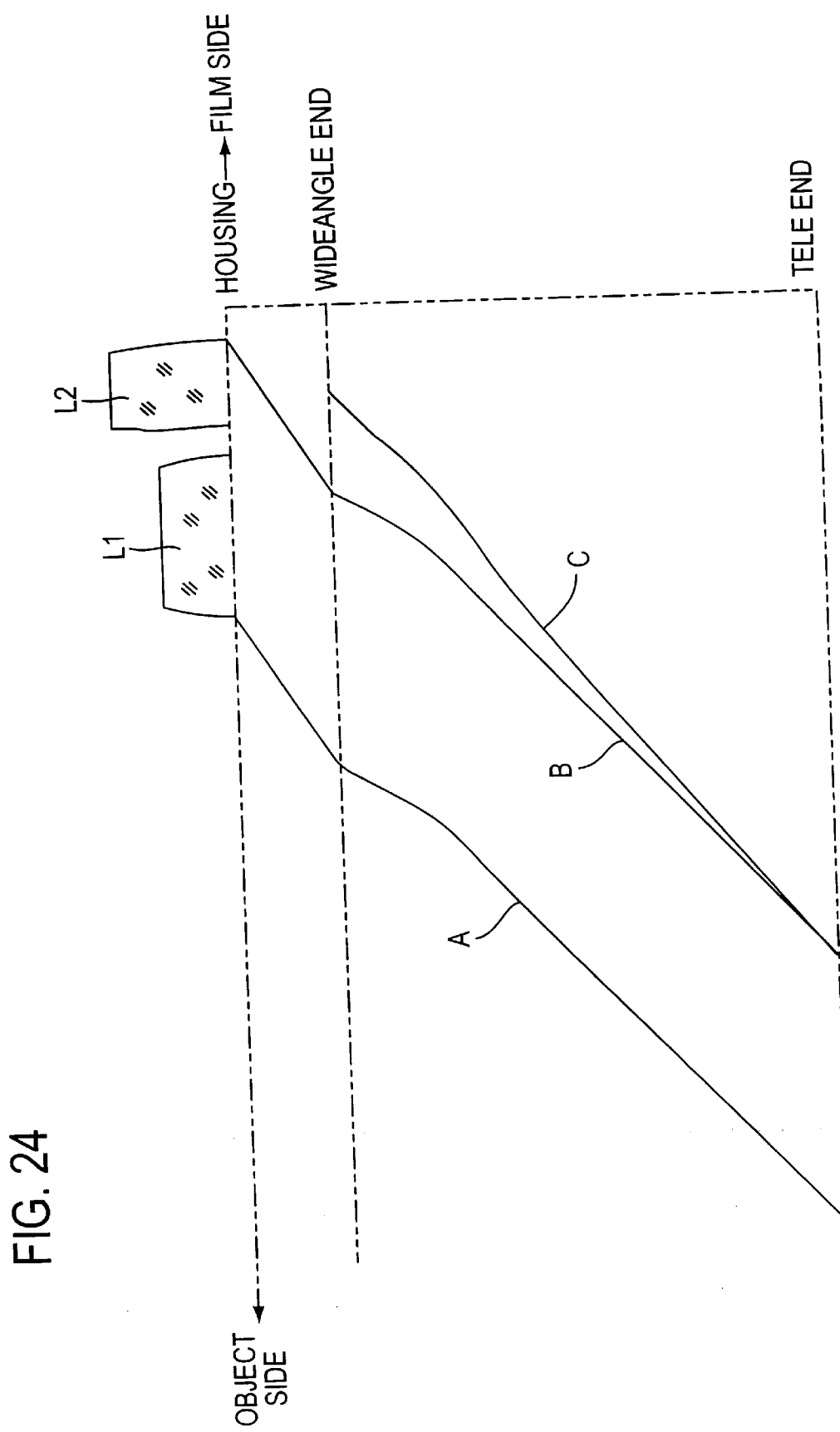
FIG. 24 is a schematic view illustrating loci of movements of the front lens group and the rear lens group.
Figure 25:
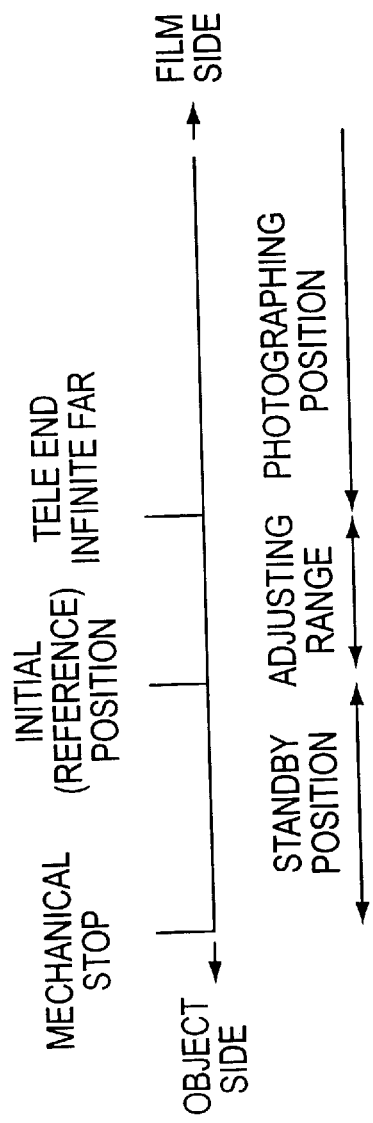
FIG. 25 is a schematic view illustrating movements of the rear lens group with respect to the front lens group.

FIG. 24 illustrates the loci of the movements of the front lens group L1 and the rear lens group L2, and FIG. 25 illustrates the range of movement of the rear lens group L2 compared to the front lens group L1.

In FIG. 24, line A represents the locus of movement of the front lens group L1, line B represents the locus of movement of the rear lens group L2 before the release button is fully depressed, and line C represents the locus of movement of the rear lens group L2 when the release button is fully depressed. As can be understood from FIG. 24, during focusing, the distance between the front lens group L1 and the rear lens group L2 is wider at the "wide" end (i.e., "W" end) position, and is shorter at the "tele" end (i.e., "T" end) position.

As shown in FIG. 25, before and during an operation of the zoom operating means 62, the rear lens group L2 is positioned at the standby position, and the constant distance to the front lens group L1 is maintained. When the release button is fully depressed, the rear lens group L2 moves rearwardly, namely to the right in FIG. 25, and moves to the photographing position and focusing is performed. When the rear lens group L2 moves rearwardly, the initial position (i.e., the reference position) of the rear lens group L2 (i.e., the rear lens supporting barrel 50) is detected via a photo sensor (not shown), and from the initial moment of position detecting, a pulse counting operation is commenced. When the number of pulses reaches a value corresponding to an amount of movement corresponding to the subject distance information obtained from the object distance measuring apparatus 64 and the focal length information set by the zoom operating means 62, the rear lens group driving motor 30 is stopped.

In FIG. 25, the range indicated as "Adjusting Range", equals a range corresponding to the minimum value of the pulse counting from the initial position, when the zoom lens barrel 10 is positioned at the "tele" end and the focused subject is at infinity. Therefore, the rear lens group L2 is moved rearwardly with respect to the front lens group L1, by an amount, such as the adjusting quantity, from the initial position.

Figure 21:
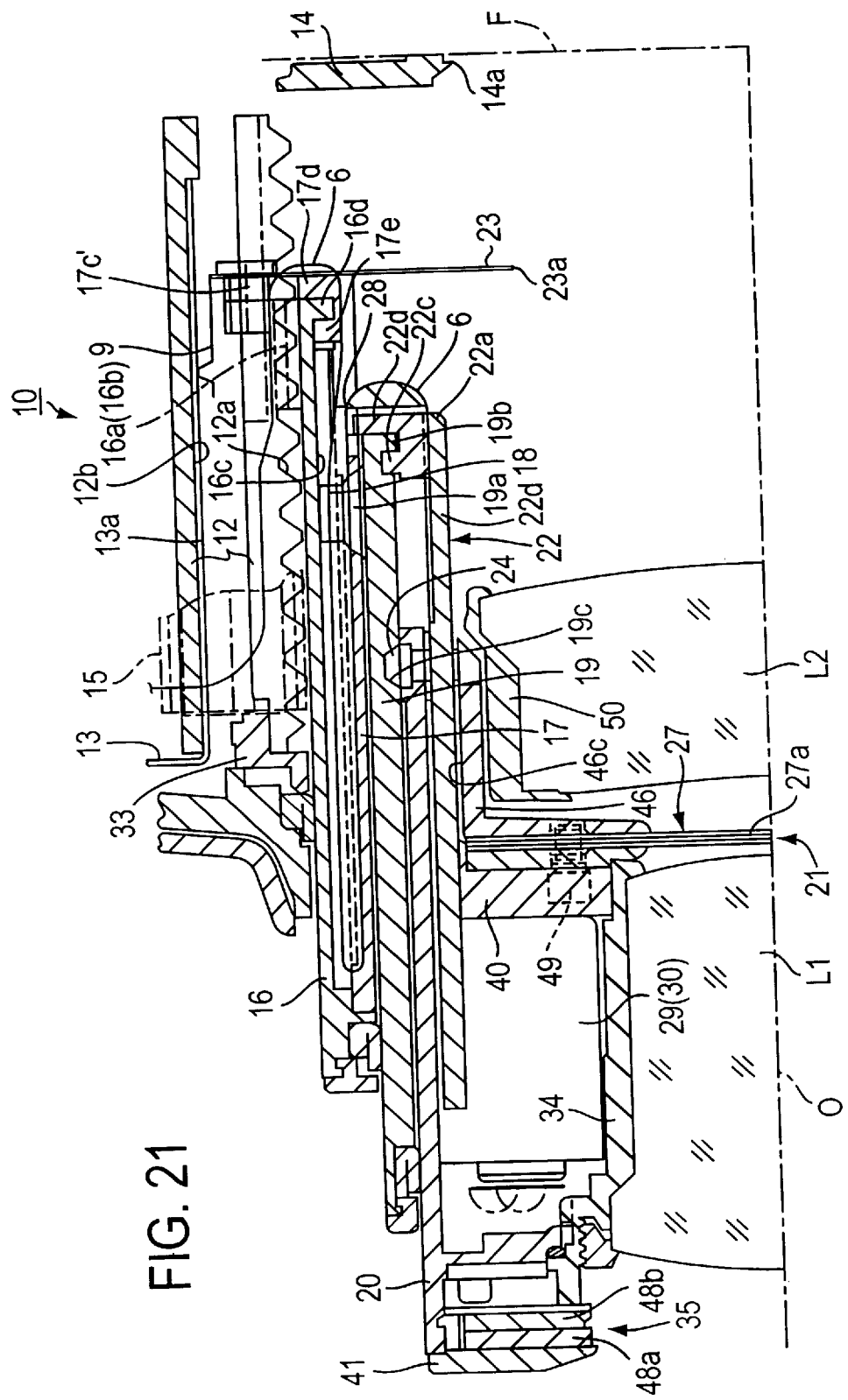
FIG. 21 is a sectional view illustrating a state when the zoom lens barrel of the present invention is positioned close to a "wide" end, and further a state before a release button is released.
Figure 22:
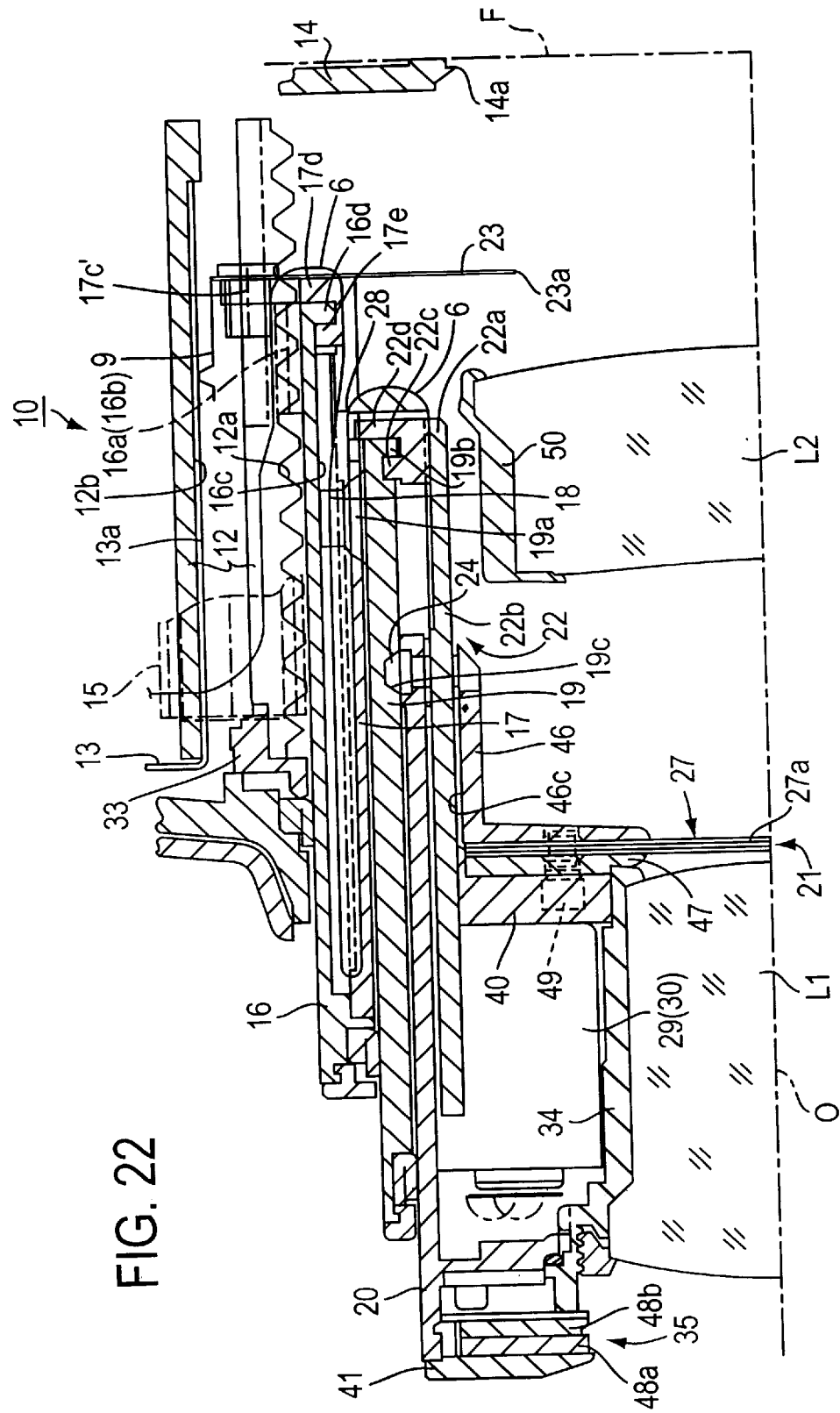
FIG. 22 is a sectional view illustrating a state when the zoom lens barrel of the present invention is positioned close to a "wide" end, and further a state immediately after the release button is released.

FIG. 21 illustrates the state when the zoom lens barrel 10 is around the "wide" end position, before the release button has been fully depressed. FIG. 22 illustrates the state when the zoom lens barrel 10 is in the "wide" end position, immediately after the release button has been fully depressed. As above described, from the state as shown in FIG. 22, after the shutter release is complete, the rear lens group driving motor 30 is driven immediately and the rear lens group L2 moves towards the front lens group L1, returning the zoom lens barrel 10 to the state as shown in FIG. 21.

Figure 23:
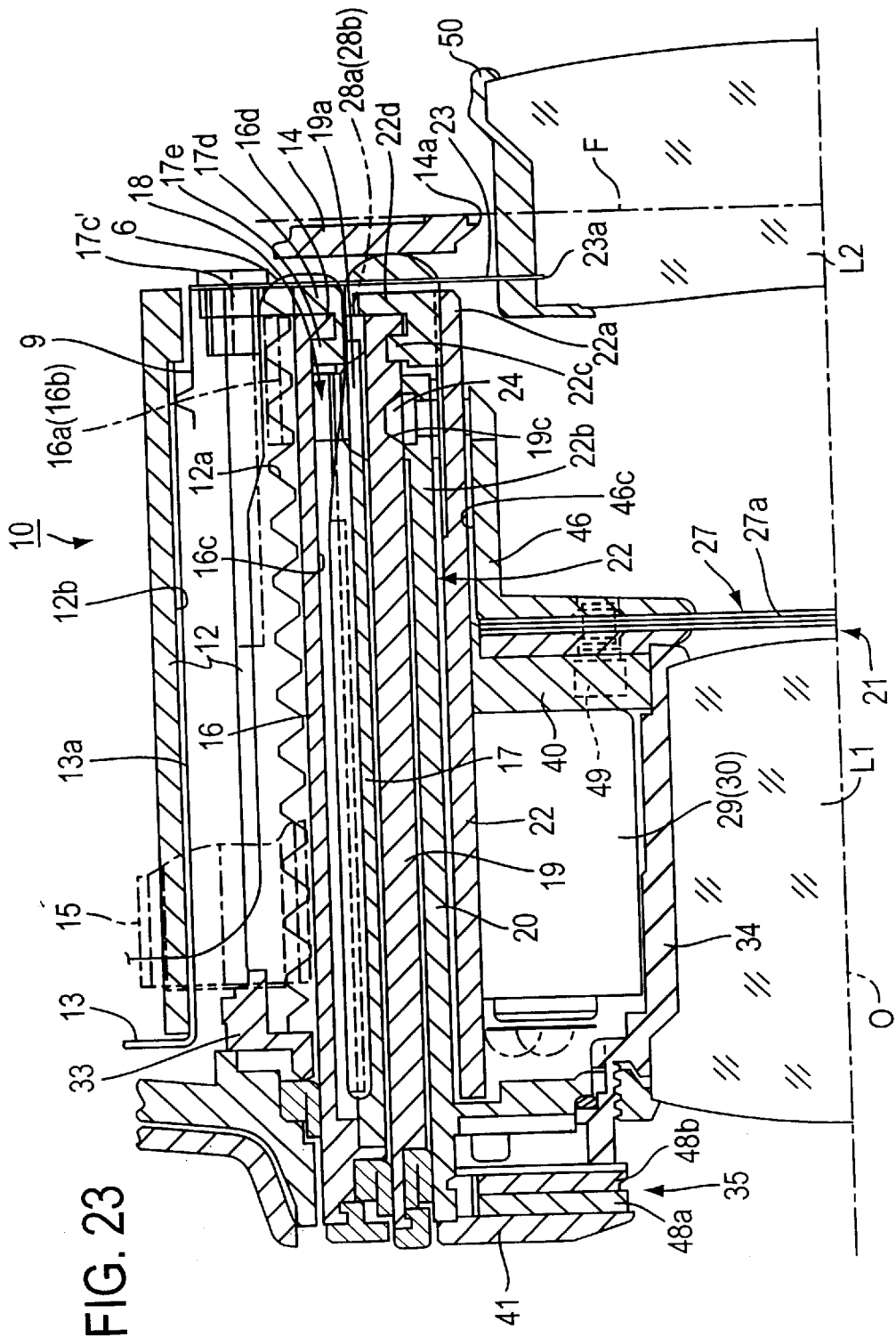
FIG. 23 is a sectional view illustrating a state when an external force in the direction of the camera body is made to the front of the first moving barrel, and a whole lens barrel unit is retracted into the camera body, and the a rear lens group collides with a film F.

If the rear lens group driving motor 30 is not immediately the rear lens group L2 remains in the photographing position, and, if a serious external force or impact is made towards the front of the first moving barrel 20, in a direction towards the main body of the camera (i.e., to the right in FIG. 22), all the moving barrels, namely, the first moving barrel 20, the second moving barrel 19 and the third moving barrel 16, will be forced into the main body of the camera, and in such a case, the rear lens group L2 may collide with a film F. Therefore, not only may the film F or the rear lens group L2 be damaged, but other devices within the camera may be damaged. Such a state is illustrated in FIG. 23.

However, because the lens drive control of the zoom lens barrel provided in the camera of the present after completion of the shutter release from the state as shown in FIG. 22, the rear lens group L2 is moved towards the front lens group L1 and is returned to the position as shown in FIG. 21. Thus, the above problem is unlikely to occur.

The above embodiment of the present invention refers to a three-stage delivery zoom lens barrel, however, it should be understood that the present invention is not limited to such a lens barrel, and can be equally applied to a one-stage, two-stage or more than three-stage delivery zoom lens barrel.

As described above, in accordance with the lens driving method of the zoom lens and the zoom lens barrel in the present invention, during the zoom operation, the front lens group and the rear lens group move as a whole without varying the distance between the two lens groups, and during the release operation, the rear lens group moves rearwardly with respect to the front lens group, and after completion of release, the rear lens group moves towards the front lens group, so that both lens groups are returned to the initial position that they were at during the zoom operation. Therefore, in a state that the lens barrel is extended from the main body of the camera, if a serious external force or impact is made to the front of the lens barrel in a direction towards the main body of the camera, and the lens barrel is forced to be retracted accordingly, it is unlikely that the rear lens group might collide with the film, and therefore the film, the rear lens group or the lens driving apparatus will not be damaged.

Figure 27:
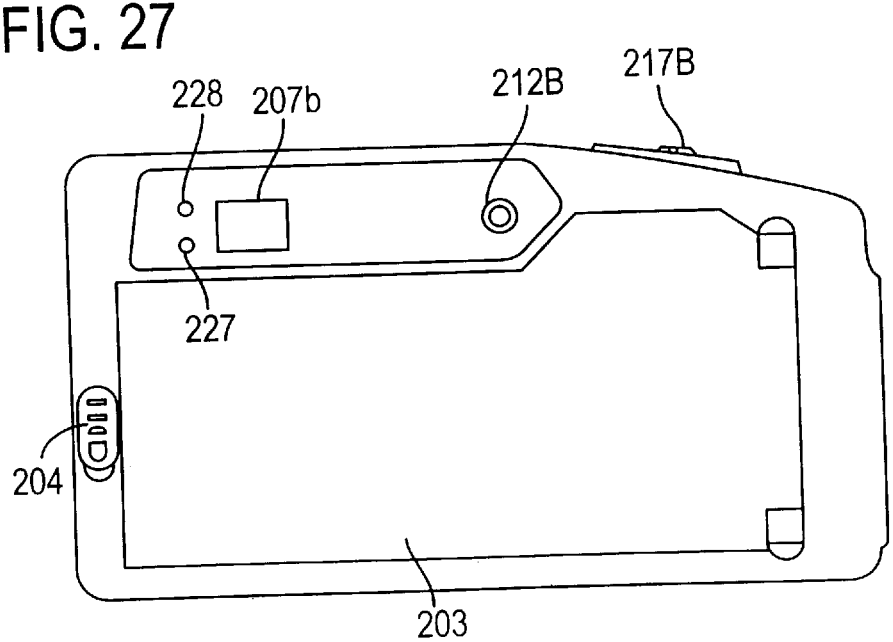
FIG. 27 is a rear elevational view of the zoom lens camera shown in FIG. 26.

FIGS. 26 through 28 illustrate a front elevational view, a rear elevational view and a plan view of the lens shutter type camera of the present invention, respectively provided with the zoom lens barrel shown in FIGS. 1 through 25.

At approximately a center of the front of a camera body 201, the zoom lens barrel 12 is mounted. On the front surface of the camera body 201, a light receiving element 65a for photometering, an AF sensor window 64a, a finder window 207a of a finder optical system, a stroboscopic lamp 209, and a self-timer indicating lamp 229, are all provided. At the bottom of the camera body 201, a battery cover 202 is provided.

On the rear surface of the camera body 201, a rear cover 203, opening and closing for the purpose of loading or removing a film cartridge, a rear cover opening lever 204, used to unlock the locking device to open the rear cover 203, a green lamp 228, which indicates the result of focusing, a red lamp 227, which indicates the state of strobe charging, an eyepiece 207b, and a power (ON/OFF) button 212B, are provided.

On the top surface of the camera body 201, as viewed from the left of the drawing, a rewind button 216B, the LCD panel 224, a mode button 214B, a driving button 215B, the release button 217B, the "wide" button 62WB, and the "tele" button 62TB, are provided.

Figure 29:
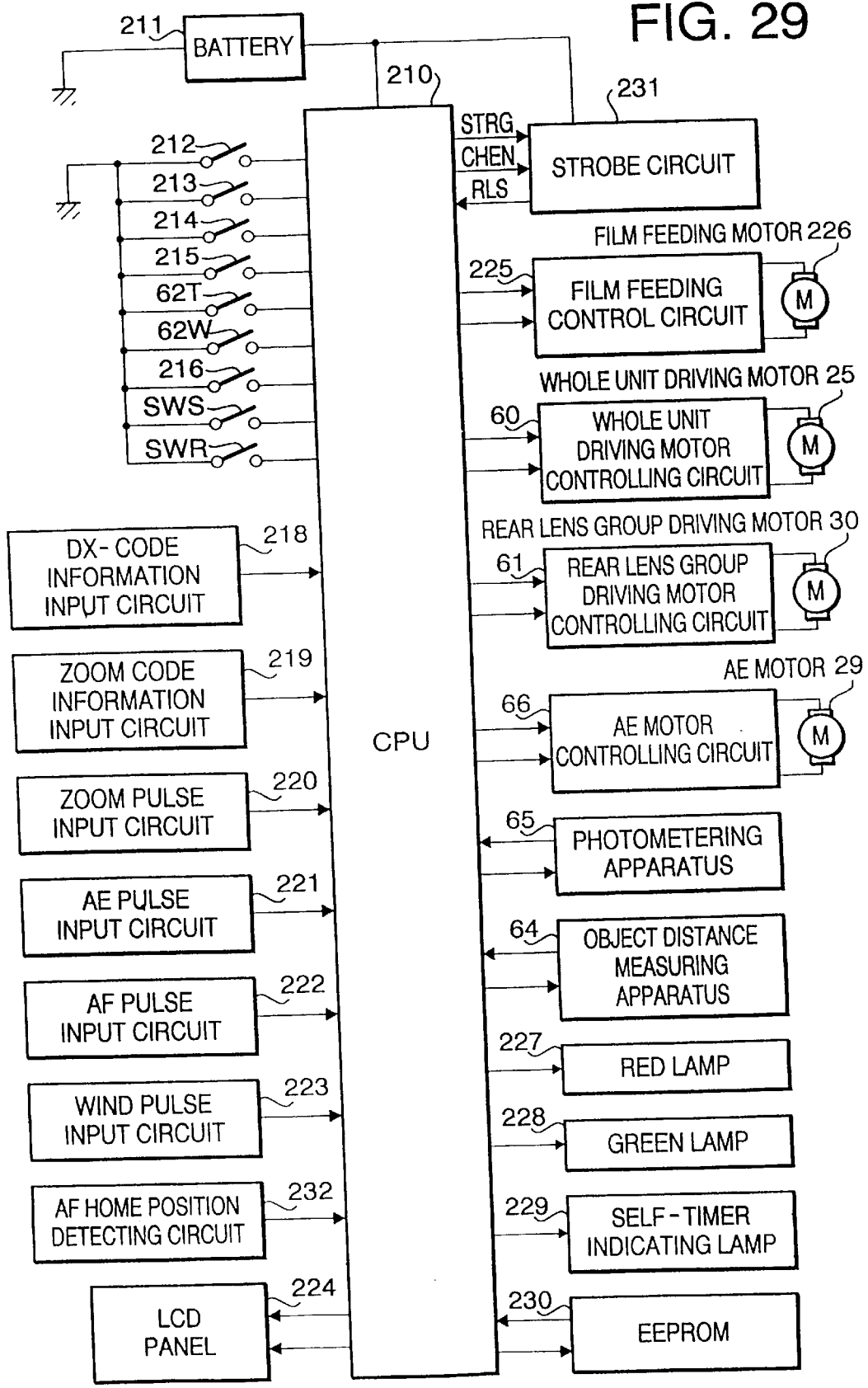
FIG. 29 is a block diagram of the main parts of a control system of the zoom lens camera of the present invention.

FIG. 29 illustrates a structure of the main internal components of the zoom lens camera of the present invention. The camera is provided with the CPU 210, which serves as the controlling means and controls the overall functions of the camera.

The CPU 210 drives and controls the whole unit driving motor 25, via the whole unit driving motor controlling means 60, the rear lens group driving motor 30, via the rear lens group driving motor controlling means 61, and the AE motor 29, via the AE motor controlling means 66. The CPU 210 also controls, via a film transport controlling means 225, a film transport motor 226 which performs loading, winding and rewinding of film. The CPU 210 further controls flashing of a strobe (i.e., an electronic flash) via a strobe means 231.

The CPU 210 is capable of operation when a battery 211 is loaded, and executes functions according to the i/o state (i.e., ON/OFF) of each switch input thereto, namely the state of the power switch 212, a rear cover switch 213, a mode switch 214, a driving switch 215, a "tele" switch 62T, a "wide" switch 62W, a rewind switch 216, the photometering switch SWS, and the release switch SWR.

The power switch 212 is connected to the power button 212B, and when the power switch 212 is turned "ON" when the electric power is "OFF" (i.e., the electric power of the battery 211 is cut), the power switch 212 turns the electric power "ON" (i.e., the electric power of the battery 211 is supplied), and when the power switch 212 is turned "OFF" when the electric power is "ON", the power switch 212 turns the electric power "OFF".

The rear cover switch 213 is associated with the opening or closing of the rear cover 203, and according to variations in the state of the rear cover 203, the rear cover switch 213 executes a film loading operation by driving the film transport motor 226, or resets a film counter reset.

The mode switch 214 is used to change photographing modes, and is connected to the mode button 214B. As the mode switch 214 changes to an "ON" state, photographing modes are changed, such as an auto strobe flashing mode, a forced strobe flashing mode, a strobe flashing forbidding mode, a long exposure mode, or a bulb mode etc.

The driving switch 215 changes between various driving modes, and is connected to the driving button 215B. As the driving switch 215 changes to an "ON" state, driving modes are changed, such as a frame photographing mode, a self-timer mode, a continuous photographing mode, or a multiple exposure mode etc.

The "tele" switch 62T is connected to the "tele" button 62TB. When the "tele" switch 62T is "ON", the whole unit driving motor 25 is driven toward the "tele" end.

The "wide" switch 62W is connected to the "wide" button 62WB. When the "wide" switch 62W is "ON", the whole unit driving motor 25 is driven toward the "wide" end.

The photometering switch SWS and the release switch SWR are connected to the release button 217B. When the release button 217B is half depressed, the photometering switch SWS is made "ON", and when the release button 217B is fully depressed, the release switch SWR is made "ON". During the time that the release button 217B is between the photometering switch SWS is maintained in the "ON" state. When the photometering switch SWS is "ON", photometering and object distance measuring operations are executed. When the release switch SWR is "ON", the whole unit driving motor 25 and the rear lens group driving motor 30 are driven so that the front lens group L1 and the rear lens group L2 may be moved to a position at which the subject is brought into AE motor 29 is also driven and exposure processing is executed according to the determined photometering value. After exposure is complete, the whole unit driving motor 25 and the rear lens group driving motor 30 are driven, and the front lens group L1 and the rear lens group L2 In addition, the film transport motor 226 is driven and the film is wound by one frame.

An output from a DX-code information input 218 is input to the CPU which provides information regarding the ISO speed of film. Also input to the CPU 210 is zoom code information input means 219, which provides information regarding the present lens position from the code plate 13a, a zoom pulse input means 220, an AE pulse input means 221, an AF reference pulse input means 222, and a wind pulse input means 223, which provides info regarding driving of the film and the amount of driving thereof. Additionally, an AF home position detecting means 232 is input to the CPU 210.

A number of indicating means, for example, the LCD panel 224, which indicates a current focal length, a number of frames photographed, an exposure mode or the like, the red lamp 227, which indicates the state of strobe charging, the green lamp 228, which indicates the result of focusing from the object distance measuring apparatus 64, and the self-timer indicating lamp 229, which indicates the operation of the self-timer, are connected to the CPU 210.

In an EEPROM 230, data inherent to the camera at the time of assembling, such as data regarding an AE adjustment thereof, or data set by a photographer, such as the exposure mode or the number of frames photographed, are stored.

Figures 31, 32:
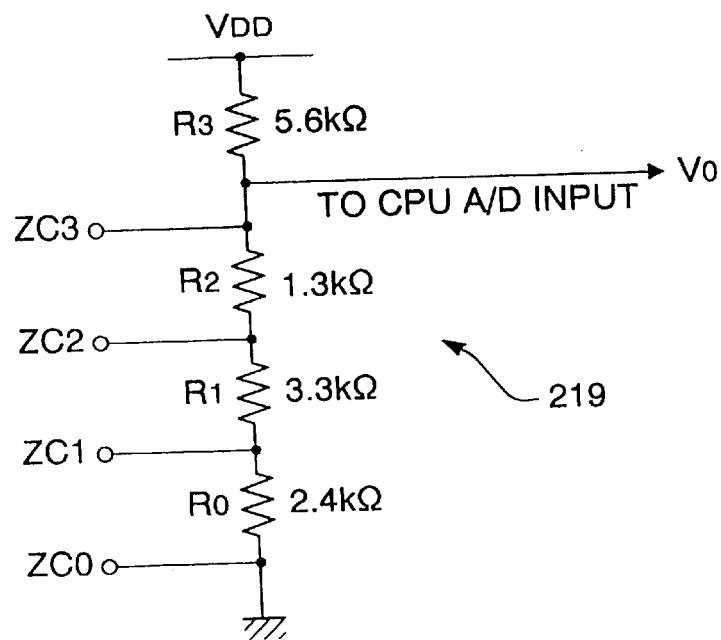
FIG. 31 is a schematic view illustrating an example of an electronic circuit to detect the zoom code, in contact with the brushes, as a voltage.
FIG. 32 is a table illustrating conversions of a voltage, obtained through contact with the brushes, into a code.

As shown in FIG. 31, the zoom code information input means (electrical circuit) 219 is provided with four resistors (R0, R1, R2, R3) connected in series. The resistor R0 is grounded while a reference voltage VDD is applied to the resistor R3. Between the resistor R0 and ground the electrode pattern ZC0 is connected, and between resistors R0 and R1 the electrode pattern ZC1 is connected, between resistors R1 and R2 the electrode pattern ZC2 is connected, and between resistors R2 and R3 the electrode pattern ZC3 is connected. In addition, an A/D conversion input port of the CPU 210 is connected between the resistors R2 and R3.

As shown in FIG. 30 (A), the code plate 13a is provided with four independent electrode patterns (zoom codes) ZC0, ZC1, ZC2 and ZC3 formed on an insulating substrate 13b.

The electrode patterns, namely conducting plates, ZC0, ZC1, ZC2 and ZC3 are connected respectively between the resistors R0, R1, R2 and R3. The contacting terminal 9 is provided with a pair of brushes 9a conducting with each other via a conductive part 9b. The brushes 9a are formed to move in slidable contact along the code plate 13a, so that any two patterns among the electrode patterns ZC0, ZC1, ZC2 and ZC3 may conduct with each other. Therefore, if any two patterns among the electrode patterns ZC0, ZC1, ZC2 and ZC3 conduct with each other, according to the combination of conduction, the output voltage of the zoom code information input means 219 will vary, as shown in FIG. 30 (C) and FIG. 30 (E). The CPU 210 performs an A/D conversion, whereby the output voltage is converted into a digital value. The CPU 210 further converts the converted digital value into a corresponding zoom code. The CPU 210 then detects the position of the zoom lens according to the zoom code.

In the present embodiment of the present invention, as shown in FIG. 30 (D), the voltages corresponding to the contacting positions of the brushes 9a are converted into seven zoom codes, namely 0, 1, 2, 3, 4, 5 and 6. Each of the seven codes represents a position at the lens, i.e., the zoom code 1 represents the housed position, the zoom code 2 the "wide" position, the zoom code 6 the "tele" position, the zoom codes 3 through 5 represent the intermediate positions between the "wide" position and the "tele" position, and the zoom code 0 represents the position between the housed position and the "wide" position. At the intermediate positions, the zoom codes 3, 4 and 5 are repeated four times in that order, and the zoom range is divided and coded into fourteen zoom step codes. In the present embodiment of the present invention, the zoom step 0 is assigned to the "wide" end position, and the zoom step 13 at the "tele" end position, and the zoom steps 1 through 12 are assigned to positions between the "wide" end and the "tele" end positions.

FIGS. 31 and 32 illustrate an example of values of the resistors R0, R1, R2 and R3, and the output voltages of the zoom code information input means 219.

The zoom pulse input means 220 is provided with an encoder consisting of the photointerrupter 1 and the rotating plate 2. The input of the photointerrupter 1, varied according to the passage of the slit of the rotating plate 2 which rotates in accompaniment to the rotation of the driving shaft of the whole unit driving motor 25, is output as a zoom pulse.

The AE pulse input means 221 is provided with an encoder consisting of the photointerrupter 57 and the rotating plate 59. The input of the photointerrupter 57, which varies according to the passage of the slit of the rotating plate 59 which rotates in accompaniment to the rotation of the driving shaft of the AE motor 29, is output as an AE pulse. The rotating plate 59 is arranged such that it rotates by less than one full turn (i.e., less than 360°).

The AF reference pulse input means 222 is provided with an encoder consisting of the photointerrupter 56 and the rotating plate 59. The input of the photointerrupter 56, which varies according to passage of the slit of the rotating plate 59 which rotates in accompaniment to the rotation of the driving shaft of the rear lens group driving motor 30, is output as an AF pulse.

Figure 37:
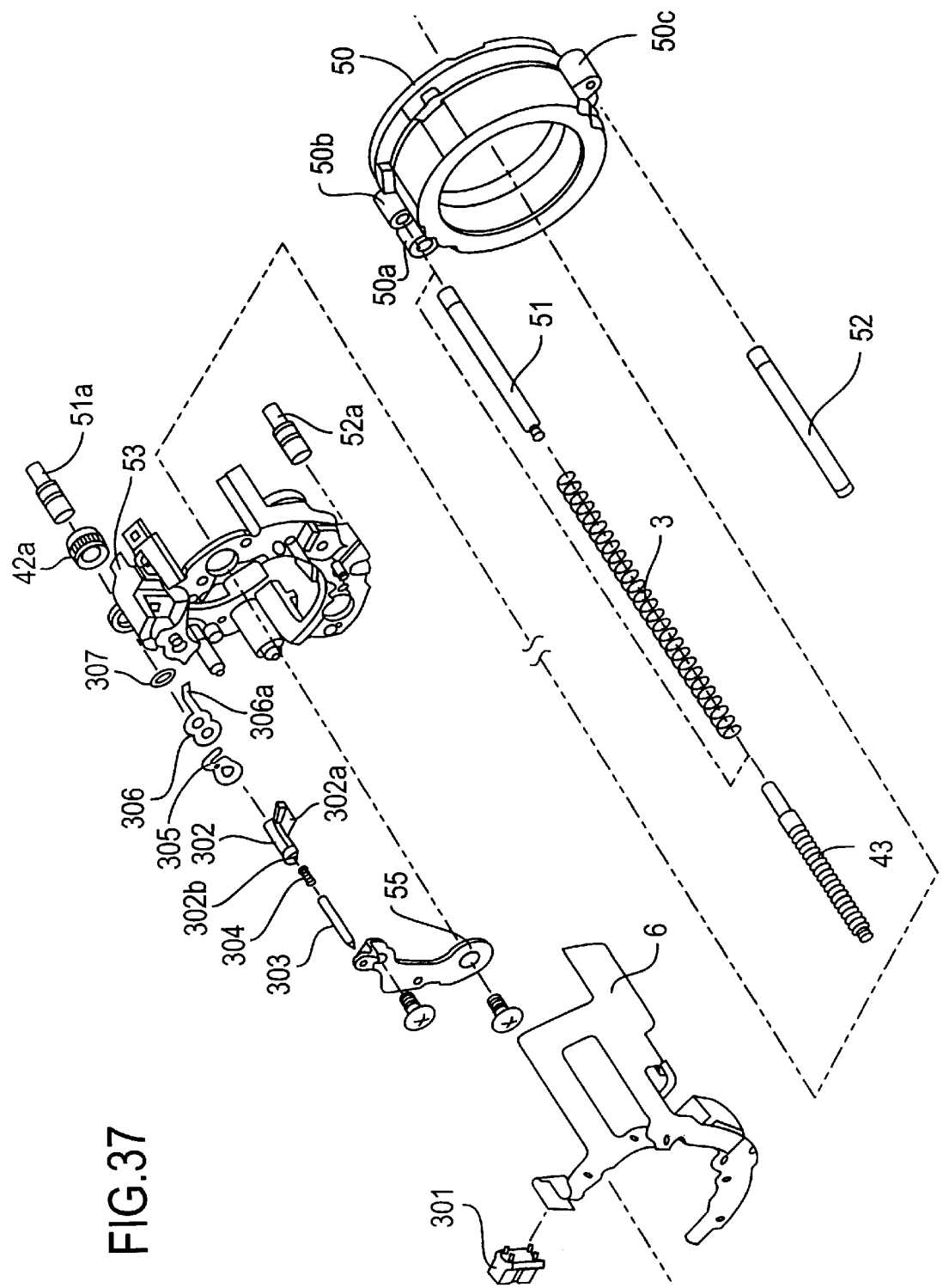
FIG. 37 is an exploded perspective view of a peripheral structure of the rear lens group of the zoom lens barrel of the present invention.
Figure 38:
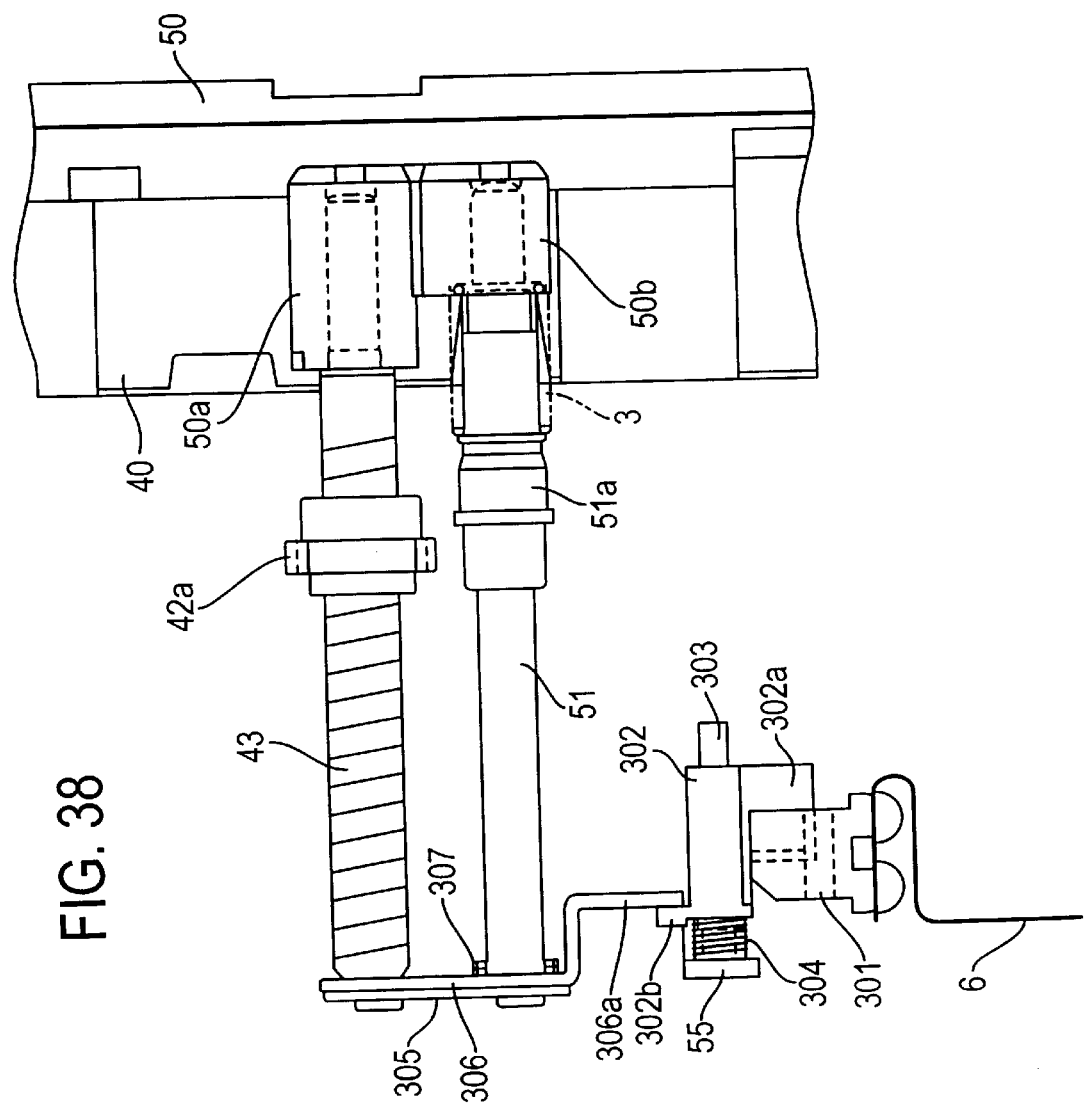
FIG. 38 is a plan view of the main parts of an example of an initial position detecting device of the rear lens group of the present invention.
Figure 39:
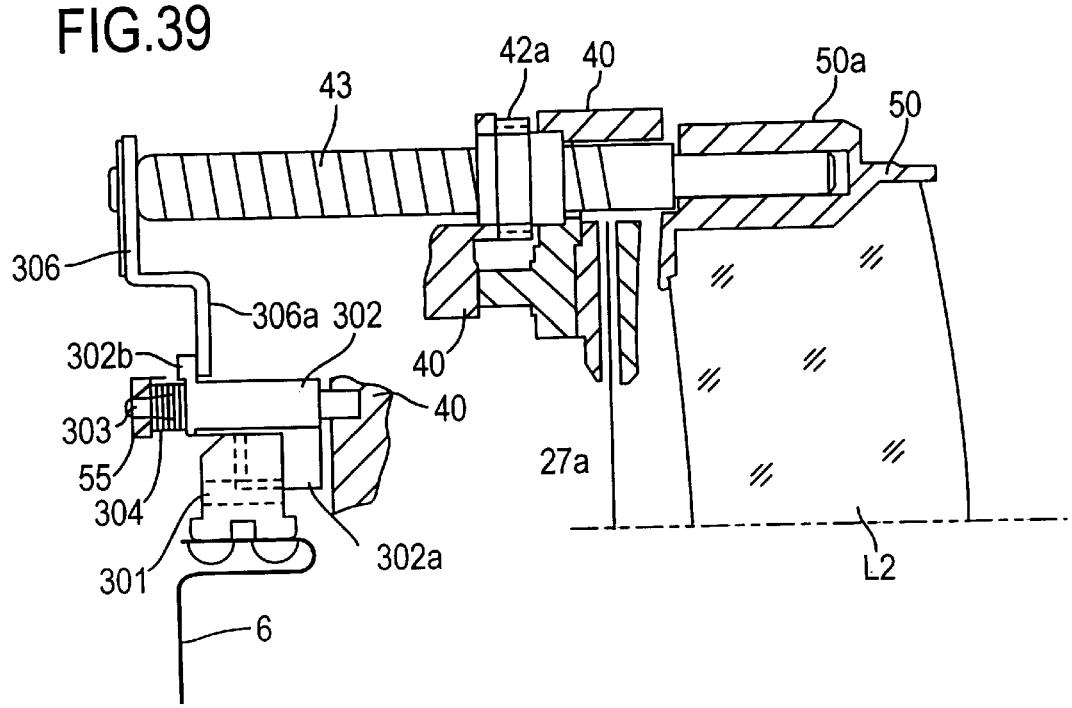
FIG. 39 is a sectional view of the initial position detecting device of the rear lens group of the present invention, at a state when the rear lens group is at the initial position.
Figure 40:
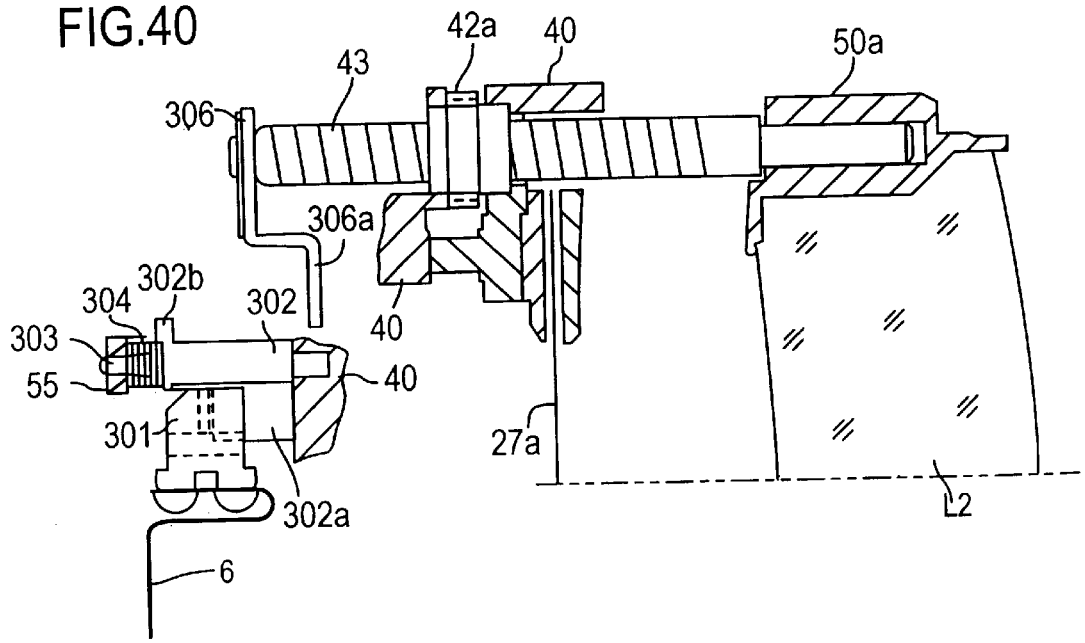
FIG. 40 is a sectional view of the initial position detecting device of the rear lens group of the present invention, at a state when the rear lens group is not at the initial position.

The AF home position detecting means 233 detects whether the rear lens group L2 is positioned at the reference position, namely the position closest to the front lens group L1 (i.e., the AF home position). In the present embodiment of the present invention, the position of the rear lens group L2 is controlled by the AF pulse number, with respect to the AF home position. The AF home position detecting means 233 is provided with a photointerrupter 301, and the position at which a chopper 302 (i.e., a chopper plate 302a), which moves integrally with the rear lens group L2, blocks the light path of the photointerrupter 301, is set as the AF home position, and according to the variation of output of the photointerrupter 301, the rear lens group L2 is detected to be at the AF home position (see, for example, FIG. 37).

Figure 33:
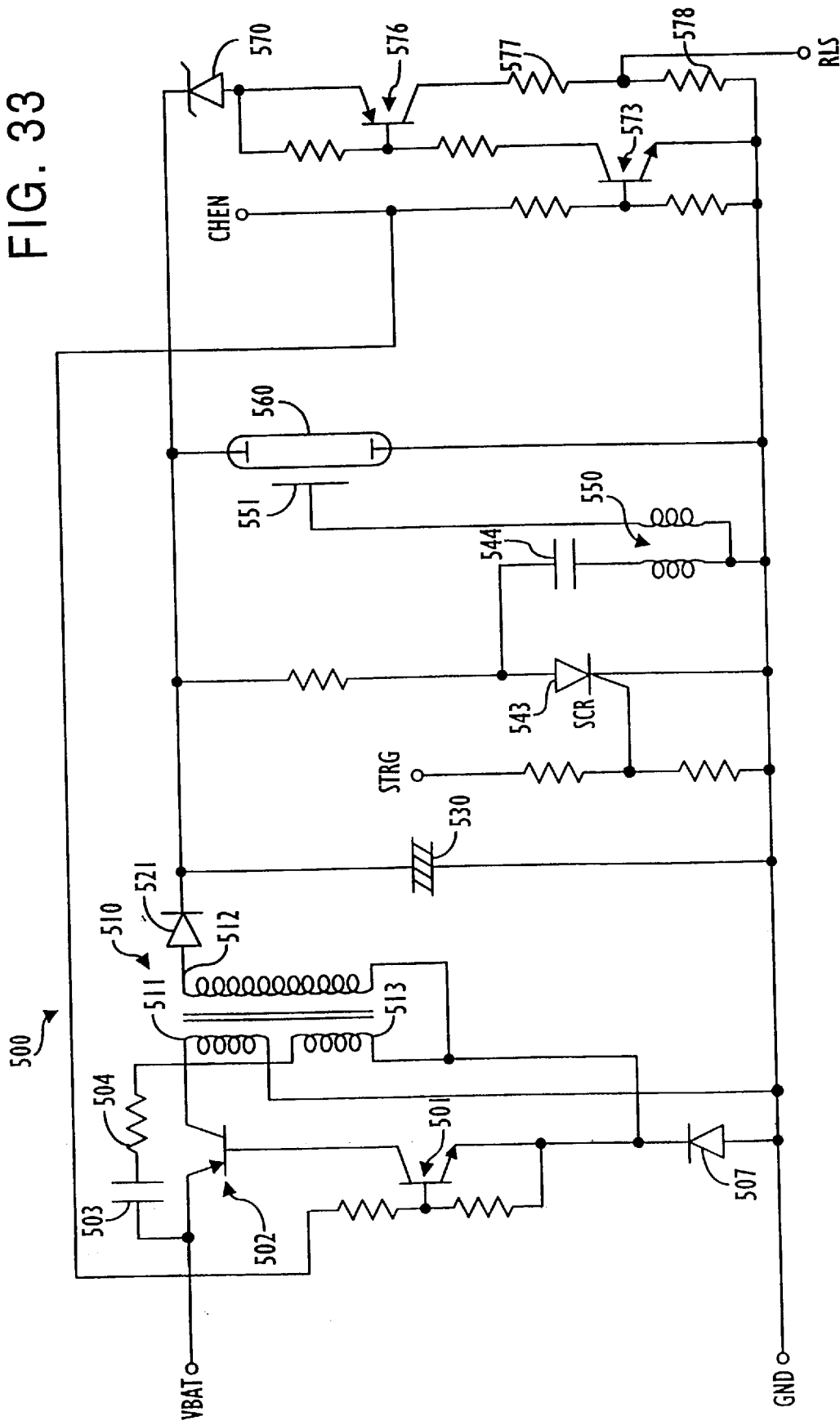
FIG. 33 is a schematic view illustrating an example of an electronic strobe circuit.

FIG. 33 illustrates an electrical circuit of the strobe means 231.

A strobe circuit 500 is provided with a ground terminal GND, a voltage input terminal VBAT and three strobe controlling terminals STRG, CHEN and RLS. The battery voltage of the camera is supplied to the terminals VBAT and GND. The controlling terminals STRG, CHEN and RLS are respectively connected to the CPU 210. The terminal STRG is a strobe flashing signal (strobe trigger) input terminal, and in an normal state the terminal STRG is set to the L level (i.e., logic low), and on occasion of strobe flashing, a signal at the H level (i.e., logic high) is input. To the terminal CHEN the charging signal is input. At the L state, charging is not performed, while at the H state, charging is performed. The terminal RLS is a charging voltage output terminal and outputs the voltage corresponding to the charging voltage to the A/D converter of the CPU 210.

The battery charging and the monitoring of the charging voltage will now be described.

As above described, the charging is performed by setting the level of the terminal CHEN to the H level (i.e., the charging signal "ON"). When the terminal CHEN is at the H level, the level of the base of a transistor 501 becomes H and transistor 501 turns ON. When the transistor 501 is ON, a voltage transforming circuit, consisting of a transistor 502, a primary winding 511 and a secondary winding 512 of a transformer 510, and a diode 521, is activated, and charging of a capacitor 530 is performed. In addition, since the signal at the level H is supplied to the terminal CHEN, transistors 573 and 576 also turn ON, and a Zener diode 570 becomes connected to each terminal of the capacitor 530 via a transistor 576 and resistors 577 and 578. If the charging voltage of the capacitor 530 is higher than the Zener voltage of the Zener break-down diode 570, the Zener current flows.

As above described, during charging when the terminal CHEN is at the H level, the resistors 577 and 578 are connected to each terminal of the capacitor 530. Zener voltage of the Zener diode 570 is deducted from the charging voltage of the capacitor 530, and the remaining voltage is divided by the resistors 577 and 578, such that a voltage value is output to the terminal RLS. In such a manner, by making an A/D conversion of the output voltage at the terminal RLS, the CPU 210 is capable of detecting the charging voltage of the capacitor 530. For reference, a diode 507 is a protecting diode for preventing the transistor 501 from exceeding an operating voltage, and a circuit consisting of a capacitor 503, a resistor 504 and a coil 513 stabilizes the transforming operation of the voltage.

When the terminal CHEN is at the L level, the transistors 501 and 502 are OFF, and charging of the capacitor 530 is not performed. In addition, when the terminal CHEN is at the L level (i.e., the charging signal "OFF"), the transistors 573 and 577 are also OFF, and in that condition, the charging voltage of the capacitor 530 can not be detected from the terminal RLS.

The strobe flashing operation will now be described.

When the charging voltage of the capacitor 530 is more than or equal to the voltage level necessary for flashing strobe flashing is performed.

When the strobe trigger is input to the terminal STRG, in other words, when the signal at the H level is input to the terminal STRG, an SCR (i.e., a thyristor) is turned ON to a conductive state. At that time, in accordance with the sudden discharge of a capacitor 544 connected to the primary winding of a transformer 550, the secondary winding of the transformer 550 will have a high voltage. The high voltage in the secondary winding of the transformer 550 is applied to a trigger terminal 551 of a xenon tube 560, and flashing of the xenon tube 560 is performed.

FIGS. 37 through 40 illustrate the structure to detect the AF home position, which is the initial position of the rear lens group L2. The AF home position is a position where the rear lens group L2 is close to the front lens group L1. By making this position the reference position for focusing, the rear lens group L2 moves along the optical axis away from the front lens group L1. When the power is "ON", the shutter release has completed, the lens is housed, and at zoom step positions other than the zoom steps 0 through 4, the rear lens group L2 is controlled to maintain the AF home position with respect to the front lens group L1. At zoom steps 0 through 4, the rear lens group L2 is moved to the rearward position from the AF home position by an amount corresponding to the specified pulse value AP1.

The rear lens supporting barrel 50 is supported, via the pair of slide shafts 51 and 52, so as to be capable of moving towards the shutter mounting stage 40 along the optical axis. One end of the slide shafts 51 and 52 are fixed on shaft supporting bosses 50b and 50c projecting from the outer periphery of the lens supporting barrel 50. The slide shaft 51 is inserted to be slidably supported by a slide bearing 51a fixed to the shutter mounting stage 40.

One end of the screw shaft 43 is fixed to a shaft supporting boss 50a projecting from the outer peripheral face of the lens supporting barrel 50, close to the shaft supporting boss 50b. The screw shaft 43 is engaged with the driving gear 42a, which is supported by the shutter mounting stage 40 and the shutter 27, such as to be rotatable, but not movable in the axial direction. When the driving gear 42a is driven by the rear lens group driving motor 30, the screw shaft 43 moves forwardly and rearwardly with respect to the driving gear 42a, and the lens supporting barrel 50, namely the rear lens group L2 supported by the lens supporting barrel 50, is moved relative to the front lens group L1. In order to prevent backlash between the screw shaft 43 and the driving gear 42a, the rear lens group urging coil spring 3 is tilted to the slide shaft 51 and is engaged with the slide bearing 51a and the shaft supporting boss 50b. The rear lens group urging coil spring 3 forces the lens supporting barrel 50 in the direction away from the shutter mounting stage 40, in other words, towards the rear of the shutter mounting stage 40. Thus backlash is prevented.

At the front of the shutter mounting stage 40, namely the presser 55, the photointerrupter 301 and the chopper 302 which comprise the AF home position detecting means 232, are mounted. The photointerrupter 301 is mounted to the flexible printed circuit board 6, and is fixed on the shutter mounting stage 40. The chopper 302 is slidably supported by a chopper guide shaft 303 and has its front end supported by the presser 55. The chopper 302 is urged towards the shutter mounting stage 40, in other words, rearwards in the optical axis direction, by a chopper urging spring 304 mounted between the chopper 302 and the presser 55. The chopper 302 is provided with the chopper plate 302a, which is inserted in the slit of the photointerrupter 301, and when the chopper 302 is at the rearward position owing to the force of the chopper urging spring 304, the optical path of the photointerrupter 301 is open. When the chopper 302 moves to the specified position against the force of the chopper urging spring 304, the optical path of the photointerrupter 301 is blocked.

At the ends of the screw shaft 43 and at one end of the slide shaft 51, a stopper plate 306 is fixed via a lock washer 305. a chopper presser 306a is provided integrally on the stopper plate 306, which is contacted with the chopper 302 and moves the chopper 302 forwardly against the force of the chopper presser urging 304 when the lens supporting barrel 50 moves forwardl. The chopper presser 306a is also contacted with a projection 302b of the chopper 302 when the lens supporting barrel 50 (i.e., the rear lens group L2) reaches a predetermined position closer to the shutter mounting stage 40. Due the further forward movement of the lens supporting barrel 50, the chopper presser 306a moves the chopper 302 against the force of the chopper urging spring 304. When the lens supporting barrel 50 moves to the AF home position close to the shutter mounting stage 40, the chopper plate 302a of the chopper 302 blocks the optical path of the photointerrupter 301. By checking the output of the photointerrupter 301, the CPU 210 detects whether the rear lens group L2, namely the lens supporting barrel 50, is at the AF home position or not.

The function of the present zoom lens camera, the following discussion will be made with reference to flow charts shown in FIGS. 41 through 73. The processes are executed by the CPU 210 based on the program stored in the internal ROM of the CPU 210.

[The Main Process]

Figure 41:
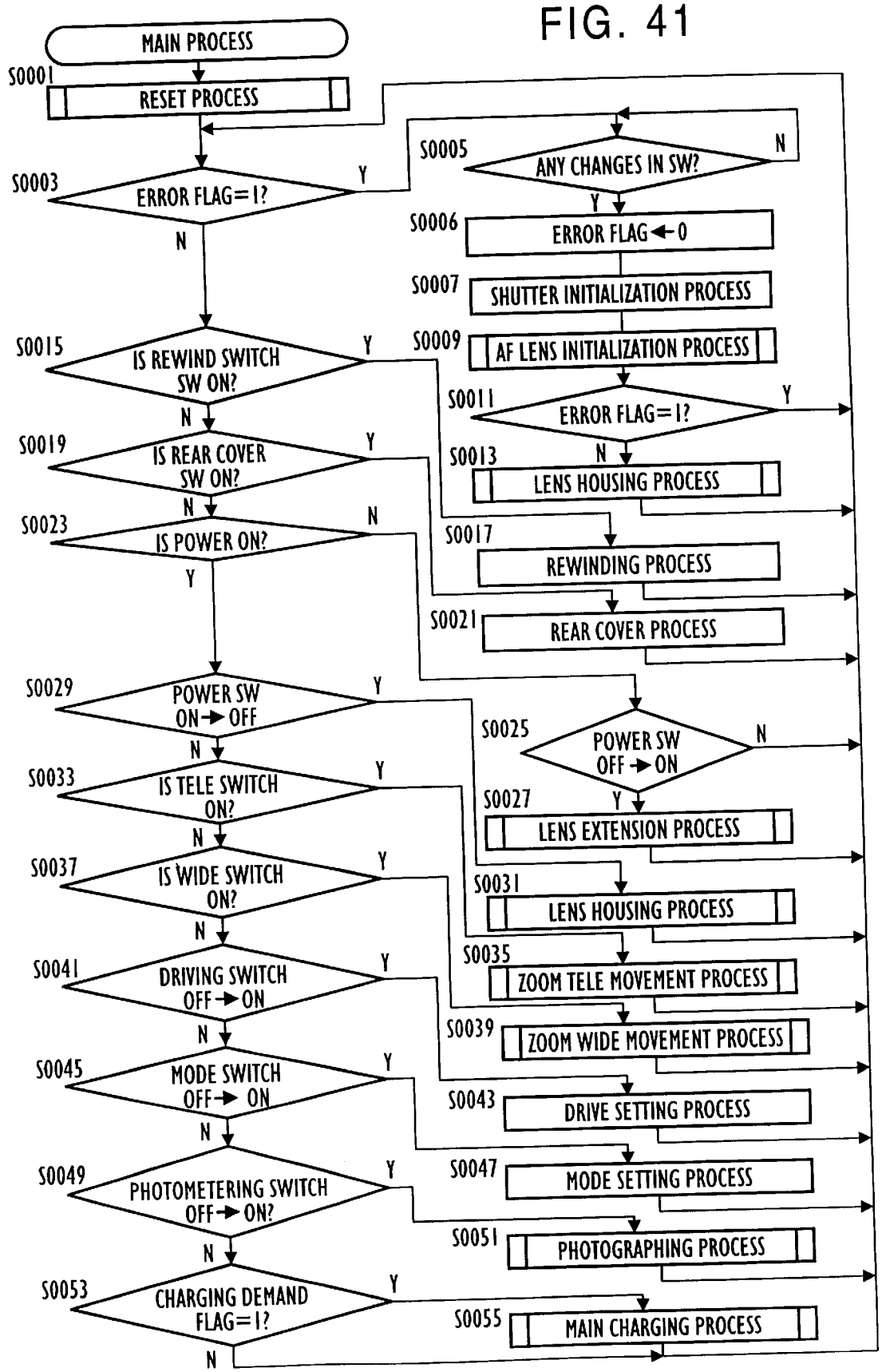
FIG. 41 is a flow chart of a main process of the zoom lens camera of the present invention.

FIG. 41 is a flow chart showing the main process of the camera in the present invention. When the battery is loaded into the camera, the CPU 210 commences the main process, and then enters a standby state and waits for an operation to be performed by the photographer.

In the main process, the reset process (FIG. 42), indicated at step S0001, is executed. In the reset process, hardware initialization, such as each port of the CPU 210, RAM initialization, test function process, reading of adjustment data, shutter initialization, AF lens initialization, and lens housing processing, are executed.

After completion of the reset process, at step S0003 through step S0053, checks are executed to check whether an error flag is set, the rewind switch 216 is ON, the state of the rear cover switch 213 changes, the power is ON, the state of the power switch 212 changes from ON to OFF the "tele" switch 62T is ON, the "wide" switch 62W is ON, the driving switch 215 is changed from OFF to ON, the mode switch 214 is changed from OFF to ON, the photometering switch SWS is changed from OFF to ON, and whether the charging demand flag is set. The processes associated with each of the checks are executed according to the result of the checks.

At step S0003, if the error flag is set (i.e., error flag is set to 1), it indicates that an error has occurred during at least one of the above processes in the reset process. To clear the error flag, error initialization processes from steps S0005 through S0013 are repeated until the error flag has cleared. At step S0005 the CPU 210 waits for a change in state of any of the switches, and after a change, at steps S0006 through S0009, the error flag is reset, a shutter initialization process (FIG. 51) and an AF lens initialization process (FIG. 43) are executed. Then at step S0011 it is checked as to whether the error flag has been set during the above processes (S0006-S0009), and if the error flag is set, control returns to step S0003 and the processes from step S0005 are repeated. If the error flag is not set at step S0011, the error state has been resolved, and control returns to step S0003 after a lens housing process (FIG. 44) has been executed at step S0013.

When the error flag is cleared, and when the power is OFF, at step S0015, step S0019, step S0023, step S0025 and step S0029, the above-mentioned checks are repeated, namely it is checked whether the rewind switch 216 is ON, the state of the rear cover switch 213 has changed, the power is ON, and whether the power switch 212 is changed from ON to OFF. When the rewind switch 216 is turned ON, or when the state of the rear cover switch 213 is changed, or when the power switch 212 is changed from ON to OFF, the following processes are executed.

At step S0015, if the rewind switch 216 is ON, the rewind motor is driven and the film rewind is executed at step S0017.

At step S0019, if the state of the rear cover switch 213 changes, namely the rear cover is closed or opened, the rear cover processes, such as resetting of the film counter or the film loading process, are executed at step S0021.

At steps S0023 and S0025, if the power switch 212 is changed from OFF to ON, the power is turned ON, and the lens extension process is executed at step S0027. Each time the power switch is turned ON, the CPU 210 turns the power ON if the power is OFF, and turns the power OFF if the power is ON.

When the power is ON, control proceeds from step S0023 to step S0029, and the processes from steps S0029 to S0053 are executed. In the processes from steps S0029 to S0053, checks are performed as to whether the power switch 212 is changed from ON to OFF the "tele" switch 62T is ON, the "wide" switch 62W is ON, the driving switch 215 is varied from OFF to ON, the mode switch 214 is varied from OFF to ON, whether the photometering switch SWS is varied from OFF to ON, and whether the charging demand flag is set.

At step S0029, if the power switch 212 is varied from ON to OFF, the power is turned OFF, and the lens housing process (FIG. 44) is executed at step S0031. In the lens housing process the lens barrel is withdrawn to the housed position.

At step S0033, if the "tele" switch 62T is turned ON, a zoom "tele" movement process (FIG. 47) is executed at step S0035. In the zoom "tele" movement process the whole unit driving motor 25 is driven in the lens extension direction.

At step S0037, if the "wide" switch 62W is turned ON, a zoom "wide" movement process (FIG. 48) is executed at step S0039. In the zoom "wide" movement process the whole unit driving motor 25 is driven in the lens retraction direction.

At step S0041, if the driving switch 215 is varied from OFF to ON, a drive setting process is executed at step S0043. Though not shown in detail, the drive setting process is a process to select the driving mode from amongst the frame photographing mode, the continuous photographing mode, the multiple exposure mode, the self-timer mode, or the like.

At step S0045, if the mode switch 214 is varied from OFF to ON, a mode setting process is executed at step S0047. Though not shown in detail, the mode setting process is a process to select the exposure mode from amongst the strobe autoflashing mode, the forced strobe flashing mode, the strobe flashing prevention mode, the red-eye reduction mode, the long exposure mode, the bulb mode, or the like.

At step S0049, if the photometering switch SWS is varied from OFF to ON, a photographing process (FIG. 49) is executed at step S0051.

At step S0053, if the charging demand flag is set, a main charging process (FIG. 50) is executed at step S0055, and the charging process of the strobe means 231 is executed.

When the power is ON, the above processes from steps S0003 through S0055 are repeated according to the operation of the photographer, and when no operation is being undertaken, the standby state is maintained, i.e., a state ready for photographing.

[The Reset Process]

Figure 42:
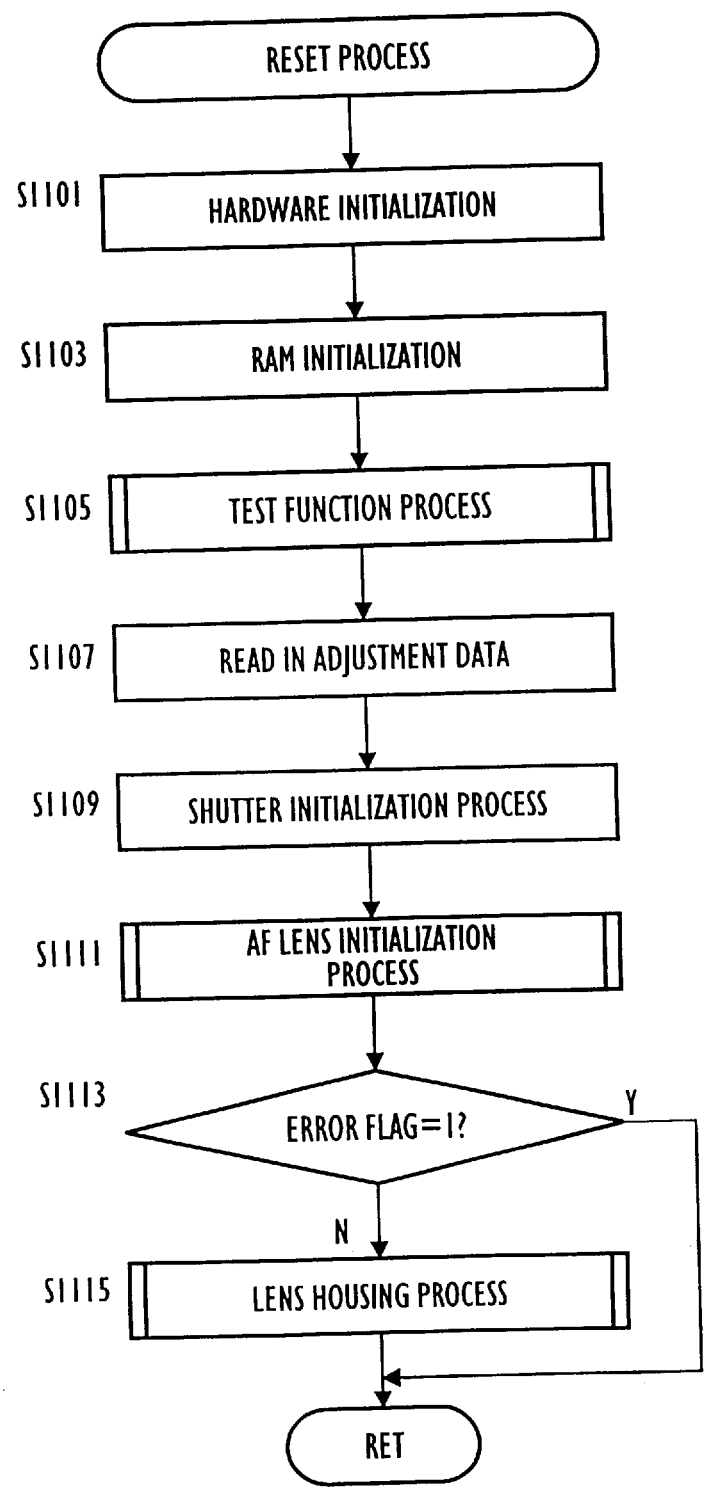
FIG. 42 is a flow chart of a reset process of the zoom lens camera of the present invention.

FIG. 42 is a flow chart showing the reset process which is performed at step S0001 of the main process. In the reset process the following processes are executed, namely, hardware initialization of each port of the CPU 210, RAM initialization, calling of the test function, reading of adjusting data, initialization of the shutter, initialization of the AF lens, and the lens housing processing.

At step S1101, the initialization of hardware, i.e., initializing the levels of each port of the CPU 210 is executed, and at S1103 the initialization of RAM, i.e., to clear the RAM in the CPU 210 is executed.

At step S1105 the test function process (FIG. 68) is executed, namely each function of the camera is tested by an external measuring apparatus, such as a computer, during or after assembly. In the test function process of the present embodiment of the present invention, although commands regarding the function to be tested are output from the external measuring apparatus, the actual process is executed by the CPU 210.

At step S1107, adjusting data is read from the EEPROM 230. The adjusting data includes exposure adjusting value data, focus adjusting value data, and diaphragm adjusting data. The exposure adjusting value data adjusts for an error between a design diaphragm value and the actual diaphragm value, or adjusts for differences due to different lenses having different transmittances. The diaphragm adjusting data detects whether the difference between the designed degree of opening of the shutter blade and the actual degree of opening thereof, has been adjusted with respect to the number of AE pulses detected by the AE encoder upon driving of the AE motor 29. If the adjustment has been performed, the diaphragm adjusted value is stored in the EEPROM 230, as part of the adjusting data.

At step S1109, the shutter initialization process is executed to completely close the shutter blades 27a. In the present embodiment of the present invention, since the opening of the shutter blades 27a is operated by the AE motor 29, there is a possibility that the battery may be removed while the shutter is open, and additionally a possibility exists that the battery is loaded while the shutter is open. Therefore, the AE motor 29 is driven in a direction to close the shutter blades 27a (shutter closing direction), and sets the closed condition wherein the shutter blades 27a are in contact with an initial position stopper (not shown).

At step S1111, the AF lens initialization process (FIG. 43) is executed, namely, the rear lens group L2 is moved to the initial position at which iis extended furthest. In the present embodiment, the rear lens group driving motor 30 is driven to move the rear lens group L2 forwardly to the furthest extended position, i.e. close to the front lens group L1, as an initial position.

At step S1113, it is checked whether the error flag has been set, and if the error flag has been set, control returns without executing any further process. If the error flag has not been set, control returns after executing a lens housing process (FIG. 44), at step S1115.

In the lens housing process, the barrier blades 48a and 48b are closed by moving the lens barrel rearwardly to the housed position within the camera body 201, by driving the whole unit driving motor 25. Since the error flag will be cleared during normal usage, the lens housing process will be executed. If the error flag is set to 1, the housing (withdrawing) of the lens is stopped since it can not be guaranteed that the rear lens group L2 is at the initial position (i.e., the AF home position) during the AF initialization process. If the lens housing process is executed in such a state, a possibility exists that the rear lens group L2 may collide with the aperture plate 14, so the lens housing process is canceled.

[The AF Lens Initialization Process]

Figure 43:
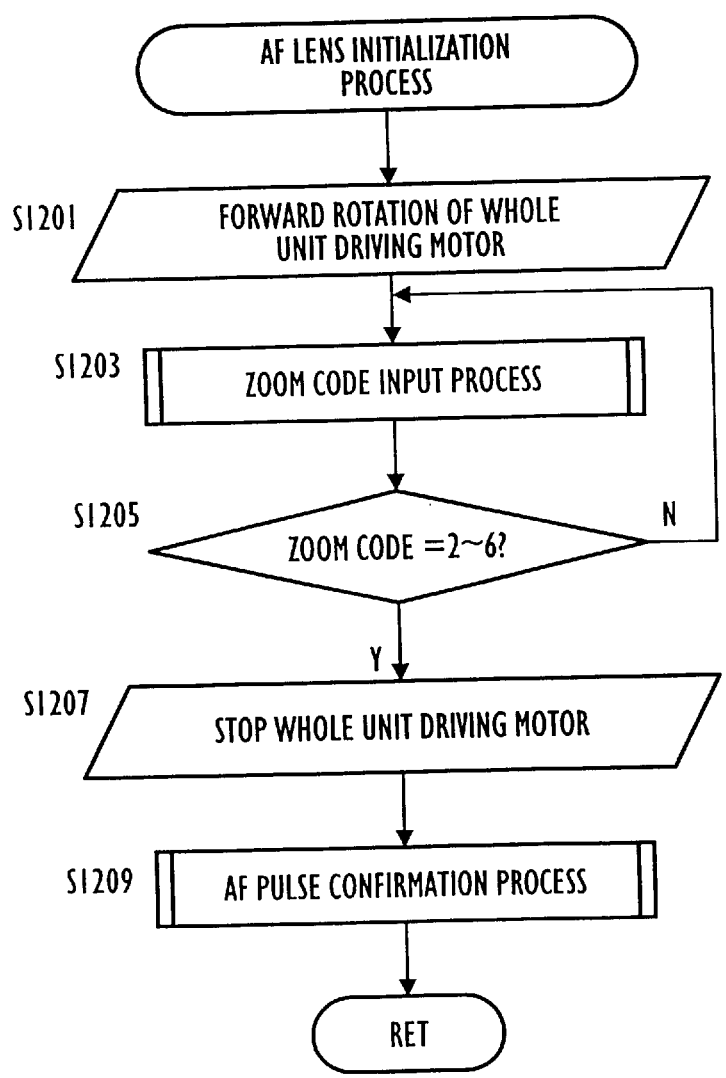
FIG. 43 is a flow chart of an AF lens initialization process of the zoom lens camera of the present invention.

FIG. 43 is flow chart showing the AF lens initialization process. In the AF lens initialization process, if the lenses are housed, the whole unit driving motor 25 is driven clockwise the rear lens group driving motor 30 is connected to an unillustrated barrier driving gear device, and the front lens group L1 and the rear lens group L2 are moved as a whole to the "wide" position by the whole unit driving motor 25. The rear lens group L2 is moved to the AF home position, namely the position at which it will be closest to the front lens group L1, by driving the rear lens group driving motor 30.

If the lenses are at any position other than the housed position, the whole unit driving motor 25 is driven clockwise, and if one of the zoom codes is detected, the rear lens group driving motor 30 is driven and the rear lens group L2 is moved to the AF home position, namely the position closest to the front lens group L1.

Since the rear lens group driving motor 30 is connected to the barrier driving gear device at the housed position, and is connected to the rear lens driving gear device at positions other than the housed position, the whole unit driving motor 25 must be driven to move the front lens group L1 and the rear lens group L2 to a position other than the housed position (i.e., to the "wide" position or further) when the rear lens group L2 is to be driven.

At step S1201, the whole unit driving motor 25 is driven clockwise, namely in the direction for extending the lenses. If the lenses are housed, the barrier driving device is detached from the barrier driving gear and engaged with the lens driving gear, so that the rear lens group L2 is in a state capable of be driven.

At step S1203, the CPU 210 performs an A/D conversion of the voltage input from the zoom code input means 219 and converts the obtained digital value into a zoom code. At step S1205, the CPU 210 checks the converted zoom code, and if the code is in the range 2 through 6 at step S1205, the whole unit driving motor 25 is stopped immediately at step S1207. In the present embodiment, zoom code 1 indicates the housed position, zoom code 2 indicates the "wide" end position, zoom code 6 indicates the "tele" end position, zoom codes 3, 4 and 5 indicate intermediate zoom positions, and zoom code 0 indicates the "OFF" state. In the processes of steps S1201 through S1207 the lens barrels 16, 19 and 20 are extended until a zoom code in the range 2 to 6 is detected.

At step S1209, when the whole unit driving motor 25 is stopped, an AF pulse confirmation process (FIG. 53) is executed and the rear lens group L2 is moved to the AF home position. The AF pulse confirmation process is characterized in that the rear lens group driving motor 30 is driven to rotate in forward and reverse directions to remove so-called "biting" of the mechanical components, such as the cam follower pin into the cam groove. After the rear lens group L2 is moved to the AF home position, control is returned.

[The Lens Housing Process]

Figure 44:
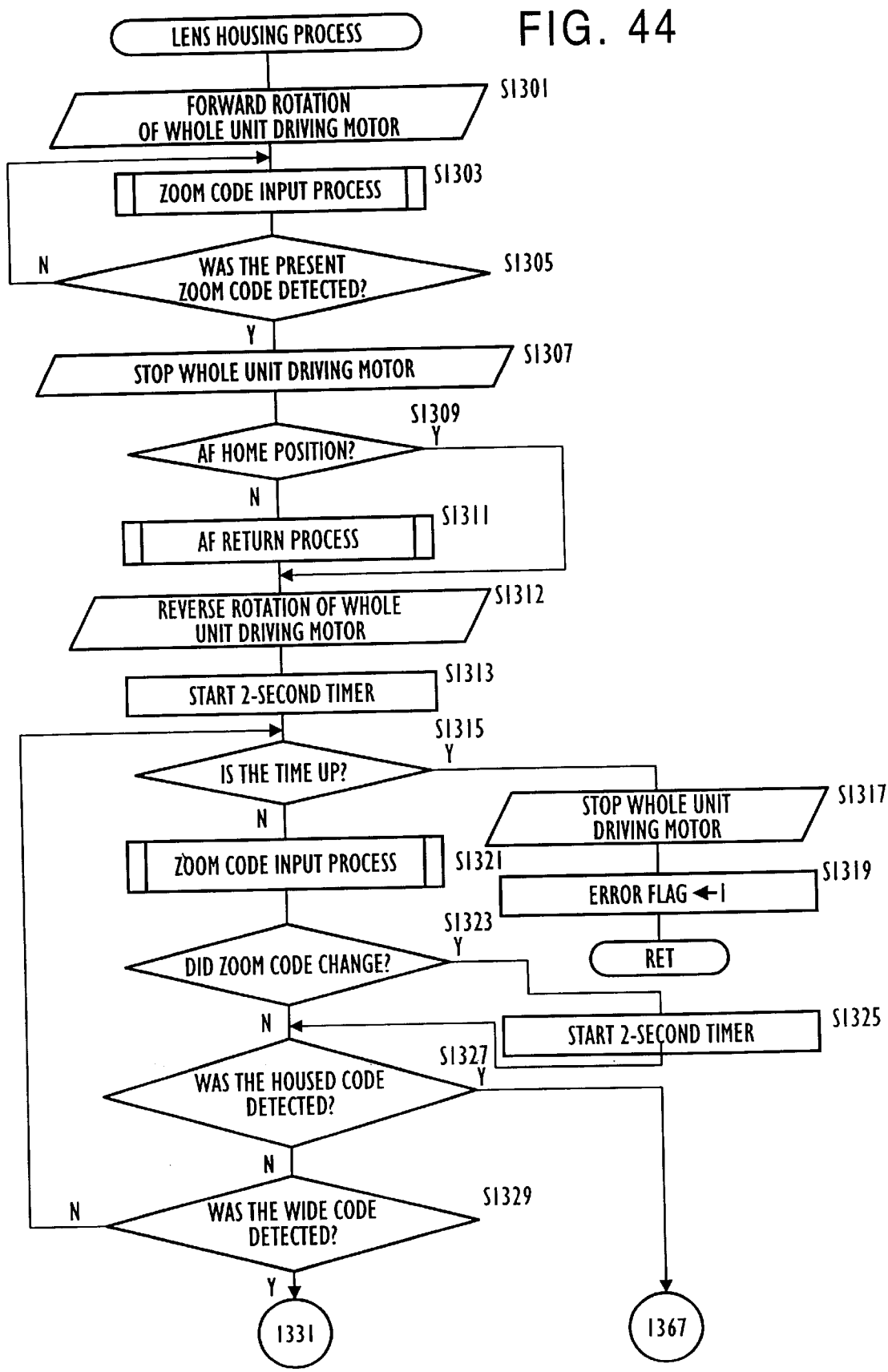
FIGS. 44 and 45 are flow charts of a lens housing process of the zoom lens camera of the present invention.
Figure 45:
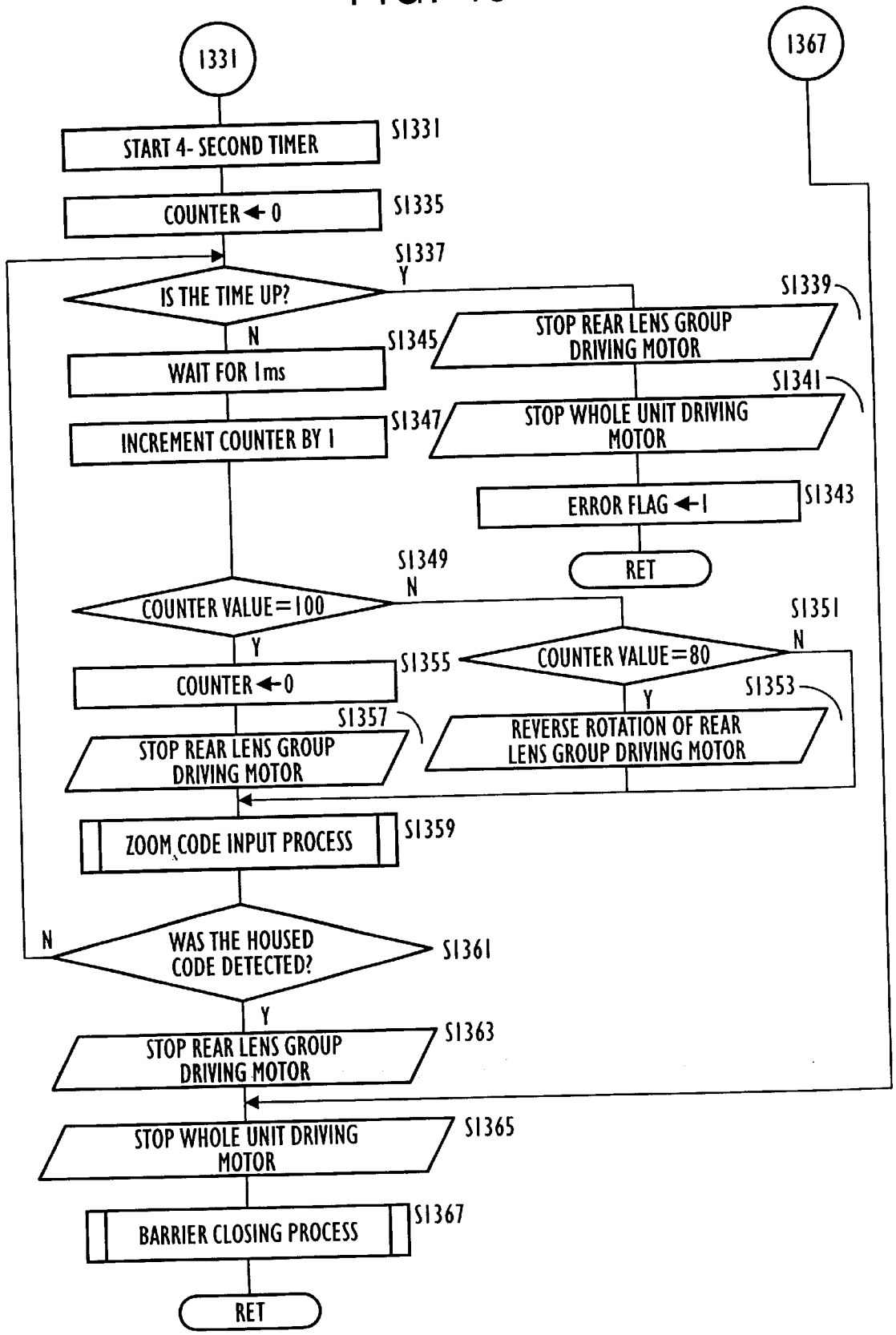

FIGS. 44 and 45 show a flow chart of the lens housing process. In the lens housing process the front lens group L1 and the rear lens group L2 are returned to the housed position. That is, the process is one in which the rear lens group L2 is returned to the AF home position by the rear lens group driving motor 30, and the lenses, i.e., the front lens group L1 and the rear lens group L2, are driven to the housed position by the whole unit driving motor 25, and then the lens barrier is closed.

At step S1301, when the lens housing process is called, the whole unit driving motor 25 is driven in the clockwise direction, namely in the "tele" zoom direction. At step S1303 the zoom code input process (FIG. 52) is executed until the present zoom code, namely the zoom code corresponding to the lens position at the time at which the lens housing process is called, is detected. If the zoom code is detected at step S1305, then at step S1307 driving of the whole unit driving motor 25 is stopped. Subsequently, at step S1309, it is judged whether the rear lens group L2 is at the AF home position. If the rear lens group L2 is not at the AF home position at step S1309, the AF return process (FIG. 54) is executed and the rear lens group L2 is moved to the AF home position.

If the lens housing process is performed when the rear lens group L2 is not at the AF home position, namely the rear lens group L2 is projecting towards the film, the rear lens group L2 may collide with the aperture plate 14 of the camera body before the lenses reach the housed position. For the purpose of avoiding such an occurrence, the rear lens group L2 is returned to the AF home position before the lenses are housed, namely before the counterclockwise driving of the whole unit driving motor 25.

When the lens housing process is called, if the lenses are positioned at the "wide" end position, there exists a possibility that the rear lens group driving motor 30 may not be connected to the movement device of the rear lens group L2, but instead connected to the barrier opening device. If the rear lens group driving motor 30 is connected to the barrier opening device, and if at the same time the rear lens group L2 is extended from the AF home position, the rear lens group L2 will not move to the AF home position even when the rear lens group driving motor 30 is driven.

Figure 34:
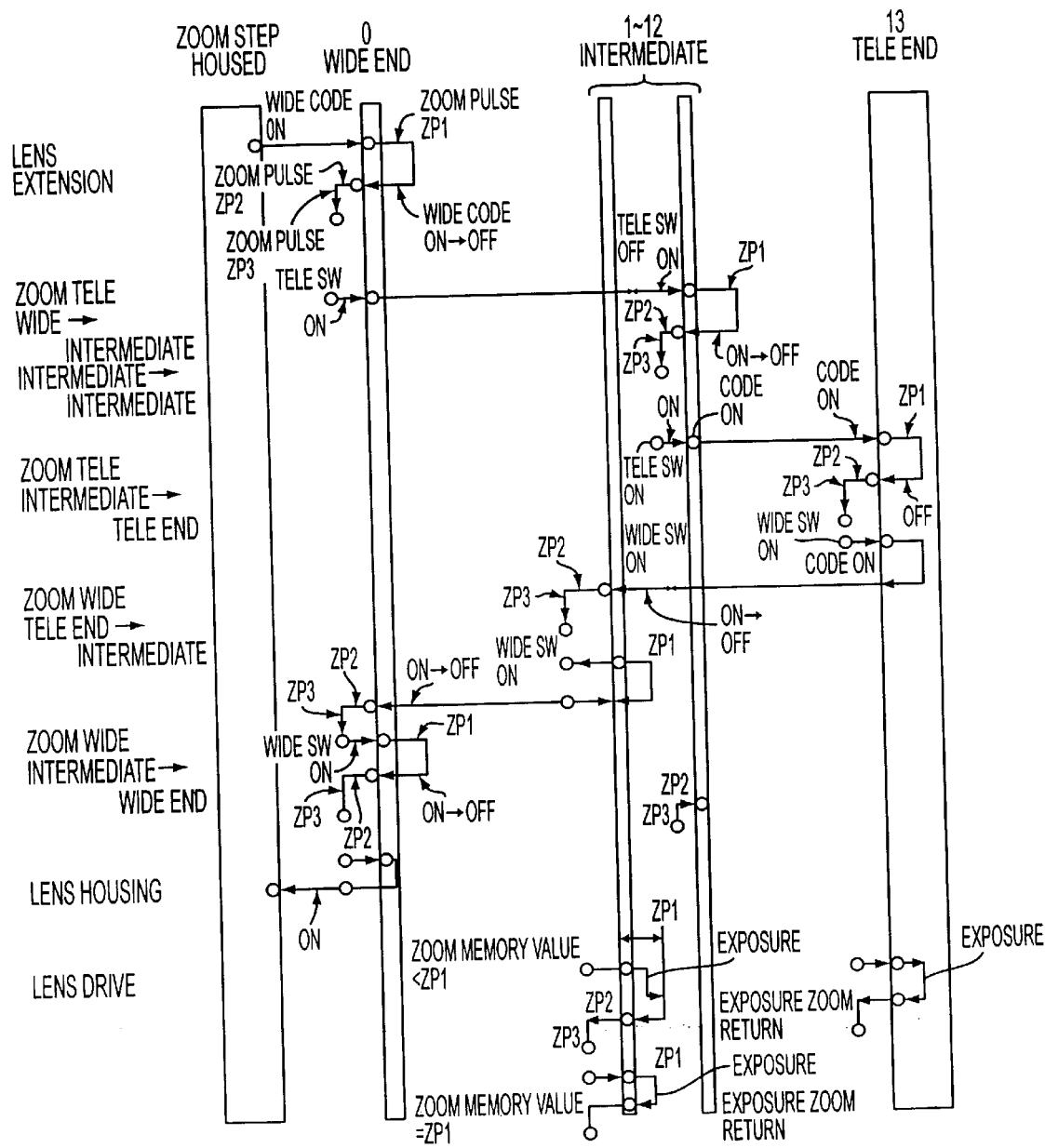
FIG. 34 is a schematic view illustrating movement of the front lens group and the rear lens group of the zoom lens camera of the present invention.

In the processes of steps S1301 through S1307, the lenses are driven once beyond the "wide" end position, to the "tele" side, as shown in FIG. 34, so that the rear lens group driving motor 30 will be connected to the driving device of the rear lens group L2 after S1307. By driving the rear lens group driving motor 30 in the AF return process at step S1311, after it has been judged at step S1309 that the rear lens group L2 is not positioned at the AF home position, the rear lens group L2 can be surely be moved.

At step S1309, if the rear lens group L2 is judged to be positioned at the AF home position, the CPU 210 skips the AF return process (step S1311), and proceeds to the movement process for housing the lenses at step S1312.

At step S1312, the movement of the lenses to the "wide" end is started by driving the whole unit driving motor 25 counterclockwise, and at step S1313 a two-second timer is started. Subsequently, at steps S1315 through S1329, before the end of the two-second timer, the zoom code, which varies according to the movement of the lenses, is input to detect the lenses reaching the "wide" end position.

At step S1315, the CPU judges whether the time of the timer is up. The phrase "time is up" refers to the case in which the variation of the zoom code is not detected within two seconds and where the movement of the lenses is stopped. If the time is not up, at step S1321, the zoom code input process is called and the zoom code is input. Whether the zoom code has changed is judged at step S1323, and if the zoom code has changed, the two-second timer is reset. If it is judged that the zoom code has not changed at step S1323, it is then judged at step S1327 whether the lenses have reached the housed position. If the lenses have not reached the housed position, it is judged whether the lenses have reached the "wide" end position at step S1329. If neither the housed code nor the "wide" code is detected, the CPU 210 repeats the processes from step S1315.

If the time becomes up while repeating the above processes, at step S1317 the CPU 210 stops the whole unit driving motor 25, and sets the error flag to 1 to indicate the occurrence of an error (step S1319), and the lens housing process is ended returns to the position at which the present process was called.

If at step S1329, the "wide" code was detected during the above process, then a four-second timer is set at step S1331, and the counter is reset to 0 (step S1335), and the processes from steps S1337 to S1361 are repeated until the four-second timer is up. Here, a process is executed in which the rear lens group driving motor 30 is driven intermittently while the whole unit driving motor 25 is driven continuously, namely the lenses are moved beyond the "wide" end position towards the housed position.

In the camera 1 of the present embodiment, as already described, the movement of the rear lens group L2 and the opening and closing of the barrier are executed by the rear lens group driving motor 30. When the lenses are positioned on the "tele" side of the "wide" end position, the rear lens group driving motor 30 is connected to the driving device of the rear lens group L2 and is not connected to the barrier opening device. However, when the lenses are positioned toward the housed position from the "wide" end position or, when the lenses are being housed, the barrier/lens switching gear device must be switched so that the rear lens group driving motor 30 is connected to the barrier opening device.

Although the switching of the gears is designed to be executed through a cam device according to the movement of the lenses, in order to ensure that the barrier/lens switching gear device will surely be engaged with the teeth of the barrier driving gear at this time, the rear lens group driving motor 30 is driven while the lenses are being moved from the "wide" end position to the housed position. To ensure the engagement of the barrel lens switch gear, after step S1311 where the counterclockwise driving of the whole unit driving motor 25 is commenced, the rear lens group driving motor 30 is designed to be driven intermittently.

At step S1337, it is judged whether the time of the four-second timer is up. Normally, the time of the four-second timer will not be up as long as an error has not occurred, and an N (NO) judgement is made at step S1337. At step S1345, after waiting 1 ms, the counter is incremented at step S1347, and it is judged whether the value of the counter has reached 100 at step S1349. If the value of the counter is less than 100, an N judgement is made at step S1349, and then at step S1351, it is judged whether the value of the counter has reached 80 at step S1351.

If the value of the counter is less than 80 at step S1351, the zoom code input process is called and the zoom code is input at step S1359. If the housed code is not detected at step S1361, control returns to step S1337 and the processes are repeated. At step S1351, when the value of the counter reaches 80, the counterclockwise driving of the rear lens group driving motor 30 is executed at step S1353. If the value of the counter reaches 100, the counter is reset to 0, and the rear lens group driving motor 30 is stopped, at steps S1355 and S1357.

Since the waiting time of 1 ms is set at step S1345, the above processes are repeated at a 100 ms cycle. Therefore, when the value of the counter is between 0 and less than 80, namely, until 80 ms passes after the detection of the "wide" end code, only the whole unit driving motor 25 is driven. When the value of the counter is 80 or more and less than 100, namely, 80 ms or more and less than 100 ms have passed since the detection of the "wide" end code, both the whole unit driving motor 25 and the rear lens group driving motor 30 are driven. When the value of the counter reaches 100, namely, 100 ms have passed, the driving of the rear lens group driving motor 30 is stopped and only the whole unit driving motor 25 is driven continuously. Since the above processes are repeated, during the driving of the whole unit driving motor 25, the rear lens group driving motor 30 is driven for 20 ms in each 100 ms period.

If the housed code is not detected before the time of the four-second timer is up, the time is judged to be up at step S1337. The housed code will not be detected within four seconds if the movement of the lens is obstructed for some reason, and in such a case, at steps S1339 and S1341, the rear lens group driving motor 30 and the whole unit driving motor 25 are stopped, and the process is ended upon setting the error flag to 1 to indicate the occurrence of an error.

During the above process, when the housed code is detected, the CPU 210 stops the rear lens group driving motor 30 at step S1363, and further stops the whole unit driving motor 25 at step S1365, and after closing the barrier by calling the barrier closing process, the lens housing process is completed. The barrier closing process is the process to close the lens barrier by the rear lens group driving motor 30.

[The Lens Extension Process]

Figure 46:
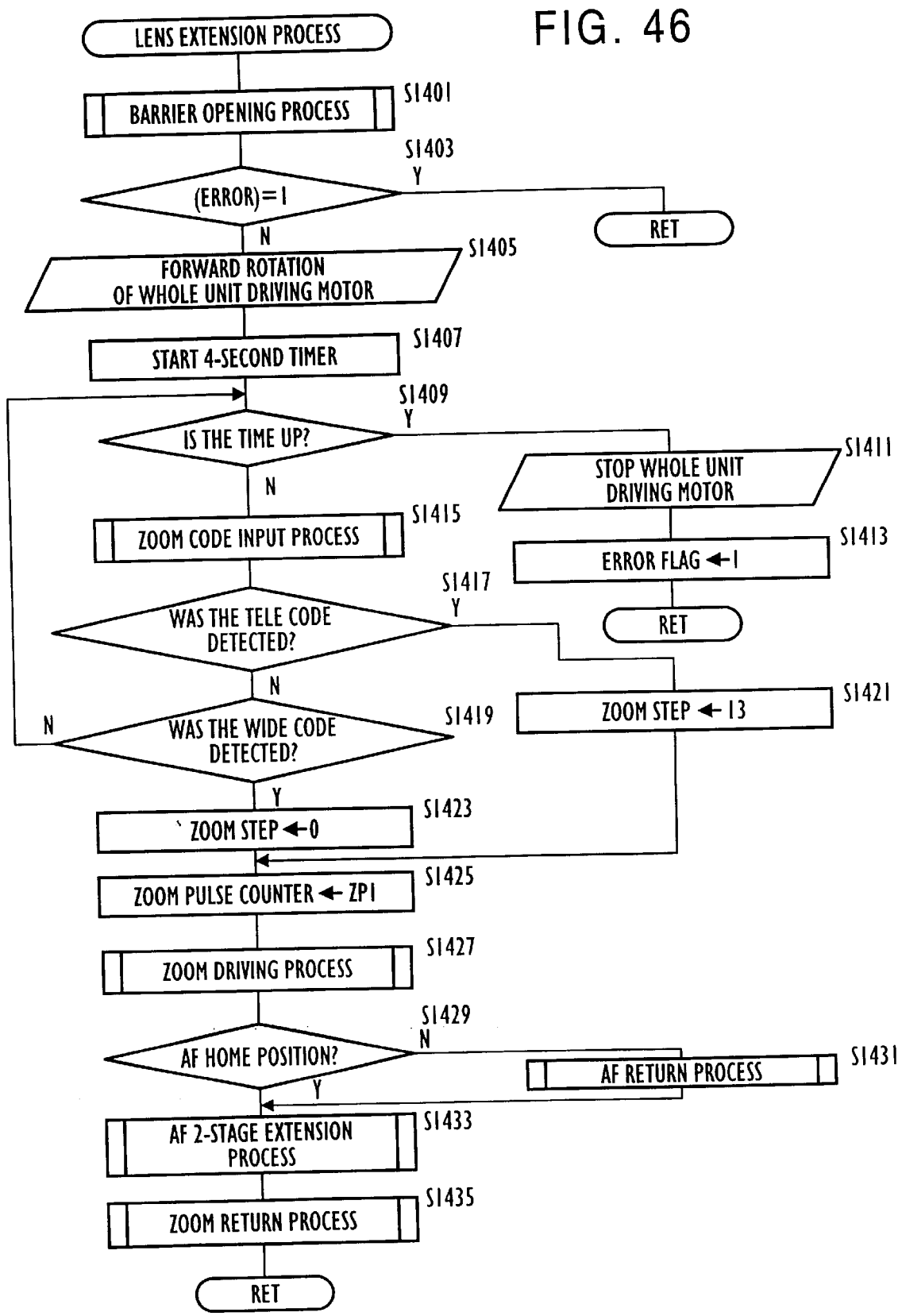
FIG. 46 is a flow chart of a lens extension process of the zoom lens camera of the present invention.

FIG. 46 shows a flow chart of the lens extension process. In the lens extension process, when the state of the camera changes from being in the standby state to the power "ON" state (i.e., the operational state), the lens barrier is opened and the lenses (i.e., the front lens group L1 and the rear lens group L2) are extended from the housed position to the "wide" end position.

When the lens extension process is called, at step S1401, the barrier opening process is called and the barrier is opened by driving the rear lens group driving motor 30. In the barrier opening process, if a pulse is not output from the AF reference pulse input means 222, namely, if the rear lens group driving motor 30 is not driven, the error flag is set to 1.

At step S1403, it is judged whether the error flag has been set to 1 in the barrier opening process. The error flag will be set to 1 if the barrier opening process does not end normally, and in this case, the lens extension processes after step S1405 are not executed and control returns. The error flag will be set to 0 if the barrier opening process is ended normally, and in this case, at step S1405 the whole unit driving motor 25 is driven clockwise and the movement of the rear lens group L2 and the front lens group L1 in the "tele" direction is started.

With the commencement of driving of the whole unit driving motor 25, the CPU 210 starts the four-second timer at step S1407, and monitors whether the "wide" end code (i.e., whether the lenses reach the "wide" end position) is detected before the time of the timer is up.

At step S1409, the CPU 210 judges whether the time of the timer is up. Normally, since the lenses reach the "wide" end position within four seconds from starting of the lens extension, the judgement at step S1409 is "N". At step S1415 the zoom code input process is called, and at step S1417 it is judged whether the input code, namely, the zoom code corresponding to the lens position, is the "tele" end code, and if the input code is not the "tele" end code, at step S1419 it is judged whether the input code is the "wide" end code.

Under normal conditions, the lens moves from the housed position to the "tele" end position within four seconds. Accordingly, before the time of the four-second timer is up, if neither the "tele" end code nor the "wide" end code is detected, it represents, for example, that the movement of the lens is obstructed. Therefore, if at step S1409 the time is judged to be up during the lens movement, at step S1411 the driving of the whole unit driving motor 25 is stopped, and at step S1413 the error flag is set to indicate that an error has occurred, and the lens extension process is ended.

In the normal lens extension process, when the lenses are extended, the "wide" end code is firstly detected. At step S1419, if the "wide" end code is detected, then at step S1423 the zoom step, which is an indicator of the lens position, is set to 0, corresponding to the "wide" position. From step S1425, the processes for stopping the lenses are executed.

If the lens extension process is continued without detecting the "wide" end code, the lenses will eventually reach the end of the range of capable movement, and will become immovable. In the camera 1 of the present embodiment, during the lens extension process, the lenses will continue to move even without the "wide" end being detected, and when the "tele" end code is detected at step S1417, the movement of the lenses, namely, the processes after step S1425, will be stopped. When the lenses reach the "tele" end position, the zoom step is set to 13, corresponding to the "tele" end position, at step S1421. Therefore, during the lens extension process, the zoom step will be set to the correct value corresponding to the lens position even when the lenses have moved to the "tele" end.

As described above, when the lenses have been extended and the zoom step has been set to correspond to the lens position, from steps S1425 to S1435 the processes to stop the lenses are executed. In the camera of the present embodiment, in order to obtain the position of the lens, the zoom step is set upon detecting the zoom code. The lenses are stopped, for the purpose of detecting the zoom code, the brush 9a is designed so as to stop at a position that is shifted towards the "wide" end position by a predetermined amount, namely, "the standby position". When the lenses are moved for the purpose of zooming or focusing, the lenses are moved once towards the "tele" side, regardless of whether the direction of movement is towards the "wide" end or the "tele" end, in order for the brush 9a to contact the zoom code. The zoom code is then input to the CPU 210, which then controls the amount of movement of the zoom lens based on the position at which the zoom code is input, i.e., by making the position at which the zoom code is input a reference position.

Figure 57:
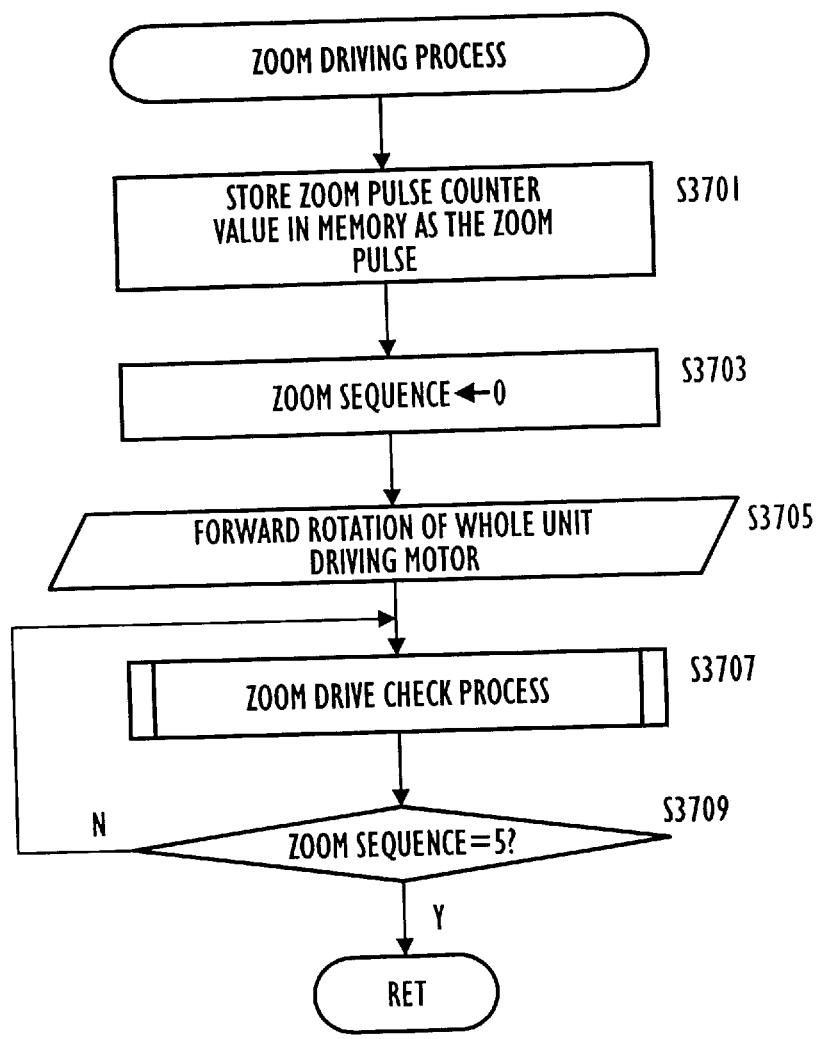
FIG. 57 is a flow chart of a zoom driving process of the zoom lens camera of the present invention.

At step S1425, a first zoom pulse ZP1 having a predetermined value, is set in the zoom pulse counter and the zoom driving process is called, as shown in FIG. 57. In the zoom driving process, the whole unit driving motor 25 is driven clockwise, namely, in the direction in which the lenses are moved toward the "tele" side, until the number of pulses output to the CPU 210 by the zoom pulse input means 220 (output in synchronization with the rotation of the whole unit driving motor 25), becomes equal to the value of the counter value set in the zoom pulse counter. Thus, the lenses will be stopped upon being moved further towards the "tele" position by a predetermined amount from the position at which the zoom code detecting terminal detects the zoom code.

The value by which the brush for zoom code detection will be moved past the zoom code and positioned at a non-continuous part on the "tele" side when the lenses are moved by the zoom driving process, is used as the first zoom pulse ZP1, which is set at the zoom pulse counter at step S1425. The value of the first zoom pulse ZP1 also satisfies the following conditions. In the camera of the present embodiment, the magnification of the finder optical system varies according to the movement of the lenses. Accordingly, the first zoom pulse ZP1 is set so that the magnification of the finder will not be affected even if the lenses are moved by an amount corresponding to this value of the pulse. In the present embodiment, though the lenses move when the shutter button is pressed, the number of zoom pulses, corresponding to the amount of movement of the lenses at that time, is set to a value which will not exceed that of the first zoom pulse ZP1.

After the lenses are moved by an amount corresponding to the zoom pulse ZP1, at step S1429 it is judged whether the rear lens group L2 is positioned at the AF home position, and if the rear lens group L2 is not positioned at the AF home position, namely, if the rear lens group L2 is extended from the AF home position at step S1429, the AF return process is called at step S1431 and the rear lens group L2 is moved to the AF home position. With the rear lens group L2 being positioned at the AF home position, the AF two-stage extension process at step S1433, and the zoom return process at step S1435, are executed and control returns to the calling routine.

The AF two-stage extension process is the process in which the rear lens group L2 is extended by a certain amount from the AF home position. In the camera of the present invention, when photography is performed (when the shutter button is depressed fully), after the front lens group L1 and the rear lens group L2 have been moved simultaneously for zooming, in addition to the movement of the front lens group L1 and the rear lens group L2 by the whole unit driving motor 25, the movement of only the rear lens group L2 by the rear lens group driving motor 30 is also performed for the purpose of focusing and adjustment of the focal length.

During photographing, since the amount of movement of the rear lens group L2 is relatively large when the lenses are at the "wide" end side, the release time lag, which is the time difference between the point at which the shutter button is pressed and the point at which exposure is actually performed, becomes rather long. In order to shorten the release time lag, in the camera of the present invention, when the lenses are positioned at the "wide" side, the rear lens group L2 is extended by a predetermined amount in advance. The AF two-stage extension process of step S1433 is performed for this purpose, and is the process by which the rear lens group L2 is extended by a predetermined amount, only when the lenses are positioned on the "wide" side. In the present embodiment, the judgement as to whether the lenses are on "wide" side, is made according to whether the zoom step is less than or equal to 4, which will be described later (see below). In step S1435, the zoom return process moves the lenses toward the "wide" direction by a predetermined amount corresponding to zoom pulse ZP2 (described hereinafter).

[The Zoom "tele" Movement Process]

Figure 47:
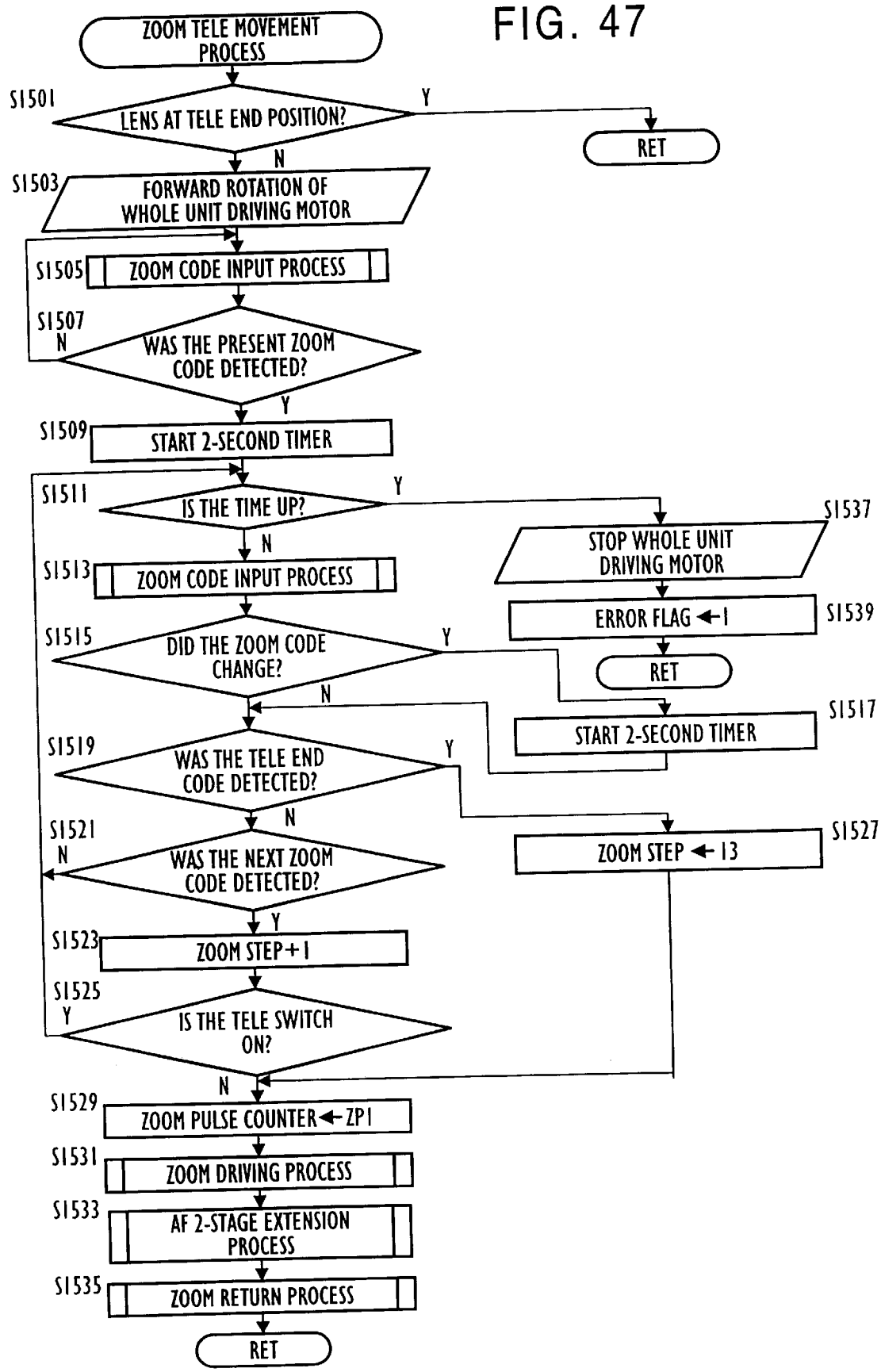
FIG. 47 is a flow chart of a zoom "tele" movement process of the zoom lens camera of the present invention.

FIG. 47 shows a flow chart of the zoom "tele" movement process. This process will be described with reference to FIG. 34, which shows the relationship between the zoom code plate 13*b* and the positions of the front lens group L1 and the rear lens group during the zoom "tele" movement process. The zoom "tele" movement process is a process to drive the whole unit moving motor 25 in a direction in which the lens barrels 16, 19 and 20 extend (i.e., in the direction in which the focal length is made long), namely the front lens group L1 and the rear lens group L2 are advanced as a whole without changing the relative distance therebetween.

In the zoom "tele" movement process, the zoom code corresponding to the present position of the lens is detected by driving the whole unit driving motor 25 clockwise. The point at which the zoom code turns "ON" is used as a reference point when the whole unit driving motor 25 is to be stopped. After the whole unit moving motor 25 is driven clockwise to advance the lenses by the predetermined first zoom pulse value ZP1 with respect to this reference point, the whole unit driving motor 25 is driven counterclockwise. After the whole unit driving motor 25 has been driven to rotate counterclockwise by the second zoom pulse value ZP2 with respect to the point at which the zoom code turns "ON/OFF" again, the whole unit driving motor 25 is driven clockwise by a backlash eliminating zoom pulse value ZP3, and the whole unit driving motor 25 is stopped. By this zoom "tele" movement process, the zoom lens is stopped between zoom codes with backlash in the forwarding (advancing) direction being removed to some extent.

Furthermore, in the present embodiment, when the whole unit driving motor 25 stops, if the zoom step is not more than 4, the rear lens group L2 is retracted by an amount corresponding to the predetermined AF pulse value AP1. In the present embodiment, the present lens position is controlled by dividing the focal length range, from the "wide" end to the "tele" end, into fourteen parts, and assigning the zoom step 0 to the "wide" end, the zoom step 13 to the "tele" end, and zoom steps 1 through 12 to the focal lengths in between.

In the zoom "tele" movement process, at step S1501 it is checked whether the lenses are at the "tele" end position, and if the lenses are at the "tele" end position, control returns since there is no need for tele-zooming.

If the lenses are not at the "tele" end position at step S1501, at step S1503 the whole unit driving motor 25 is driven clockwise, namely, in the tele-zoom direction, and the zoom code input process is executed at step S1505. The process waits until the present zoom code corresponding to the zoom step is detected at step S1507. When the present zoom code corresponding to the zoom step is detected, at step S1509 a two-second timer is started to detect a state in which the whole unit driving motor 25 is incapable of driving for a predetermined period of time (i.e., two seconds).

When the two-second timer is started, at step S1511 it is checked whether the time is up. In the case of normal operations the time will not be up, and therefore at step S1513 the zoom code input process is executed. Then at step S1515 it is checked whether the zoom code has changed, and if the zoom code has not changed, a "tele" end code detecting check is directly executed at step S1519. If the zoom code has changed, the "tele" end code detecting check is executed at step S1519 only after restarting the two-second timer at step S1517.

If the zoom code does not change even after the whole unit driving motor 25 has driven for the predetermined period of time, it is assumed that an abnormal condition, such as the lens barrel has contacted some object, has occurred. Therefore at steps S1511, S1537 and S1539, after starting the two-second timer, if the two seconds have elapsed and the time of the two-second timer is up without any variation of the zoom code, the whole unit driving motor 25 is stopped, the error flag is set, and control is returned.

If the "tele" end code is not detected at step S1519, it is judged whether or not the next zoom code is detected at step S1521, and if the next code is not detected, the processes of steps S1511 through S1519 are repeated. Upon detection of the next zoom code, the zoom step is incremented by 1 at step S5123, and if the "tele" switch 62T is ON at step S1525, control is returned to step S1511 and the above processes are repeated, while if the "tele" switch is OFF, a jump to step S1525 is performed. That is, once this process is entered, tele-zooming is performed by one zoom step even when the zoom switch 62T is turned OFF before tele-zooming is performed by one zoom step.

A jump to step S1529 is performed when the lenses reach the "tele" end or when the "tele" switch 62T is turned OFF (steps S1525, S1529 or S1519, S1527, S1529). If the jump is performed upon reaching the "tele" end, the zoom step is set to 13 at step S1527.

At step S1529, the predetermined first zoom pulse value ZP1 is set in the zoom pulse counter. Then after the zoom driving process at step S1531, the AF two-stage delivery process (step S1533) and the zoom return process (step S1535) are executed, and control is returned.

In the zoom driving process, the whole unit driving motor 25 is driven clockwise (i.e., in the direction in which the lenses are extended) by an amount corresponding to the value of the zoom pulse counter, namely, that of the first zoom pulse value ZP1.

In the AF two-stage extension process, when the whole unit driving motor 25 is stopped, if the zoom step is not more than 4, the rear lens group L2 is retracted by an amount corresponding to the predetermined AF pulse value (i.e., AP1). Then the whole unit driving motor 25 is driven counterclockwise, by an amount corresponding to the second zoom pulse value ZP2, with respect to the point at which the zoom code turns ON/OFF, the whole unit driving motor 25 is driven clockwise by an amount corresponding to the backlash eliminating third zoom pulse value ZP3, and the whole unit driving motor 25 is stopped. By this zoom "tele" movement process, the zoom lens is stopped between zoom codes with the backlash in the advancing direction being somewhat eliminated.

In the zoom return process, the whole unit driving motor 25 is driven counterclockwise, and is further driven counterclockwise by an amount corresponding to the second zoom pulse value ZP2 with respect to the point at which the zoom code turns ON/OFF. After that, the motor is driven clockwise by an amount corresponding to the backlash eliminating third zoom pulse value ZP3, and then the whole unit driving motor 25, is stopped to stop the front lens group L1 and the rear lens group L2 at the standby position between the zoom codes.

[The Zoom "wide" Movement Process]

Figure 48:
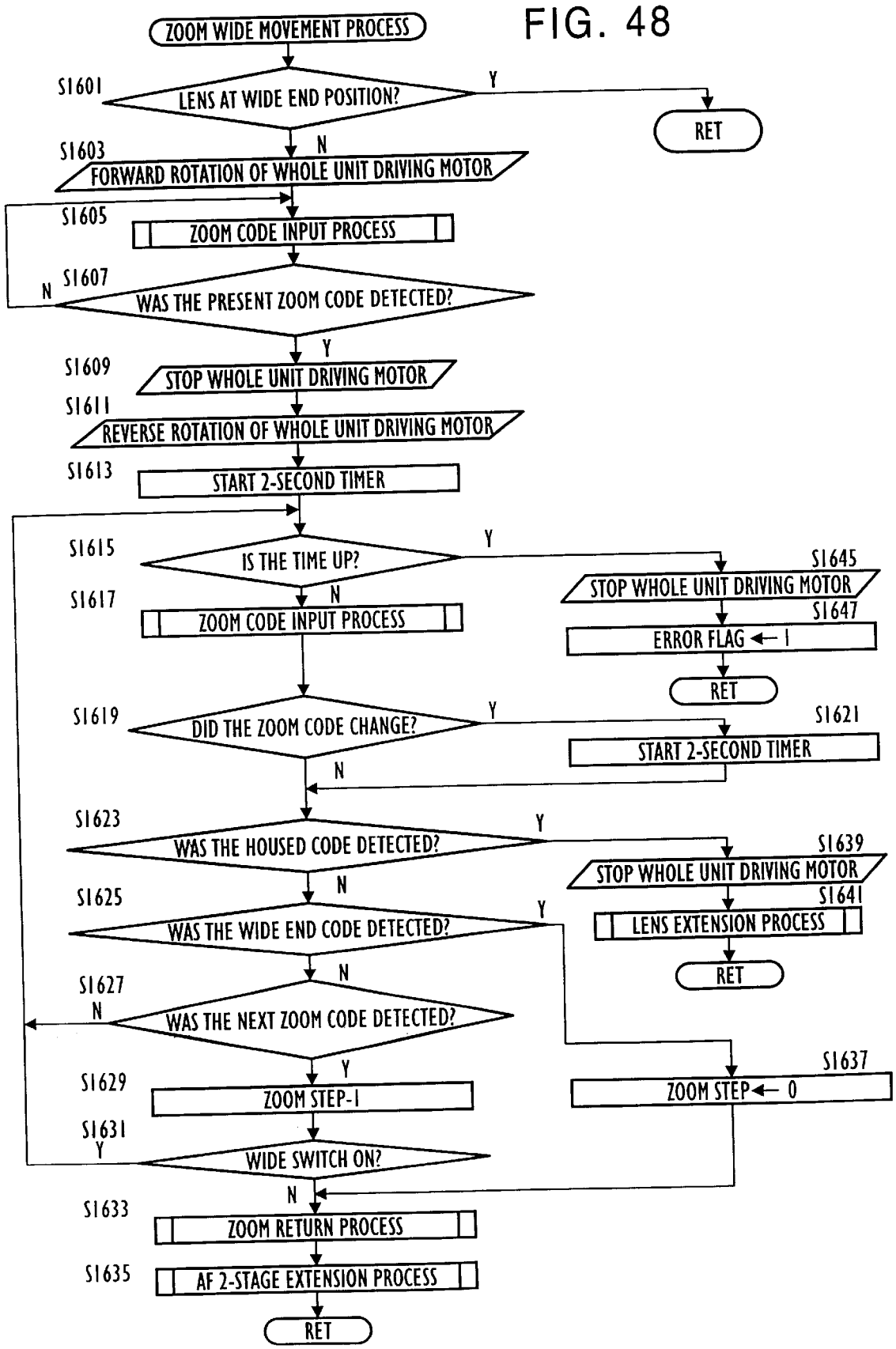
FIG. 48 is a flow chart of a zoom "wide" movement process of the zoom lens camera of the present invention.

FIG. 48 shows a flow chart for the zoom "wide" movement process. This process shall be firstly described with reference to FIG. 34, which shows the relationship between the zoom code plate 13b and the positions of the front lens group L1 and the rear lens group L2 during the zoom "wide" movement process. In the zoom "wide" movement process the whole unit driving motor 25 is driven in the direction in which the lens barrels 16, 19 and 20 are retracted (i.e., the direction in which the focal length is made shorter), namely, the front lens group L1 and the rear lens group L2 are retracted as a whole without changing the distance therebetween.

In the zoom "wide" movement process, the whole unit driving motor 25 is driven clockwise and after being driven clockwise further by an amount corresponding to the first zoom pulse value ZP1. From the point at which the zoom code corresponding to the present lens position is detected, the whoel unit driving motor 25 is driven counterclockwise. When the whole unit driving motor 25 is stopped in the intermediate zoom region, the motor 25 is further driven counterclockwise by an amount corresponding to the second zoom pulse value ZP2 from the point at which the zoom code turns "ON/OFF". Then the motor 25 is driven counterclockwise by an amount corresponding to the backlash eliminating zoom pulse value ZP3, and then the whole unit driving motor 25, is stopped. By this zoom "wide" movement process, the zoom lens is stopped between zoom codes with the backlash in the forwarding (advancing) direction being somewhat eliminated.

In the present embodiment, when the whole unit driving motor stops, if the zoom step is not more than 4, the rear lens group L2 is retracted by an amount corresponding to the predetermined AF pulse value AP1. The motor 25 is then driven counterclockwise by an amount corresponding to the second zoom pulse value ZP2 with respect to the point at which the zoom code turns "ON/OFF", and then the motor 25 is driven clockwise by an amount corresponding to the zoom pulse value ZP3 for backlash elimination, and then the whole unit driving motor 25 is stopped. By this zoom "wide" movement process, the zoom lens is stopped between zoom codes with the backlash in the advancing direction being eliminated to some extent.

When the zoom "wide" movement process is entered, at step S1601 it is checked whether or not the lens is at the "wide" (i.e., "wide" end) position, and if the lens is at the "wide" position, control returns since there is no need for zooming.

If at step S1601, the lens is not at the "wide" position, the whole unit driving motor 25 is driven in a clockwise direction, i.e., tele-zooming direction, at step S1603 since there is a possibility that the lenses may have been moved past the next zoom code due to the backlash when the lenses were retracted. At step S1605 the zoom code input process is executed and the process waits until the present zoom code corresponding to the zoom step is detected at step S1607. When the present zoom code corresponding to the zoom step is detected, the whole unit driving motor is stopped (step S1609), driven counterclockwise (step S1611), and the two-second timer is started at step S1613. When the two-second timer is started, it is checked whether the time is up at step S1615. In the case of normal operations the time will not be up, and therefore at step S1617 the zoom code input process is executed. It is then checked whether the zoom code has changed at step S1619, and if the zoom code has changed, the two-second timer is restarted (step S1621) and it is checked whether the housed code has been detected at step S1623. If the zoom code has not changed at step S1619 control proceeds to step S1623. If the housed code is not detected at step S1623, it is checked whether or not the "wide" end code is detected at step S1625, and if the "wide" end code is also not detected, it is checked whether the next zoom code has been detected at step S1627. If the next zoom code has not been detected, control returns to step S1615, and the process from steps S1615 to S1627 are repeated until the next zoom code is detected.

When the next zoom code is detected at step S1627, the zoom step is decremented by 1 at step S1629, and if the "wide" switch 62W is ON at step S1631, control returns to step S1615 and the above processes of steps S1615 through S1631 are repeated. If the "wide" end code is detected at step S1625, or if the "wide" switch is OFF, control jumps to step S1633 and the zoom return process is called (steps S1625, S1633, S1635, S1637 or S1631, S1635, S1637). At step S1637, when the jump is performed upon detection of the "wide" end code, the zoom step is set to 0.

In the zoom return process at step S1633, the front lens group L1 and the rear lens group L2 are returned to the standby position, at which they were positioned before the lens driving process in the photographing process.

In the AF two-stage delivery extension at step S1635, the rear lens group L2 is retracted to the AF home position, or to the position retracted from the AF home position by an amount corresponding to the value AP1 in accordance with the present zoom step.

Although the above description is directed to a normal operation, in cases where the lens barrel is forcibly pushed etc., it is checked at step S1623 that the housed code has been detected. If so the whole unit driving motor 25 is stopped at step S1639, and the lens extension process is executed at step S1641 before the control is returned. In addition, if the time becomes up at the two-second timer, for example when the lens barrel is pressed and is incapable of movement, the whole unit driving motor 25 is stopped at step S1645, and control returns after setting the error flag to 1.

In the present zoom "wide" process, since the "wide" switch check is executed after detecting the present zoom code and the next zoom code, wide zooming is performed by one zoom step once this process is entered, even when the zoom "wide" switch 62W is OFF before zooming is performed by one step.

[The Photographing Process]

Figure 49:
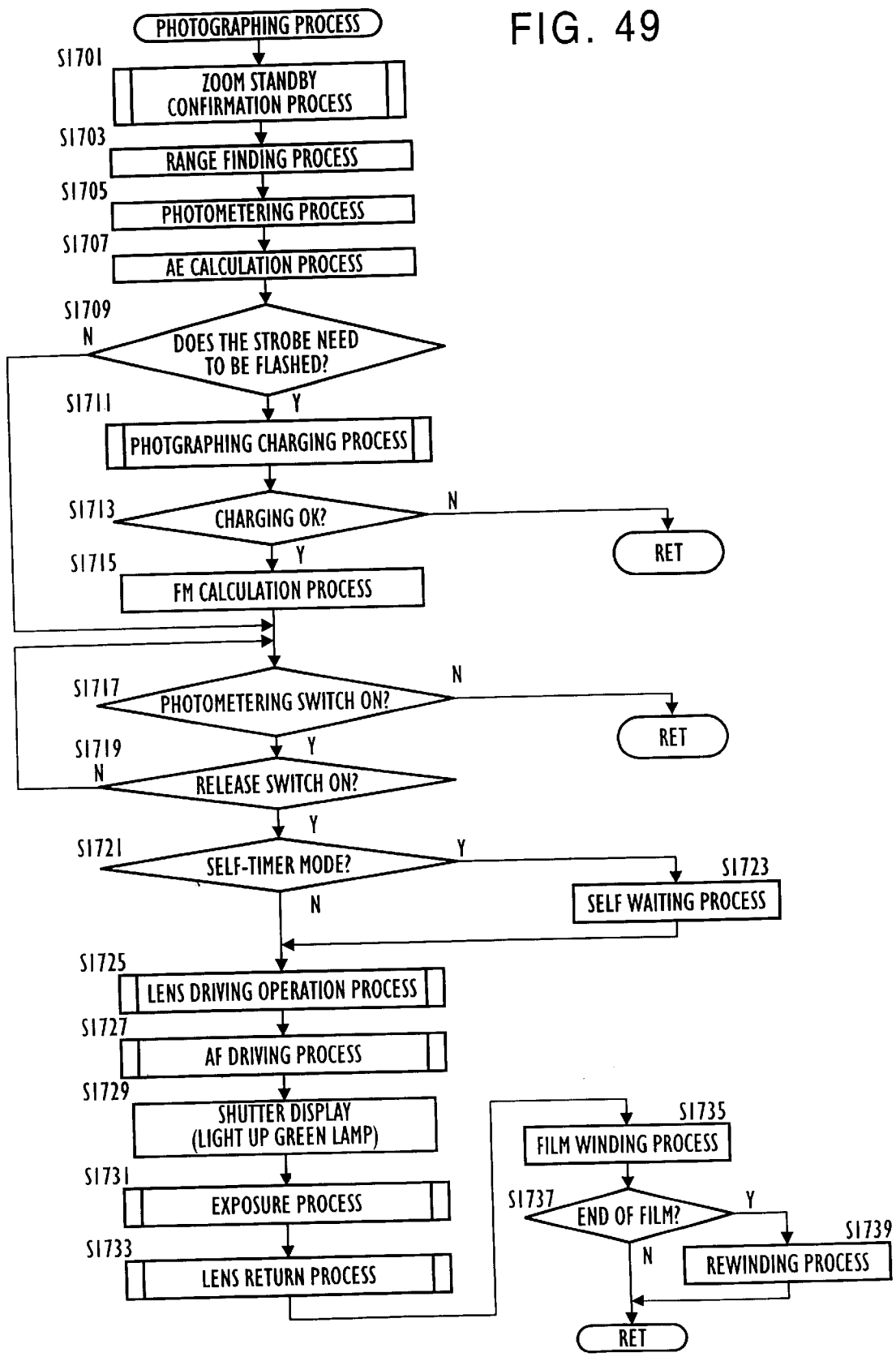
FIG. 49 is a flow chart of a photographing process of the zoom lens camera of the present invention.

FIG. 49 shows a flow chart for the photographing process. The photographing process, of the present embodiment, is called when the photometering switch SWS is turned ON, and is characterized in that it is checked if the front lens group L1 is at the standby position, and that the front lens group L1 and the rear lens group L2 are moved to positions, at which the subset will be in focus at the preset focal length, after the release switch SWR is turned ON.

In the photographing process, at step S1701, the zoom standby confirmation process is executed, and the front lens group L1 is moved to the standby position corresponding to the present focal length.

Then at steps S1703, S1705 and S1707, the object distance measuring process is executed and the focal length is obtained, the photometering process is executed and the luminance of the subject is obtained. The AE calculation process is also executed to determine the shutter speed, the aperture value, and whether strobe flashing is necessary. Strobe flashing will be necessary when the luminance of the subject is at the strobe flashing level in the auto strobe flashing mode, or when the forced strobe flashing mode is set, etc. If it is judged that strobe flashing is necessary at step S1711. During the photographing charging process is executed at step S1711, and during the photographing charging process, if the photometering switch SWS is turned OFF or if the time of the charging timer becomes up (step S1713), control returns, while if sufficient charging has been completed, after executing the flashmatic (FM) operation at step S1715, control proceeds to step S1717. If strobe flashing is not necessary at step S1709, control proceeds to step S1717, skipping steps S1711 through S1715.

At step S1717, it is checked whether the photometering switch SWS is turned ON, and if the photometering switch SWS is turned OFF, control returns. If the photometering switch SWS is ON at step S1717, the process waits for the turning ON of the release switch SWR (step S1719) while the photometering switch SWS remains ON.

When the release switch SWR is ON (step S1719) and if the self-timer mode is not set at step S1721, the lens drive calculation process is executed at step S1725. If the self-timer mode is set, the lens drive calculation process is executed after a self-waiting process at step S1723, in which waiting is performed for a predetermined amount of time.

In the lens drive calculation process, the amount of movement, i.e., the zoom pulse value, of the front lens group L1 with respect to the ON/OFF switching point of the zoom code and the amount of movement, i.e., the AF pulse value, of the rear lens group L2 with respect to the switching point of the AF home signal (AF home position) are calculated according to the result of focusing and the present focal length.

Then at steps S1725 and S1727, according to the amount of movement of the front lens group L1 and the rear lens group L2 obtained through the lens drive calculation process, the lens driving process is executed. In the lens driving process, the rear lens group L2 is driven together with the front lens group L1, and control is performed to bring the subject into focus.

When the movement of the lens is completed, at step S1729 the green lamp 228 is lit (i.e., current is passed through the green lamp) to notify the photographer that the shutter will be released, and the exposure process is executed at step S1731. The green lamp 228 only stays lit for a small duration of time and then is turned OFF.

After the exposure process has completed, at step S1733, the lens return process is executed, in which the front lens group L1 and the rear lens group L2 are returned to the positions they were at prior to movement at step S1727.

Then at steps S1735, S1737 and S1739, the film winding process is executed, and if the film is not at the end, control is returned, while if the end of the film has been reached, the rewinding process is executed and control returns.

[The Main Charging Process]

Figure 50:
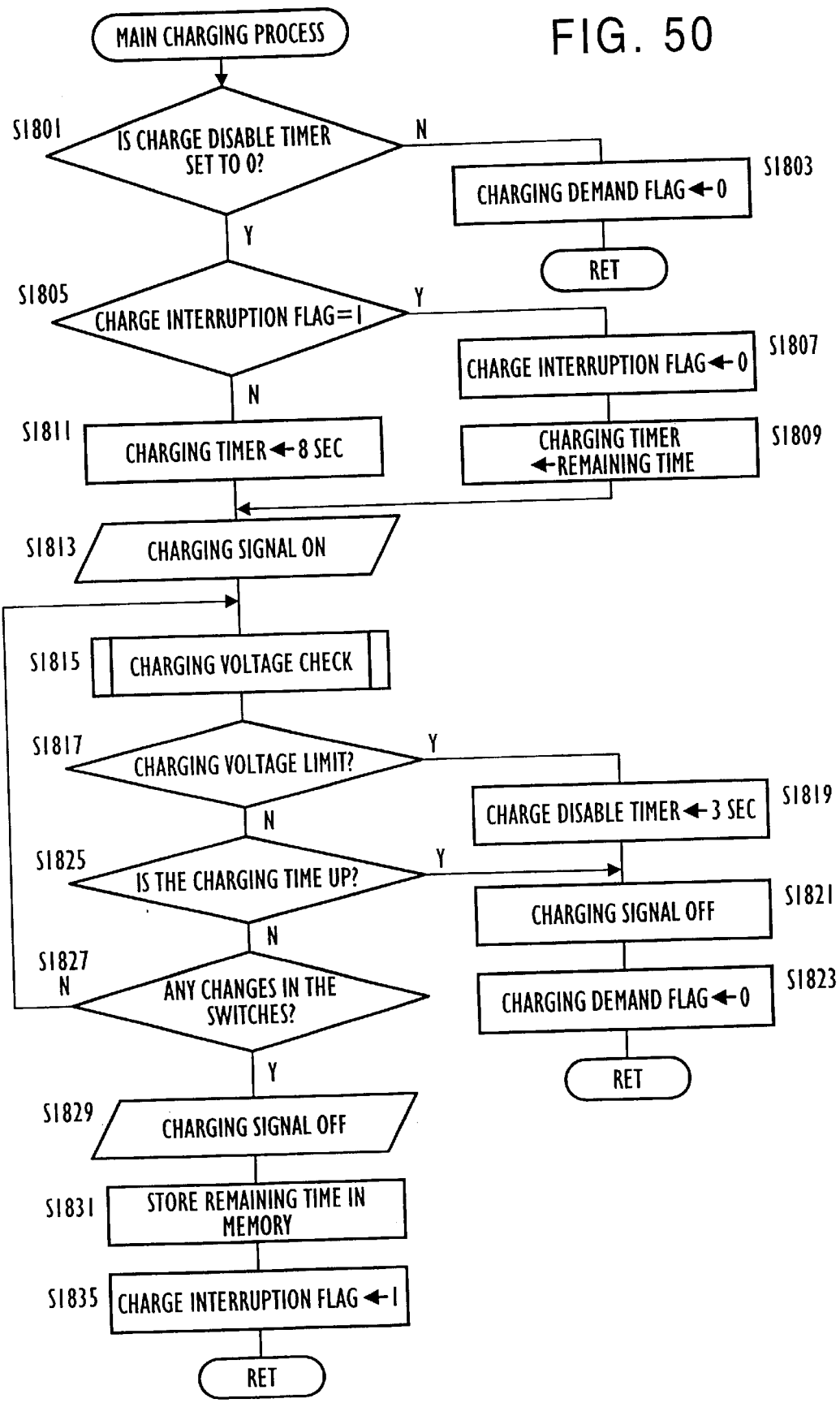
FIG. 50 is a flow chart of a main charging process of the zoom lens camera of the present invention.

FIG. 50 shows a flow chart for the main charging process. The main charging process is the charging process that is called in the main process (FIG. 41) when the charging demand flag equals 1.

At step S1801, the CPU 210 judges whether the value of the charge disable timer is set 0. The charge disable timer is a timer in which the time to disabled charging is set. A charge disable time of three seconds is set when the flash capacitor 530 of the strobe means 231 is fully charged. If the time is not up at the charge disable timer at step S1801, at step S1803 the charging demand flag is set to 0, and the process is ended. In such a manner, while the charge disable timer is counting the three seconds during which charging is to be disabled, the CPU 210 prohibits charging unconditionally without checking the charging voltage. The charging can be interrupted (disabled) by setting the level of the terminal CHEN of the strobe means 231 to L.

If the time at the charge disable timer is up, at step S1805 the CPU 210 judges whether the charge interruption flag is set to 1. As will be described later, the charge interruption flag is set to 1 when the charging process is canceled before the completion thereof. In the present main charging process and in the photographing charging process, which will be described later, the charging process is deemed to have been completed normally when the charging voltage reaches a predetermined value, or when the charging time reaches a predetermined time (for example, in the present camera, eight seconds). During charging, if the charging is interrupted due to the operation of another switch, etc., the time spent on charging prior to interruption is deducted from the predetermined time, namely from eight seconds, and the remaining time is stored in the memory. When charging is resumed, it is judged whether the charging voltage will reach the predetermined value within the remaining time.

Therefore, if the charge interruption flag is set to 1, the charge interruption flag is cleared (i.e., set to 0) and a resumed charging process is performed by setting the charging timer to the remaining time which has been stored in the memory. If the charge interruption flag is not 1, namely if the charging process has not been interrupted at step S1805, charging is performed upon setting the charging timer to the predetermined charging, i.e., eight seconds.

In order to start charging, the CPU 210 turns ON the charging signal at step S1813. In other words, charging is started by setting the level of terminal CHEN of the strobe means 231 to be high (H). While the level at the terminal CHEN on the strobe means 231 is H, an A/D conversion is performed on the output of terminal RLS of the strobe means 231, and the converted output is input to the CPU 210. At step S1815, the CPU 210 checks the charging voltage based on the A/D converted voltage value. If the charging voltage has reached the upper limit at step S1817, then at step S1819, the CPU 210 disables charging for three seconds, by setting three seconds as the charge disable time in the charge disable timer, and then at step S1821, the CPU 210 stops the charging by making the voltage at the terminal CHEN of the strobe means 231 as low (L). Then the charging demand flag is set to 0 at step S1823 and the main charging process is completed.

If at step S1817, the CPU judges that the charging voltage has not reached the upper limit, at step S1825 it is judged whether the time is up at the charging timer. If the time is up at the charging timer, at step S1821 the charging is stopped by making the level at the terminal CHEN of the strobe means 231 as L, and at step S1823 the charging demand flag is set to 0 to indicate the completion of the charging process. For reference, if the main charging process is completed after the time of the charging timer is up, the charge disable time of three seconds is not set.

If the time of the charging timer is not up at step S1825, then at step S1827, the CPU judges whether the state of any of the switches has changed. If any change of state amongst the switches is detected, the charging process is interrupted, and the process corresponding to the operated switch is performed in accordance with a predetermined priority. Therefore, upon detecting a change in the state of the switches, the CPU 210 sets the charging signal to OFF at step S1829 (i.e., sets the level at the terminal CHEN of the strobe means 231 to be low). At step S1831 the remaining time indicated by the charging timer is stored in the memory, and at step S1835 the charge interruption flag is set 1 to indicate the interruption of charging, and the main charging process is completed. The remaining time stored in the memory at step S1831, and the charge interruption flag set at step S1835, are referred to at the time of execution of the next main charging process or the next photographing charging process.

[The Shutter Initialization Process]

Figure 51:
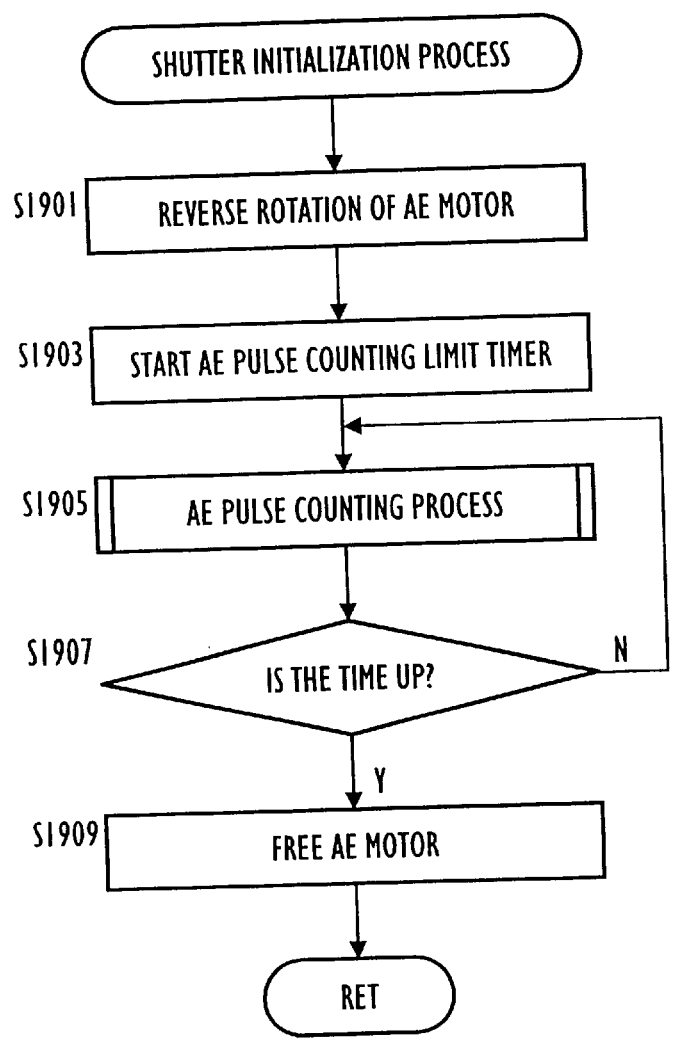
FIG. 51 is a flow chart of a shutter initialization process of the zoom lens camera of the present invention.

FIG. 51 shows a flow chart for the shutter initialization process. In the shutter initialization process of the present embodiment, the AE motor 29, which drives the shutter 27, is driven in the shutter closing direction to fully close the shutter blades until the shutter blades come into contact with the stoppers.

At step S1901, the AE motor 29 is firstly driven counterclockwise to drive the shutter blades 27a in the closing direction. Then at step S1903 the AE pulse counting limit timer is started, and the AE pulse count process is called to wait for the time to be up at the AE pulse counting limit timer, while detecting the AE pulse (steps S1905, S1907). The AE pulse counting process is performed by the CPU 210 in combination with the AE pulse inputting circuit 221.

At steps S1907 and S1909, the shutter blades 27a are completely shut and the AE motor 29 becomes incapable of driving, as the time will become up as determined by the AE pulse counting limit timer, the AE motor 29 is released, and control is returned.

By the above process, the shutter 27 is set to the initial position at which the shutter blades 27a are completely shut.

[The Zoom Code Input Process]

Figure 52:
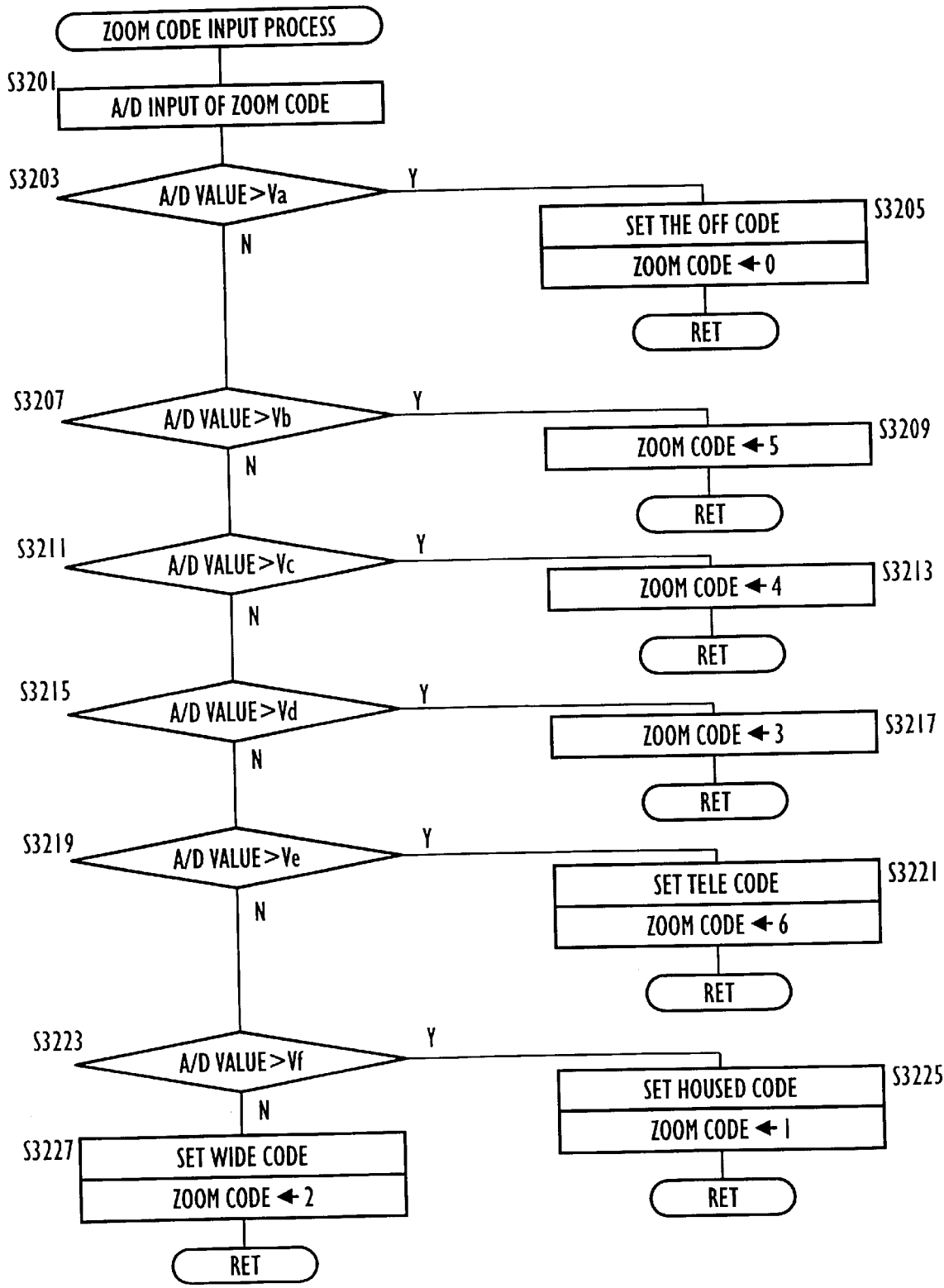
FIG. 52 is a flow chart of a zoom code input process of the zoom lens camera of the present invention.

FIG. 52 shows a flow chart of the zoom code input process. In the zoom code input process, the zoom code is set based on the A/D converted value of the voltage input into the A/D conversion terminal of the CPU 210 from the zoom code information input means 219.

At step S3201, a voltage is input from the zoom code information input means 219 into the A/D terminal of the CPU 210. The CPU 210 compares the A/D converted value of the input voltage with the threshold voltages Va through Vf, and sets the zoom code corresponding to the input voltage. The setting of the zoom code is executed as follows.

At step S3203, the CPU 210 compares the A/D converted value with the threshold voltage Va. If the A/D converted value of the input voltage is greater than the threshold voltage Va at step S3203, the zoom code is set to 0 at step S3205, and control is returned.

If the A/D converted value of the input voltage is less than or equal to Va at step S3203, and greater than Vb at step S3207, the zoom code is set to 5 at step S3209.

If the A/D converted value of the input voltage is less than or equal to Vb at step S3207, and greater than Vc at step S3211, the zoom code is set to 4 at step S3213.

If the A/D converted value of the input voltage is less than or equal to Vc at step S3211, and greater than Vd at step S3215, the zoom code is set to 3 at step S3217.

If the A/D converted value of the input voltage is less than or equal to Vd at step S3215, and greater than Ve at step S3219, the zoom code is set to 6 at step S3221.

If the A/D converted value of the input voltage is less than or equal to Ve at step S3219, and greater than Vf at step S3223, the zoom code is set to 1 at step S3225.

If the A/D converted value of the input voltage is less than or equal to Vf at step S3223, the zoom code is set to 2 at step S3227.

Here, the codes identified by Vd, Ve and Vf, for which the interval between the threshold voltages is relatively large, are respectively assigned to the lens housed position (the zoom code=1), the "wide" end position (the zoom code=2) and the "tele" end position (the zoom code=6), which become reference points for the lens position. In such a manner, the correct zoom code will be set at least for the reference points even if the voltage input into the CPU 210 varies somewhat due to voltage fluctuations.

[The AF Pulse Confirmation Process]

Figure 53:
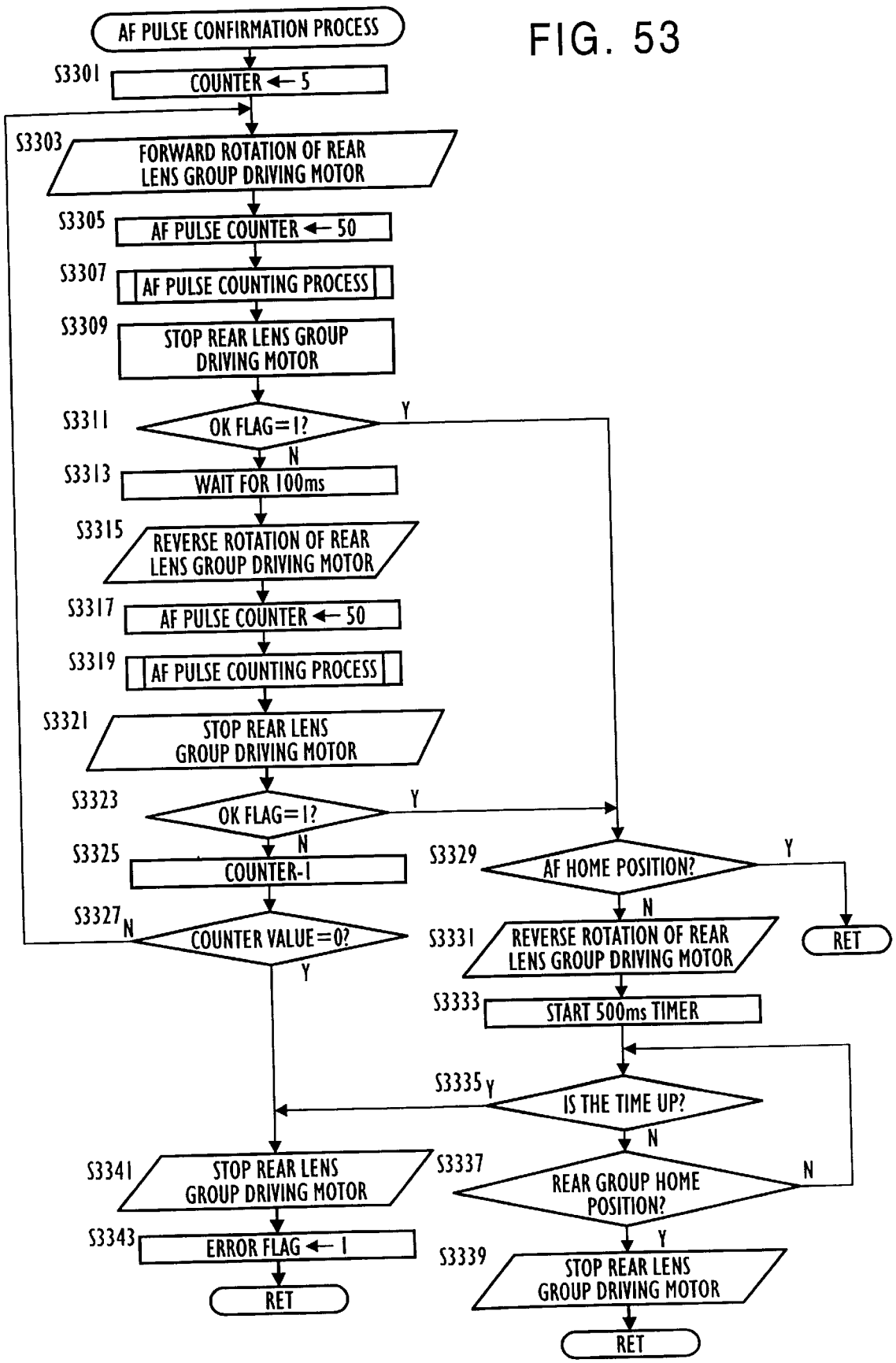
FIG. 53 is a flow chart of an AF pulse confirmation process of the zoom lens camera of the present invention.

FIG. 53 shows a flow chart for the AF pulse confirmation process. In the AF pulse confirmation process the rear lens group driving motor 30 is driven alternately in the clockwise and counterclockwise directions. For example, during driving of the rear lens group driving motor 30, if the rear lens group driving motor 30 is unable to rotate for some reason, by alternately driving the rear lens group driving motor 30 clockwise and counterclockwise, the cause of the obstruction of rotation of the rear lens group driving motor 30 may be removed, thus allowing the rear lens group L2 to move. In the present embodiment, the rear lens group driving motor 30 alternately rotates clockwise and counterclockwise, and after confirming that the rear lens group driving motor 30 has rotated more than a predetermined amount, the rear lens group L2 is moved to the AF home position. If this confirmation has not been made within five operations of alternate clockwise and counterclockwise driving, or even if such a confirmation is made, if the rear lens group L2 does not move to the AF home position within the predetermined time, the rear lens group driving motor 30 is stopped, and the error flag is set to 1.

At step S3301, the value of the counter which defines the maximum number of times that the rear lens group driving motor 30 is driven alternately in the clockwise and counterclockwise directions is set to 5.

Then at steps S3303, S3305 and S3307, the rear lens group driving motor 30 is firstly driven clockwise, namely in the direction in which the rear lens group is retracted, the AF pulse counting process is performed upon setting the value of the AF pulse counter to 50, and the process waits until 50 AF pulses are output. When the value of the AF pulse counter becomes 50, at step S3309 the rear lens group driving motor 30 is stopped.

At step S3311 it is checked whether the OK flag is set, and if the OK flag is set, in other words if 50 AF pulses have been output, it is checked whether the rear lens group L2 is at the AF home position. If the rear lens group L2 is at the AF home position, control returns, while if the rear lens group L2 is not at the AF home position, at step S3331 and step S3335 the rear lens group driving motor 30 is driven counterclockwise, namely in the direction in which the rear lens group L2 is moved towards the AF home position, and a 500 ms timer is started. Since the rear lens group L2 will normally reach the AF home position before the time of the 500 ms timer is up, the rear lens group driving motor 30 is stopped and control is returned when the rear lens group L2 reaches the AF home position (steps S3335, S3337, S3339). If the rear lens group L2 does not reach the AF home position before the time of the 500 ms timer is up at S3335, at steps S3335, S3341 and S3343, the rear lens group driving motor 30 is stopped, and control is returned upon setting the error flag to 1.

Although the above is directed to a normal case, if the rear lens group L2 does not move easily the following processes are executed.

In the AF pulse counting process at step S3307, if the AF pulse is not output for a predetermined amount of time even though the rear lens group driving motor 30 is being driven, this probably will indicate that a condition is occurring in which the rear lens group driving motor 30 cannot move due to biting, etc., therefore the OK flag is cleared. In this case, control proceeds to the rolling process, from steps S3311 to S3313. When control is at step S3313, after waiting for 100 ms, the rear lens group driving motor 30 is driven counterclockwise at step S3315. Then at steps S3317, S3319 and S3321, the value of the AF pulse counter is set to 50, the AF pulse counting process is executed, and then the rear lens group driving motor 30 is stopped. In the AF pulse counting process, when 50 AF pulses are detected, the OK flag is set, and if 50 AF pulses are not detected within a predetermined time, the OK flag is cleared. Thus, if the rear lens group L2 moves during such a counterclockwise rotation of the rear lens group driving motor 30, control proceeds to the process at step S3329, while if the rear lens group L2 does not move, control proceeds to the process at step S3325.

At step S3325, the counter is decremented by one, and if the value of the counter is not 0, control returns to step S3303, and the processes from step S3303 are repeated. If the value of the counter becomes 0, namely if the rear lens group L2 is not moved even upon repeating the clockwise and counterclockwise driving of the rear lens group driving motor 30 five times, since this will indicate that some form of trouble may be occurring with the lens driving system. At steps S3341 and S3343, the rear lens group driving motor 30 is stopped, and the error flag is set to 1, and control is returned.

[The AF Return Process]

Figure 54:
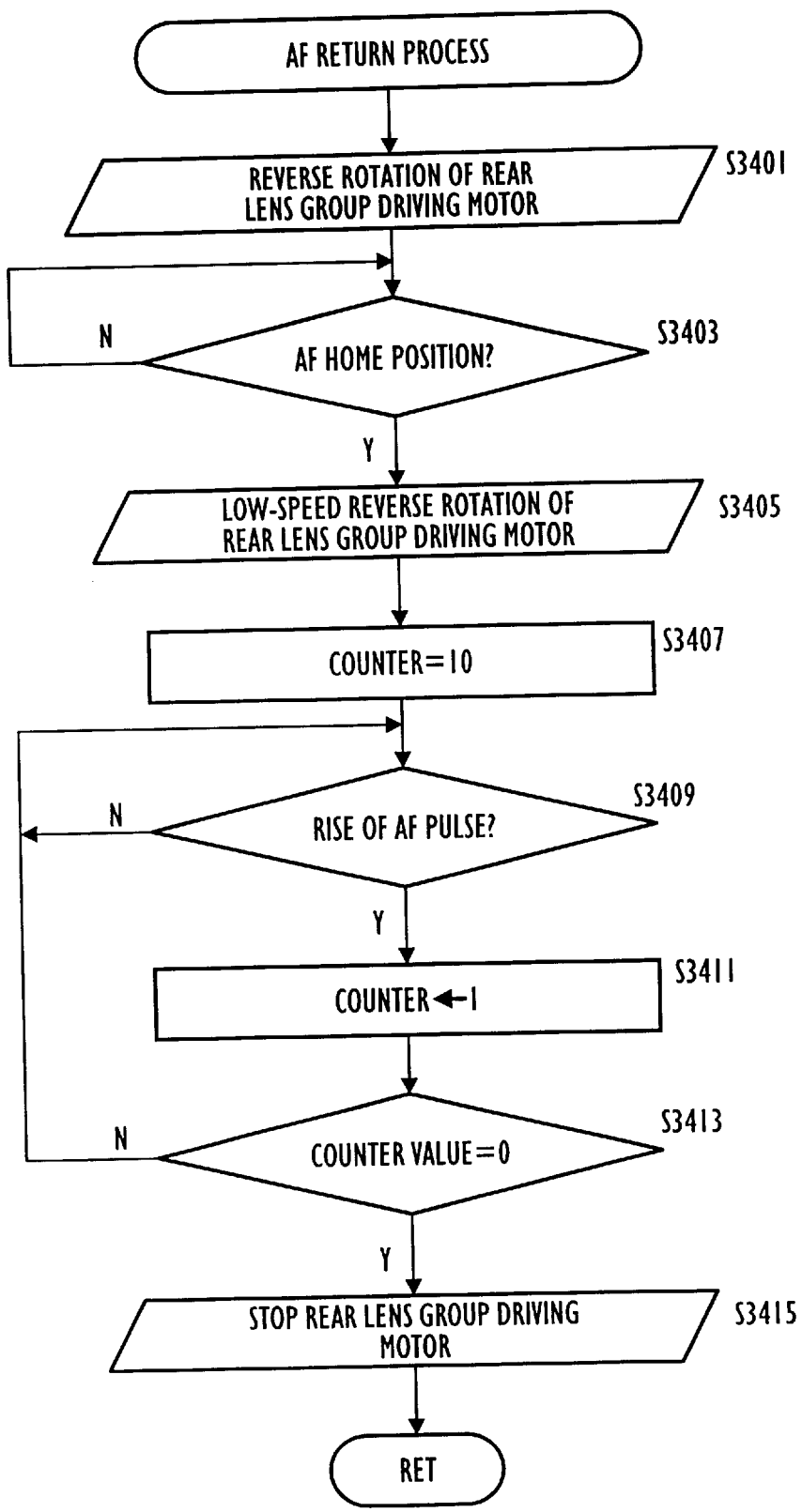
FIG. 54 is a flow chart of an AF return process of the zoom lens camera of the present invention.

FIG. 54 shows a flow chart for the AF return process. In the AF return process the rear lens group L2 is returned to the AF home position.

At steps S3401 and S3403, the rear lens group driving motor 30 is driven counterclockwise, namely in the direction in which the rear lens group is advanced, to advance the rear lens group L2 towards the AF home position and waiting is performed until the rear lens group L2 reaches the AF home position.

At steps S3405, S3407, S3409, S3411 and S3413, when the arrival of the rear lens group L2 at the AF home position is detected, via the photointerrupter 301, the driving of the rear lens group driving motor 30 is switched to low-speed counterclockwise driving, and a value of 10 is set in the counter. The rise of the AF pulse is then counted and the counter is decremented by one on each count and the process waits until the value at the counter becomes 0.

At steps S3413 and S3415, when the value at the counter becomes 0, the rear lens group driving motor 30 is stopped, and control is returned. In such a manner, the rear lens group L2 is surely stopped at the AF home position.

In the present embodiment, after the rear lens group L2 reaches the AF home position, the driving of the rear lens group driving motor 30 is continued for another ten pulses. This is done since the driving pulse count for the rear lens group L2 is based on the switching of the AF home signal and so that the rear lens group L2 will definitely be at the AF home position in the standby condition.

[The Barrier Closing Process]

Figure 55:
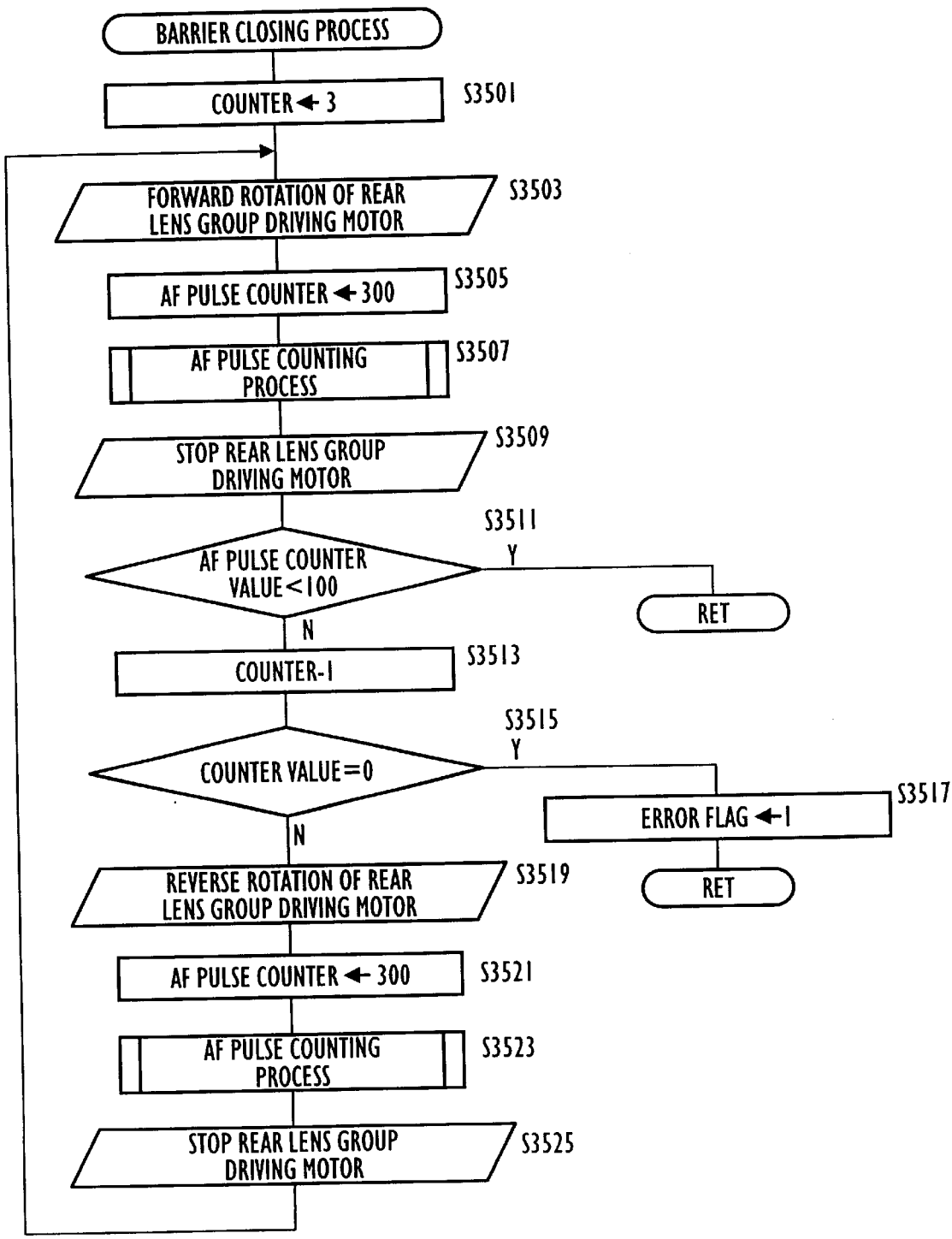
FIG. 55 is a flow chart of a barrier closing process of the zoom lens camera of the present invention.

FIG. 55 shows a flow chart for the barrier closing process. In the barrier closing process the barrier is closed upon housing of the lenses.

Firstly, a value 3, which is the number of times the opening/closing process (described later) is to be repeated when a fault occurs, is set in the counter. In the present embodiment, the judgement whether the barrier closing process is completed normally, is made according to whether the rear lens group driving motor 30 has driven clockwise by a predetermined amount, namely, whether a predetermined number of AF pulses have been counted upon driving the rear lens group driving motor 30.

During clockwise driving of the rear lens group driving motor 30, if the predetermined number of AF pulses is not input from the AF reference pulse inputting means 222, it can be suspected that the barrier could not be closed due to some reason, or that the barrier closing process was executed with the barrier closed already.

Therefore, in the present embodiment, when the predetermined number of AF pulses is not counted upon clockwise driving of the rear lens group driving motor 30, the rear lens group driving motor 30 is once driven counterclockwise by a predetermined amount, namely by an amount sufficient for opening the closed barrier, and then the rear lens group driving motor 30 is driven clockwise again. The number of times set at step S3501 is the value for restricting the number of times of execution of the process in which the rear lens group driving motor 30 is once driven counterclockwise and then driven clockwise again (described above).

At step S3503, the rear lens group driving motor is driven clockwise, namely, driven in the direction by which the barrier will close, and at step S3505 a value of 300 is set in the AF pulse counter, and at step S3507 the AF pulse counting process is called. In the AF pulse counting process the AF pulse counter, set at step S3505, is decremented based on the pulse signals output to the CPU 210 from the AF reference pulse input means 222 in synchronization with the rotation of the rear lens group driving motor 30.

The AF pulse counting process is ended when the pulse is not output within a predetermined time, or when the count value at the decremented AF pulse counter becomes 0.

After completion of the AF pulse counting process, at step S3509 the rear lens group driving motor 30 is stopped, and at step S3511, it is judged whether the AF pulse count remaining after being decremented in the AF pulse counting process is less than 100.

At step S3511, if the value of the AF pulse counter is less than 100, namely, if the value was decremented by 200 or more in the AF pulse counting process, it is judged that the barrier was closed normally, and the barrier closing process is ended. If the value of the AF pulse counter is 100 or more at step S3511, it is considered that the rear lens group driving motor 30 cannot rotate due to some reason, and the elimination of the obstruction is attempted by once rotating the rear lens group driving motor 30 once counterclockwise, and then again clockwise. In such a manner, the obstacle can be removed.

The control proceeds to step S3519, as long as the counter value does not become zero upon decrementing of the counter at step S3513. At step S3519,the rear lens group driving motor 30 is driven counterclockwise, and a value of 300 is set in the AF pulse counter, and the AF pulse counting process is called. After completion of the AF pulse counting process at step S3523, the rear lens group driving motor 30 is stopped at step S3525, and the control returns to step S3503. Then at steps S3503, S3505, S3507 and S3509, the clockwise driving of the rear lens group driving motor 30, the setting of the AF pulse counter, the execution of the AF pulse counting process, and stopping of the rear lens group driving motor 30 are made. It is then judged at step S3511, whether the barrier has closed, based on the value of the AF pulse counter. In the present embodiment, since a value of 3 is set at the counter at step S3501, if the barrier is not closed, the above retry process is repeated twice.

During the above process, if the barrier closes, at step S3511 the value of the AF pulse counter will be less than 100, and the barrier closing process is completed. In addition, after repeating the process, if the value of the AF pulse counter does not become less than 100, after the last of the repetitions, the barrier is judged not to be closed, and the barrier closing process is ended upon setting the error flag to 1 to indicate an occurrence of a fault.

[The Barrier opening Process]

Figure 56:
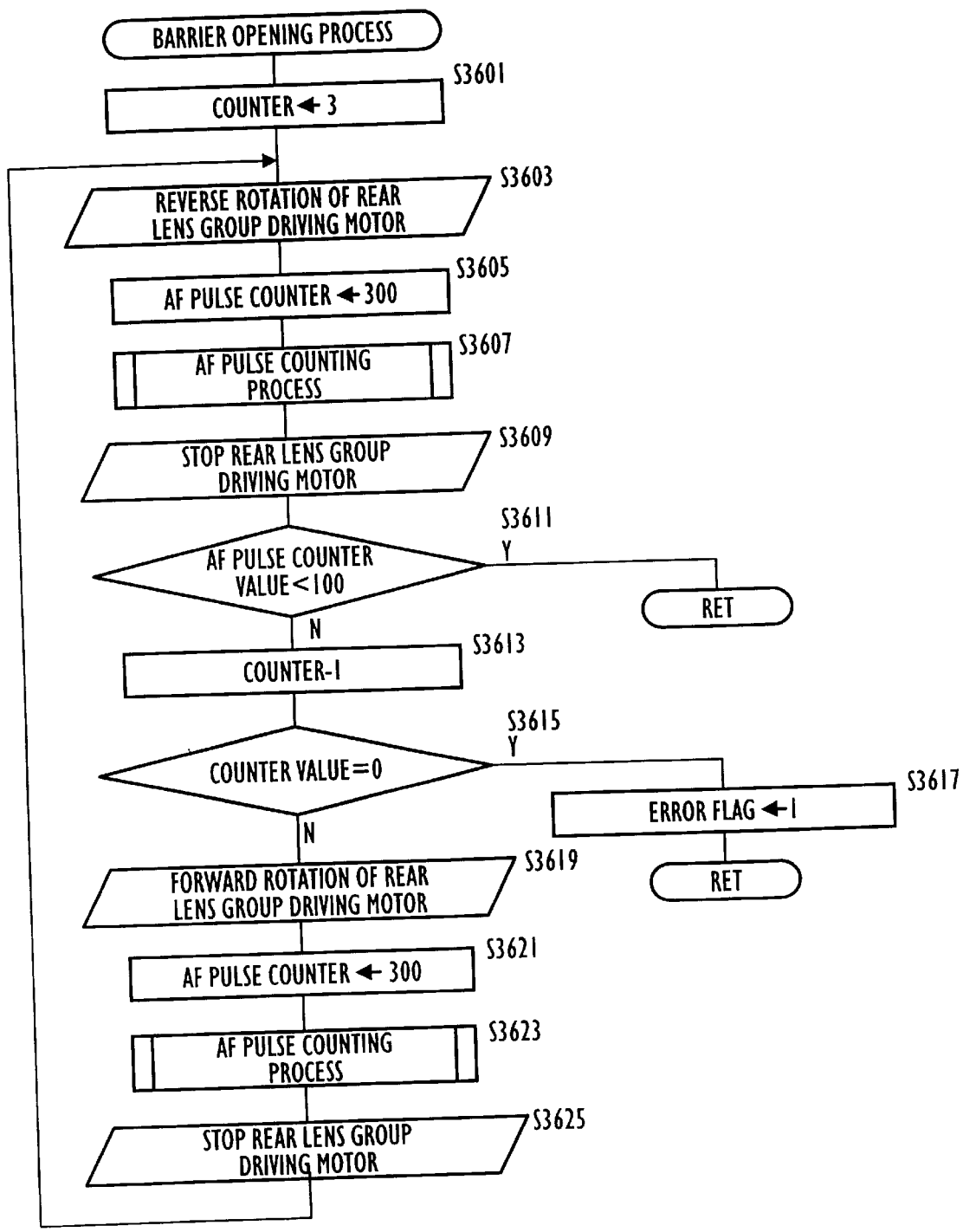
FIG. 56 is a flow chart of a barrier opening process of the zoom lens camera of the present invention.

FIG. 56 shows a flow chart for the barrier opening process. In the barrier opening process the barrier is opened when the lenses are extended from the housed position.

First, a value of 3, which is the number of times of repetition of the process, is set at the counter at step S3601. Normally, the barrier opening process is called with the barrier being closed. However, the barrier opening process will be executed with the barrier open when, for example, the battery of the camera is changed with the lens being extended, i.e., the barrier is open. The barrier opening process may also be called when the lenses are housed without the barrier being closed because of some obstruction. If the rear lens group driving motor 30 is driven to open the barrier when the barrier is already open, the rear lens group driving motor 30 will not rotate because the barrier is open, and the AF reference pulse input means 222 will therefore not generate any pulses.

Therefore, in the present process, the rear lens group driving motor 30 is driven in order to open the barrier, and if the opening of the barrier is not confirmed, in other words, if the AF reference pulse input means 222 does not output pulses to the CPU 210, the rear lens group driving motor 30 is driven in the direction to close the barrier, and is again driven in the direction to open the barrier. The number of times set at the counter at step S3601 is the value for restricting the number of times of execution of the above-described process in which the barrier is opened after closing, which is executed when it cannot be confirmed that the barrier was opened upon driving the rear lens group driving motor 30 for the first time.

At step S3603, the rear lens group driving motor is firstly driven counterclockwise, namely, in the direction in which the barrier opens. At step S3605 a value of 300 is set in the AF pulse counter, and at step S3607 the AF pulse counting process is called. In the AF pulse counting process the AF pulse counter is decremented based on the pulse signals output to the CPU 210 from the AF reference pulse input means 222 in synchronization with the rotation of the rear lens group driving motor 30.

The AF pulse counting process is ended when the pulses are not output to the CPU 210 from the AF reference pulse input means 222 within a predetermined time, or when the count value of the decremented AF pulse counter becomes 0.

After completion of the AF pulse counting process, at step S3609 the rear lens group driving motor 30 is stopped. At step S3611, it is judged whether the AF pulse count remaining after being decremented in the AF pulse counting process is less than 100.

At step S3611, if the value of the AF pulse counter is less than 100, namely, if the value was decremented by 200 or more in the AF pulse counting process, it is judged that the barrier was opened normally, and the barrier opening process is ended. If the value of the AF pulse counter is 100 or more at step S3611, it is considered that the rear lens group driving motor 30 cannot rotate due to some reason and the elimination of the obstruction is attempted by once rotating the rear lens group driving motor 30 clockwise, namely, in the direction in which the barrier closes, and then again counterclockwise. In such a manner, the obstacle can be removed.

At step S3613, the counter is decremented, and as long as the counter does not become 0 at step S3615, control proceeds to step S3619. At step S3619, the rear lens group driving motor 30 is driven clockwise, a value of 300 is set in the AF pulse counter, and the AF pulse counting process is called. After completion of the AF pulse counting process at step S3623, the rear lens group driving motor 30 is stopped at step S3625, and control is returned to step S3603. Then the counterclockwise driving of the rear lens group driving motor 30, the setting of the AF pulse counter, the execution of the AF pulse counting process, and the stopping of the rear lens group driving motor 30 are made, and it is judged whether the barrier is closed, according to the value of the AF pulse counter.

In the present embodiment, since the value of 3 is set in the counter at step S3601, if the barrier is not opened at step S3611, the processes from steps S3613 to S3609 via S3625 are repeated twice. If the barrier opens in this process, the AF pulse counter will be less than 100 at step S3611, and the barrier opening process is ended. If the value of the AF pulse counter does not become less than 100 after the last of the repetitions, it is judged that the barrier did not open and the barrier opening process is ended upon setting the error flag to 1 to indicate the occurrence of a fault.

[The Zoom Driving Process]

FIG. 57 shows a flow chart for the zoom driving process. The zoom driving process is a process to drive and control the whole unit driving motor 25 clockwise (i.e., in the direction in which the lenses are extended) by the amount corresponding to the value of the zoom pulse counter, in order to cause the front lens group L1 and the rear lens group L2 to become focused at the subject distance, as shown in FIG. 34.

In the zoom driving process, at step S3701 the value of the zoom pulse counter is stored in memory as a number of zoom pulses. Then at steps S3703, S3705, S3707 and S3709, the zoom sequence is then set to 0 and the whole unit driving motor 25 is driven clockwise, namely, in the advancing direction, the zoom drive check process is executed, and the process waits until the zoom sequence becomes 5, after which control is returned.

The zoom sequence is an identifier for identifying the operation sequence condition of the whole unit driving motor controlling means 60. A zoom sequence of 0 indicates that the switching of the zoom code has been detected, which serves as the reference point for the counting of the zoom pulses. A zoom sequence of 1 or 2 indicates the condition where the zoom pulses are being counted, a zoom sequence of 3 indicates the activation of the reverse rotation brake, a zoom sequence of 4 indicates the short-circuit braking condition, and a zoom sequence of 5 indicates the open terminal condition (inactive condition) and thus the ending of the series of the zoom drive sequences.

[The AF Two-stage Extension Process]

Figure 58:
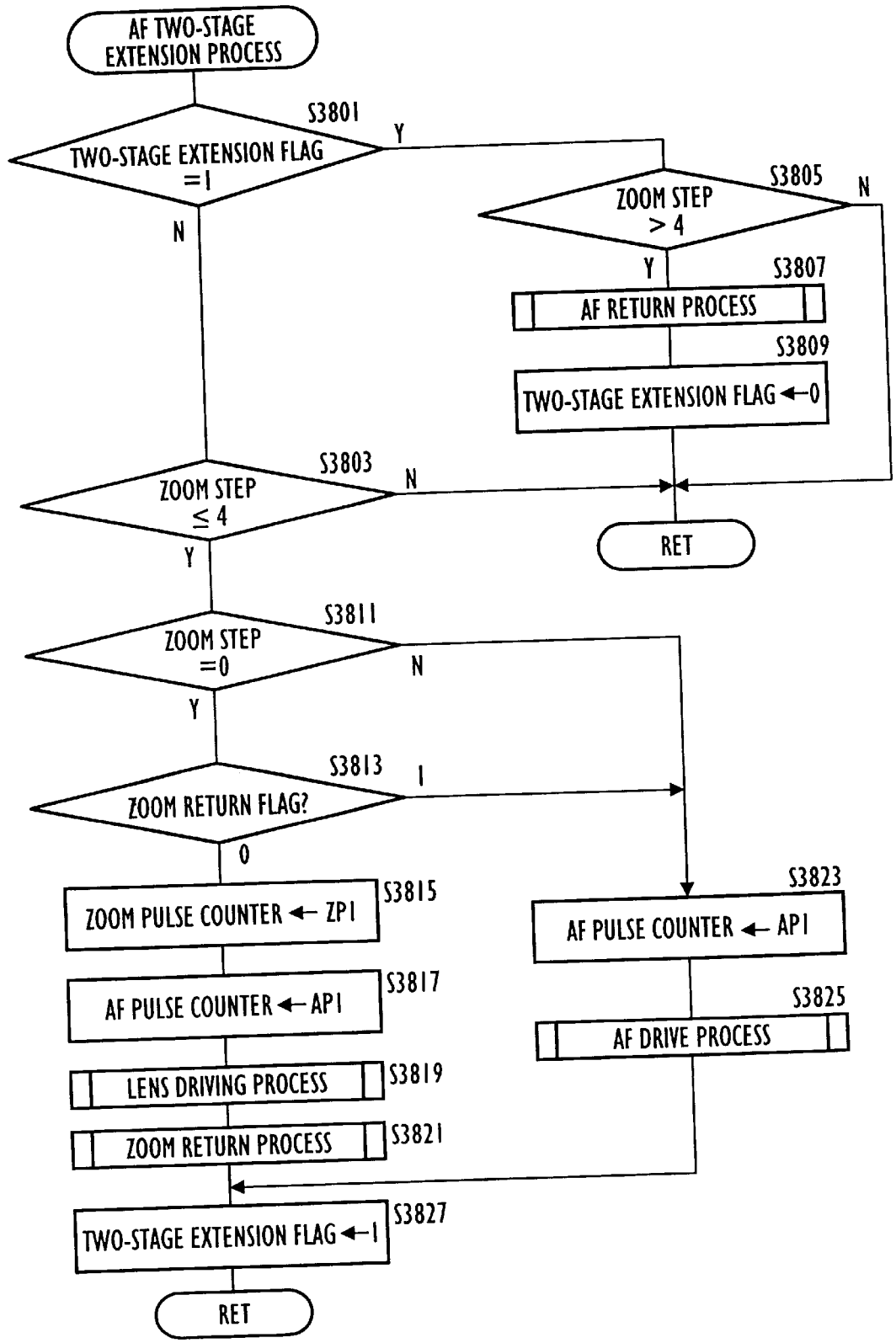
FIG. 58 is a flow chart of an AF two-stage extension process of the zoom lens camera of the present invention.

FIG. 58 shows a flow chart for the AF two-stage extension process. The AF two-stage extension process is executed when the focal length of the lenses has been changed and is the process by which the rear lens group L2 is extended by a predetermined amount (AP1) from the AF home position when the lenses are positioned at the "wide" side.

When the AF two-stage extension process is called, at step S3801, the CPU 210 judges whether the rear lens group L2 is presently in the condition where it has been extended by a predetermined amount by the AF two-stage extension process. In the latest execution of the AF two-stage extension process, if the lenses were positioned at the "wide" end side (i.e., the zoom step was less than 4), the rear lens group L2 would have been extended by a predetermined amount and the two-stage extension flag would have been set to 1. If the zoom step was 4 or more when the previous AF two-stage extension process was executed, the rear lens group would not have been extended (would be positioned at the AF home position) and the two-stage extension flag would have been set to 0.

When the AF two-stage extension process is called with the two-stage extension flag being set to 1 at step S3801, then at step S3805, the CPU judges whether the zoom step corresponding to the present lens position is greater than 4. If the zoom step is greater than 4, namely the rear and the front lens groups L1 and L2 are at the "tele" side, at steps S3807 and S3809, the AF return process is called to return the already extended rear lens group L2 to the AF home position, and control is returned upon clearing the two-stage extension flag, i.e., setting the flag to 0. If the present zoom step is 4 or less, although the rear lens group L2 needs to be extended, since the rear lens group L2 has already been extended when the previous AF two-stage extension process was executed, control is returned without executing any process.

If the two-stage extension flag is not 1 at step S3801, namely, if the flag is set to 0, this would mean that the rear lens group L2 was positioned at the AF home position at the end of the previous AF two-stage extension process. In this case, at step S3803 the CPU 210 judges whether or not the zoom step is 4 or less, and if the zoom step is greater than 4 at step S3803, since it is not necessary to extend the rear lens group L2, in other words, it is sufficient for the rear lens group L2 to remain at the AF home position, the extension of the rear lens group L2 is not executed, and control is returned. If the zoom step is 4 or less, namely if the lenses are positioned at the "wide" side, the process of extending the rear lens group L2 is executed. However, process method will differ according to whether or not the lenses are at the "wide" end.

At step S3811, it is judged whether the value of the zoom step is 0, in other words, whether the lenses are positioned at the "wide" end position. If the lenses are positioned at the "wide" end position, the rear lens group driving motor 30 may be connected with the barrier opening device and is not connected to the rear lens group moving device. In other words, if the rear lens group driving motor 30 is driven in the state where the lenses are positioned at the "wide" end position, the rear lens group L2 may not be driven and the opening/closing of the barrier may be executed instead.

On the other hand, when the lenses are at the "tele" position, rather than at the "wide" position, the rear lens group driving motor 30 will always be connected to the rear lens group moving device. Therefore, when the lenses are not positioned at the "wide" end, namely the zoom step is not 0 at step S3811, the rear lens group L2 can be made to extend from the AF home position by an amount corresponding to the AF pulse number AP1 by setting the predetermined value AP1 at the AF pulse counter (step S3823) and calling the AF drive process at step S3825. After extending the rear lens group L2, the CPU 210 sets the two-stage extension flag to 1, and control is returned.

When the value of the zoom step is 0, namely when the lenses are positioned at the "wide" end at step S3811, as already described, a possibility exists that the rear lens group driving motor 30 may be connected to the barrier opening device. However, as long as the AF two-stage extension process is called during the lens return process, the rear lens group driving motor 30 is guaranteed to be connected with the rear lens group moving device. Therefore at step S3813, the process is branched according to the zoom return flag, which indicates whether the AF two-stage extension process being executed was called in the lens return process. If the present AF two-stage extension process was called in the lens return process, the zoom return flag would be set to 1. In such a case, at step S3823 and step S3825, only the driving of the rear lens group L2 is executed.

On the other hand, if the present AF two-stage extension process was called from a process other than the lens return process, the zoom return flag would be set to 0, and the CPU 210 will therefore execute the processes from step S3815.

At steps S3815 and S3817, the CPU 210 sets the predetermined values ZP1 and API respectively in the zoom pulse counter and the AF pulse counter, and at step S3819 the lens driving process is called, and the front and rear lens groups L1 and L2 are firstly moved by an amount corresponding to the zoom pulse ZP1, by driving the whole unit driving motor 30, and simultaneously the rear lens L2 is moved by an amount corresponding to the AF pulse AP1, by driving the rear lens group driving motor 30. After that, in the zoom return process at step S3821, the front and the rear lens groups L1 and L2 are returned by an amount corresponding to the value ZP1, by driving the whole unit driving motor 25. That is, the lenses are once moved to the "tele" position by the predetermined amount so that the rear lens group driving motor 30 is surely engaged with the driving device of the rear lens group L2, the rear lens group L2 is extended by driving the rear lens group driving motor 30, and after that, by returning the front and rear lenses toward the "wide" position by the predetermined amount, eventually the rear lens group L2 is only moved toward the "wide" position.

As described above, at the point at which the AF two-stage extension process is ended, if the lenses are at the "wide" position (i.e., the zoom step is not more than 4), the rear lens group L2 would be extended by a predetermined amount and the twostage extension flag would be set to 1. If the lenses are at the "tele" position (i.e., the zoom step is greater than 4), the rear lens group L2 would be positioned at the AF home position, and the two-stage extension flag would be set 0.

[The Zoom Return Process]

Figure 59:
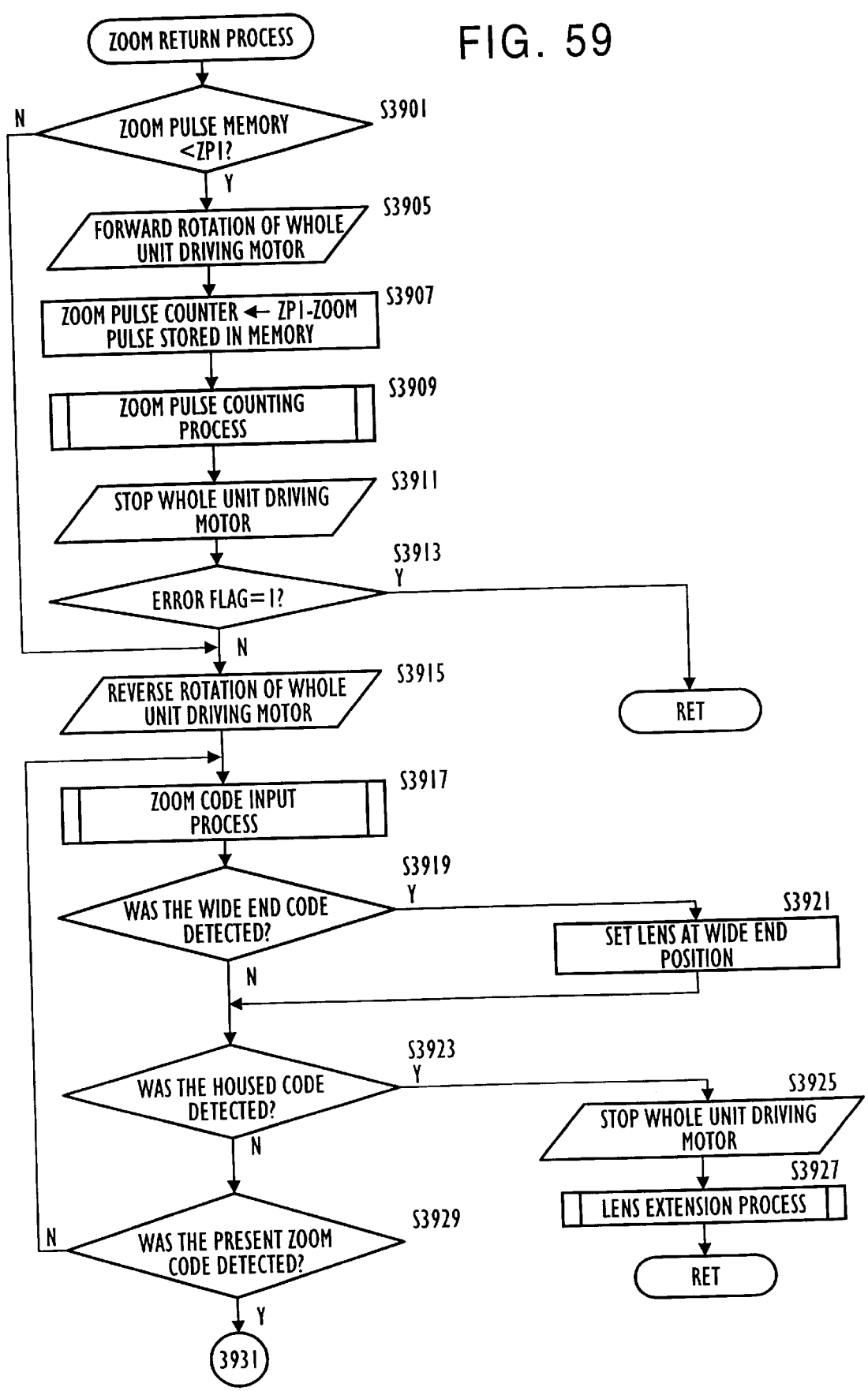
FIG. 59 is a flow chart of a zoom return process of the zoom lens camera of the present invention.

FIG. 59 shows a flow chart for the zoom return process. The zoom return process is the process in which the front lens group L1 and the rear lens group L2 are returned to the standby position at which they were positioned prior to being moved in the lens driving process during the photographing process. In other words, in this process the whole unit driving motor 25 is driven counterclockwise by an amount corresponding to the second zoom pulse ZP2 from the switching point at the housed side of the present zoom code, in order to return the front lens group L1 and the rear lens group L2 to the standby position, and is then stopped upon being rotated clockwise by an amount corresponding to the third zoom pulse ZP3, to eliminate backlash to some degree, as shown in FIG. 34, i.e., the lens driving.

In the zoom return process at steps S3901, S3905, S3907, S3909 and S3911, it is checked whether the pulse number stored in the zoom pulse memory is less than the first zoom pulse value ZP1, and if it is less, the whole unit driving motor 25 is driven clockwise, namely driven for movement in the tele direction. Then the value of the pulse, obtained by deducting the drive pulse value stored in the zoom pulse memory from the first zoom pulse value ZP1, is set in the zoom pulse counter, and the zoom pulse counting process is executed to wait until the value of the zoom pulse counter becomes 0. When the value becomes 0, namely when the whole unit driving motor has been driven by an amount corresponding to the value of the first zoom pulse ZP1 from the switching point of the present zoom code, the whole unit driving motor 25 is stopped. In such a process, when the lenses are stopped around the "tele" position switching point of the present zoom code, the zoom code may become unstable during the initial stages of passing current to the whole unit driving motor 25, and the standby position may shift. For the purpose of avoiding such an occurrence, the whole unit driving motor is driven clockwise by an amount corresponding to the value of the first zoom pulse ZP1 so that the zoom code will definitely turn OFF. Then at step S3913, if the error flag is set to 1, control is returned, and if the error flag is not set to 1 control proceeds to step S3915.

If the drive pulse number stored in the zoom pulse memory equals the first zoom pulse number ZP1 (this means that the lenses have already been moved to the position at which the present zoom code turns OFF), the process of driving the whole unit driving motor 25 is skipped.

At step S3915, the whole unit driving motor 25 is driven counterclockwise, namely, driven for movement in the "wide" direction. Then at steps S3917, S3919, S3923 and S3929, the zoom code input process is called to detect the zoom code, and it is checked whether the "wide" code is detected, the housing code is detected, and whether the present zoom code is detected. If the "wide" code was detected, the lens "wide" position is set, while if the housed condition is detected, the whole unit driving motor 25 is stopped and control is returned after executing the lens extension process (steps S3919, S3921 and S3923, or at steps S3923, S3925 and S3927).

If the present zoom code is detected at step S3929, then at step S3931 the zoom code input process is executed. The process waits until the OFF code is detected, namely, until the present zoom code turns OFF (step S3933). When the OFF code is detected, the second zoom pulse value ZP2 is set at the zoom pulse counter and the zoom pulse counting process is called to wait until the value at the zoom pulse counter becomes 0 (steps S3935, S3937).

At step S3939, upon returning from the zoom pulse counting process, the whole unit driving motor 25 is stopped. At steps S3941, S3943, S3945 and S3947, if the error flag was set to 1, namely, if the return was performed without the value at the zoom pulse counter becoming 0, control is returned without executing any process. While if the error flag was not set, the whole unit driving motor 25 is driven in a clockwise direction, the backlash elimination pulse number ZP3 is set at the zoom pulse counter, and the zoom pulse counting process is called to wait for the value at the zoom pulse counter to become 0. Then at step S3949, upon returning from the zoom pulse counting process, the whole unit driving motor 25 is stopped and control is returned.

Thus by the zoom return process, the front lens group L1 is moved rearwardly to the standby position, which is retracted by the value of the second zoom pulse ZP2 from the rear end edge of the present zoom code. At the standby position, backlash during a rotation of the whole unit driving motor 25 in the "tele" direction is substantially removed.

[The Zoom Standby Confirmation Process]

Figure 60:
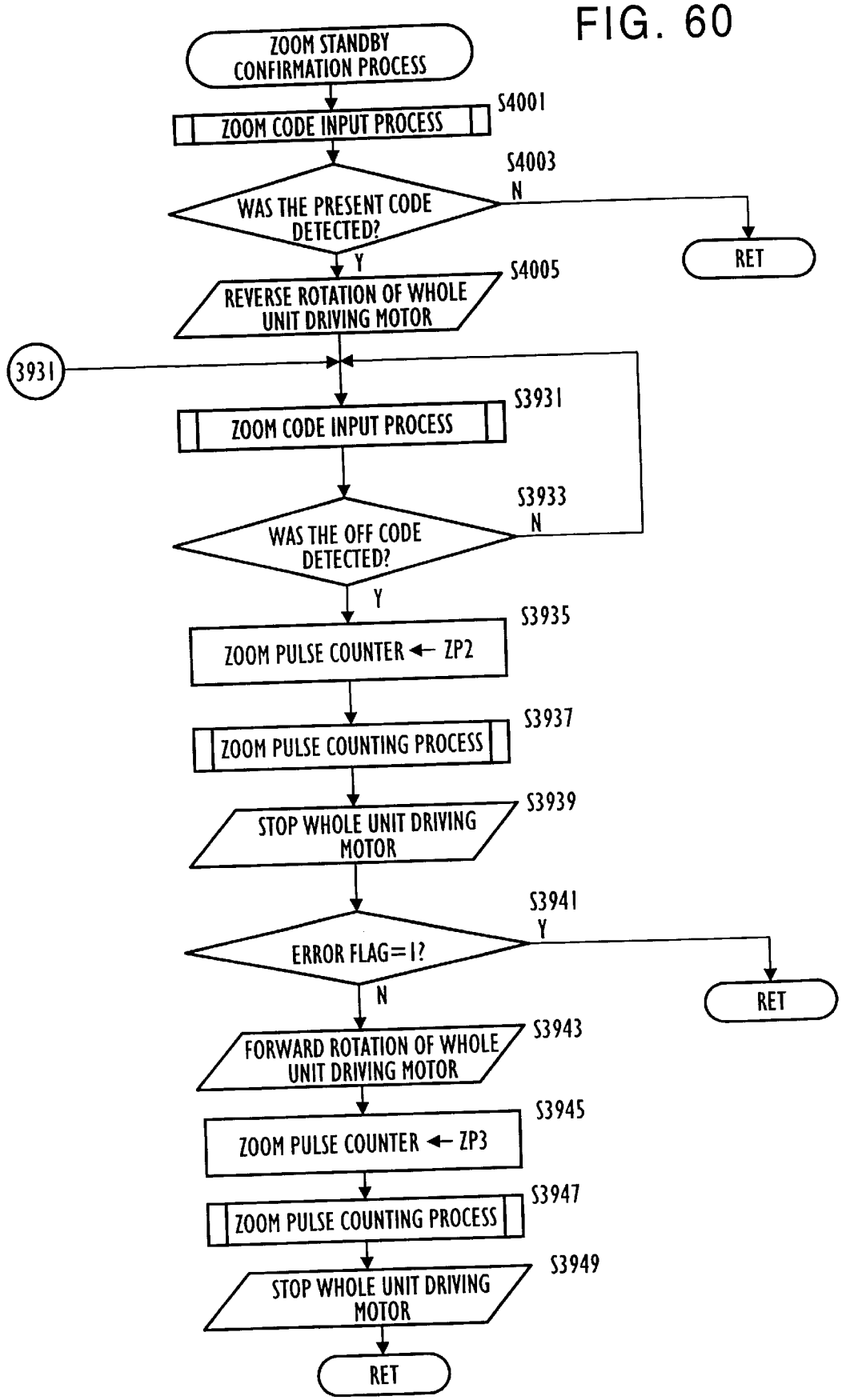
FIG. 60 is a flow chart of a zoom return process and a zoom standby confirmation process of the zoom lens camera of the present invention.

FIG. 60 shows a flow chart for the zoom standby confirmation process. The zoom standby confirmation process is the process called during the photographing process, in which, when the photometering switch SWS is ON, it is confirmed whether the lenses are positioned at the correct standby position, and if the lenses are not at the correct standby position, the lenses are moved to the correct standby position. The processes after step S3931 of the zoom standby confirmation process, are the same as those of the zoom return process.

In the zoom standby confirmation process, at steps S4001 and S4003, the zoom code input process is called and the zoom code is input, and if the present zoom code is not detected, control is returned since it is assumed that the lenses are at the correct standby position. If the present zoom code is detected at step S4003 (i.e., the lenses have moved from the standby position), at step S4005, the whole unit driving motor 25 is driven counterclockwise, namely driven in the direction for movement to the "wide" side, and control proceeds to step S3931, and the zoom code input process is executed.

The detection of the OFF code is then waited for and when the OFF code is detected, the second zoom pulse number ZP2 is set in the zoom pulse counter, and the zoom pulse counting process is called to wait for the value at the zoom pulse counter to become 0 (steps S3933, S3935 and S3937).

At step S3939, upon returning from the zoom pulse counting process, the whole unit driving motor 25 is stopped. At steps S3941, S3943, S3945 and S3947, if the error flag was set to 1, namely if control was returned without the value at the zoom pulse counter becoming 0, the control is returned without executing any process. While if the error flag was not set, the whole unit driving motor 25 is driven in a clockwise direction, the backlash elimination pulse number ZP3 is set at the zoom pulse counter, and the zoom pulse counting process is called to wait for the value at the zoom pulse counter to become 0. Then at step S3949, upon returning from the zoom pulse counting process, the whole unit driving motor 25 is stopped and control is returned.

As above described, in the zoom standby confirmation process, the front lens group L1 and the rear lens group L2 are moved to the standby position, which is retracted by a predetermined distance from the switching position at the "wide" side of the present zoom code, when the present zoom code corresponding to the zoom step is detected.

[The Photographing Charging Process]

Figure 61:
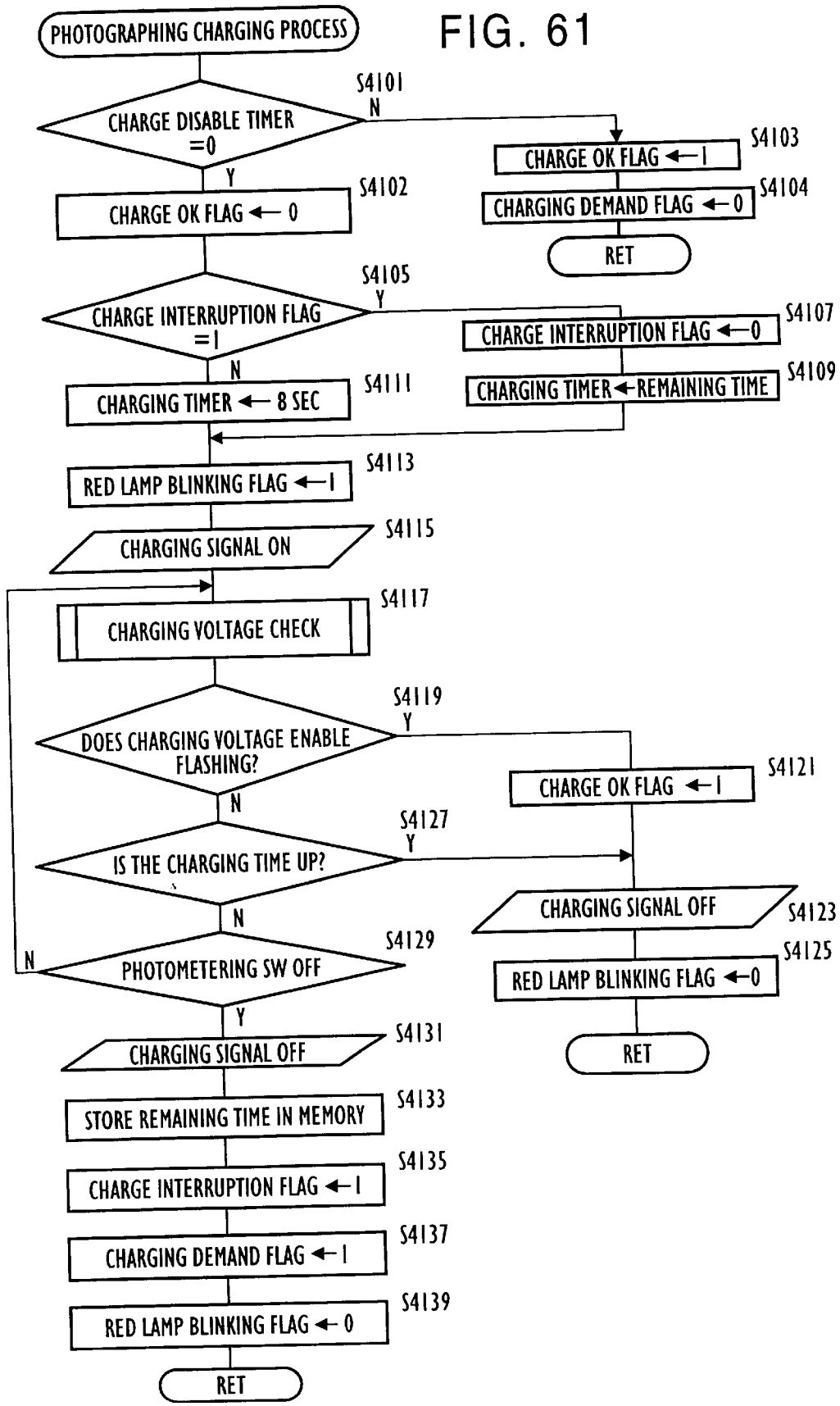
FIG. 61 is a flow chart of a photographing charging process of the zoom lens camera of the present invention.

FIG. 61 shows a flow chart for the photographing charging process. The photographing charging process is the process executed when the photometering switch SWS is ON, and is the charging process called when it is judged in the photographing process that strobe flashing is necessary.

When the photographing charging process is called, at step S4101 the CPU 210 judges whether the charge disable timer is set to 0. The charge disable timer times the period during which charging is disabled and a charge time of three seconds is set at this timer when the flash capacitor 530 of the strobe means 231 becomes fully charged in the main charging process shown in FIG. 41. In such a manner, if the time of the charge disable timer is not up (i.e., the timer value is not 0), although the charging of the flash capacitor 530 will be disabled, strobe flashing will be enabled since the capacitor 530 is almost fully charged. Therefore if the time is not up at the charge disable timer at step S4101, then at step S4103 the charge-OK flag is set to 1 to indicate that the strobe can be flashed, and at step S4104 P14607. S01 the charging demand flag is set to 0, and control is returned upon ending the photographing charging process.

The time will not be up at the charge disable timer at step S4101, if the strobe means 231 is not fully charged or if three or more seconds have passed since the strobe means 231 was fully charged. In such cases, since charging is not disabled, and the CPU 210 sets the charge-OK flag to 0 at step S4102, and the processes for charging after step S4105 are executed.

At step S4105, the CPU 210 judges whether the charge interruption flag is set to 1. When a switch operation is performed while the main charging process is being executed, the charging process is interrupted and the process corresponding to the operated switch is executed, and in this process the charge interruption flag is set to 1.

If the charge interruption flag is set to 0, that is if the main charging process was not interrupted at step S4105, a predetermined limit time (8 seconds) is set at the charging timer in order to restrict the charging time. If the charge interruption flag is set to 1 at step S4105, since the charging will be resumed, the charge interruption flag is cleared (set to 0) and the amount of the charge limiting time remaining at the point at which charging was interrupted is set at the charging timer (steps S4107 and S4109). In such a manner, even if charging is interrupted, a part of the predetermined charging limit time (8 seconds) will already have been spent in charging in the charging process prior to the interruption. Since the charging time for the charging process after interruption is set to the part of the predetermined charging limit time (8 seconds) remaining after the above mentioned spent time, charging will have been performed for the predetermined charging time when the charging is ended with the time becoming up at the timer.

After the charging timer is set at step S4111 or S4109, the CPU 210 sets the red lamp blinking flag to 1, and the red lamp 227 is blinked. Although the charging of the strobe flash capacitor 530 is executed in the main charging process, without being recognized thereof by the photographer, since the charging in the photographing charging process is executed while the photographer is pressing the shutter button 217 halfway down, it is preferred to notify the photographer that charging is in progress. For this purpose, in the photographing charging process, the red lamp 227 is blinked so that the photographer may recognize that charging is in progress.

When the charging timer is set, at step S4115 the charging signal is set to ON, namely the level at the terminal CHEN of the strobe means 231 is set to be H, and charging is started. The output of the terminal RLS of the strobe means 231, which corresponds to the charging voltage, is input to the CPU 210 upon undergoing the A/D conversion. At step S4117 the CPU 210 checks the A/D converted charging voltage. If the charging voltage has reached the level enabling strobe flashing at step S4119, then at step S4121 the CPU 210 sets the charge-OK flag to 1 to indicate that strobe flashing is enabled, and at step S4123 the charging is stopped by setting the level at the terminal CHEN of the strobe circuit 500 to low (L), and at step S4125 the red lamp blinking flag is set to 0, and the blinking of the red lamp is stopped. In such a manner, the photographer may recognize that the charging process is complete, namely that the condition is no longer that in which the strobe cannot be flashed, in other words, photographing is now possible.

At step S4119, if the CPU 210 judges that the charging voltage has not reached the value enabling strobe flashing, then at step S4127 it is judged whether the time at the charging timer is up. If the time at the charging timer is up, then at step S4123 the level at the terminal CHEN of the strobe circuit 500 is set to low (L) to stop charging, and at step S4125 the red lamp blinking flag is set to 0 to end the blinking of the red lamp. If the time is up at step S4127, the charge-OK flag will not be set to 1, since the charging voltage will not have reached the level at which flashing is enabled.

If the time of the charging timer is not up at step S4127, then at step S4129 the CPU 210 judges whether the photometering switch SWS is OFF. If the photometering switch SWS is ON, the processes from steps S4117 through S4127 are repeated. In such a manner, as long as the shutter button 217 is at least pressed halfway, charging is executed until the charging voltage reaches the level enabling flashing or until the charging time (eight seconds) has elapsed.

At step S4129, if the photometering switch SWS is judged to be OFF, namely if the half-pressed condition of the shutter button is canceled during charging, then at step S4131 the CPU 210 makes the charging signal OFF, namely the CPU 210 turns OFF the charging signal, i.e., sets the level at the terminal CHEN of the strobe circuit 500 to low, and at step S4133 the remaining time, indicated by the charging timer, is stored in the memory, and at step S4135 the charge interruption flag is set to 1 to indicate that the charging has been interrupted. Then in order to resume the execution of the remaining charging process canceled in the main charging process, at step S4137 the charging demand flag is set to 1, and then at step S4139 the red lamp blinking flag is set 0 to stop the blinking of the red lamp 227, and the photographing charging process is ended. As above described, the remaining time stored in the memory at step S4133, and the charge interruption flag and the charging demand flag, are referenced during the execution of the main charging process.

[The Focusing Process]

Figure 62:
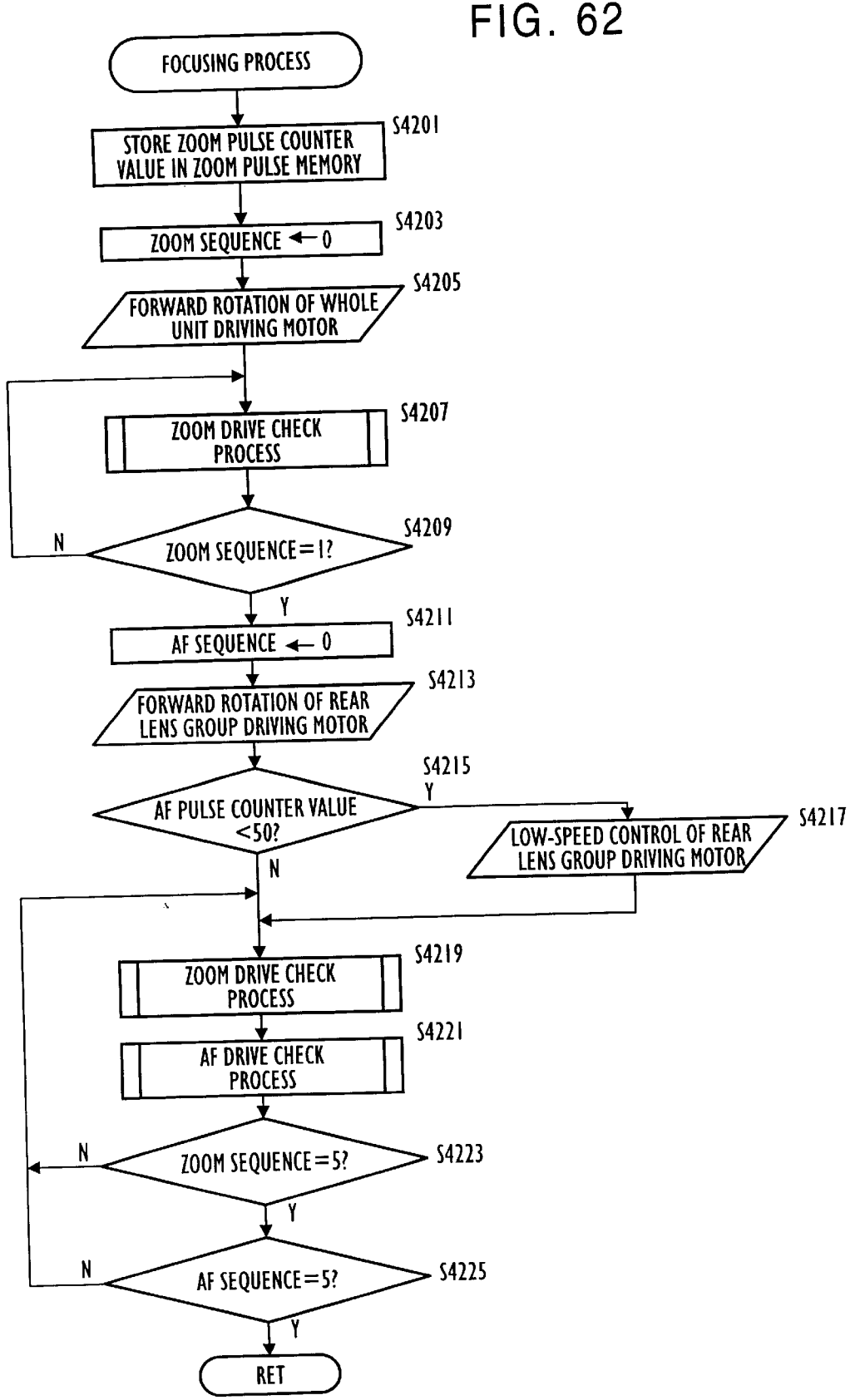
FIG. 62 is a flow chart of a focusing process of the zoom lens camera of the present invention.

FIG. 62 shows a flow chart for the focusing process. In the focusing process, the whole unit driving motor 25 is driven clockwise (i.e., in the direction in which the lenses are extended), and the rear lens group driving motor 30 is driven clockwise (i.e., in the retracting direction in which the rear lens group L2 is retracted) based on the whole unit driving motor drive pulse number and the rear lens group driving motor drive pulse number calculated in the lens drive calculation process, to move the front lens group L1 and the rear lens group L2 to the focused position, (see lens drive of FIG. 34). The present focusing process is characterized in that both the whole unit driving motor 25 and the rear lens group driving motor 30 are driven at the same time, i.e., driven in parallel.

In the focusing process, the zoom pulse counter value, namely, the number of pulses, calculated in the lens drive calculation process, by which the whole unit driving motor 25 is driven from the switching point at the housed side of the present zoom code, is written into of the zoom pulse memory at step S4201. The zoom sequence is then set to 0, and the whole unit driving motor 25 is driven clockwise, and the driving check process is executed to wait for the zoom sequence to become 1, namely for the present zoom code to be detected (i.e., turned from OFF to ON), and when the zoom sequence becomes 1, the AF sequence is set to 0 (steps S4203, S4205, S4207, S4209 and S4211).

The rear lens group driving motor 30 is then driven clockwise, and it is checked whether the value at the AF pulse counter is less than 50. If the value is less than 50, the control of the rear lens group driving motor 30 is changed to low-speed control (i.e., pulse width modulation (PWM) controlling), while if the value is not less than 50, control proceeds to the zoom drive check process (steps S4213, S4215, S4217 and S4219, or at steps S4213, S4215 and S4219).

The process then waits for both the zoom sequence and the AF sequence to become 5, and when both become 5, namely when both the whole unit driving motor 25 and the rear lens group driving motor 30 stop, control is returned (steps S4219, S4221, S4223 and S4225).

In the focusing process, since both the whole unit driving motor 25 and the rear lens group driving motor 30 are driven at the same time, the time required for focusing by moving the front lens group L1 and the rear lens group L2 to the focused position is shortened.

[The Exposure Process]

Figure 63:
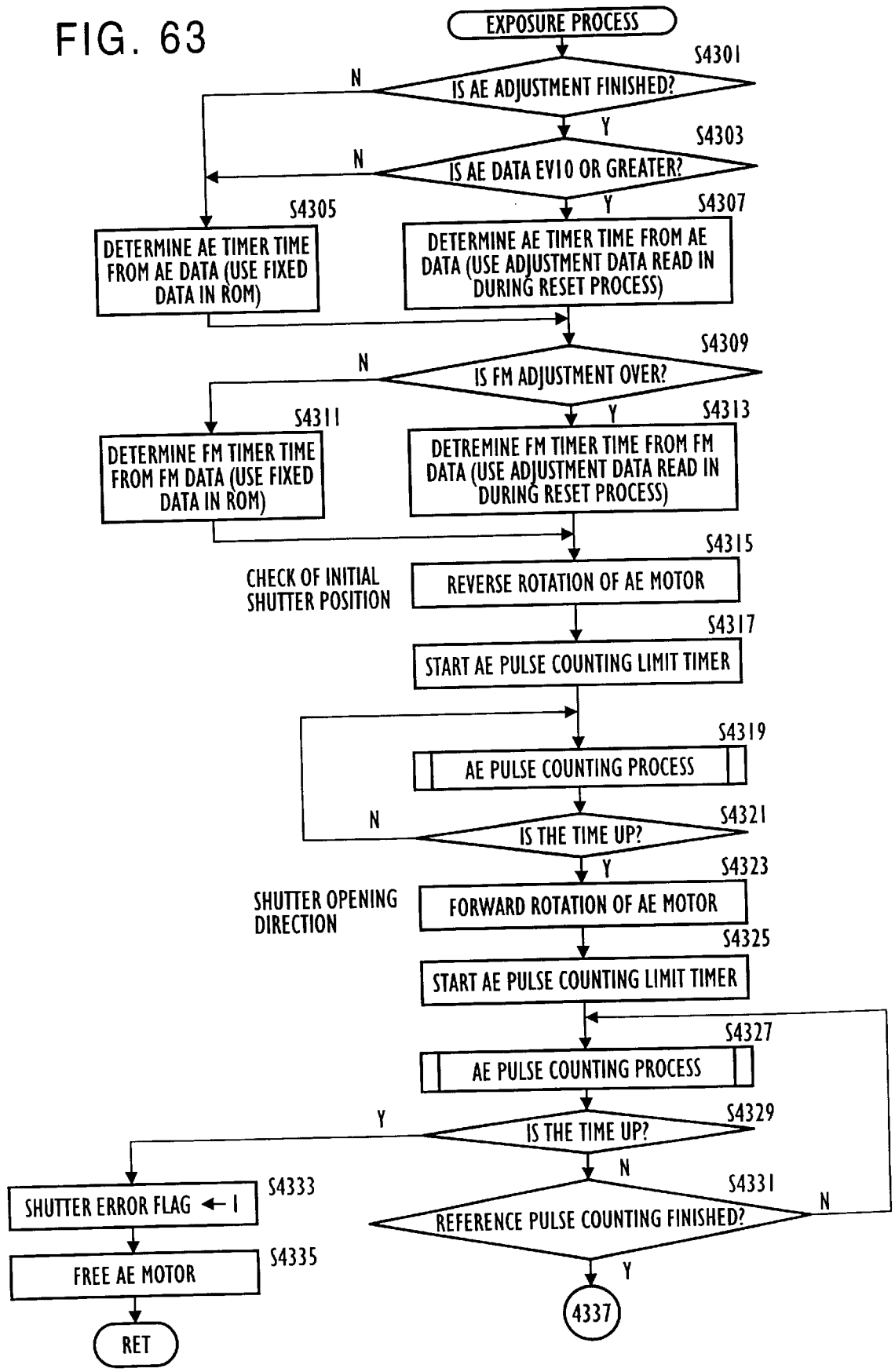
FIGS. 63, 64 and 65 are flow charts of an exposure process of the zoom lens camera of the present invention.
Figure 64:
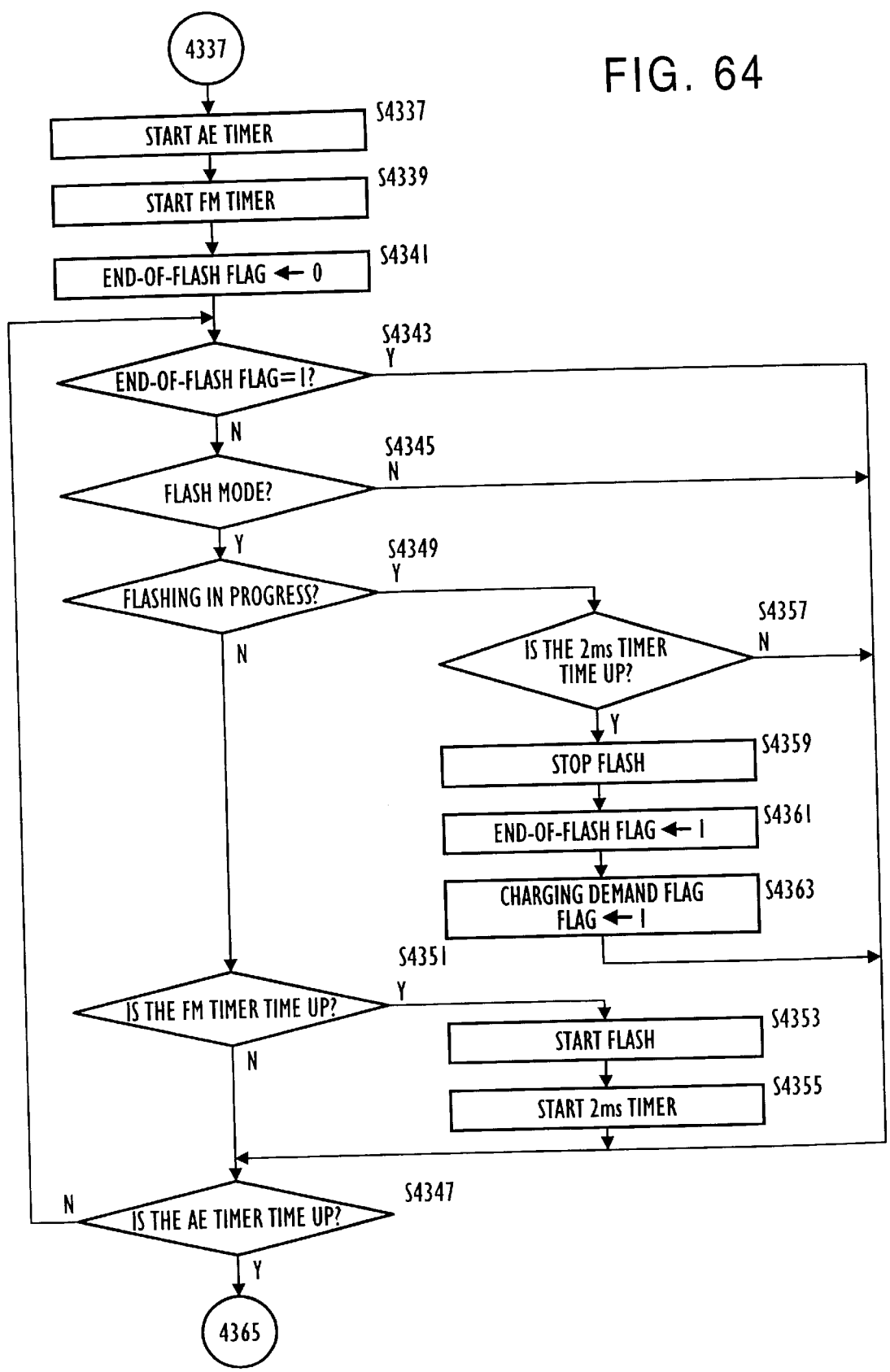
Figure 65:
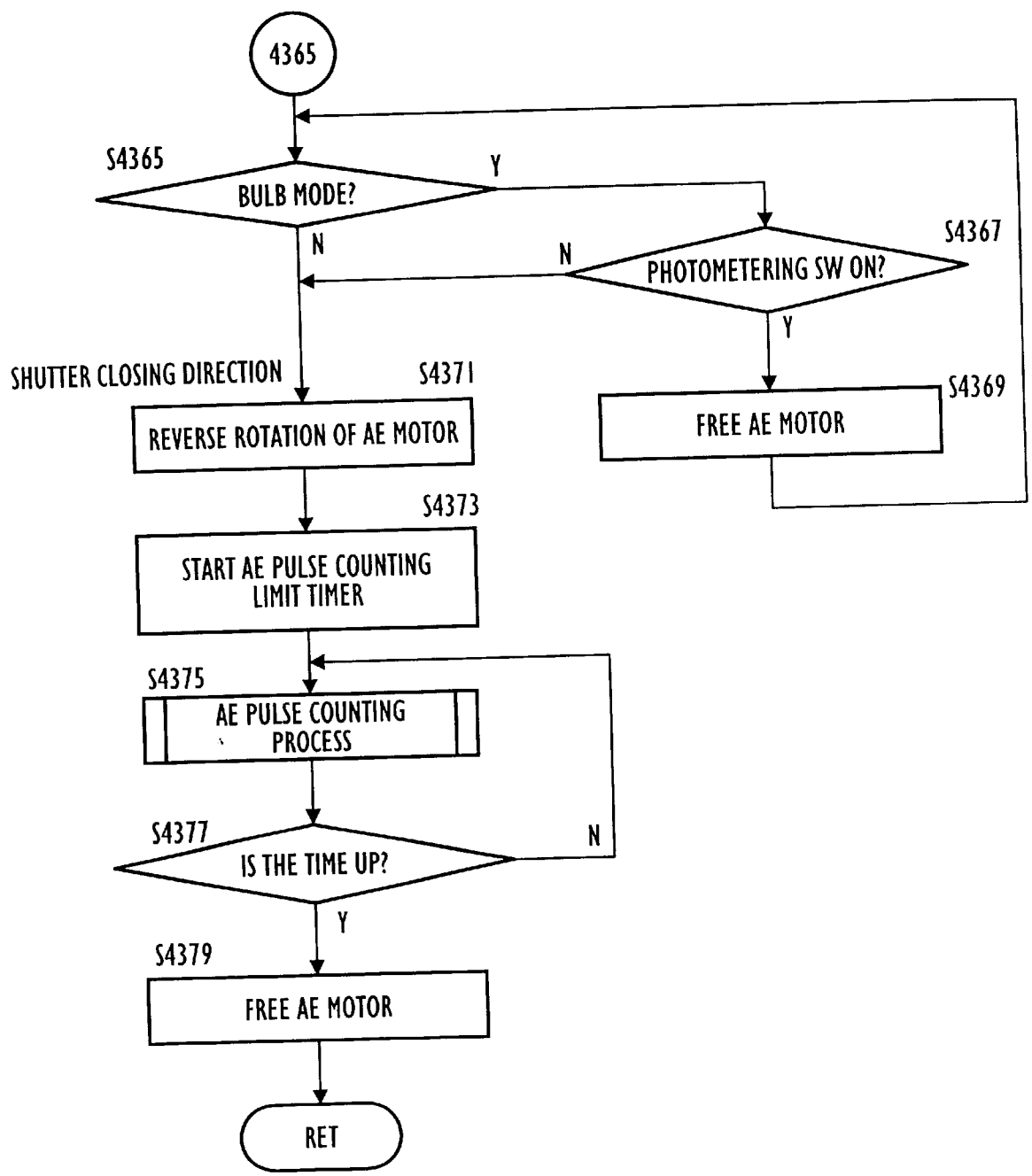

FIGS. 63 through 65 show a flow chart for the exposure process. The exposure process is executed, when the release switch SWR is turned ON. In the exposure process, the compensation process in regard to the shutter, and the shutter initial position confirmation process, etc., are executed, and the shutter is thereafter released to perform exposure.

Whether the AE adjustment has finished is checked, at step S4301, and if the AE adjustment has not finished, or if the AE data is less than 10 Ev even if the AE adjustment has finished, the AE timer time is selected from among the fixed data stored in the ROM based on the AE data obtained during the AE calculation process (steps S4301 and S4305, or at S4301, steps S4303 and S4305). If the AE adjustment has finished and the AE data is 10 Ev or more, at steps S4301, S4303 and S4307, based on the AE data obtained during the AE calculation process, the AE timer time is determined from among the adjustment data read during the reset process. The fixed data in the ROM is used when the AE data is less than 10 Ev since the shutter release time will be long when the AE data is less than 10 Ev and the influence of errors will therefore be small, and since the process can be executed in a shorter time by using the data in the ROM.

Then at steps S4309 and S4311, or at steps S4309 and S4313, whether the FM adjustment has completed is checked. If the FM adjustment has not completed, the FM timer time is selected from among the fixed data in the ROM based on the FM data, while if the FM adjustment has completed, the data that was read in the adjustment data reading process during the reset process is used.

When the setting of the timers is completed, at steps S4315, S4317, S4319 and S4321, the shutter initial position confirmation process is executed. In the process, namely at steps S4315, S4317, S4319 and S4321, the AE motor 29 is driven counterclockwise to drive the shutter blades 27a in the shutting direction, the AE pulse counting limit timer is started, and the AE pulse counting process is executed to wait until the timer time is up. When the shutter blades 27a are completely shut, and become immovable, the time becomes up since the AE motor 29 becomes incapable of rotating.

When the time is up, at steps S4323 and S4325, the AE motor 29 is driven clockwise and the shutter is driven in the opening direction, and the AE pulse counting limit timer time is started. Then at steps S4327, S4329 and S4331, the AE pulse counting process is executed and waiting is performed until the reference pulse number is reached during the AE pulse counting process, while checking whether the time is up at the AE pulse counting limit timer time.

At steps S4329, S4333 and S4335, if the time becomes up at the AE pulse counting limit timer time, it means that the rotation of the AE motor 29 is impeded due to some reason, the shutter error flag is set, the AE motor 29 is freed, namely the passage of current is stopped, and control is returned.

At the moment when the counting of the reference pulse is ended, since the shutter blades 27a start to be opened. the AE timer and the FM timer are started, and the end-of-flash flag is cleared (steps S4335, 4337, S4339 and S4341).

Although it is checked whether the end-of-flash flag is set, and whether the flash mode is set, in the case where the strobe is not to be flashed, since the end-of-flash flag will remain cleared and the flash mode will not be set, waiting is performed for the time to be up at the AE timer (steps S4343, S4345 and S4347).

When the time of the AE timer is up and if the bulb mode is not set, the AE motor 29 is driven counterclockwise (i.e., in the direction in which the shutter is closed) to start the shutter blade shutting operation and the AE pulse counting limit timer time is started (steps S4371 and S4373). Then while executing the AE pulse counting process, the process waits for the time to be up at the AE pulse counter, namely, that the shutter blades 27a are shut and the AE motor 29 is stopped, and when the time is up, the AE motor is freed, and control is returned (steps S4375, S4377 and S4379). In the case of the bulb mode, the AE motor 29 is freed while the photometering switch SWS is ON, in order to prevent the AE motor 29 from overloading, and waiting is performed for the photometering switch SWS to be turned OFF (steps S4365, S4367 and S4369).

If the strobe flashing mode is set, since this means that a flashing mode is set, control proceeds to step S4349, and it is checked whether flashing is in progress, and since flashing will not be in progress initially, waiting is performed for the time to be up at the FM timer (steps S4349, S4351, S4347, S4313 and S4345). Since the FM timer time is normally shorter than the AE timer time, the time will normally be up at the FM timer first. When the time is up at the FM timer, flashing is started and the 2 ms timer is started (steps S4351, S4353 and S4355). The 2 ms timer is a timer for waiting for the complete ending of the flashing of the strobe, and this waiting time is not limited to 2 ms and may differ according to the characteristics of the strobe.

When flashing is started, since flashing will be in progress, waiting is performed until the time is up at the 2 ms timer (steps S4349, S4357, S4347, S4343 and S4345). When the time of the 2 ms timer is up, the flashing is stopped, the end-of-flash flag is set, and the charging demand flag is set (steps S4357, S4359, S4361 and S4363). Then at steps S4343 and S4347, since the end-of-flash flag has already been set, the process waits until the time is up at the AE timer.

[The Lens Return Process]

Figure 66:
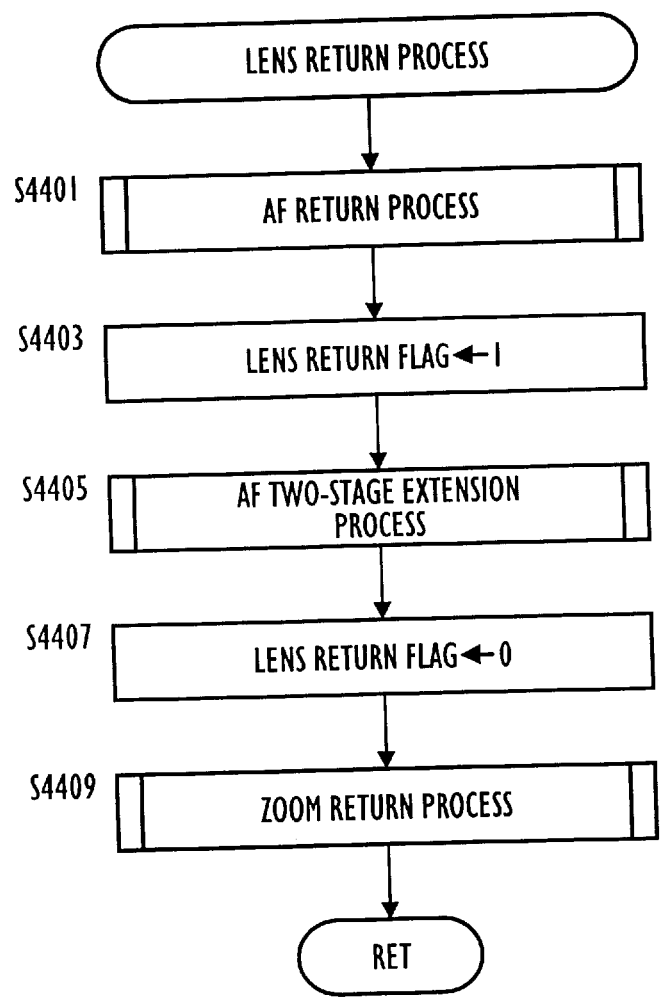
FIG. 66 is a flow chart of a lens return process of the zoom lens camera of the present invention.

FIG. 66 shows a flow chart for the lens return process. The lens return process is a process in which the front lens group L1 and the rear lens group L2, which been moved to the focused positions during the photographing process, are returned to the positions prior to the photographing process. The front lens group L1 is returned to the standby position, retracted in the direction of the housing position by an amount corresponding to the second zoom pulse ZP2 from the "wide" side switching point of the zoom code corresponding to the zoom step which identifies the present focal length. The rear lens group L2 is returned to the AF home position if the zoom step is 5 or greater, or moved to a position extended (i.e., retracted) from the AF home position by an amount corresponding to the value of the AF pulse AP1, when the zoom step is between 0 and 4.

In the lens return process, the AF return process is called, the rear lens group L2 is returned to the AF home position, and the lens return flag is set. Then the AF two-stage extension process is called, and if the zoom code is 5 or greater, the rear lens group L2 is left as it is. If the zoom code is 4 or less, the rear lens group L2 is extended (i.e., retracted) by an amount corresponding to the value of the AP pulse AP1, and then the zoom return flag is cleared, i.e., set to 0. Then the zoom return process is called, and the front lens group L1 is moved to the standby position of the present zoom code, and control is returned (steps S4401, S4403, S4405, S4407 and S4409).

[The Lens Drive Calculation Process]

Figure 67:
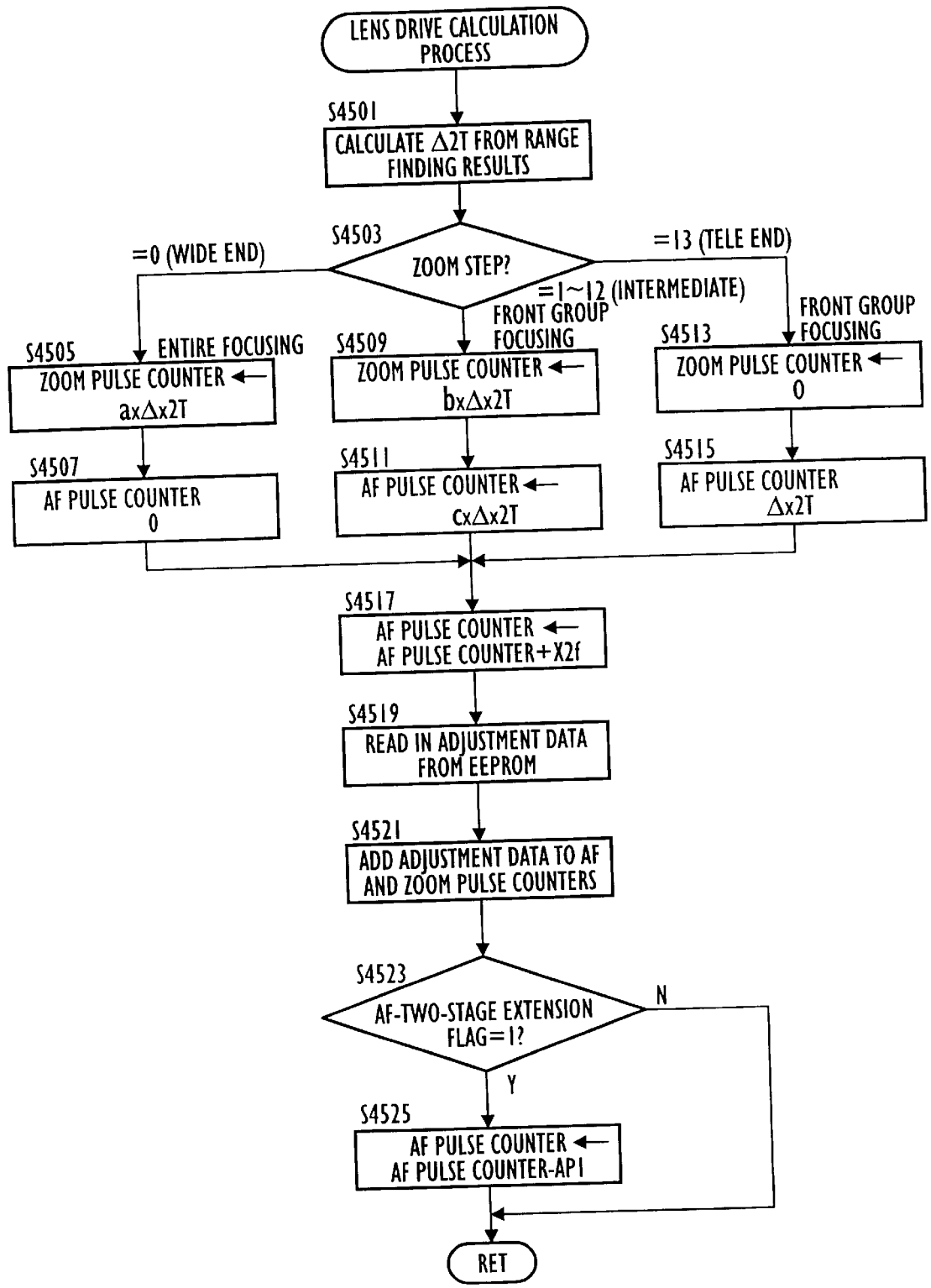
FIG. 67 is a flow chart of a lens driving operation process of the zoom lens camera of the present invention.

FIG. 67 shows a flow chart for the lens drive calculation process. The lens drive calculation process is the process in which the pulse numbers, by which the whole unit driving motor 25 and the rear lens group driving motor 30 are to be driven, are determined based on the subject distance (or the photographing distance) obtained in the focusing processing and the present zoom step, as the zoom pulse number from the "wide" side switching point (i.e., the ON/OFF point) corresponding to the present zoom step and the AF pulse value. In the focusing process in the present embodiment, the direction in which the whole unit driving motor 25 is driven is the direction in which the front lens group L1 is advanced (extended), and the direction in which the rear lens group driving motor 30 is driven is the direction in which the rear lens group L2 is retracted from the AF home position, namely, moved away from the front lens group L1.

In the present embodiment, three modes of focusing are performed. At the "wide" end, whole focusing (first mode) is performed in which the front lens group L1 and the rear lens group L2 are moved as a whole by the whole unit driving motor 25. At the "tele" end, rear lens group focusing (third mode) is performed in which only the rear lens group L2 is moved by the rear lens group driving motor 30. Between the "wide" end and the "tele" end, the front lens group focusing (second mode) is performed in which the front lens group L1 and the rear lens group L2 are moved by the whole unit driving motor 25, and the rear lens group L2 is moved by the rear lens group driving motor 30, so that the absolute position of the rear lens group L2 with respect to the camera will not be changed.

In the lens drive calculation process, at step S4501, the reference amount of lens movement (i.e., the pulse number) A2T is calculated based on the present zoom step and the subject distance obtained through the focusing processing. Then at steps S4503, S4505, S4507, S4509, S4511, S4513 and S4515, it is judged whether the present zoom step is 0 (i.e., the "wide" end), between 1 and 12 (i.e., intermediate position between the "wide" end and the "tele" end), or 13 (i.e., the "tele" end), and the pulse calculation process corresponding to the zoom step is executed in accordance with the present zoom step. At steps S4505 and S4507, if the present zoom step is at the "wide" end, the whole focusing will be performed, and the value (a*Δ*2T) is set in the zoom pulse counter, and the value 0 is set in the AF pulse counter. If the present zoom step corresponds to an intermediate position, the front lens group focusing will be performed, and at steps S4509 and S4511, the value (b*Δ*2T) is set in the zoom pulse counter, and the value (c*AX2T) is set in the AF pulse counter. If the present zoom step corresponds to the "tele" end, the rear lens group focusing will be performed, and at steps S4513 and S4515, the value 0 is set in the zoom pulse counter, and the value (Δ*2T) is set in the AF pulse counter. The symbols a, b, c and AX are predetermined compensation factors.

When the setting of the pulse counter is complete, at step S4517, the correction value X2f, according to the focal length, is added to the value of the AF pulse counter. Then at steps S4519 and S4521, the adjustment data is read from the EEPROM 230, and are further added to the values at the AF pulse counter and the zoom pulse counter. At steps S4523 and S4525 it is checked whether the AF two-stage extension flag is set, and if it is set, since the rear lens group L2 has already been extended (retracted) by the value of the AF pulse AP1 from the AF home position, the value AP1 is deducted from the AF pulse counter.

In the above processing, the setting of the drive pulse number of the whole unit driving motor 25 and the drive pulse number of the rear lens group driving motor 30, for moving the front lens group L1 and the rear lens group L2 to lens positions at which the lenses will be in focus with the subject at the present focal length, are completed.

[The Test Function Process]

Figure 68:
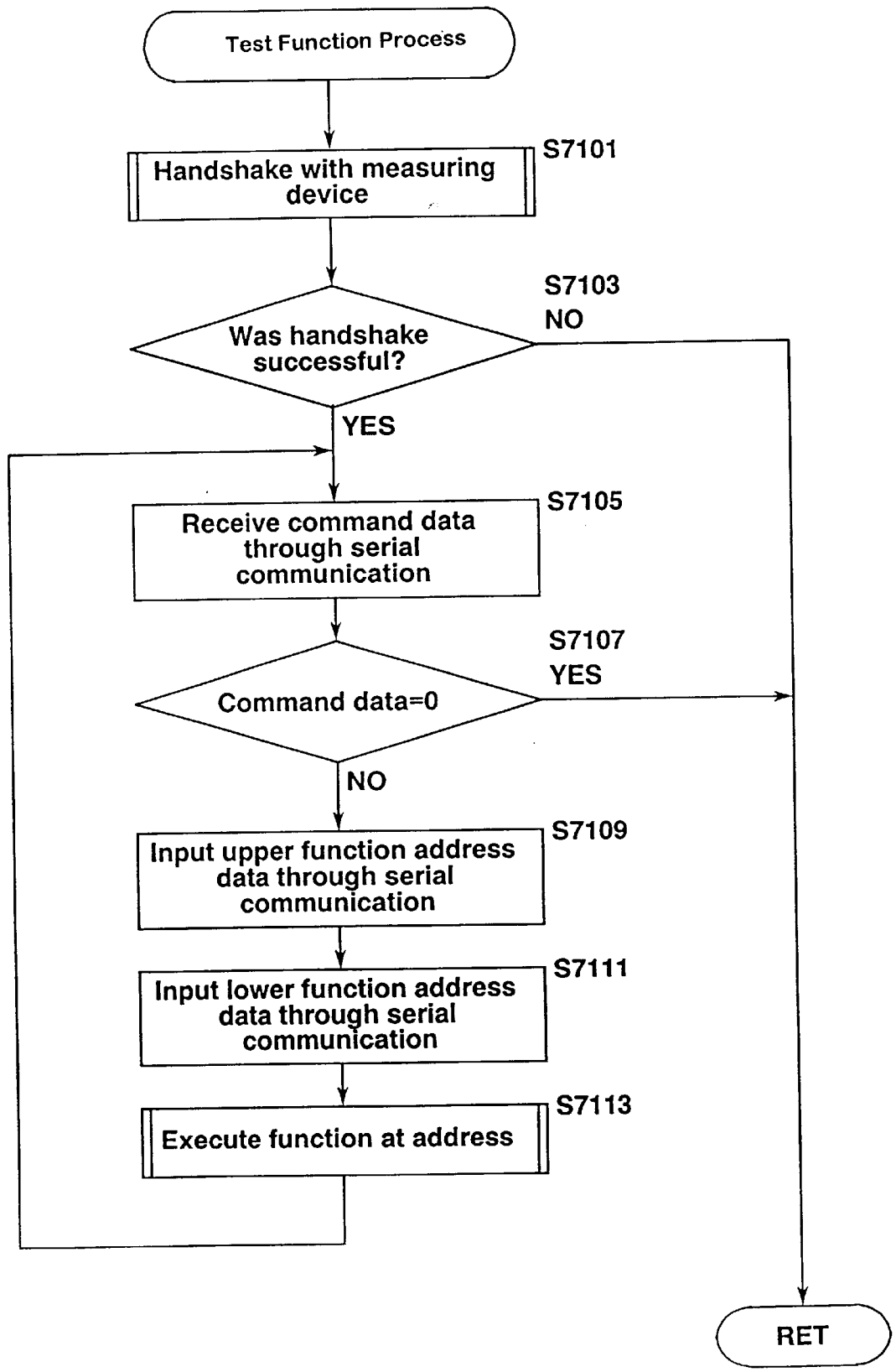
FIG. 68 is a flow chart of a test function process of the zoom lens camera of the present invention.

FIG. 68 shows a flow chart for the test function process. The test function process is the process for testing the functions of the camera, and is called to execute the various functions of the camera with the camera being connected to a measuring device.

In the prior art, tests to be performed upon connecting a measuring device to a camera are commenced when commands are input into the camera from the measuring device, are determined in advance and predetermined processes are executed at the camera side according to the various commands input from the measuring device. However, when tests are performed by such a method, only a limited number of predetermined operations can be executed and other operations cannot be executed. Test operations can only be performed for test items that are considered at the time of writing the test program and test items cannot be added later. With the camera of the present embodiment, programs for controlling the camera can be designed one function at a time and input from the measuring device to be executed by the camera.

The test function process. is called during the execution of the reset process, when the reset process is executed. Therefore, the test function process is executed by connecting the measuring device (not shown) to the camera, as the battery is loaded into the camera.

When the test function process is called, at step S7101 a handshake between the CPU 210 of the camera and the measuring device, connected to the camera, is executed, and the communication condition is set. If an error occurs during the handshake, or if the measuring apparatus is not connected to the camera, it is deemed that the handshake was unsuccessful at step S7103, and the test function process is canceled, and control is returned. If the handshake is successful and communication is enabled at step S7103, the input of commands from the measuring device to the CPU 210 is enabled (step S7105).

If the command data has a value 0, which indicates the end of the test function process at step S7107, control is returned upon ending the test function process. If the value of the command data is not 0, the upper address and the lower address of the function to be called are received through serial communication from the measuring device (steps S7109, S7111) and the function stored in the address range is executed at step S7113. The processes related to the test items necessary, are executed by repeating the above until the command data with a value of 0 is received.

As described above, detailed tests can be performed with the camera of the present embodiment, since the camera controlling programs can be designed and executed in function units by means of data input from the measuring device.

[The AF Pulse Counting Process]

Figure 69:
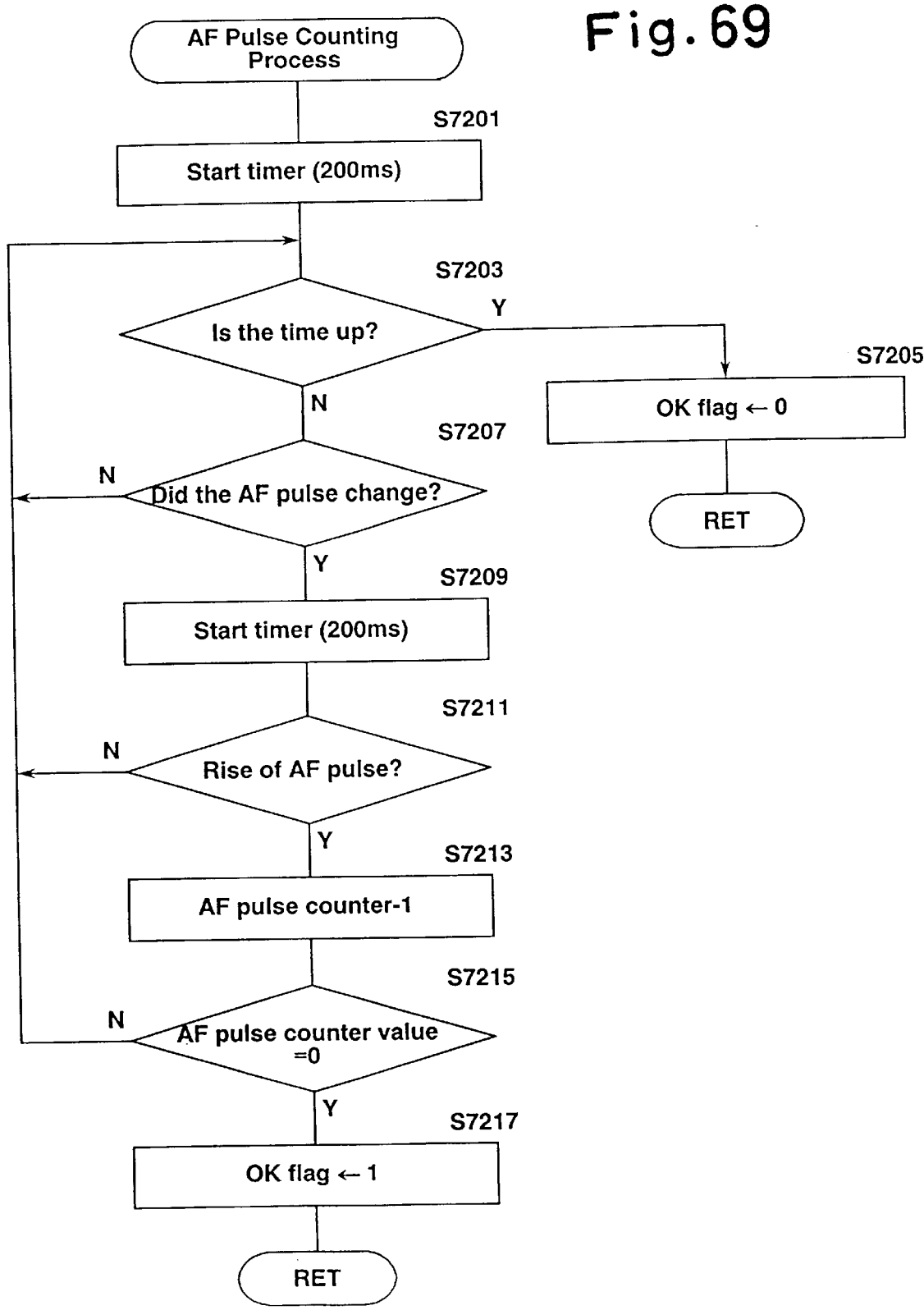
FIG. 69 is a flow chart of an AF pulse counting process of the zoom lens camera of the present invention.

FIG. 69 shows a flow chart for the AF pulse counting process. The AF pulse counting process is the process in which the AF pulse counter is decremented by one each time a change in the AF pulse is detected within a predetermined time period, and the OK flag is set to 1 when the value at the AF pulse counter becomes 0. The OK flag is set to 0 if the value at the pulse counter does not become 0 within the predetermined period.

At step S7201, the CPU 210 first sets a timer to zooms as the period during which the changes in the AF pulse are to be monitored. In the following processes, if there is no change in the AF pulse within the 200 ms period, the CPU 210 sets the OK flag to 0, as above described.

At step S7203, the CPU 210 judges whether or not the time is up at the 200 ms timer. If the time is not up, then at step S7207, whether there was a change in the AF pulse is judged based on the output signal from the AF reference pulse input means 222 to the CPU 210. The judgement as to whether there is a change in the AF pulse is made by detecting the change of the pulse from both the H (high) level to the L (low) level and vice versa.

If there is no change in the AF pulse at step S7207, the CPU 210 returns the process to step S7203. Therefore, if no changes in the AF pulse are detected within the 200 ms time period, it is judged that the time is up at step S7203, and the process is ended upon setting the OK flag to 0 at step S7205. In other words, the OK flag is set to 0 if the same number of pulses as the value set at the AF pulse counter before the AF pulse counting process was called is not detected during the execution of the AF pulse counting process.

When the CPU 210 detects a change in the AF pulse at step S7207, then at step S7209 the timer is reset, and the period of 200 ms is set again and restarted. If the detected change in the AF pulse is a rise of the AF pulse at step S7211, then at step S7213 the AF pulse counter is decremented by one. Here, the value to be counted, that is, the value corresponding to the amount by which the rear lens group L2 is to be driven by means of the rear lens group driving motor, is set at the AF pulse counter before the AF pulse counting process is executed. If the value at the decremented AF pulse counter is 0 at step S7215, the CPU 210 sets the OK flag to 1 and ends the process. That is, the OK flag is set to 1 if the same number of pulses as the value set at the AF pulse counter before the AF pulse counting process was called has been counted.

As described above, in the AF pulse counting process, the OK flag is set to 1 if the same number of pulses as the predetermined value set previously at the AF pulse counter are output from the AF reference pulse input means 222 to the CPU 210. The OK flag is set to 0 if the output of pulses is stopped before the AF reference pulse input means 222 outputs a number of pulses equal to the predetermined value set at the AF pulse counter to the CPU 210.

[The Zoom Drive Check Process]

Figure 70:
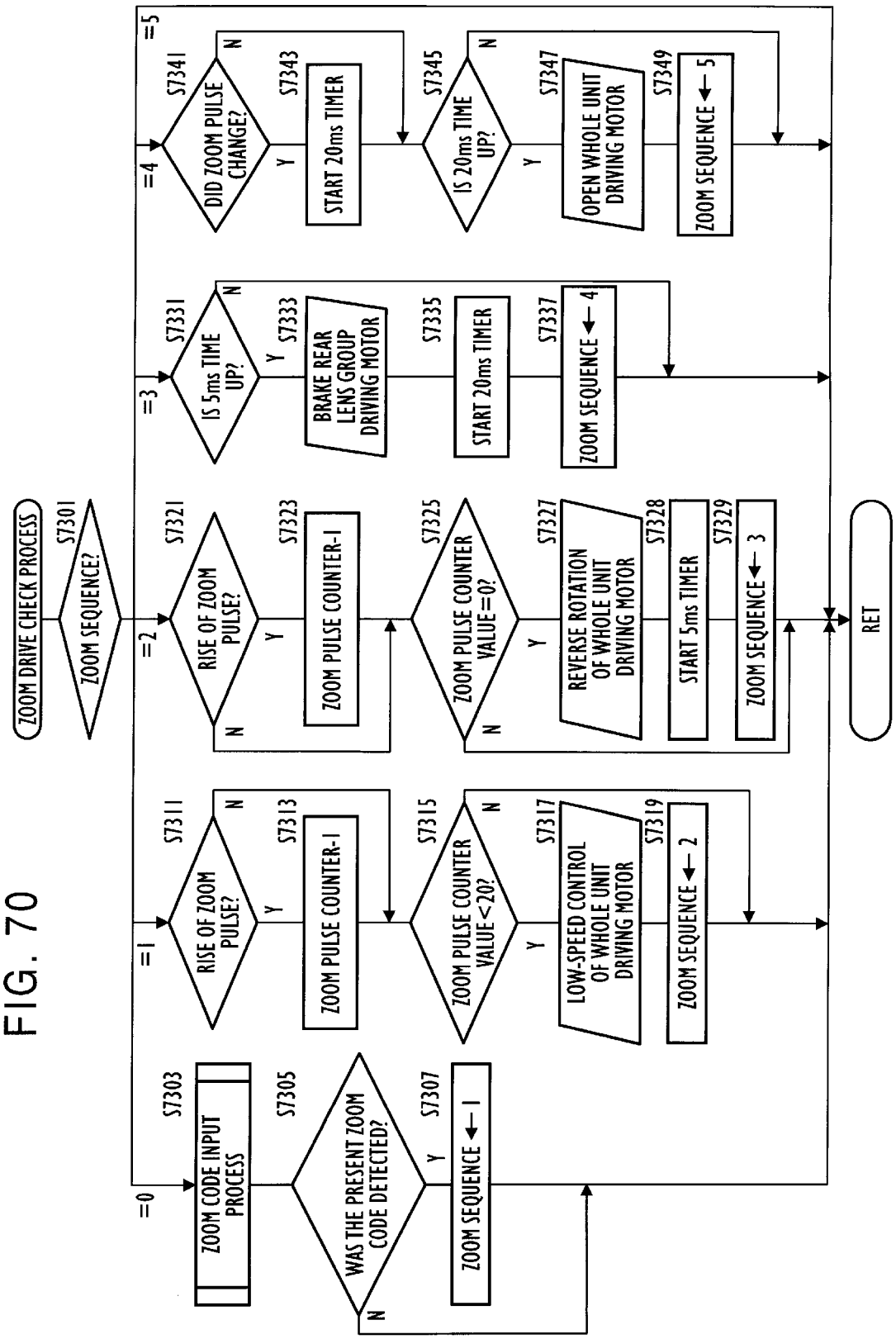
FIG. 70 is a flow chart of a zoom driving check process of the zoom lens camera of the present invention.

FIG. 70 shows a flow chart for the zoom drive check process. In addition, the relationship between the driving state of the whole unit driving motor 25 and the zoom sequence is shown in the form of a timing chart in FIG. 35. The zoom drive check process is a process in which it is judged at which stage the driving of the lenses by the whole unit driving motor 25 for focusing on the subject distance is at, and in which stage the driving control of the whole unit driving motor 25 is carried out.

When the zoom drive check process is executed, according to the value of the zoom sequence (0 through 5), which is the index that indicates the state of driving of the whole unit driving motor 25, namely, the state of operation of the whole unit driving motor controlling means 60, the process branches at step S7301. When the zoom drive check process is called, the condition will be one in which the whole unit driving motor 25 is driven clockwise, and the zoom sequence is set to 0.

At step S7303, if the value of the zoom sequence is 0, the CPU 210 calls the zoom code input process, and the value of the zoom code is input. When the lenses are stopped, the terminal for zoom code detection is positioned to the "wide" side of the zoom code. When the whole unit driving motor 25 is driven clockwise, the zoom code detection terminal first contacts the zoom code corresponding to the preset lens position. If the zoom code input in the zoom code input process equals to the value stored in the memory as the present zoom code at step S7305, then at step S7307 the zoom sequence is set to 1. If the zoom code input by the zoom code input process differs from the value stored in memory as the present zoom code at step S7305, the zoom sequence remains at 0, and the zoom drive check process is ended.

When the value of the zoom sequence is 1, namely, after the present zoom code is detected, at step S7311 the CPU 210 monitors the rise of the zoom pulse output by the zoom pulse input means 220. At steps S7311 and S7313, the zoom pulse is then only decremented if the rise of the zoom pulse is detected. When the zoom pulse counter becomes less than 20 at step S7315, then at step S7317 the CPU 210 switches the whole unit driving motor 25 to the low-speed control, and at step S7319, the value of the zoom sequence is set at 2. If the value at the zoom pulse counter is equal to or greater than 20 at step S7315, the zoom sequence remains at 1, and the zoom drive check process is ended.

Therefore, when the whole unit driving motor 25 is started to drive, the zoom pulse counter is decremented on the basis of the present zoom code, and according to the pulses output by the zoom pulse input means 220 to the CPU 210. The whole unit driving motor 25 is driven by the normal DC drive until the count at the zoom pulse counter becomes 20. The zoom sequence will be 1 while the whole unit driving motor 25 is being driven at normal speed. If the driving in the DC drive condition is continued, the lenses may be moved by more than the amount corresponding to the desired number of pulses due to inertia, etc., when the whole unit driving motor 25 stops. Therefore, when the zoom pulse counter becomes less than 20, the whole unit driving motor 25 is put under low speed control. The low-speed control is executed by means of PWM control. When the driving of the whole unit driving motor 25 is switched to low-speed control, the zoom sequence is set to 2.

When the zoom sequence is 2, namely during the low-speed control of the whole unit driving motor 25, if the zoom drive check process is called, the processes from step S7321 are executed. In such processes, at step S7321 the CPU monitors a rise of the zoom pulse, and decrements the zoom pulse when a rise is detected at step S7323. If a rise of the zoom pulse is not detected at step S7321, the process at step S7323 is skipped.

Until the zoom pulse count, which is decremented by one at a time while the lenses are being driven with the whole unit driving motor 25 being under low-speed control, become 0, the processes at steps S7321 and S7323 are executed each time the zoom drive check process is called. The zoom sequence will remain at 2 during this period. When the zoom pulse becomes 0 at step S7325, the whole unit driving motor 25 is driven counterclockwise at step S7327, to perform the braking process (i.e., reverse brake). After starting the counterclockwise driving of the whole unit driving motor 25, at step S7328, the time of 5 ms, which is the reverse driving period, is set at the timer, and the zoom sequence is set to 3 at step S7329. In such a manner, when the zoom sequence is 3, the whole unit driving motor 25 is driven counterclockwise for braking.

When the zoom sequence is 3, if the zoom drive check process is called, at step S7331 the CPU 210 judges whether the period of 5 ms, which is the period of the counterclockwise driving of the whole unit driving motor 25, has elapsed. If 5 ms has not elapsed, control is returned with the zoom sequence remaining at 3. After 5 ms have elapsed, at steps S7333, S7335 and S7337, braking is performed by short-circuiting the terminals of the whole unit driving motor 25, and the 20 ms timer is started, and the zoom sequence is set to 4, and control is returned.

If the zoom driving check processing is called when the zoom sequence is 4, at step S7341 the CPU 210 monitors whether the zoom pulse changes. That is, whether the whole unit driving motor 25 is rotating under the condition where the brakes are acting is judged according to whether the zoom pulse changes within 20 ms.

If the CPU 210 judges, that there is no change in the zoom pulse at step S7341, and that the time is up at the 20 ms timer at step S7345, then at steps S7347 and S7349, the control of the whole unit driving motor 25 is stopped, and the terminals of the motor are brought in to the open condition (i.e., undriven condition), and the zoom sequence is set to 5. If it is detected at step S7341 that the zoom pulse has changed, the 20 ms timer is restarted at step S7343, and it is monitored whether the next change in the zoom pulse is detected within the 20 ms after the previous change in the zoom pulse. A return is performed with the brake acting on the whole unit driving motor 25 and with the zoom sequence remaining at 4 until it is judged at step S7345 that the time is up at the 20 ms timer.

If the zoom drive check process is called when the zoom sequence is 5, as shown in the flow chart, control is returned without executing any processes in the zoom drive check process.

As above described, in the zoom drive check process, the lenses are moved to the position of the present zoom code, which is the reference position (zoom sequence=0). The lenses are then moved at the normal speed while the counter at the zoom pulse counter is 20 or more (zoom sequence=1), and then moved at a low speed when the count at the zoom pulse counter becomes less than 20 (zoom sequence=2). When the count at the zoom pulse counter becomes 0, the whole unit driving motor 25 is driven counterclockwise for 5 ms (zoom sequence=3), and thereafter, braking is performed by short-circuiting the terminals of the whole unit driving motor 25 (zoom sequence=4). When the whole unit driving motor 25 comes to a complete stop, unit driving motor 25 is ended (zoom sequence=5), and thereafter, the undriven condition is maintained, until a new value is set at the zoom pulse counter and the zoom sequence is set to 0.

[The AF Drive Process]

Figure 71:
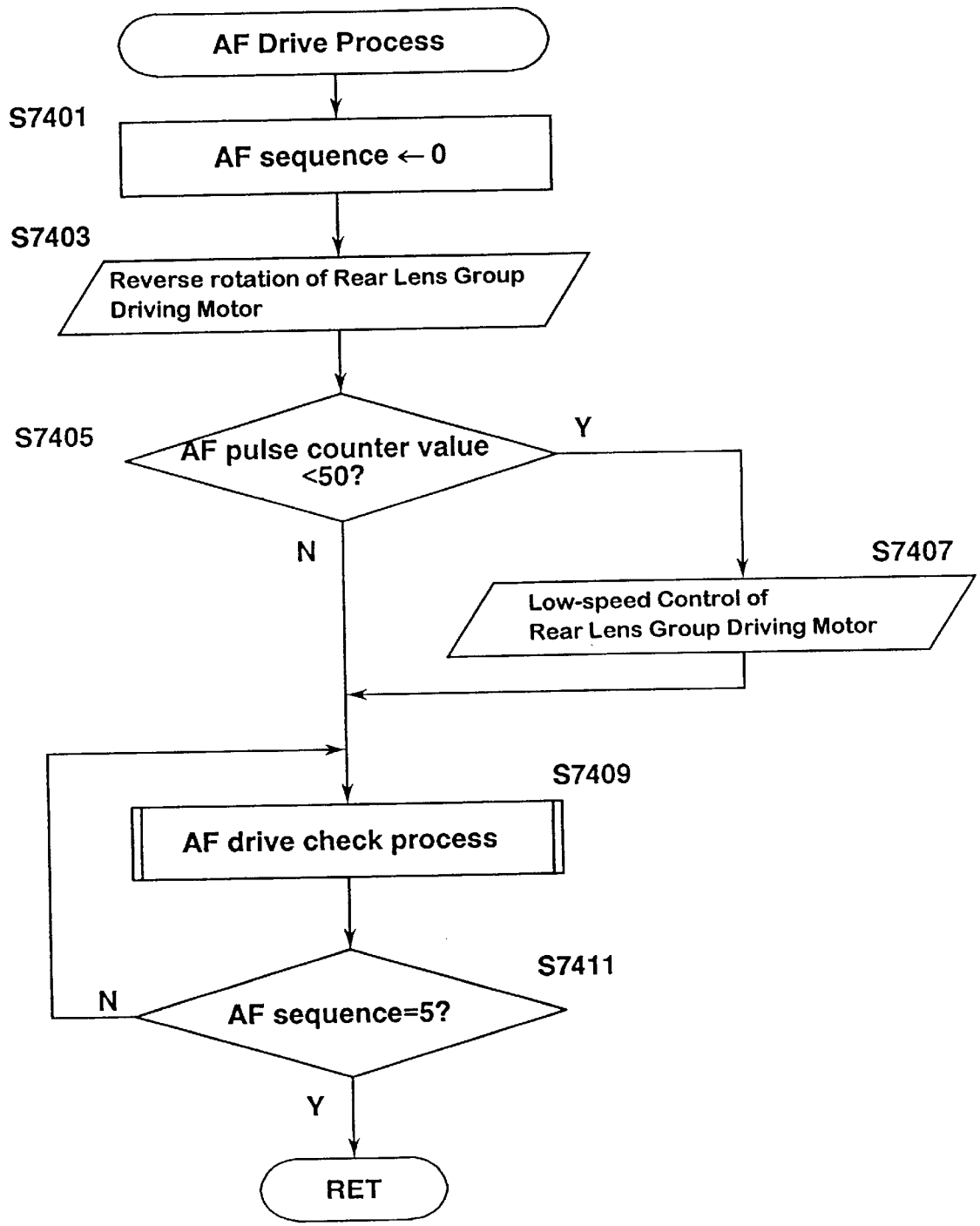
FIG. 71 is a flow chart of an AF driving process of the zoom lens camera of the present invention.

FIG. 71 shows a flow chart for the AF drive process. The AF drive process is a process in which the rear lens group motor 30 is driven and controlled so as to move the rear lens group rearwardly, i.e., towards the film plane, in the lens retracting direction. By this process the rear lens group L2 is moved rearwardly in order to set the focus on the subject distance.

At step S7401 the AF sequence is first set to 0. At steps S7403 and S7405 the rear lens group driving motor 30 is driven clockwise, namely, driven in the retracting direction, and it is checked whether the count at the AF pulse counter is less than 50. If the count is less than 50, the control of the rear lens group driving motor 30 is switched to low-speed control (i.e., the PWM control), while if the count is 50 or greater, the AF drive check process is called without switching the control (steps S7405, S7407 and S7409, or at steps S7405 and S7409). Then at steps S7409 and S7411, it is then waited for the AF sequence to become 5 while performing the AF drive check process and a return is performed when the sequence becomes 5.

Figure 35:
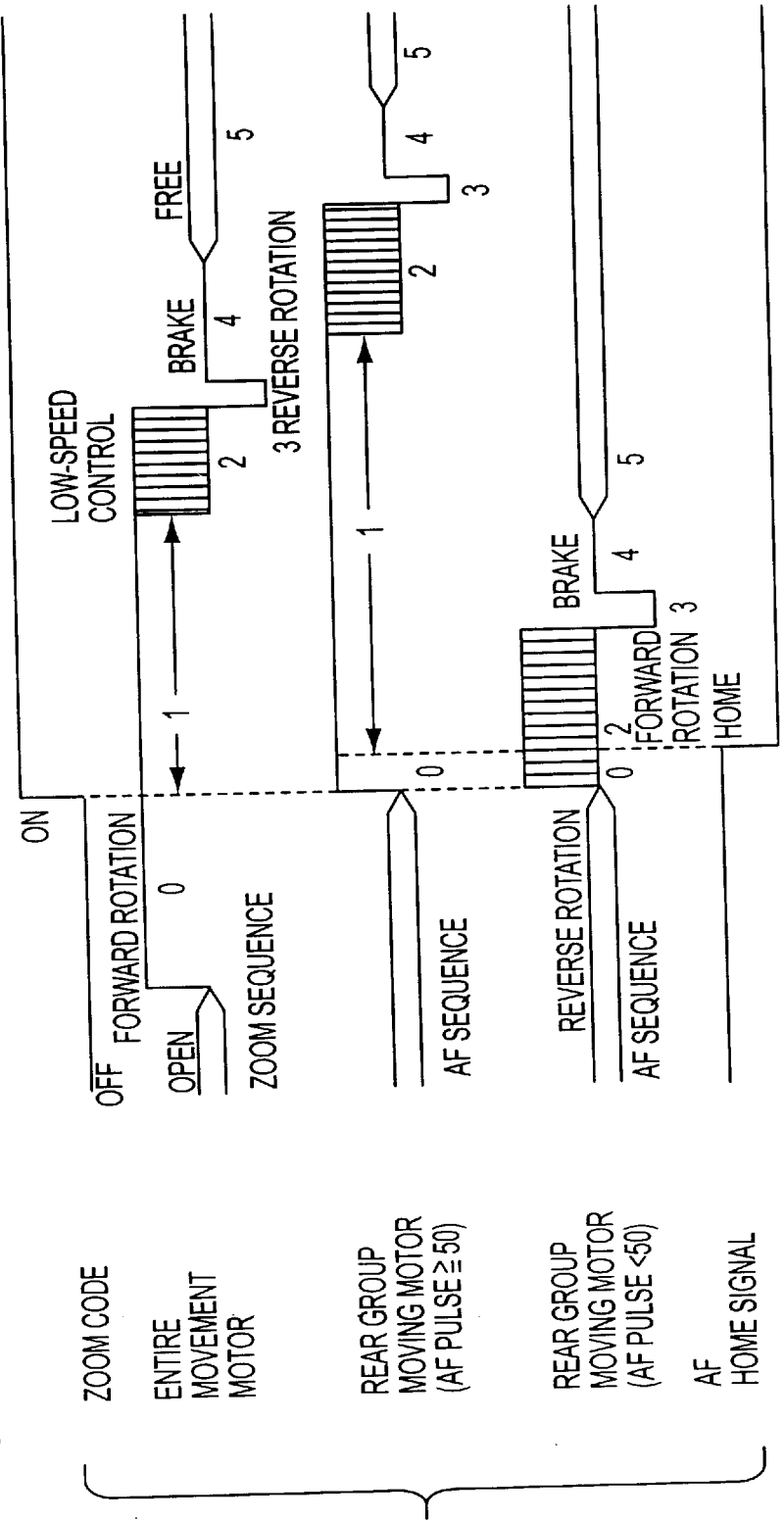
FIG. 35 is a schematic view illustrating movement sequences of a whole unit driving motor and a rear lens group driving motor during exposure (i.e., during focusing) of the zoom lens camera of the present invention.
Figure 36:
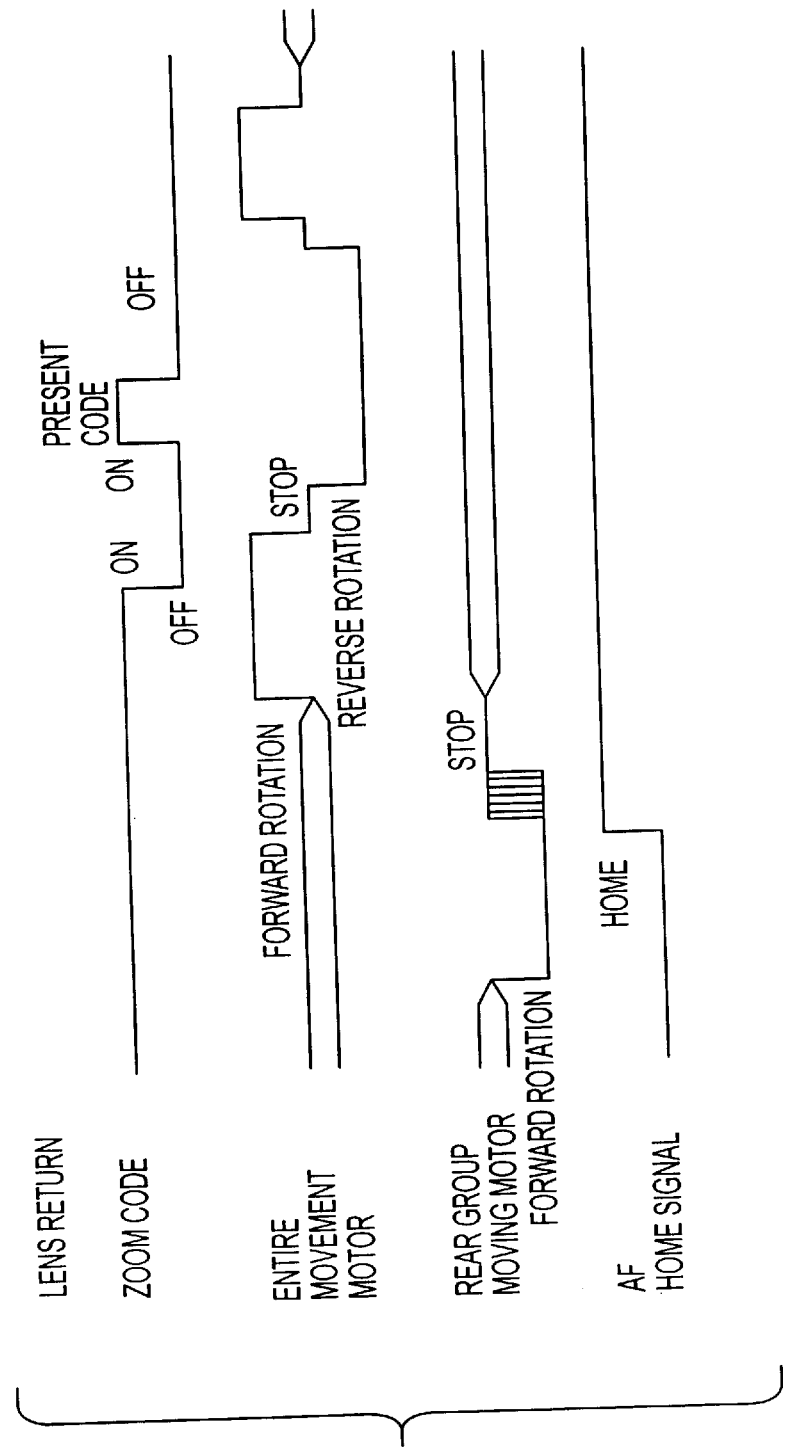
FIG. 36 is a schematic view illustrating movement sequences of the whole unit driving motor and the rear lens group driving motor during lens return of the zoom lens camera of the present invention.

The AF sequence is an identifier which identifies the state of the operation sequence of the rear lens group driving motor controlling means 61, and as shown in FIG. 35 and FIG. 36, an AF sequence of 0 indicates the condition where the switching of the AF home signal, basis for the counting of AF pulses, has been detected. An AF sequence of 1 and 2 indicate the condition in which the AF pulses are being counted with 1 indicating the DC drive condition and 2 indicating the low-speed control condition. An AF sequence of 3 indicates the reverse braking condition, 4 indicates the short-circuit braking condition, and 5 indicates the open terminal condition (inactivated condition) and thus the ending of the series of sequences.

If the rear lens group driving motor 30 is driven by the DC drive when the AF pulse number by which the rear group moving motor 30 is to be driven is small, the rear lens group driving motor 30 may be driven, due to inertia, etc., by more than the AF pulse number by which it is supposed to be driven. Thus, when the AF pulse number is less than 50, the start-up and driving are performed from the beginning at the same low speed as in AF sequence 2.

[The Zoom Pulse Counting Process]

Figure 72:
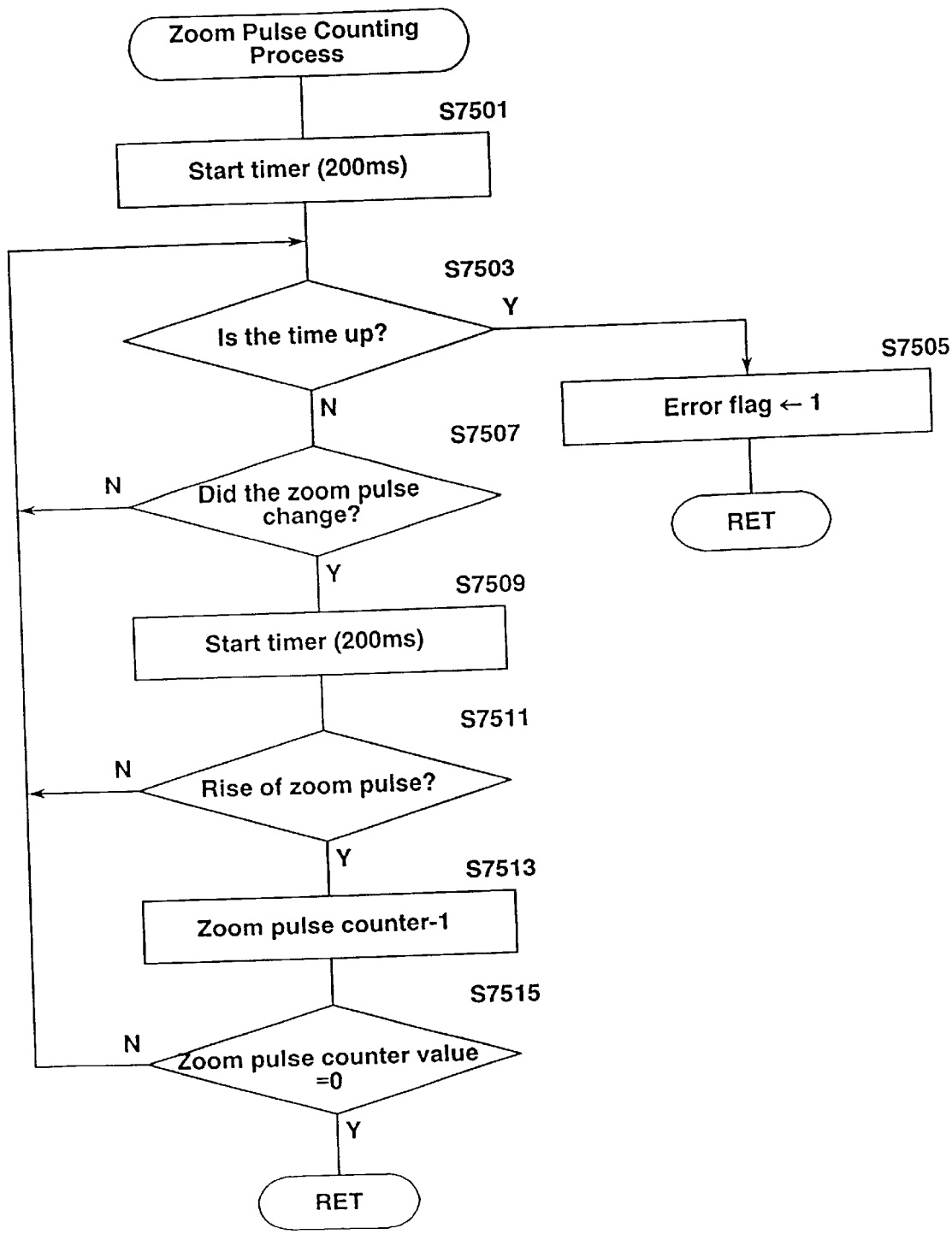
FIG. 72 is a flow chart of a zoom pulse counting process of the zoom lens camera of the present invention.

FIG. 72 shows a flow chart for the zoom pulse counting process. The zoom pulse counting process is a process in which the previously set zoom pulse counter is decremented by one each time a change in the zoom pulse output from the zoom pulse input means 220, is detected within a predetermined period, and which is ended when the count at the zoom pulse counter becomes 0. If a change in the zoom pulse is not detected within the above-mentioned predetermined period, the error flag is set to 1.

At step S7501, the CPU 210 first sets the period of 200 ms at the timer as the period during which the change in the zoom pulse is to be monitored. In the following processes, if there is no change in the zoom pulse within 200 ms, the CPU 210 sets the error flag to 1.

At step S7503, the CPU 210 judges whether the time is up at the 200ms timer. If the time is not up, then at step S7507, it is judged whether there was a change in the zoom pulse based on the output pulse from the zoom pulse input means 220 to the CPU 210. Whether the zoom pulse changed is judged here by detecting the change in the pulse both from the H (high) level to the L (low) level and vice versa.

If there is no change in the zoom pulse at step S7507, the CPU 210 returns to the process at step S7503. Therefore, if the change in the zoom pulse is not detected within 200 ms, at step S7503 it is judged that the time is up, and at step S7505 the error flag is set to 1 and control is returned. In other words, a return is performed upon setting the error flag to 1, if the same number of pulses as the value set at the zoom pulse counter before the zoom pulse counting process was called is not detected within the interval during which the zoom pulse counting process is executed.

When the CPU 210 detects a change in the zoom pulse at step S7507, then at step S7509 the timer is reset to 200 ms. If the detected change in the zoom pulse is a rise of the zoom pulse at step S7511, then at step S7513 the zoom pulse counter is decremented by one. Here, the value to be counted, that is, the value corresponding to the amount by which the lenses are to be driven by means of the whole unit driving motor 25 (i.e., the count of the pulses output by the zoom pulse input means 220), is set at the zoom pulse counter before the zoom pulse counting process is executed. When the count of the zoom pulse counter becomes 0 at step S7515, the CPU 210 ends the process. That is, the process is ended normally if the same number of pulses as the value set at the zoom pulse counter before the zoom pulse counting process was called has been counted.

As described above, in the zoom pulse counting process, a return is performed without setting the error flag if the same number of pulses as the value set previously at the zoom pulse counter are counted. On the other hand, a return is performed upon setting the error flag to 1, if the same number of pulses as the value set at the zoom pulse counter by the zoom pulse input means 220 could not be counted.

[The AF Drive Check Process]

Figure 73:
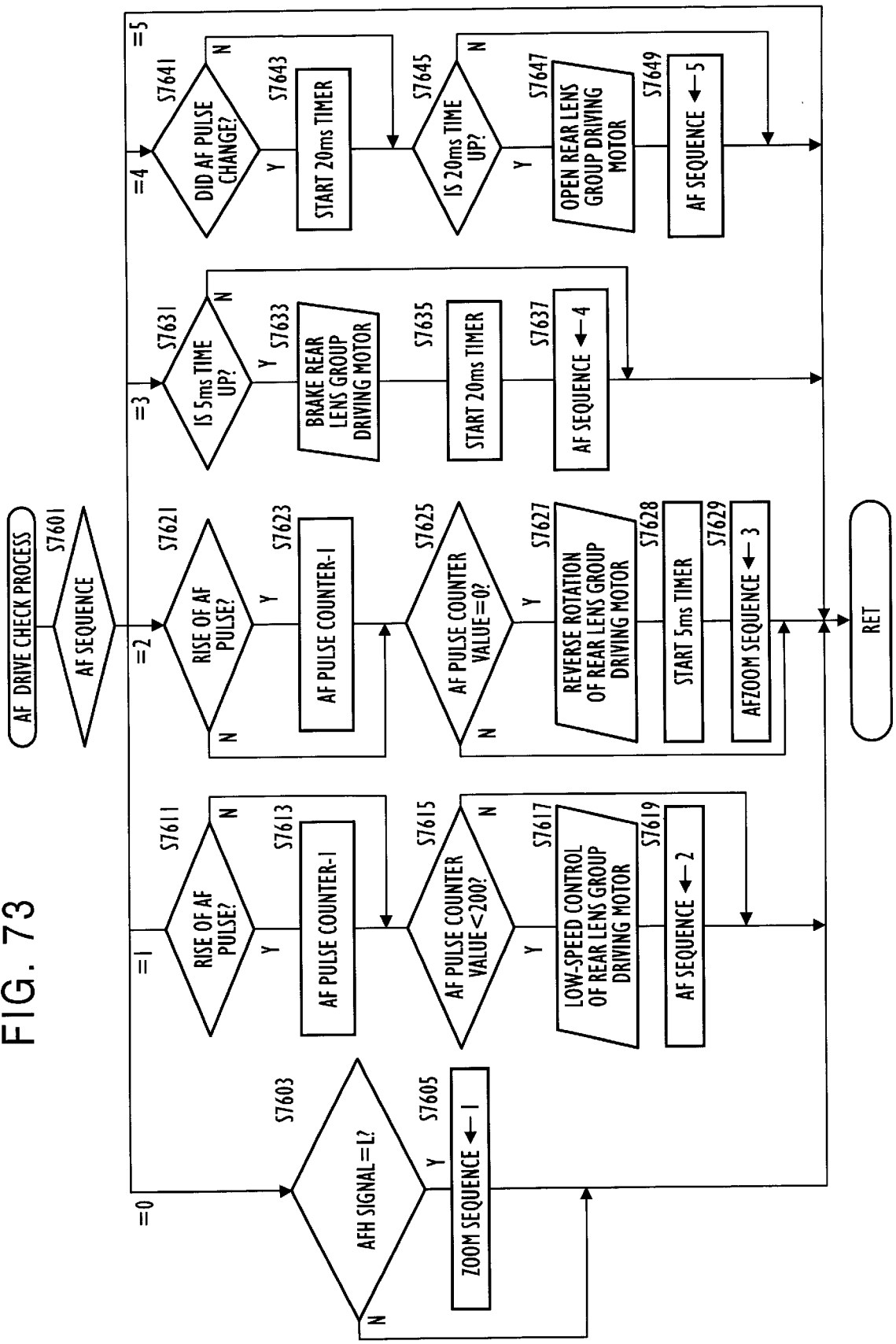
FIG. 73 is a flow chart of an AF driving check process of the zoom lens camera of the present invention.
Figure 74:
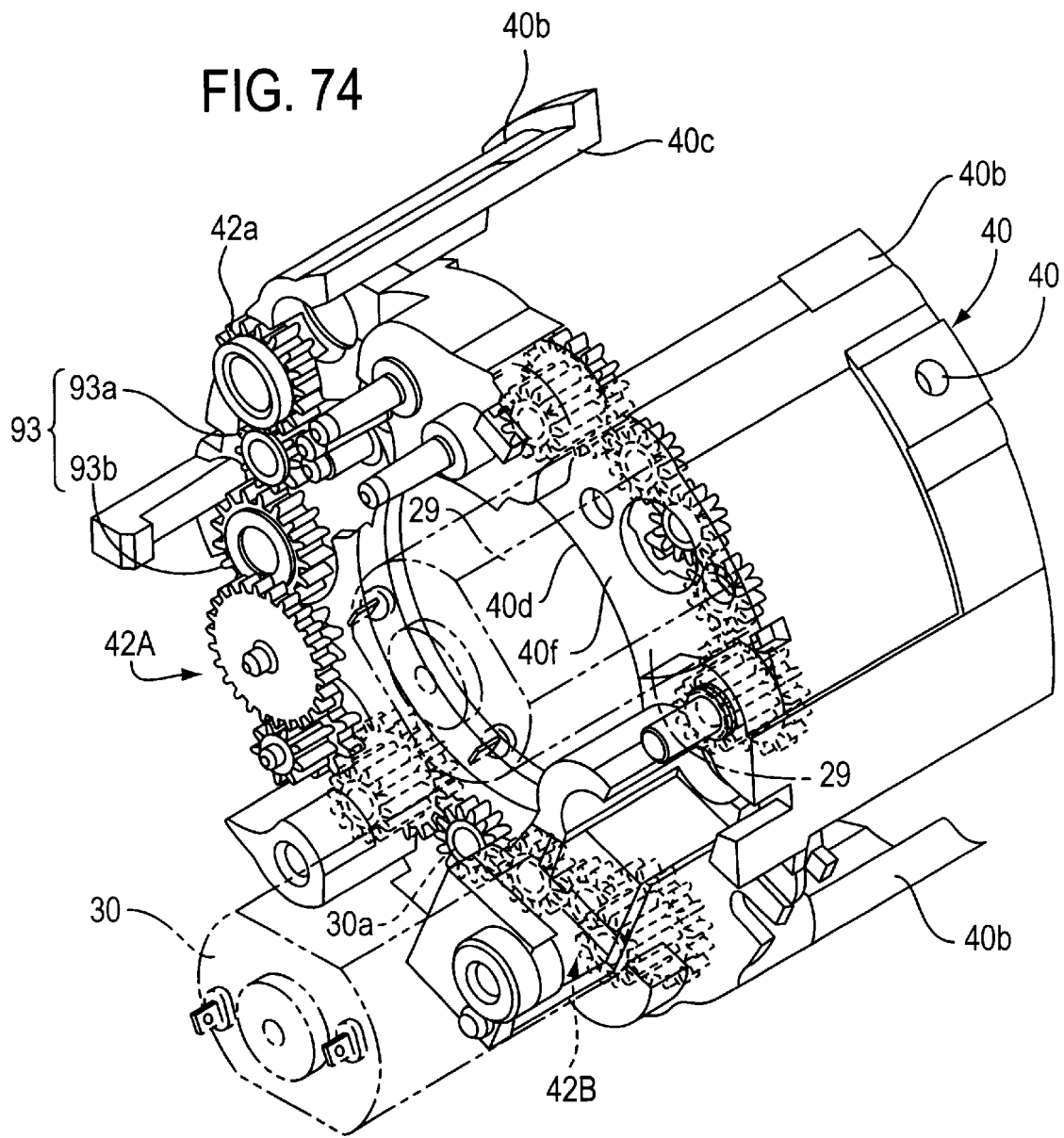
FIG. 74 is a schematic perspective view of a part of the zoom lens barrel of the present invention.

FIG. 73 shows a flow chart for the AF drive check process. The AF drive check process is a process in which the rear lens group driving motor 30 is controlled so that the rear lens group L2 will be driven based on the value set at the AF pulse counter.

The execution the AF drive check process which branch at step S7601 is processed in accordance with the value of the AF sequence (0 through 5). The AF sequence is an identifier that identifies the state of the operation sequence of the rear lens group driving motor controlling means 61. When the AF drive check process is executed for the first time, the rear lens group driving motor 30 is driven, and the AF sequence is set to 0. FIG. 35 shows the relationship between the driving state of the rear lens group driving motor 30 and the AF sequence.

At step S7603, if the value of the AF sequence is 0, the CPU 210 judges whether the AFH (i.e., the "AF home") signal has changed from H (high) to L (low). The AFH signal is H (high) when the rear lens group L2 is positioned at the AF home position, and changes to L (low) when the rear lens group L2 moves away from the AF home position. The movement of the rear lens group L2 based on the AF pulse counter, described below, is executed on the basis of the position at which the AFH signal changes to L. When the AFH signal changes from H to L at step S7603, then at step S7605 the CPU 210 sets the AF sequence to 1, and control is returned. While the AFH signal is H, control is returned while the AF sequence remains at 0.

If the value of the AF sequence is 1, namely, after the change of the AFH signal from H to L is detected, at step S7611 the CPU 210 monitors the rise of the AF pulse. At steps S7611 and S7613, the AF pulse counter is decremented only when the rise of the AF pulse is detected. When the count at the AF pulse counter becomes less than 200 at step S7615, then at step S7617 the CPU 210 switches the rear lens group driving motor 30 to low-speed control, and at step S7619, the value of the AF sequence is set to 2. If the AF pulse counter is 200 or more at step S7615, the AF drive check process is ended and control is performed with the AF sequence remaining at 1. If the DC drive of the rear lens group driving motor 30 is performed from the beginning to the end, the desired AF pulse number may be exceeded due to the influence of inertia, etc. Thus, when the remaining AF pulse number becomes 200, the rear lens group driving motor 30 is driven at low speed through the PWM control.

As described above, when the rear lens group driving motor 30 is started to drive, the AF pulse counter is decremented based on the point at which the AFH signal changes from H to L, and normal DC drive of the rear lens group driving motor 30 is performed until the count at the AF pulse counter becomes 200. While the normal drive of the rear lens group driving motor 30 is being performed, the AF sequence will be 1. When the count at the AF pulse counter becomes less than 200, the rear lens group driving motor 30 is driven under low-speed control. When the rear lens group driving motor 30 comes under low-speed control, the AF sequence is set to 2.

When the AF drive check process is called when the AF sequence is 2, that is, when the rear lens group driving motor 30 is under low-speed control, the processes from step S7621 are executed. In such processes, at step S7621 the CPU 210 monitors the rise of the AF pulse, and if a rise of the AF pulse is detected, at step S7623 the zoom pulse counter is decremented. If the rise of the AF pulse is not detected at step S7621, the process at step S7623 is skipped.

The AF pulse count is decremented by one at a time while the rear lens group L2 is being driven with the rear lens group driving motor 30 being under low-speed control Before the AF pulse count becomes 0, the processes at steps S7621 and S7623 are executed each time the AF drive check process is called. In such a case, the AF sequence will remain at 2. When the AF pulse count becomes 0, by driving the whole rear lens group driving motor 30 counterclockwise at step S7627, the braking processing (i.e., reverse brake) is executed. After starting the counterclockwise driving of the rear lens group driving motor 30, at step S7628, the time of 5 ms, which is the counterclockwise driving period, is set at the timer, and the AF sequence is set to 3 at step S7629. In such a manner, when the AF sequence is 3, the rear lens group driving motor 30 is driven counterclockwise for braking.

When the AF sequence is 3, if the AF driving check processing is called, at step S7631 the CPU 210 judges whether the period of 5 ms has elapsed, and if 5 ms has not elapsed control is returned with the AF sequence remaining at 3. After 5 ms has elapsed, then at step S7633, step S7635 and step S7637, the braking is activated by short-circuiting the terminals of the rear lens group driving motor 30, and the 20 ms timer is started, and the AF sequence is set to 4, and control is returned.

If the AF drive check process is called when the AF sequence is 4, at step S7641 the CPU 210 monitors whether the AF pulse changes. That is, whether or not the rear lens group driving motor 30 is rotating under the condition where the brake is acting, is judged according to whether the AF pulse changes within 20 ms.

If the CPU 210 judges, that there is no change in the AF pulse at step S7641, and that the time is up at the 20 ms timer at step S7645, at steps S7647 and S7649, the control of the rear lens group driving motor 30 is stopped, and the terminals of the motor are brought into the open condition (i.e., undriven condition), and the AF sequence is set to 5. If the change of the AF pulse is detected at step S7641, the 20 ms timer is restarted at step S7643, and it is monitored whether or not the next change in the AF pulse is detected within 20 ms after the previous change in the AF pulse. At step S7645, a return is performed with the brake acting on the rear lens group driving motor 30 and with the AF sequence remaining at 4 until it is judged that the time is up at the 20 ms timer.

If the AF drive check process is called when the AF sequence is 5, as shown in the flow chart, the control is returned without executing any processes in the AF drive check process.

As above described, in the AF drive check process, the lenses are firstly moved to the reference position at which the AFH signal becomes L (the AF sequence=0). The rear lens group is then moved by the normal DC drive while the count at the AF pulse counter is 200 or more (the AF sequence=1), and then moved at low speed by PWM when the count at the AF pulse counter becomes less than 200 (the AF sequence=2). When the count at the AF pulse counter becomes 0, the rear lens group driving motor 30 is driven counterclockwise for 5 ms (the AF sequence=3), and thereafter, braking is performed by short-circuiting the terminals of the rear lens group driving motor 30 (the AF sequence=4). When the rear lens group driving motor 30 comes to a complete stop, its control is ended (the AF sequence=5), and thereafter, the rear lens group driving motor 30 is not controlled (undriven condition is entered), until a new value is set at the AF pulse counter and the AF sequence is set 0.

A detailed description of the barrier apparatus and the rear lens group driving device in the present embodiment of the present invention will now be described with reference to FIGS. 74 through 93.

Figure 87:
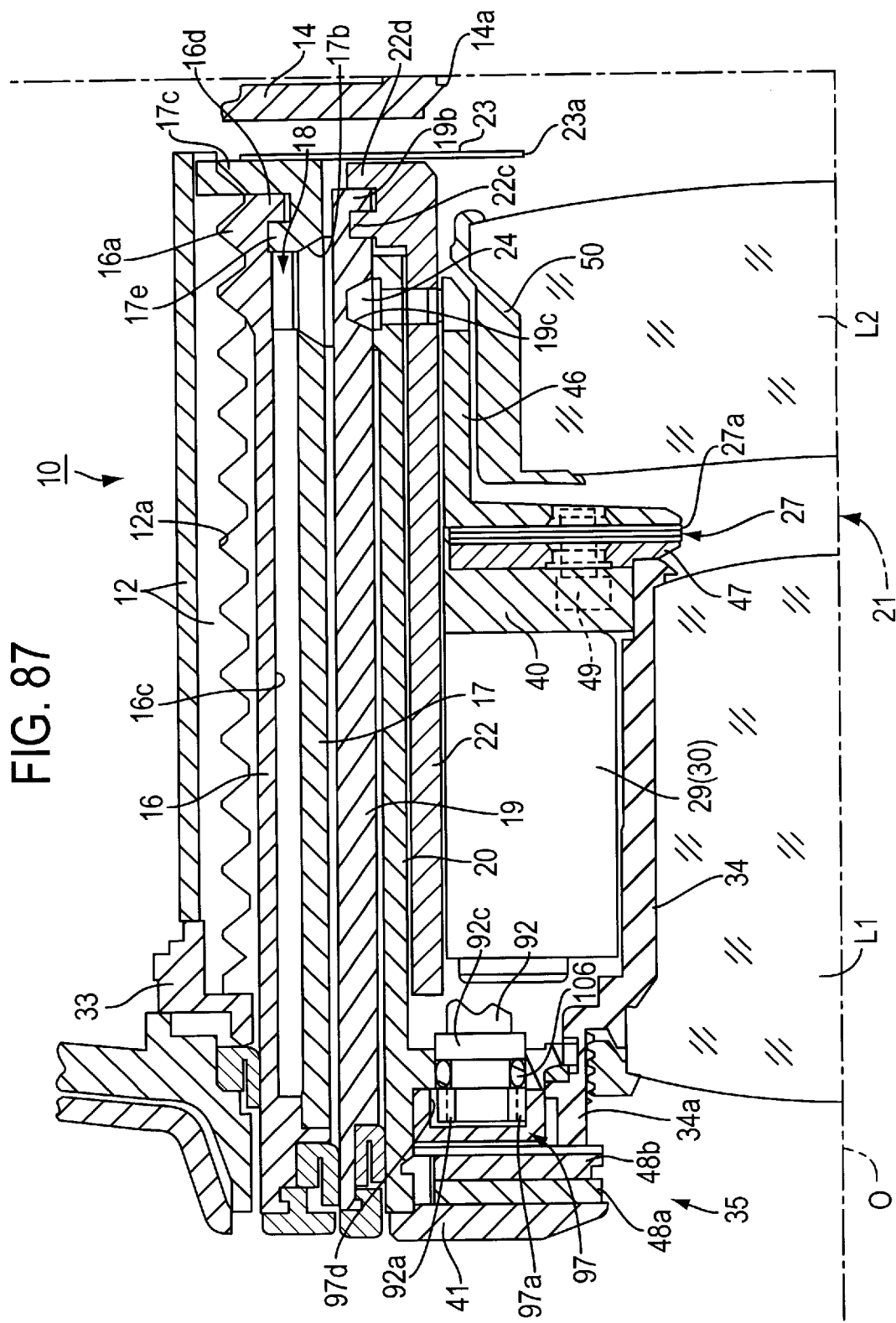
FIG. 87 is a sectional view of an upper part of the zoom lens barrel of the present invention, illustrating the main parts of a lens barrier apparatus.
Figure 88:
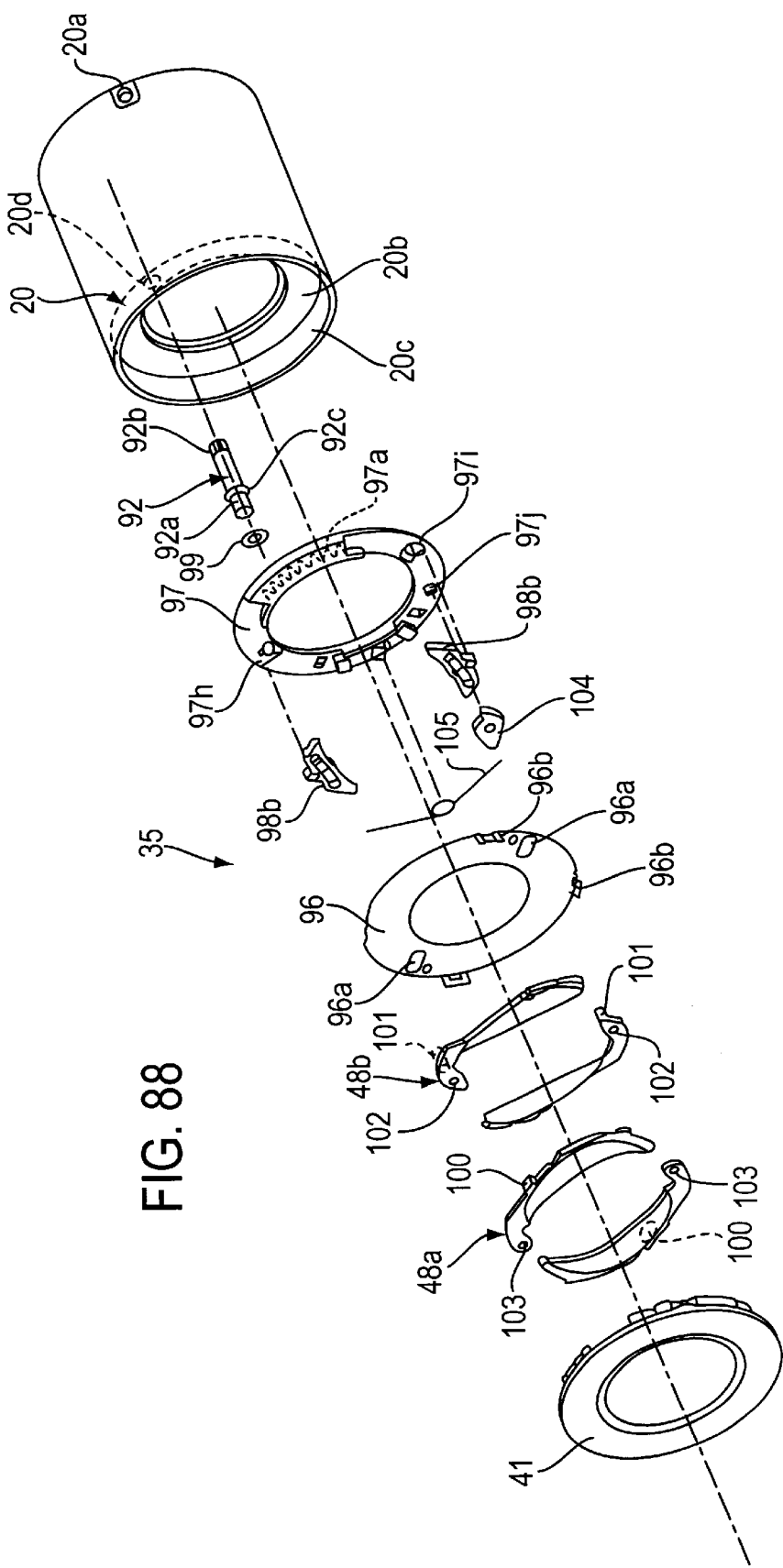
FIG. 88 is an exploded perspective view of the lens barrier apparatus of the zoom lens barrel of the present invention.

In FIGS. 87 and 88, at the front of the first moving barrel 20 positioned at the front of the zoom lens barrel 10, the lens barrier apparatus 35, equipped with the pair of follower barrier blades 48a and the pair of main barrier blades 48b, namely four barrier blades in total, is mounted. On the inner periphery of the decorative plate 41, fixed to the front end of the first moving barrel 20, the annular plate 96 is fixed. Both pairs of barrier blades 48a and 48b are pivotally attached between the decorative plate 41 and the annular plate 96. Between a front end surface 20c of the first moving barrel 20, i.e., in the space surrounded by the first moving barrel 20 and an inner periphery flange 20b formed on the front part of the first moving barrel 20, and the annular plate 96, a barrier driving ring 97, provided with a pair of barrier driving levers 98a and 98b, is rotatively mounted. The barrier driving ring 97 is rotated clockwise and counterclockwise, via a barrier coupling gear shaft 92 which rotates upon receiving a rotation from the rear lens group driving motor 30. The barrier coupling gear shaft 92 has a driving gear 92a at its front end, and a driven gear 92b at its rear end. The rotation of the rear lens group driving motor 30 is transmitted to the driven gear 92b via a certain gear train (described later). The barrier driving ring 97 opens and closes the main barrier blades 48b together with the follower barrier blades 48a via the barrier driving levers 98a and 98b which are attached pivotally to the barrier driving ring. The mechanism of the barrier driving device in the present invention will now be described with reference chiefly to FIGS. 87 through 93. Of the four barrier blades, only one main barrier blade 48b is shown by the chain double-dashed line in the drawings in FIG. 89 through FIG. 92, for the purpose of illustration.

Figure 75:
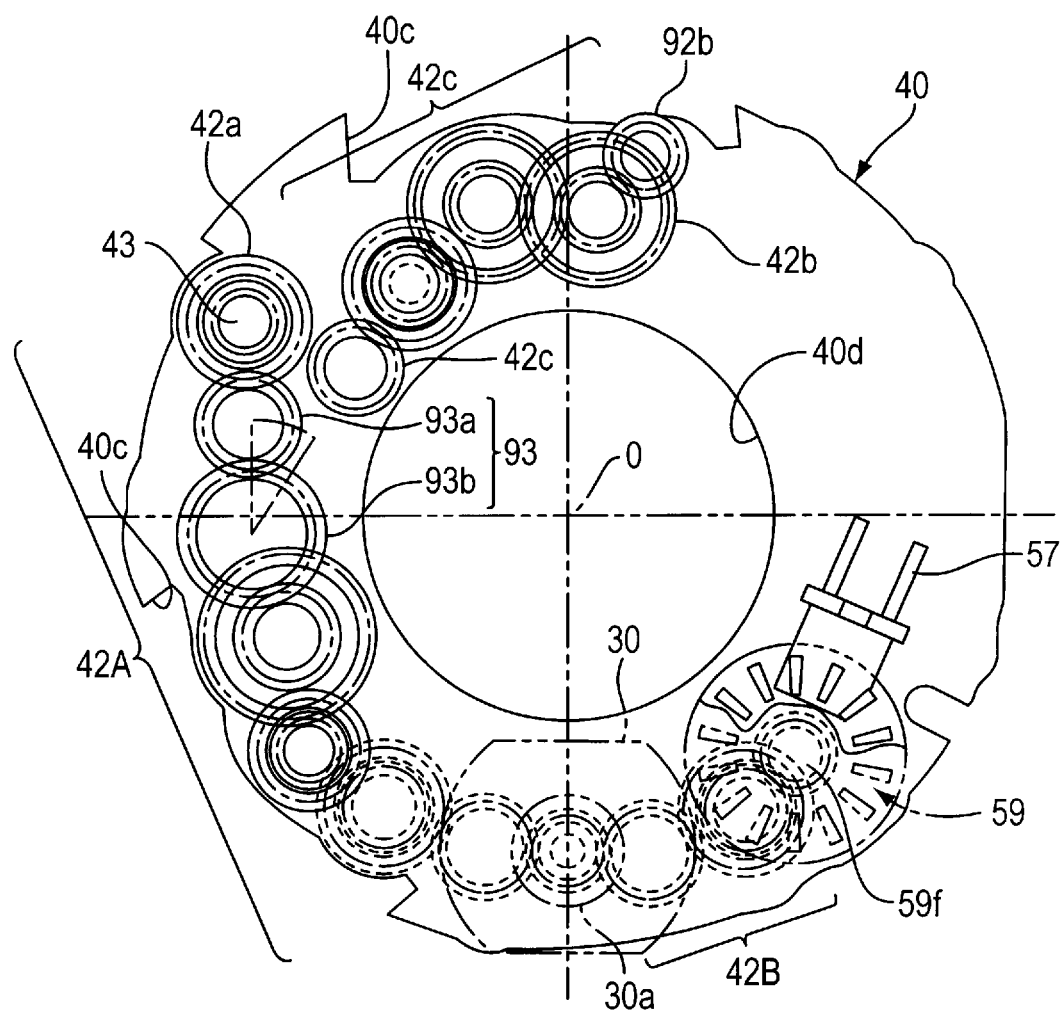
FIG. 75 is a front elevational view of the part shown in FIG. 74.
Figure 76:
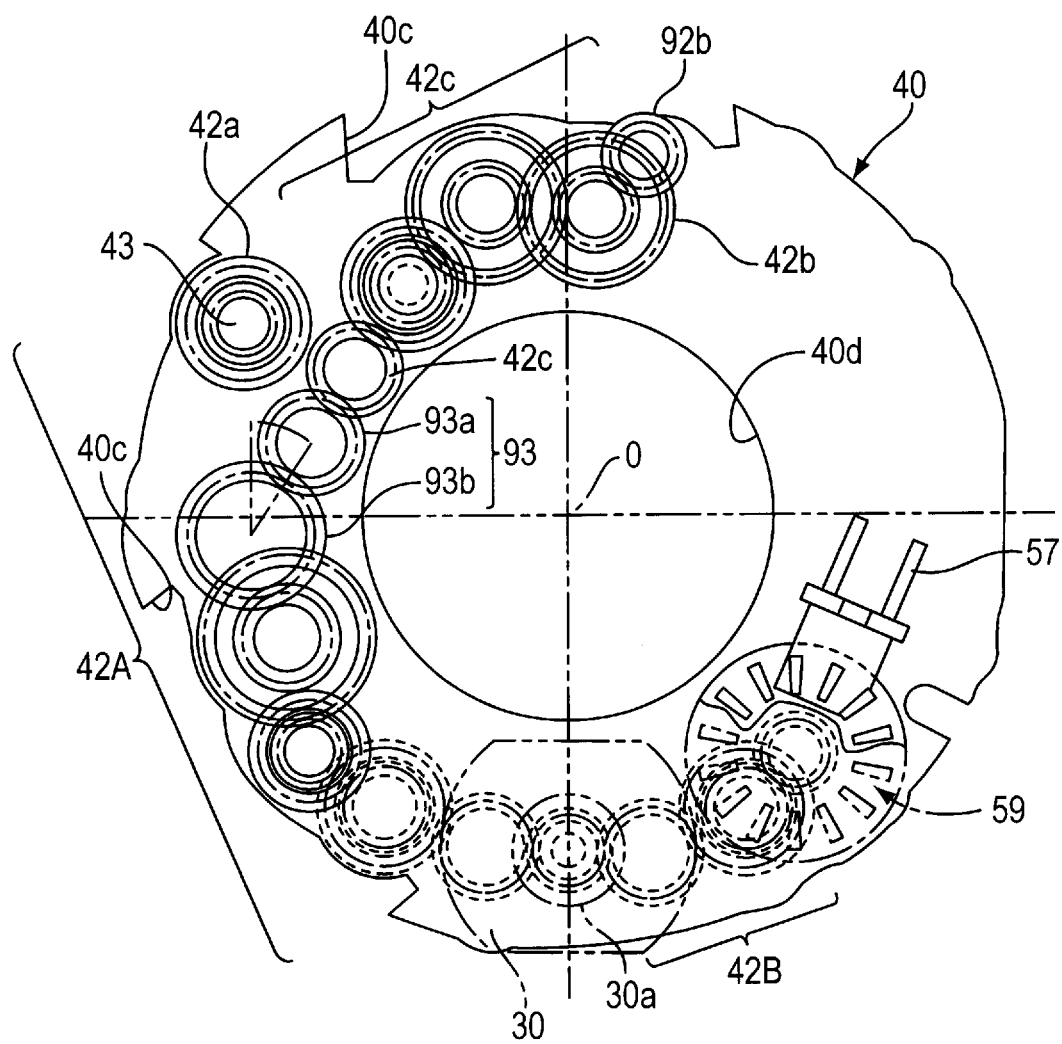
FIG. 76 is a front elevational view of the part shown in FIG. 74, in a different state from the state of FIG. 75.

A supporting insertionhole 20d is formed on the inner periphery flange 20b of the first moving barrel 20, at a position opposite to a hollow 111 (see FIG. 8) formed on the presser 53 of the AF/AE shutter unit 21, as shown on FIG. 88. The barrier coupling gear shaft 92 has a driving gear 92a extending by a predetermined amount from the supporting insertion hole 20d in the condition where the driven gear 92b is inserted through the hollow 111 to engage with a final gear 42b of the barrier opening gear train (i.e., the second gear train) 42c as shown in FIG. 75 and FIG. 76. The driving gear 92a of the barrier coupling gear shaft 92 engages with a sector gear 97a formed on the rear surface of the barrier driving ring 97, as shown in FIG. 87. With the above structure, when the barrier coupling gear shaft 92 rotates clockwise or counterclockwise upon receiving the rotation of the rear lens group driving motor 30, the barrier driving ring 97 is respectively rotated clockwise or counterclockwise about the optical axis 0.

Figure 89:
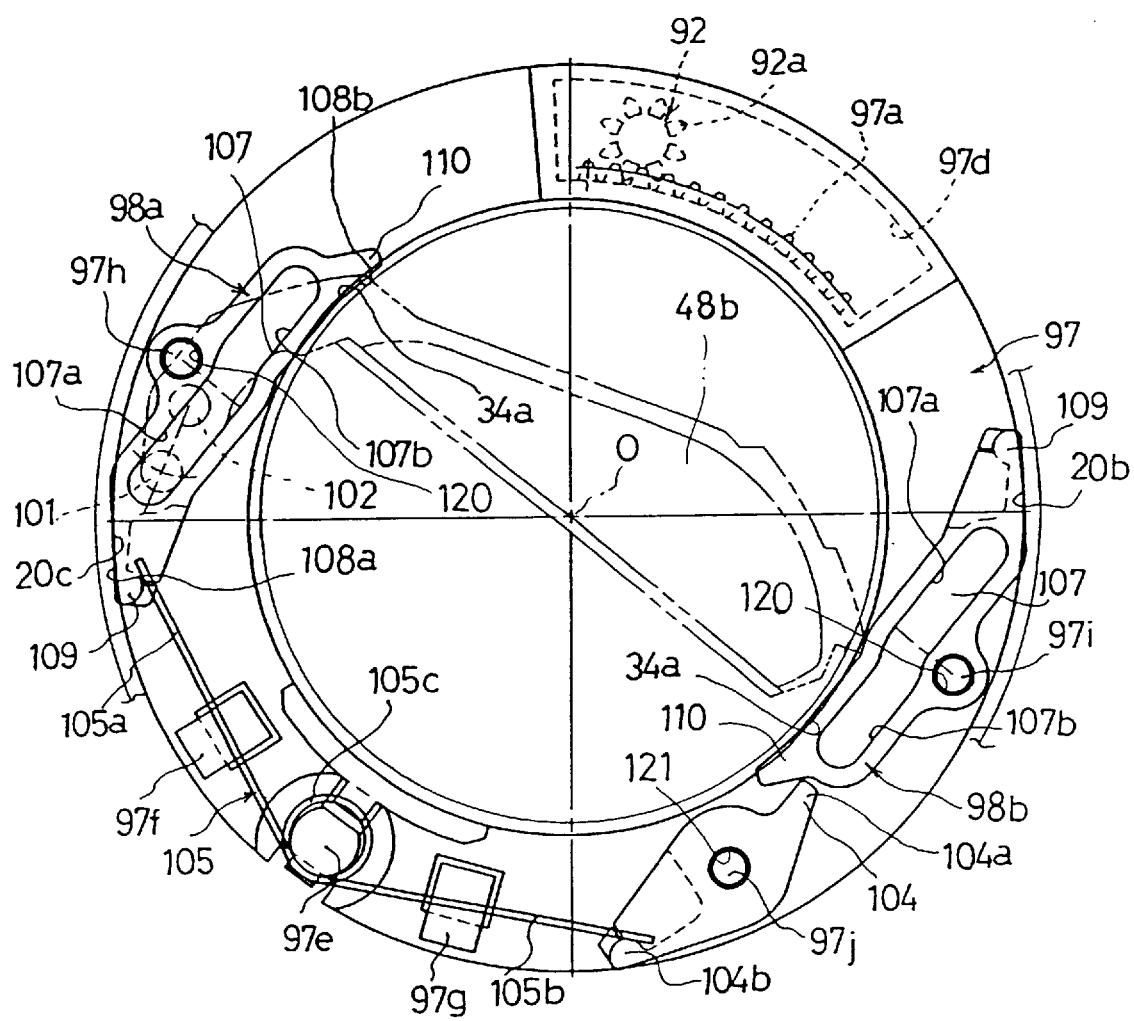
FIG. 89 is a front elevational view of the lens barrier apparatus of the present invention, illustrating forced opening sections while main barrier blades are driven to be opened from a closed state.

As shown in FIG. 87 through FIG. 89, the barrier driving ring 97 is formed in such a manner that the diameter of the outer peripheral rim thereof is slightly smaller than that of the inner peripheral face of the barrel 20c, and that the diameter of the inner peripheral rim thereof is slightly larger than that of the outer periphery of a cylinder part 34a.

On the rear surface of the decorative plate 41, a pair of pivots (not shown) are fixed, with one pivot being positioned substantially opposite the other with respect to the optical axis 0. To these pivots are rotatably fitted to hollows 102, formed respectively on each of the pair of main barrier blades 48b, and to hollows 103, formed respectively on each of the pair of follower barrier blades 48a. Each main driven barrier blade 48b opens and closes the photographing aperture by rotating with the corresponding follower barrier blade 48a about the corresponding pivot. Each of the pair of main barrier blades 48b is provided with a boss 101 at a position eccentric with respect its to hollow 102. Each of the pair of follower barrier blades 48a is provided with an engaging projection 100 projecting rearwards in the optical axis 0 direction, which engage with outer rims (edges) of the corresponding main barrier blade 48b, located on the inner side thereof, in order to follow the opening-closing operation of the main barrier blade 48b.

On the front wall of the barrier driving ring 97, shafts 97h and 97i are fixed with one shaft part being positioned substantially opposite the other one with respect to the optical axis 0. Each of the barrier driving levers 98a and 98b is provided with a cam groove 107 (as shown in FIG. 89) into which the boss 101 of the corresponding main barrier blade 48b is fitted. On each barrier driving lever 98a and 98b, shaft grooves 120 are formed at intermediate positions along the length of the cam grooves 107, and to each of the shafts 97h and 97i is rotatably fitted the corresponding shaft groove 120. Each of the shaft grooves 120 is disposed near the corresponding hollow 102. The barrier driving levers 98a and 98b are respectively provided with engaging parts 109 at one end and engaging parts 110 at the other end.

On the front wall of the barrier driving ring 97, at a protrusion 97e provided at a position to one side of the line connecting the pair of hollows 102 of the pair of main barrier blades 48b, a coil 105c of a torsion spring 105 is engaged. The torsion spring 105 is engaged for the purpose of urging the pair of main barrier blades 48b in the opening direction via the pair of barrier driving levers 98a and 98b, and one end 105a thereof is connected with the engaging part 109 at one end of the barrier driving lever 98a.

Between the torsion spring 105 and one of the barrier driving levers 98b, a reverse lever 104, to reverse the direction of the force of the torsion spring 105, is positioned. On the front wall of the barrier driving ring 97, a shaft 97j is fixed between the barrier driving lever 98b and the protrusion 97e, and the reverse lever 104 is rotatably fitted on the shaft 97j. The reverse lever 104 has an engaging part 104b at one end, which is engaged with another end 105b of the torsion spring 105, and another engaging part 104a at the other end, which is engaged with the other end engaging part 110 of the barrier driving lever 98b. Restricting protrusions 97f and 97g are disposed at both sides of the protrusion 97e of the barrier driving ring 97, in order to restrict the deformation of the end parts 105a and 105b of the torsion spring 105, extending radially outward at predetermined positions.

The cam grooves 107 provided respectively at the barrier driving levers 98a and 98b, are respectively equipped with a first opening section 107a and a second opening section 107b. Although, the first and the second opening sections 107a and 107b are somewhat stepped at their middle boundary parts, they are generally arranged to be substantially straight.

During the barrier opening operation, namely, when the barrier driving ring 97 rotates from the position at which the barriers are fully closed (i.e., the position shown in FIG. 89) to the intermediate open position (i.e., the position shown in FIG. 90), the first opening section 107a serves as a forcible opening section and forcibly moves the pair of main barrier blades 48b to move in the opening direction. During the barrier closing operation, namely, when the barrier driving ring 97 rotates from the intermediate open position (i.e., the position shown in FIG. 90) to the position at which the barriers are fully closed(i.e., the position shown in FIG. 89), the first opening section 107a serves as a spring urging section, for urging the pair of main barrier blades 48b in the closing direction by means of the torsion spring 105.

During the barrier closing operation, namely, when the barrier driving ring 97 rotates from the position at which the barriers are fully opened (i.e., the position shown in FIG. 91) to the intermediate open position (i.e., the position shown in FIG. 90), the second opening section 107b serves as a forcible opening section and forcibly moves the pair of main barrier blades 48b in the closing direction. During the barrier opening operation, namely, when the barrier driving ring 97 rotates from the intermediate open position (i.e., the position shown in FIG. 90) to the position at which the barriers are fully opened (i.e., the position shown in FIG. 91), the second opening section 107b serves as a spring urging section for urging the pair of main barrier blades 48b in the opening direction by means of the torsion spring 105.

The barrier driving ring 97 also has the above mentioned sector gear 97a, for rotatably driving the barrier driving ring 97 itself upon receiving the rotation of the barrier coupling gear shaft 92, at the other side of the line joining the pair of hollows 102 of the pair of main barrier blades 48b. The sector gear 97a is formed on an inner periphery of an arched groove 97d provided on the rear surface of the barrier driving ring 97.

The lens barrier apparatus 35, having the above structure, is operated as follows. When the barrier coupling gear shaft 92 rotates in one direction (i.e., the clockwise direction in FIG. 89) with the barrier blades 406 in the fully closed position when the zoom lens barrel 10 is at the lens housed position, and the various members are positioned as shown in FIG. 89, the barrier driving ring 97 is rotated counter-clockwise via the sector gear 97a. During rotation of the barrier driving ring 97, the barrier driving levers 98a and 98b respectively move the pair of main barrier blades 48b as follows.

Figure 90:
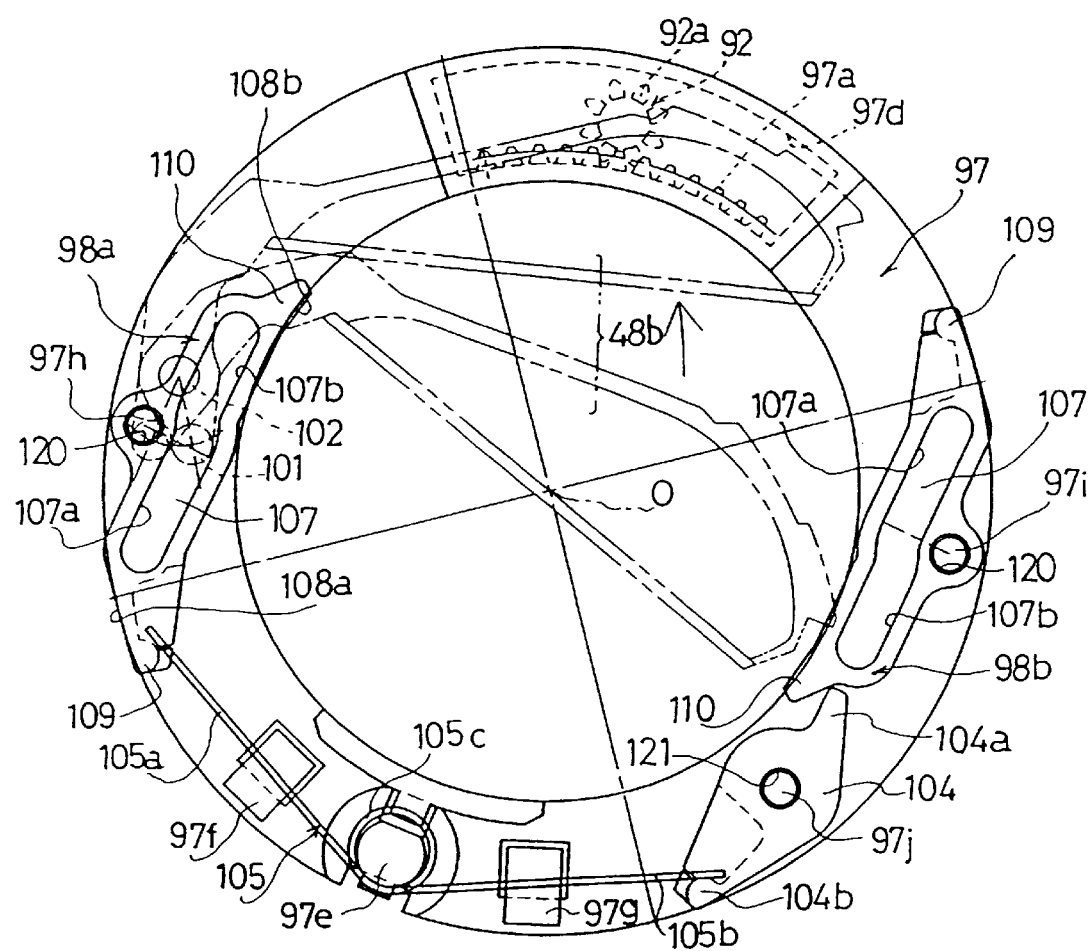
FIG. 90 is a front elevational view of the lens barrier apparatus of the present invention, illustrating forced opening sections while main barrier blades are driven to be opened from a closed state.
Figure 91:
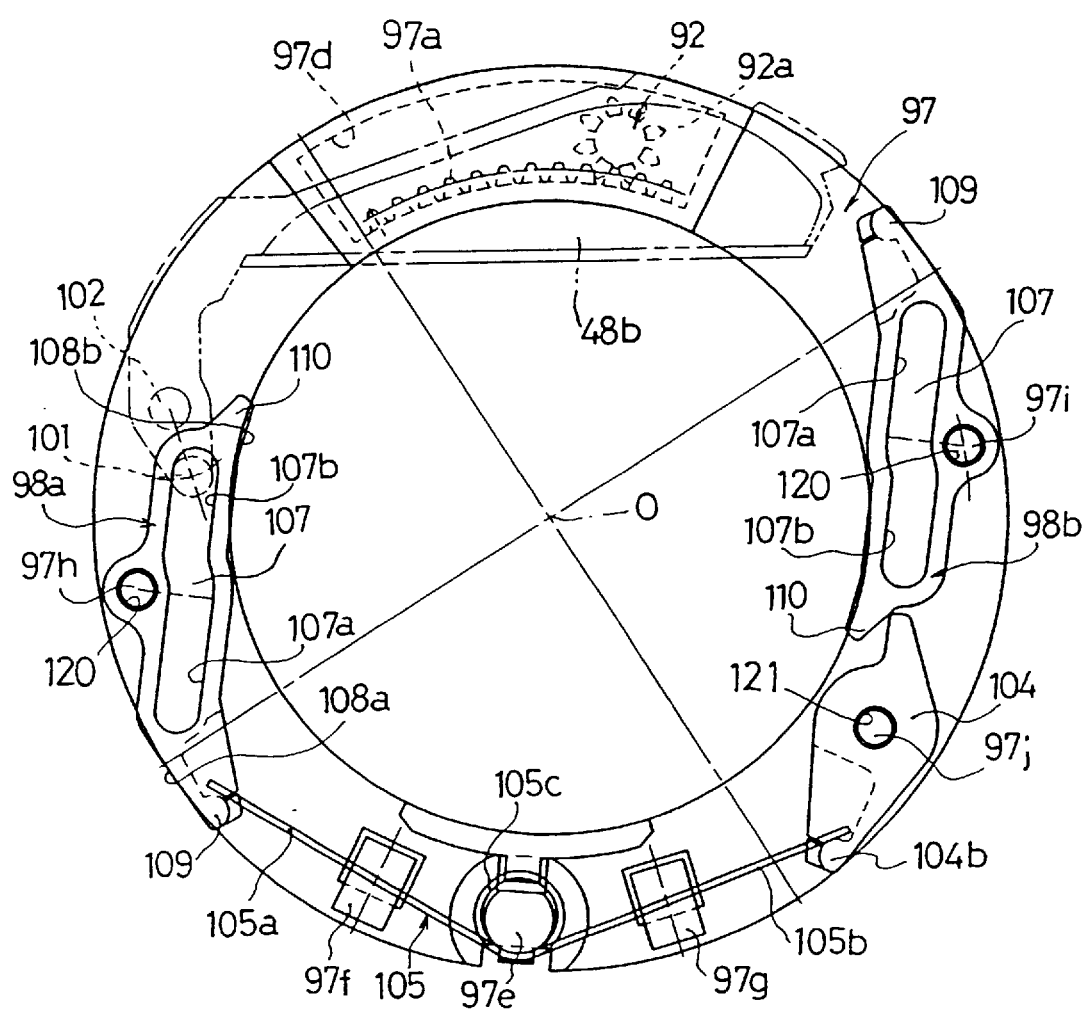
FIG. 91 is a front elevational view of the lens barrier apparatus of the present invention, illustrating forced opening sections while main barrier blades are driven to be closed from an opened state.
Figure 92:
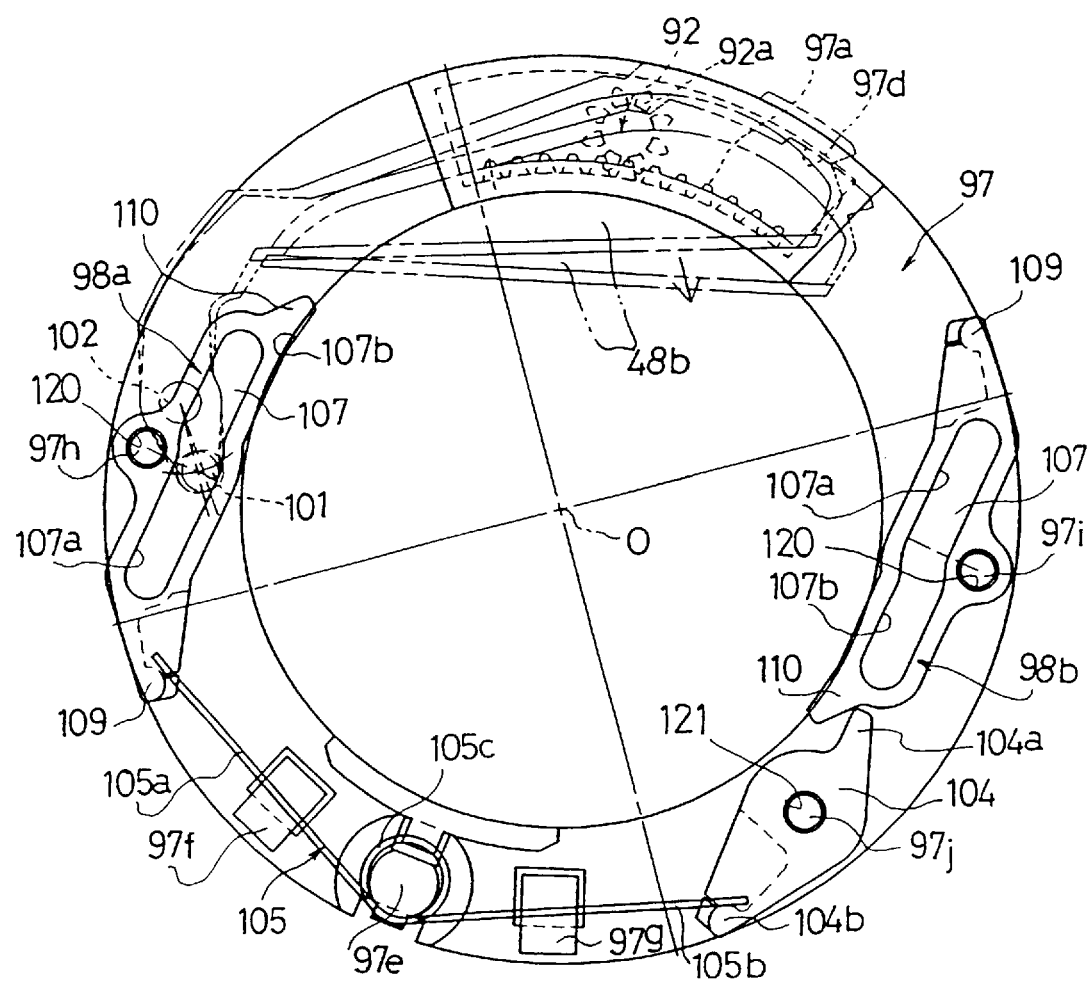
FIG. 92 is a front elevational view of the lens barrier apparatus of the present invention, illustrating forced opening sections while main barrier blades are driven to be closed from an opened state.
Figure 93:
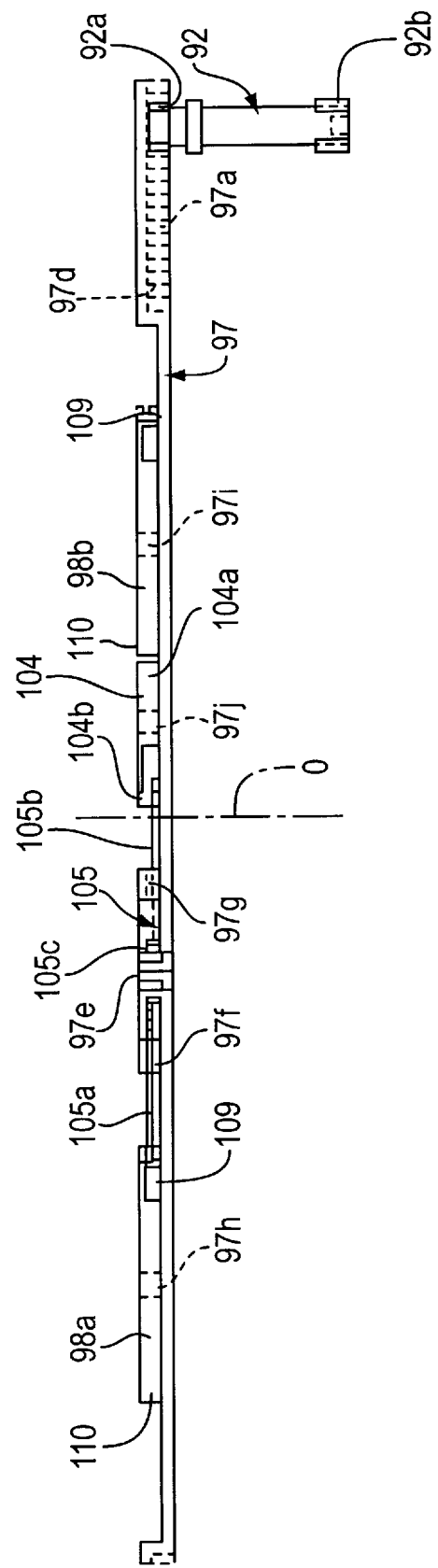
FIG. 93 is a plan view of the lens barrier apparatus provided at the front of the first moving barrel.

In the state as shown in FIG. 89, when the barrier driving ring 97 rotates counterclockwise from the barrier- closed position towards the intermediate open position, each of the barrier driving levers 98a and 98b moves the corresponding boss 101 towards the optical axis 0, via the first opening sections 107a of the cam grooves 107, namely, from the state shown in FIG. 89 to the state shown in FIG. 90. When the barrier driving ring 97 is moved further in the same direction, each of the barrier driving levers 98a and 98b moves the corresponding boss 101 further toward the optical axis 0, via the second opening sections 107b of the cam grooves 107, namely, from the state shown in FIG. 90 to the state shown in FIG. 91. By this movement, both the pair of main barrier blades 48b and the pair of follower barrier blades 48a are brought to the opened condition. When the barrier coupling gear shaft 92 rotates in the opposite direction (i.e., counterclockwise shown in FIG. 91) from the state as shown in FIG. 91, the barrier driving ring 97 is rotated in the clockwise direction via the sector gear 97a, namely in the clockwise direction as shown in FIGS. 91. Thereafter, the pair of main barrier blades 48b and the pair of follower barrier blades 48a are both brought to the closed condition through a reverse operation of the above described operation performed when the barrier driving ring is rotated in the counterclockwise direction of FIG. 89. The mechanism by which the rotation of the rear lens group driving motor 30 is transmitted to the lens barrier apparatus 35 via the barrier coupling gear shaft 92, will now be described in detail, with reference to FIGS. 74 through 87.

Figure 79:
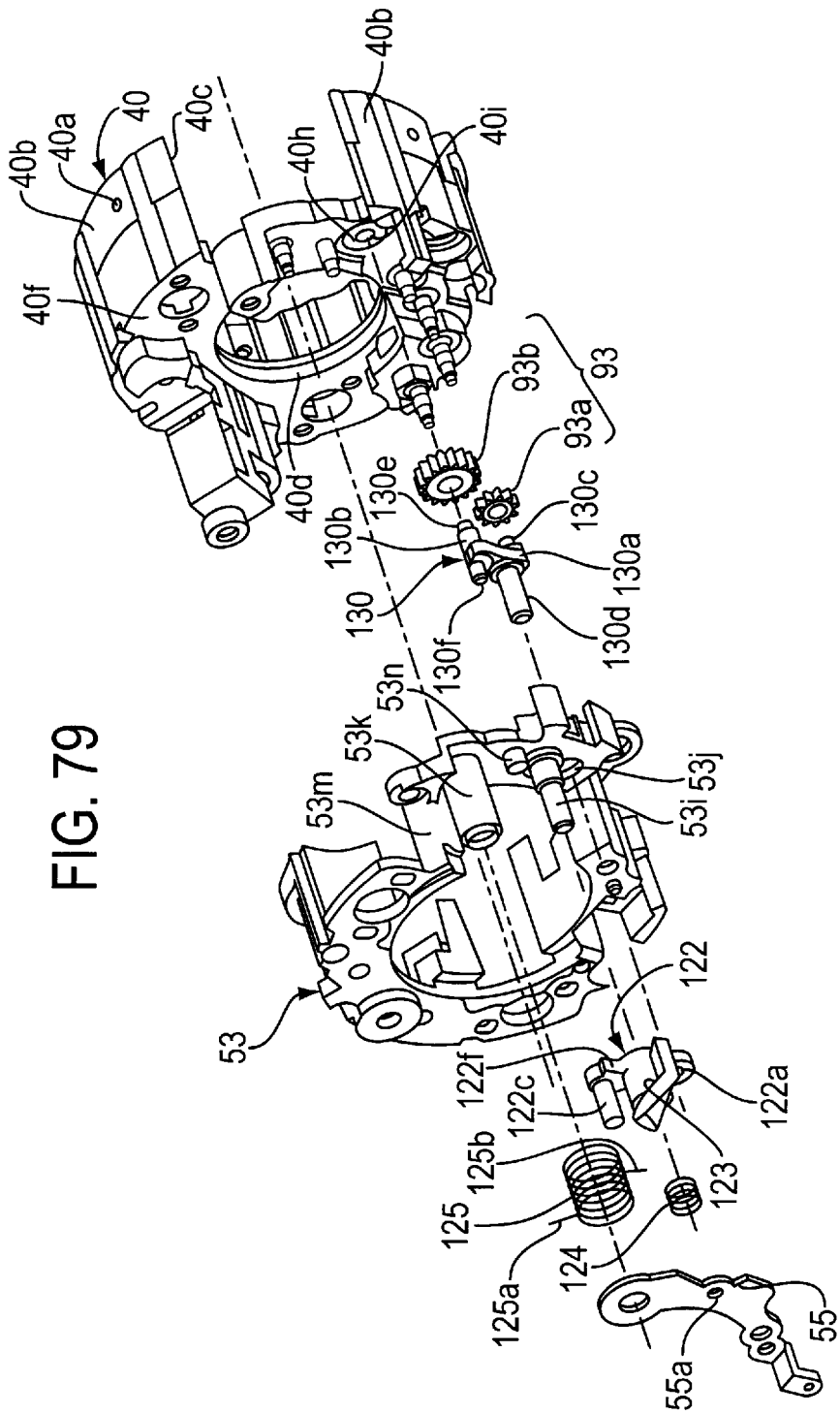
FIG. 79 is an enlarged exploded perspective view of a part of the zoom lens barrel of the present invention.

As shown in FIG. 79, the shutter mounting plate 40 is provided with an annular part 40f which extends in the direction perpendicular to the optical axis 0, and the rear lens group driving motor 30 is fixed to the front surface of the annular part 40f. On the front wall and the rear wall of the annular part 40f, a lens driving gear train 42A which transmits the rotation of a pinion 30a fixed to the rotating shaft of the rear lens group driving motor 30, and an encoder gear train 42B which transmits the rotation of the pinion 30a, are provided. The encoder gear train 42B is used to transmit the rotation of the rear lens group driving motor 30 to a rotation shaft 59f (FIG. 75) of the rotating plate 59. The rotation of the rear lens group driving motor 30 is transmitted to the rotation shaft 59f via the encoder gear train 42B. Further, a barrier opening gear train 42C is provided on the annular part 40f, in order to transmit the rotation of the lens driving gear train 42A to the barrier coupling gear shaft 92, so that the lens barrier of the lens barrier apparatus 35, namely the pair of main barrier blades 48b and the pair of follower barrier blades 48a, may be opened or closed.

In the lens gear train 42A, a planetary gear 93 (FIG. 74) consisting of a planet gear 93a and a sun gear 92b is provided. When the zoom lens barrel 10 moves from the lens extended position to the lens housed position, the position of the planetary gear 93 is switched from the position shown in FIG. 75 to the position shown in FIG. 76, via a switching cam 122 (see FIG. 80 through FIG. 82). The planet gear 93a is engaged with an input gear 42c of the barrier opening gear train 42C in the state shown in FIG. 76, and the planet gear 93a is engaged with the driving gear 42a with which the screw shaft 43 is engaged in the state shown in FIG. 75. The driving gear 42a is the final gear of the lens driving gear train 42A. When the rear lens group driving motor 30 drives clockwise and counterclockwise in the state shown in FIG. 75, the barrier driving ring 97 is driven clockwise and counterclockwise via the barrier coupling gear shaft 92, and the lens barrier of the lens barrier apparatus 35 is opened and closed. In addition, when the rear lens group driving motor 30 drives clockwise and counterclockwise in the state shown in FIG. 75, the driving gear 42a is driven clockwise and counterclockwise, and the rear lens group L2 is moved relative to the front lens group L1 via the screw shaft 43.

The planet gear 93a and the sun gear 93b of the planetary gear 93 are supported by a rotation switching member 130 as shown in enlarged form in FIG. 79 through FIG. 82. The rotation switching member 130 is provided with a base 130a parallel to the annular part 40f. On the rear surface of the base 130a, a primary shaft 130b is fixed at one end, and a secondary shaft 130c is fixed at the other end. On the front surface of the base 130a, a shaft 130f coaxial with the primary shaft 130b is fixed at one end, and a driven shaft 130d approximately coaxial with the secondary shaft 130c is fixed at the other end. The primary shaft 130b, the secondary shaft 130c, the driven shaft 130d and the shaft 130f are all parallel to the optical axis 0.

The sun gear 93b is rotatably fitted to the primary shaft 130b, and the planet gear 93a is rotatably fitted to the secondary shaft 130c. The sun gear 93b is fitted into a depressed bearing surface 40h formed on the front face of the annular part 40f, and in this condition, a front end part 130e of the primary shaft 130b is inserted in and rotatably supported by a hole 40i formed in the center of the depressed bearing surface 40h. The shaft 130f is rotatably fitted into a guide hollow (not shown) formed at a position corresponding to the presser 53. It can be understood that with the above structure, when the rotation switching member 130 rotates about the primary shaft 130b, the planet gear 93a switches between the position shown in FIG. 75 and the position shown in FIG. 76.

The driven shaft 130d of the rotation switching member 130 passes through and protrudes towards the front from a guide slot 53j, formed on the presser 53, and is inserted into a hollow 122a of the switching cam 122, supported rotatably by the presser 53.

The switching cam 122 is provided with a shaft insertion hole 122b at the center thereof, and the presser 53 is provided with shaft a 53i which is rotatably fitted into the shaft insertion hole 122b. The shaft 53i is longer than the shaft insertion hole 122b by a predetermined amount and a front end thereof is fitted into the hole 55a of the presser plate 55, fixed to the front of the presser 53. Around the shaft insertion hole 122b, the switching cam 122 is provided with the hollow 122a, an engaging pin 122c which extends forward in the optical axis direction, and an engaging cam 122d. On the inner periphery of the front end of the engaging cam 122d, a cam surface 123 is formed. The cam surface 123 is formed as a surface that gradually inclines toward the rear lens group driving motor 30 from a rear end 123a to a front end 123b thereof. When the relative position between the AF/AE shutter unit 21 and the linear guide member 22 becomes a predetermined position, the cam surface 123 engages with the engaging part 22f at the front end of one of the guide legs 22b provided on the linear guide member 22. Therefore, the relative position, in the optical axis direction, between the cam surface 123 of the switching cam 122 and the engaging part 22f of the linear guide member 22, is strictly set.

Figure 77:
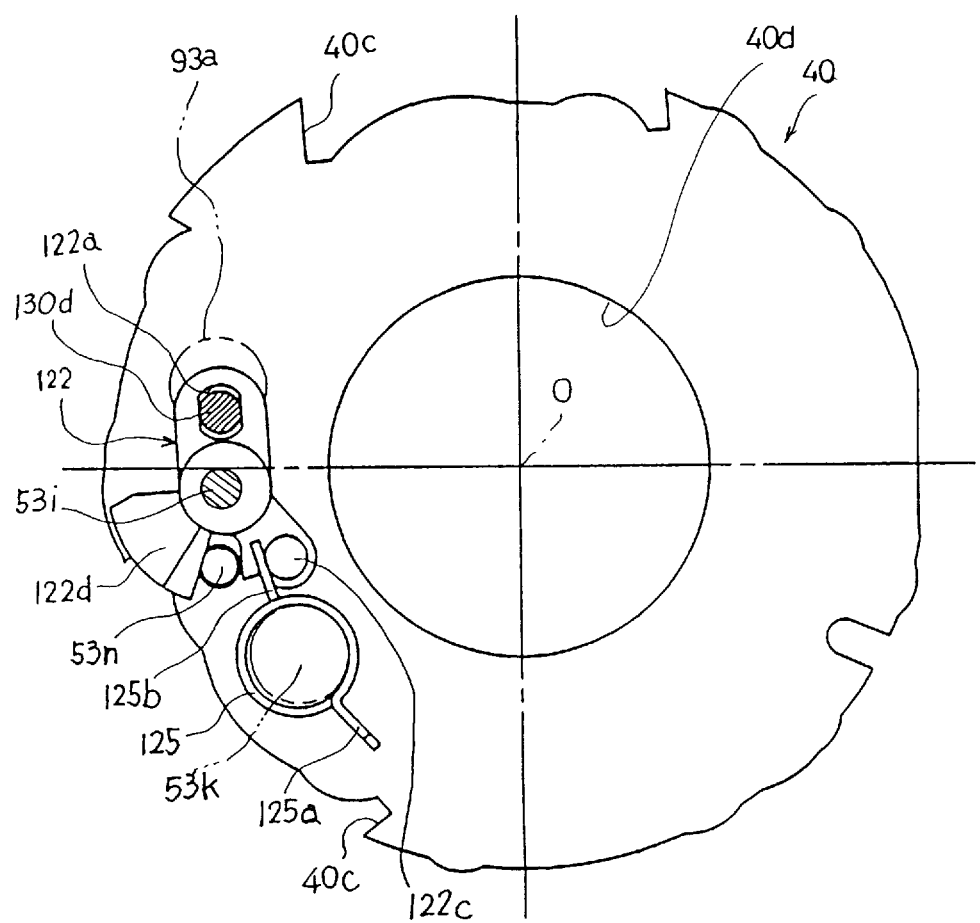
FIG. 77 is a plan view of positions of switching cams in a photographing state.
Figure 78:
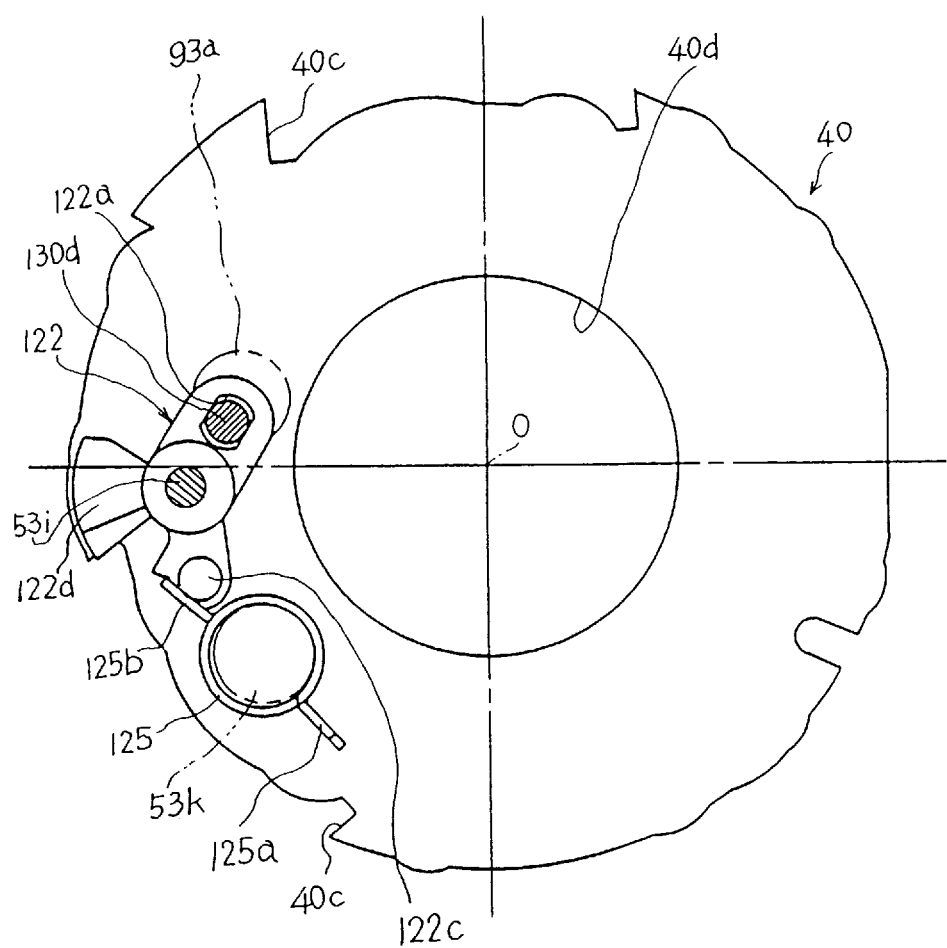
FIG. 78 is a plan view of positions of switching cams in a housed state.
Figure 80:
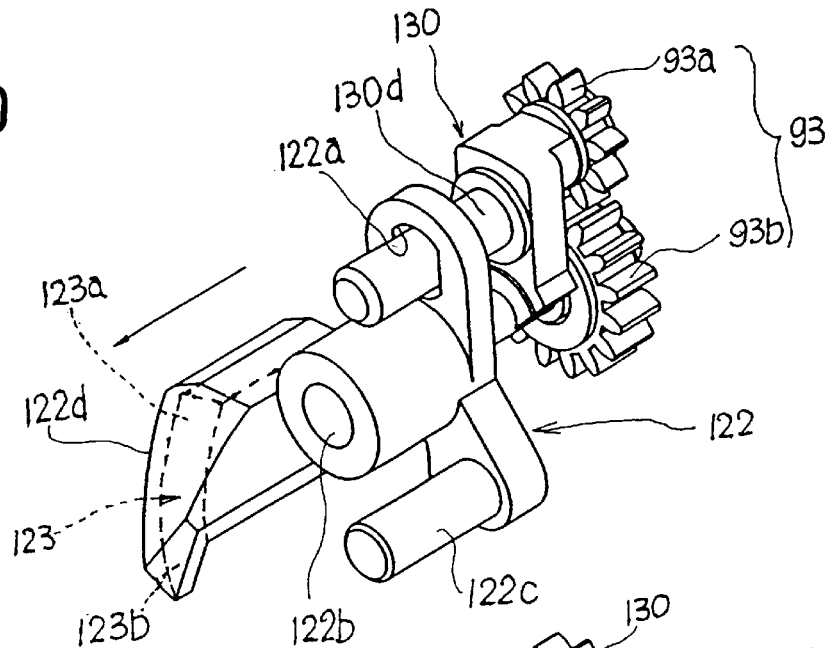
FIG. 80 is an enlarged perspective view of a switching cam, a rotation switching member and a planetary gear.

Between the shaft insertion hole 122b of the switching cam 122 and the presser 55, a coil spring 124, fitted to the shaft 53i, is provided. The switching cam 122 is constantly urged rearwards in the optical axis direction by the coil spring 124. Further, a torsion spring 125 is fitted to a fixing post 53k, fixed on the presser 53 and engages with a screw 127, to fix one end of the presser 55. One end 125a of the torsion spring 125 engages with a fixing part 53m of the presser 53, and another end 125b engages with the engaging pin 122c of the switching cam 122. The switching cam 122 is constantly urged by the torsion spring 125 in the counterclockwise direction with respect to the view of the AF/AE shutter unit 21 from the subject side. In addition, since the driven shaft 130d of the rotation switching member 130 is inserted through the guide slot 53j, the rotation switching member 130 is also urged in the same direction by the torsion spring 125. When the AF/AE shutter unit 21 and the linear guide member 22 are in a mutually separated condition, the switching cam 122 is fitted to the shaft 53i in such a state, as shown in FIG. 77, that an engaging part 122f formed close to the engaging pin 122c is contacted with an engaging projection 53n fixed to the presser 53. Thus in this condition, the switching cam 122 is made unrotatable in the clockwise direction with respect to the view of the AF/AE shutter unit 21 from the subject side. At this time, the relative positional relationship between the switching cam 122 and the rotation switching member 130 will be as shown in FIG. 80. From such a state, if the engagement of the engaging projection 53n with the engaging part 122f is released by moving the switching cam 122 forwardly (i.e., in the direction indicated by an arrow in FIG. 80) against the urging force of the coil spring 124, it is possible to rotate clockwise.

Figure 81:
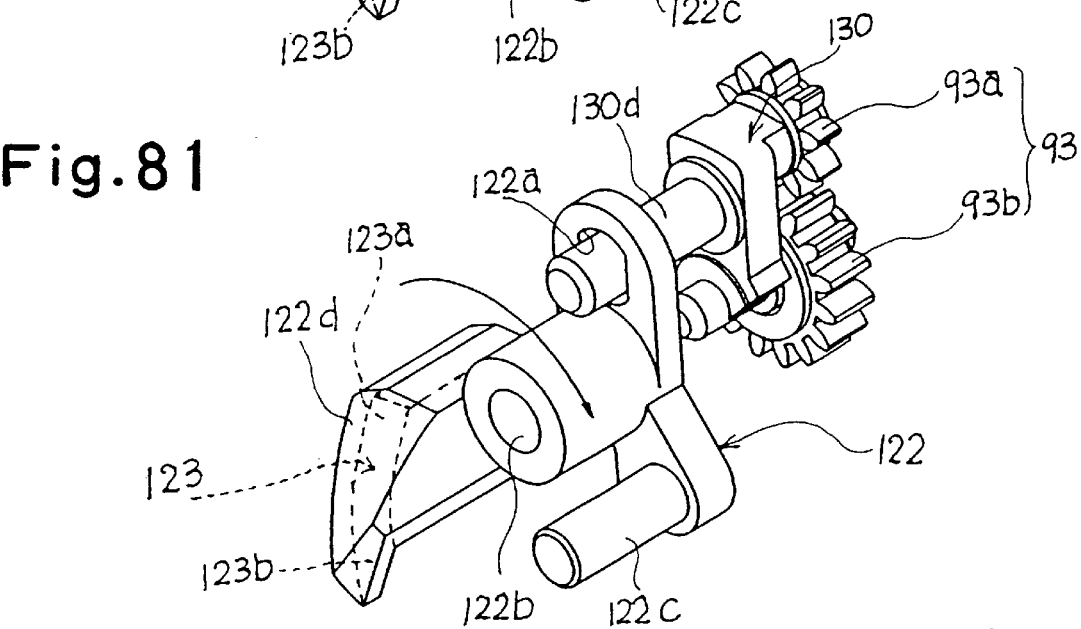
FIG. 81 is an enlarged perspective view of the switching cam, the rotation switching member and the planetary gear, in a different state from the state shown in FIG. 80.
Figure 82:
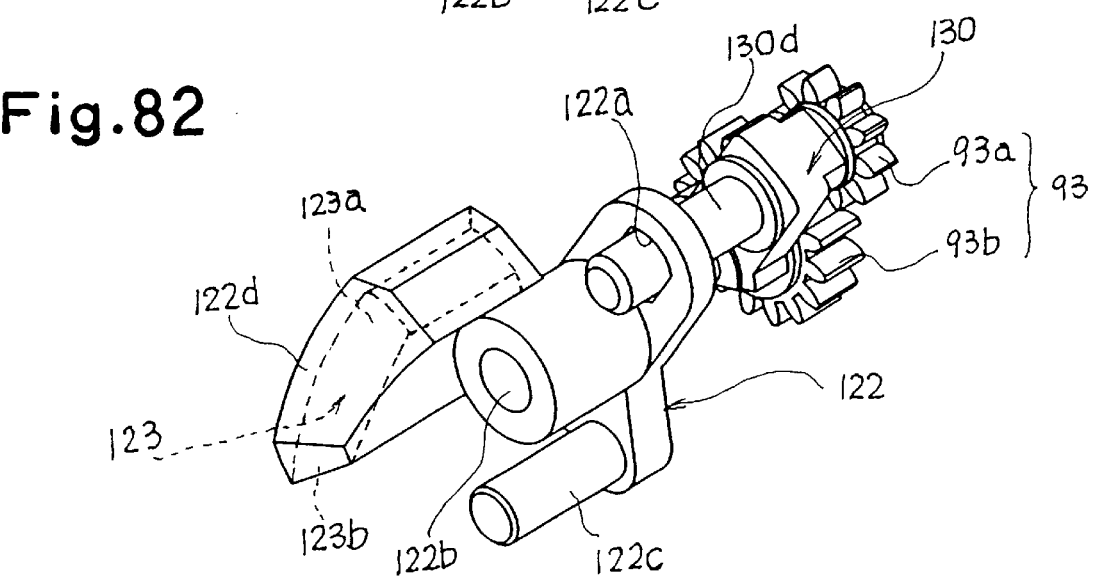
FIG. 82 is an enlarged perspective view of the switching cam, the rotation switching member and the planetary gear, in yet a different state from the states shown in FIG. 80 and FIG. 81.
Figure 83:
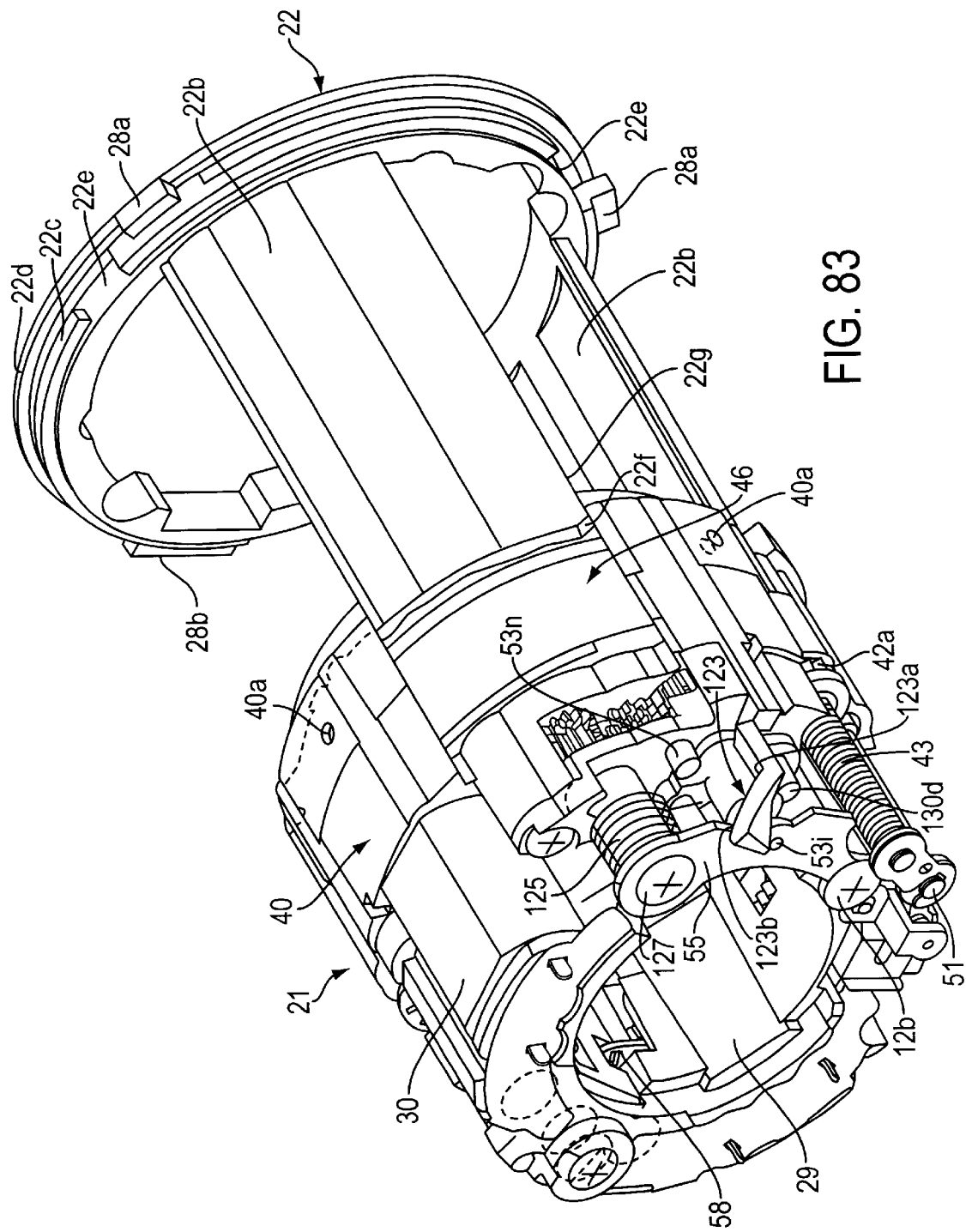
FIG. 83 is a schematic perspective view illustrating outlines of the AF/AE shutter unit and a linear guide member in a photographing state.
Figure 84:
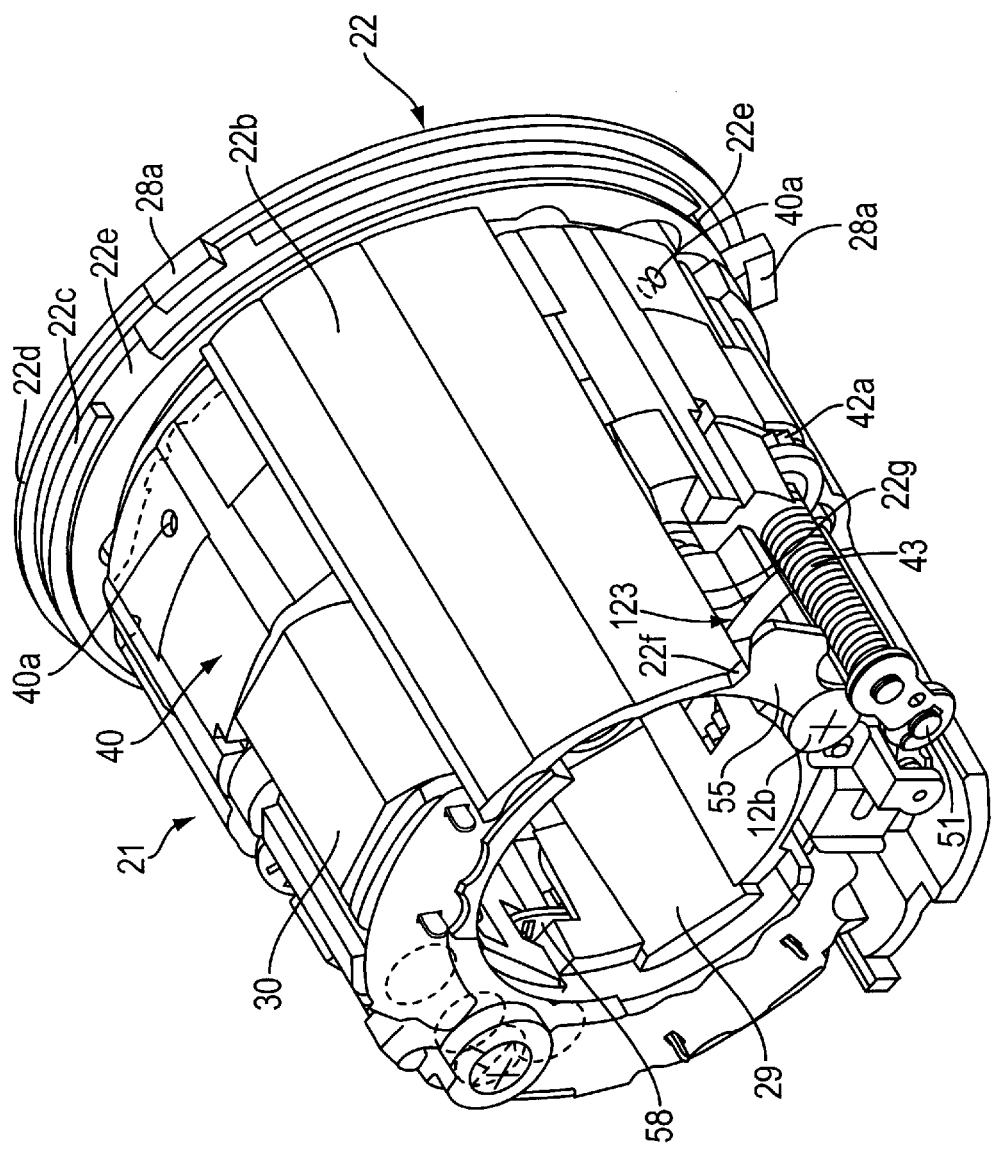
FIG. 84 is a schematic perspective view illustrating outlines of the AF/AE shutter unit and the linear guide member in a housed state.
Figure 85:
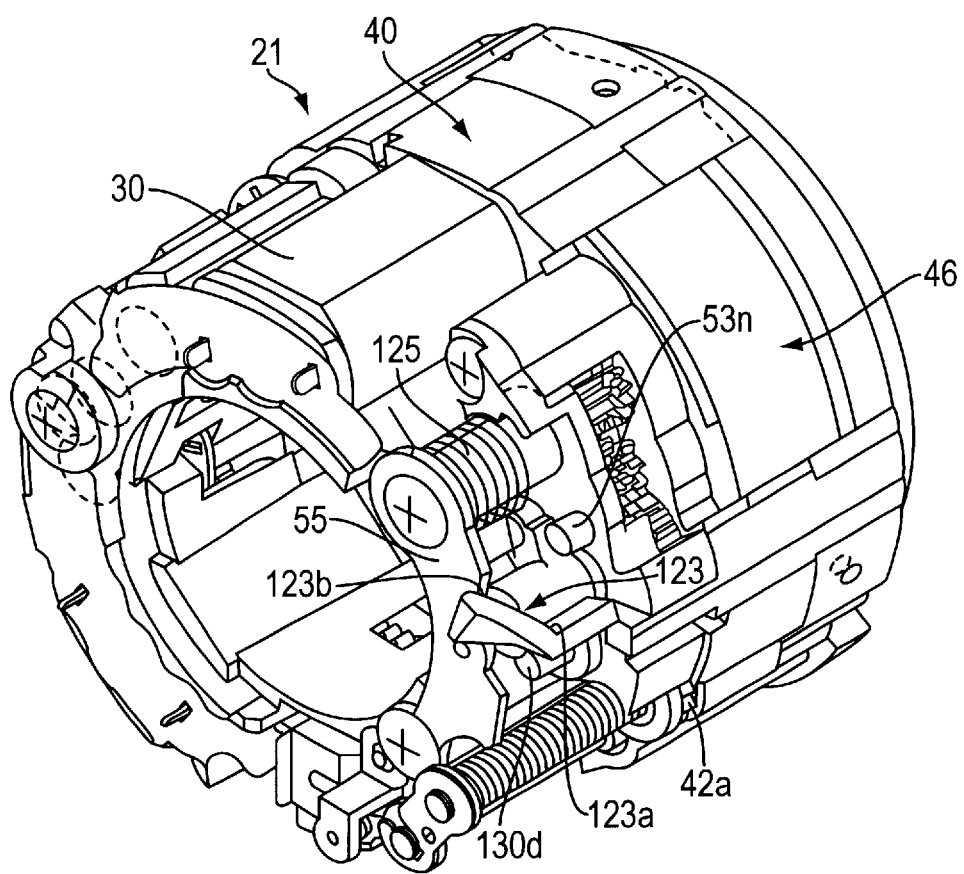
FIG. 85 is a schematic perspective view illustrating an outline of the AF/AE shutter unit shown in FIG. 83.
Figure 86:
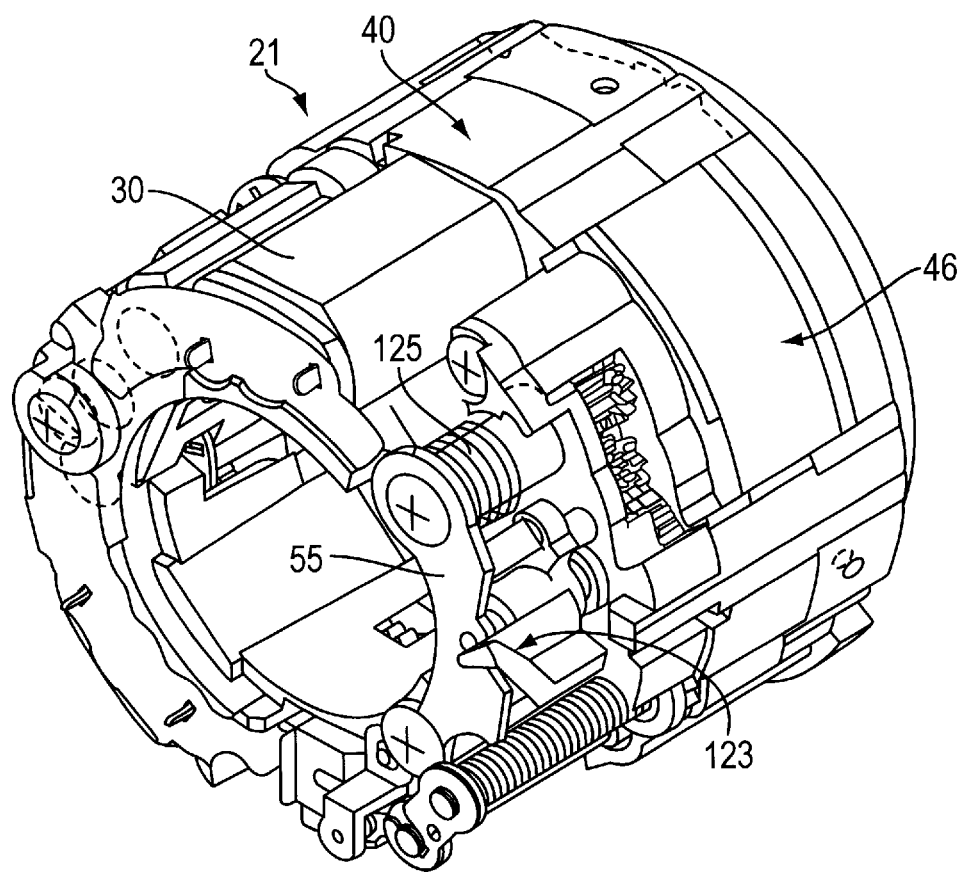
FIG. 86 is a schematic perspective view illustrating an outline of the AF/AE shutter unit shown in FIG. 84.

When the power supply of the camera is turned OFF in the condition shown in FIG. 83 (photographing condition), the transition to the condition shown in FIG. 84, namely to the housed condition, is carried out. In this process, the engaging part 22f of the linear guide member 22 contacts the front end 123b of the cam surface 123, and when the linear guide member 22 and the AF/AE shutter unit 21 move closer, since the engaging part 22f presses the cam surface 123 forwardly in the optical axis direction, the switching cam 122 is moved forwardly, and the engagement of the engaging projection 53n and the engaging part 122f becomes disengaged. At this time, the switching cam 122 and the rotation switching member 130 will be in the relative positional relationship as shown in FIG. 81.

Thereafter, when the linear guide member 22 and the AF/AE shutter unit 21 move much closer, the switching cam 122 rotates in the clockwise direction (i.e., in the direction shown by the arrow in FIG. 81) with respect to the view of the AF/AE shutter unit 21 from the subject side, while sliding the cam surface 123 against the engaging part 22f of the linear guide member 22. At the same time as this rotation, the rotation switching member 130 is also rotated in the same direction via the hole 122a and the driven shaft 130d, and by such a rotation, the engagement of the planet gear 93a with the driving gear 42a is disengaged.

Thereafter, when the linear guide member 22 and the AF/AE shutter unit 21 become closest to each other, as shown in FIG. 84, and the engaging cam 122d rides the rims 22g of the guide legs 22b adjacent the engaging part 22f. At this time, the switching cam 122 will be rotated to a position furthest in the clockwise direction with respect to the view of the AF/AE shutter unit 21 from the subject side, and simultaneously, the rotation switching member 130 is also rotated in the same direction, and is rotated to a position furthest in the clockwise direction with respect to the view of the AF/AE shutter unit 21 from the subject side. In this condition, the planet gear 93a engages with the input gear 42c of the barrier opening gear train 42C. When this engagement is set, the rear lens group driving motor controlling means 61 rotates the pinion 30a of the rear lens group driving motor 30 in a predetermined direction to close the lens barrier. This rotation is transmitted to the lens barrier apparatus 35 via the lens driving gear train 42A, the barrier opening gear train 42C, and the barrier coupling gear shaft 92. From the housed state, when the power supply of the camera is turned ON, the rear lens group driving motor controlling means 61 rotates the pinion 30a of the rear lens group driving motor 30 in the direction opposite the above-mentioned predetermined direction to open the lens barrier of the lens barrier apparatus 35, and then extend the zoom lens barrel. By this extension, the linear guide member 22 and the AF/AE shutter unit 21 separate away from each other, and disengaging the guide legs 22b of the linear guide member 22 and the switching cam 122 is disengaged, and the photographing condition shown in FIG. 83 is set. In such a photographing condition, the planet gear 93a is in a state of engagement with the driving gear 42a.

As described above, in the zoom lens barrel 10 in the present embodiment of the present invention, since the rotation of the rear lens group driving motor 30 is transmitted to the lens barrier apparatus 35 via the specified gear trains, the lens barrier is surely opened and closed.

As is understood from the above description, the present embodiment of the present invention, is provided with at least a front lens group and a rear lens group, as well as a whole unit driving means for moving the front lens group and the rear lens group as a whole, and a rear lens group driving means for moving the rear lens group with respect to the front lens group. When the front lens group and the rear lens group are in a retracted position that is towards the camera body with respect to a predetermined position, the front lens group and the rear lens group are moved forwardly by driving the whole unit driving means. The the rear lens group is moved rearwardly by driving the rear lens group driving means, therefore if any external force is applied in the lens retraction direction to the front lens group and the retracted rear lens group, since the rear lens group is moved rearwardly after extension of the front lens group and the rear lens group, there is no possibility that the rear lens group may collide with a film, or an aperture frame of the camera body.

Further in the present embodiment of the present invention, a lens barrier apparatus, driven to be opened and closed by the rear lens group driving means, is provided. In addition a switching means is further provided, by which, when the front lens group and the rear lens group are at a housed position, the rear lens group driving means is connected with the lens barrier apparatus. When the front lens group and the rear lens group are extended from a predetermined position by the whole unit driving means, the rear lens group driving means is connected with the rear lens group. When the front lens group and the rear lens group are at a predetermined position, after the front lens group and the rear lens group are extended from the predetermined position by the whole unit driving means, the rear lens group driving means is driven, therefore a switching of connection of the switching means from the lens barrier apparatus to the rear lens group is surely performed.

An embodiment of the present invention in regard to the zoom finder optical system, to perform zooming in synchronization with the movement of the lenses, will now be described.

Figure 94:
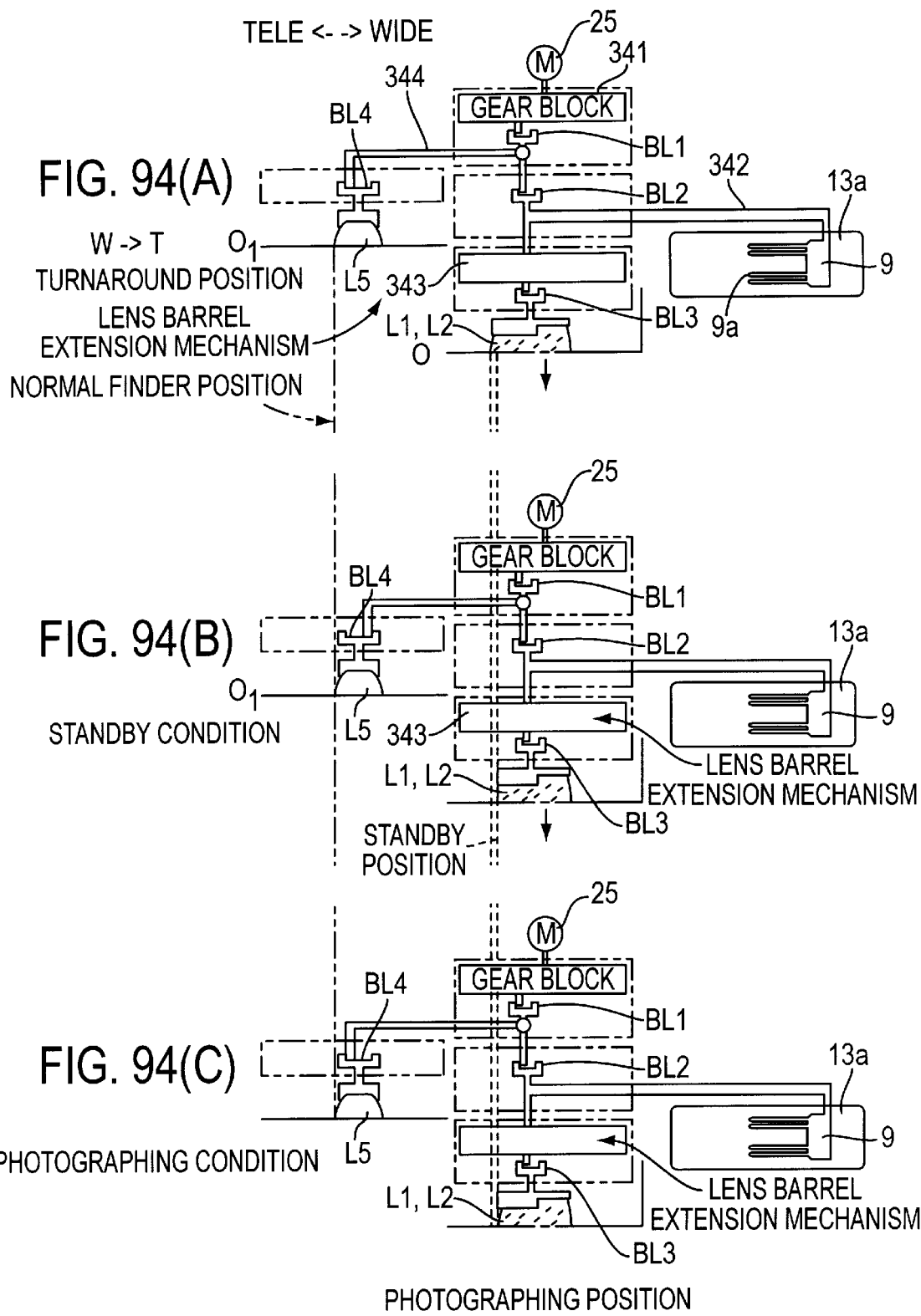
FIG. 94 is a schematic view of the zoom lens camera provided with a zoom finder of the present invention, illustrating the overall structure of a transmission device, from the whole unit driving motor, to the front and rear lens groups and a zoom finder optical system, and backlashes of the transmission device.

FIG. 94 is a schematic representation of the overall operation of the transmission device, from the whole unit driving motor 25 to the front and rear lens groups L1 and L2, and to a zoom finder optical system, namely to a system which includes variable magnification lens L5, and which shows the backlashes thereof. The front lens group L1 and the rear lens group L2 zoom by moving along the optical axis 0, and the variable magnification lens L5 changes in magnification (changes in image magnification) by moving along an optical axis 01. While FIG. 94 shows only one variable magnification lens, it is likely that the zoom finder optical system will contain a plurality of lenses to perform the variable magnification function; as one example, FIG. 95A discloses two movable lenses L5 and L6 (in addition, two or more stationary lenses, not illustrated, will also be included in the finder optical system).

The backlashes during zooming of the photographing optical system of the camera of the present embodiment, include a gear train backlash BL1 of the gear device 341, from a pinion 25a of the whole unit driving motor 25, via the reduction gear train 26, to the driving pinion 15, a detection backlash BL2 of a zoom code detecting device 342, from the driving pinion 15, via the outer peripheral gear 16b (i.e., the third moving barrel 16) and the fixed lens barrel block 12, to the linear guide barrel 17, and a lens barrel backlash BL3 of a lens barrel extension device 343, from the linear guide barrel 17, via the second moving barrel 19, to the first moving barrel 20. The detection backlash BL2 is also the backlash in which the components up to the brushes 9a and the code plate 13a, for detecting the position of the front lens group L1, are involved.

The backlashes in the magnification changing operation of the zoom finder optical system, include the gear train backlash BL1, and a finder backlash BL4 of the finder driving device 344, which includes from the driving pinion 15 to the outer peripheral gear 16b (i.e., the third moving barrel 16) and the finder driving gear 334.

Although the backlashes from BL1 to BL4, contain the usual backlash that occurs when a gear changes in the direction of rotation, detection backlash BL2 and finder backlash BL4 also contain their own characteristic backlash. The magnitudes of the respective backlashes are indicated schematically in the figures by the width of the respective U-shaped parts.

With reference to FIG. 94 and FIG. 34, the operations during zooming and during focusing in the present embodiment of the present invention will now be described.

In the present embodiment, in the photographing standby state where the power is ON, the front lens group L1 and the rear lens group L2 are stopped at the standby position which is rather on the housed position side of the switching position of the zoom code. For example, when the zoom lens is zoomed from the "wide" position to the "tele" position, the whole unit driving motor 25 drives clockwise. The whole unit driving mot is then stopped after being further driven clockwise from the zoom code OFF/ON detecting position at which the brushes 9a contact the zoom code, to the position at which the zoom code turns OFF (i.e., by a predetermined zoom pulse number ZP1). This lens position is defined as the turnaround position. From the turnaround position, the whole unit driving motor 25 is driven counterclockwise. Then, the whole unit driving motor 25 is further driven counterclockwise by the value of the second zoom pulse ZP2, from the zoom code ON/OFF detecting position at which the brushes 9a move apart after contacting with the present zoom code, and then the whole unit driving motor 25 stops. For the purpose of decreasing the backlashes BL1, BL2 and BL3, the whole unit driving motor 25 is further driven clockwise by the value of the third zoom pulse ZP3. Such a lens position is the lens standby position, as shown in FIG. 94 (B).

During "tele" zooming, the whole unit driving motor 25 is driven clockwise, and before the rotation by the value of the first zoom pulse ZP1 is complete, each device 341, 342 and 343 is operated in the state that the backlashes BL1 through BL3 are eliminated, and the front and rear lens groups L1 and L2 are moved forwardly. When the rotation of the whole unit driving motor 25 by the value of the first zoom pulse ZP1 is complete, the backlash BL4 is eliminated, and the variable magnification lens L5 is started to move from the position corresponding to the turnaround position, as shown in FIG. 94 (A). At such a position, during the clockwise rotation of the whole unit driving motor 25, the backlashes BL1 through BL4 in the "tele" direction are eliminated.

From such a turnaround position, when the whole unit driving motor 25 rotates counterclockwise, since the driving by the value of the backlashes BL1, BL2 and BL3 is complete during the initial driving of the whole unit driving motor 25 counterclockwise, the gear device 341, the zoom code detecting device 342, and the lens barrel extension device 343 move the front lens group L1 and the rear lens group L2 to the lens standby position. In regard to the finder driving device 344, however, the backlash is not eliminated in the course of the counterclockwise driving of the whole unit driving motor 25. Therefore, the variable magnification lens L5 is not moved unless the whole unit driving motor 25 is rotated counterclockwise by a value of not less than that of the finder backlash BL4 from the turnaround position. As shown in FIG. 94(B) the variable magnification lens L5 is not moved from the position corresponding to the turnaround position. In the present embodiment, the value of the finder backlash BL4 approximately coincides with the value of the rotation of the whole unit driving motor 25 while the front lens group L1 and the rear lens group L2 move from the turnaround position to the standby position.

When the lens stops after zooming from the "tele" position to the "wide" position, the whole unit driving motor 25 is driven counterclockwise from the zoom code ON/OFF detecting position at which the brushes 9a are contacted with and then moved away from the zoom code. The whole unit driving motor 25 is further driven counterclockwise by the value of the second zoom pulse ZP2, then driven clockwise by the value of the third zoom pulse ZP3, and eventually stops after moving the front lens group L1 and the rear lens group L2 to the lens standby position, as shown in FIG. 94 (B). Such a standby state is the same as the standby state during the tele-zooming.

Through the above operations, the lenses are stopped at the same lens standby position and under the same backlash conditions when they are zoomed to the tele-side or the wide-side.

During focusing, namely during photographing, the front lens group L1 and the rear lens group L2 are moved from the standby position to the "tele" position according to the subject distance, as shown in FIG. 94 (C), and after completion of photography, return to the standby position. The amount of movement is set with respect to the zoom code OFF/ON detecting position. In this case, the driving pulse, namely the value of the pulse from the zoom code ON/OFF detecting position, of the whole unit driving motor 25, will not exceed the value of the first zoom pulse ZP1. Therefore, if the whole unit driving motor 25 moves by a predetermined amount during photographing, the variable magnification lens L5 of the finder is not moved due to the finder backlash BL4, and therefore the visual field of the finder is maintained as stable.

When the value of the driving pulse during focusing is less than the value of the first zoom pulse ZP1, the whole unit driving motor 25 is driven clockwise by such a value, and then is driven counterclockwise.

FIG. 95 through FIG. 99 illustrate an embodiment for providing finder backlash BL4, and the interlocking mechanism of the zoom finder optical system of which image magnification is varied synchronized with the rotation of the whole unit driving motor 25.

The rotation of the driving shaft of the whole unit driving motor 25 is transmitted to the driving pinion 15 via the pinon 35a and the reduction gear train 26 fixed to the driving shaft. The driving pinion 15 is engaged with the outer peripheral gear 16b of the third moving barrel 16, as well as with a small gear 331 of double gears 331 and 332. A large gear 332 meshing with the small gear 331, is engaged with an outer peripheral gear 333a of a finder meshing gear ring 333, and the outer peripheral gear 333a is engaged with the finder driving gear 334 which drives the variable magnification lens in the finder optical system. In such a manner, the rotation of the whole unit driving motor 25 is transmitted, from the driving pinion 15, via the double gears 331 and 332, and the finder meshing gear ring 333, to the finder driving gear 334. The finder meshing gear ring 333 is engaged rotatively on a bearing 333a projecting cylindrically from the anti-dropping member 33.

Figure 95:
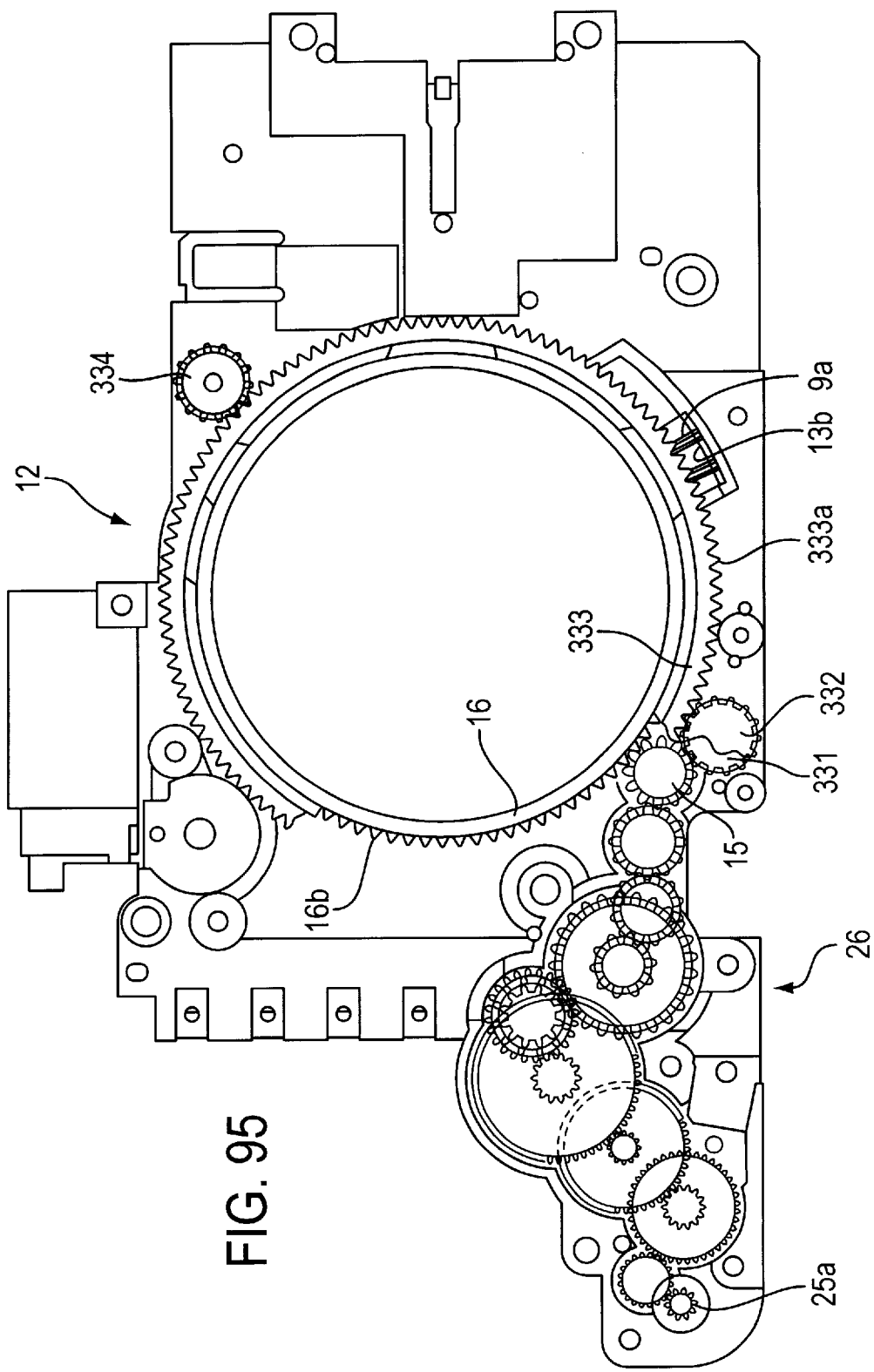
FIG. 95 is a front elevational view of a fixed part of the zoom lens barrel, illustrating an interlocking structure of a zoom lens driving device and a zoom finder driving device, of the zoom lens camera of the present invention.
Figure 95A:
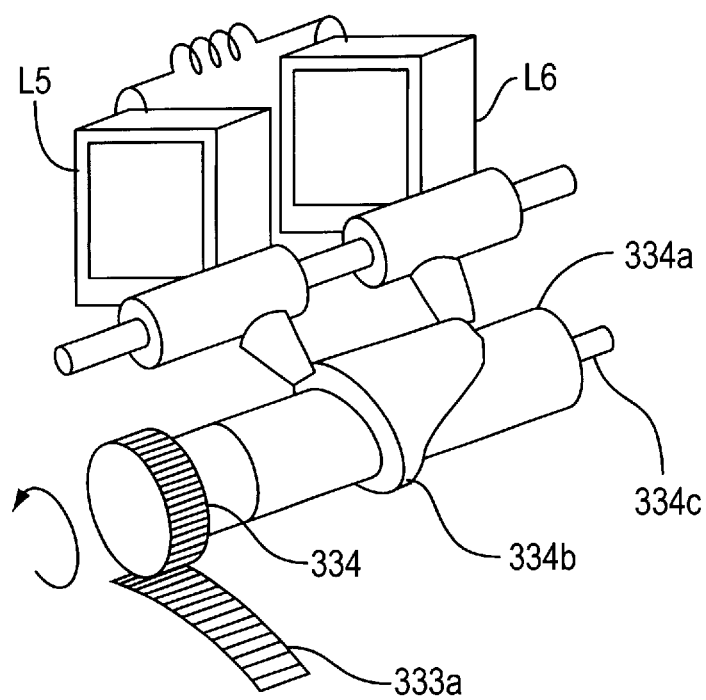
FIG. 95A is a perspective view of a finder optical system which can be used in association with the present invention.
Figure 96:
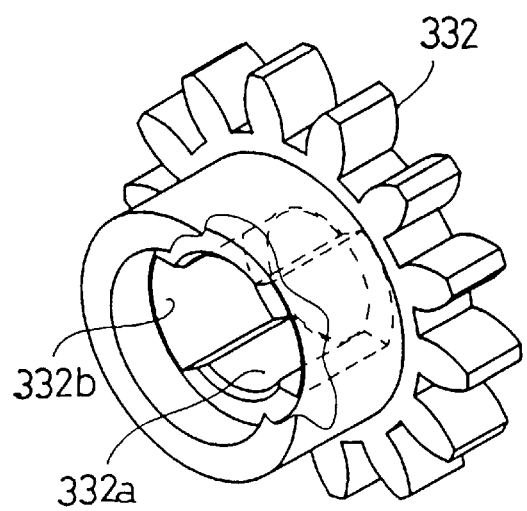
FIG. 96 is an exploded perspective view of double gears having a delayed interlocking function to cause a delayed driving (i.e., backlash) between the zoom lens driving device and the zoom finder driving device.
Figure 97:
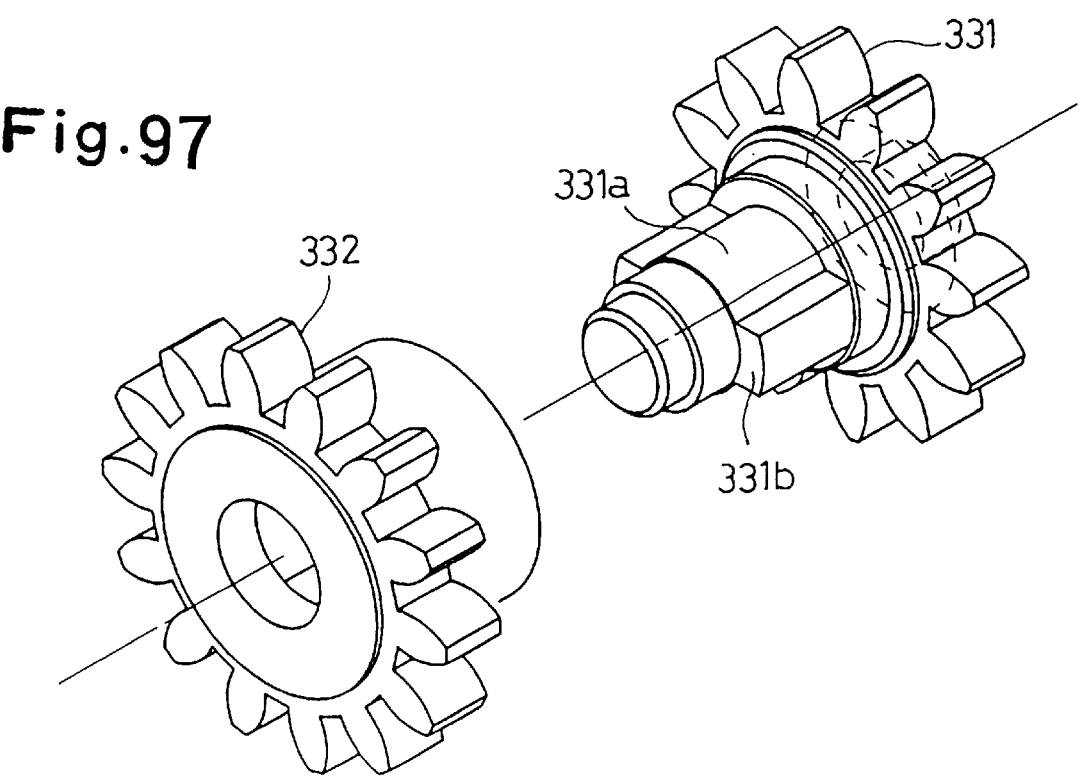
FIG. 97 is a schematic perspective view of a driven large gear in the double gears of FIG. 96, seen from the opposite side of FIG. 96.
Figure 98:
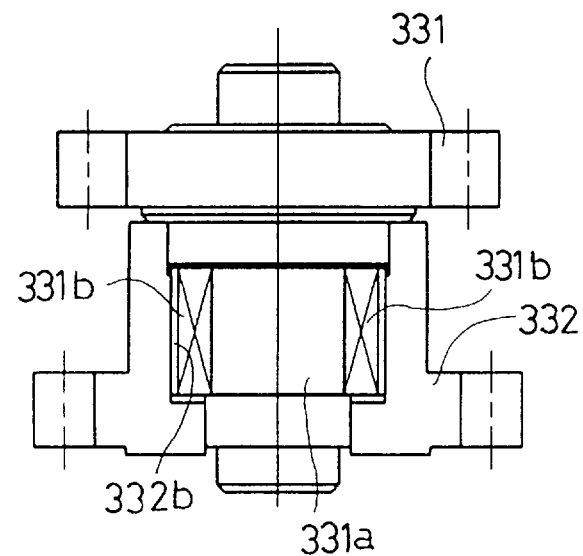
FIG. 98 is a cross sectional view of a shaft of the double gears of FIG. 96.
Figure 99:
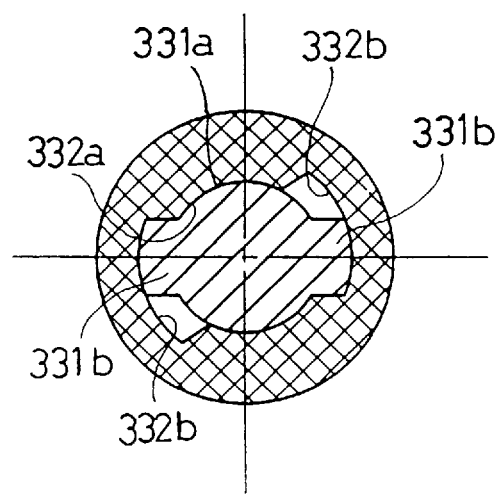
FIG. 99 is a sectional view of the double gears of FIG. 96.

Gear 334 is then engaged (either directly or indirectly) to a mechanism for driving/zooming a finder optical system. One such connection is shown in FIG. 95A, which shows gear 334 driving shaft 334a, having cam surfaces 334b and 334c, which serve to drive, e.g., finder lenses L5 and L6. An alternate finder system which could be driven by the finder driving gear 334 is shown in Japanese Patent Application 8-365, which has been incorporated by reference hereinabove.

A shaft 331a of the small gear 331 is inserted in a shaft hole 332a of the large gear 332. At shaft 331a, a pair of keys 331b are formed symmetrically with respect to the shaft center, and on the shaft hole 332a, a pair of key grooves 332b are formed so that the pair of the keys 331b may be engaged. The width of the key grooves 332b in the peripheral direction is formed to be wider than the thickness of the keys 331b. In such a manner, although each key 331b contacts with one of the faces of the corresponding key groove 332b in the radial direction, so that the large gear 332 follows and rotates integrally with the small gear 331, while the small gear 331 rotates in one direction, when the direction of rotation is changed, each key 331b separates from one of the faces of the corresponding key groove 332b in the radial direction, and the large gear 332 is not rotated, in other words, the magnification of the finder optical system is not changed until the small gear 331 has rotated for a predetermined rotation angle and each key 331b contacts the other face of the corresponding key groove 332b in the radial direction.

The predetermined rotation angle, hereinafter referred as "delayed meshing angle", is set to be larger than the rotation angle of the small gear 331 when the whole unit driving motor 25 drives the lens from the standby position to the designated focal length or to the focused position during photographing. Although the details will be described later, the delayed meshing angle is set so that the finder optical system will not change in magnification, for example, during the photographing process in which the whole unit driving motor 25 is driven clockwise to advance the front lens group L1 and the rear lens group L2 by a predetermined number of zoom pulses, i.e., by the first zoom pulse number ZP1, from the point at which the turning ON of the present zoom code is detected to further advance the lenses as well as during the period in which the whole unit driving motor 25 is driven counterclockwise after the above movement and then further driven counterclockwise by the second zoom pulse ZP2 from the point at which the turning OFF of the present zoom code is detected to thereby return the front lens group L1 and the rear lens group L2 to the standby position.

As above described, in the present embodiment of the present invention, if the whole unit driving motor 25 is driven during focusing, since the amount of rotation of the whole unit driving motor is set so that the variable magnification lens L5 of the zoom finder may not be moved, the magnification of the visual field of the finder is not varied every time the photometering switch SWS is ON, and thus the time lag during pressing of the release switch SWR is further reduced.

As should be understood from the above description, since the present embodiment provides a zoom lens having at least a front lens group and a rear lens group, a zoom finder, and a whole unit driving means to move the front lens group and the rear lens group as a whole, during zooming, the whole unit driving means is driven and the front lens group and the rear lens group are moved and then stopped at one of the standby positions set in each phase. During focusing, the whole unit driving means is driven to move the front lens group and the rear lens group to a focused position. After that, the whole unit driving means is then driven to return the front lens group and the rear lens group to the standby position. During such movements, if the amount of movement from the standby position to the focused position moves the front lens group and the rear lens group during focusing, the magnification of the zoom finder is not changed, and therefore a visual field of the finder may be provided agreeable to the user.

The above described embodiment was directed to the case in which it is not necessary to consider a zoom code error. However, the following explanation will be directed to the case in which it is necessary to consider a zoom code error, with reference to FIGS. 100 through 103. The overall operation of the components is essentially the same as the embodiment shown in the schematic representation of FIG. 94, and therefore the explanation thereof shall not be repeated herein.

Figure 102:
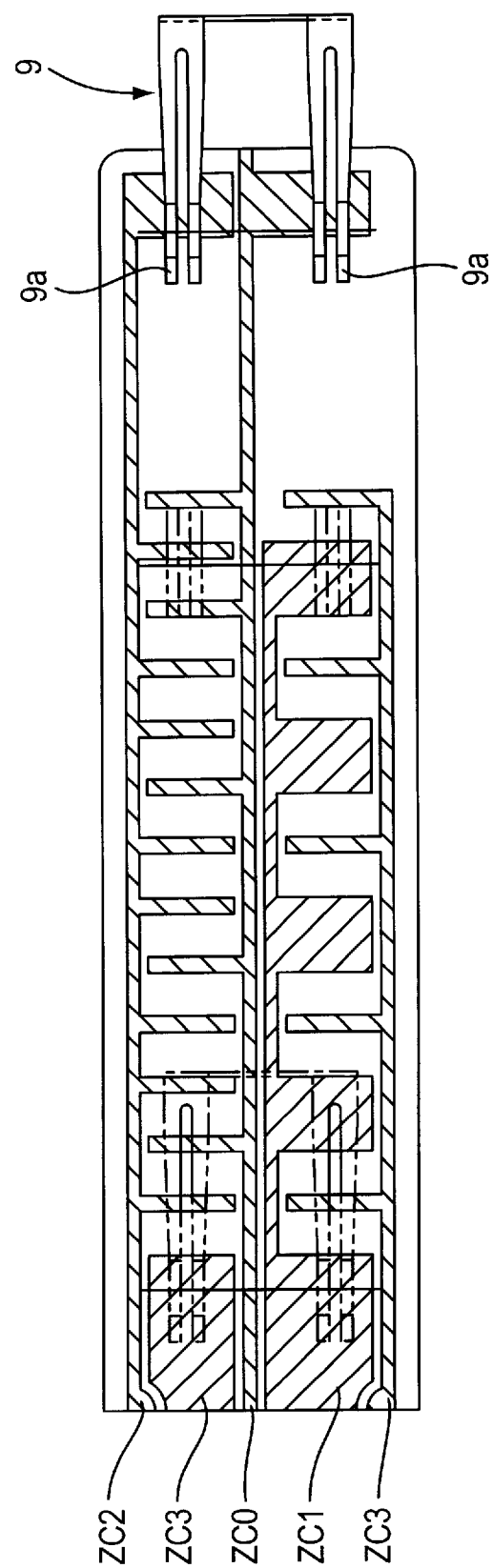
FIG. 102 is a plan view illustrating an overall structure of the zoom code of the zoom lens camera of the present invention.

FIGS. 102 and 103 show enlarged views of the code plate 13a and brushes 9a, which form the zoom code, and the contacting conditions thereof. The code plate 13a is provided with four independent electrode patterns ZC0, ZC1, ZC2 and ZC3 formed on the insulating substrate 13b. Since the electrode patterns ZC0, ZC1, ZC2 and ZC3 have a finite thickness, they are raised from the insulating substrate 13b by their respective thicknesses. The curved tip 9d of the brush part 9a thus slides against the insulting substrate and the electrode patterns. However, at the switching positions of the electrode patterns (i.e., the ON/OFF switching position of the zoom code), the brush parts 9a contact with or separate from the electrode pattern at part 9e or part 9f, positioned away from the tip 9d. Therefore, when the brushes 9a are in contact with or separated from the electrode patterns ZC0, ZC1, ZC2 and ZC3, an error amounting to a distance do arises. Therefore, in the present embodiment, although the reference position of the front lens group L1 (and of the rear lens group L2) is set to the position at which the brushes 9a turn ON/OFF at the film surface side of the electrode patterns ZC0, ZC1, ZC2 and ZC3, the distance do is taken into consideration in this process.

Figure 100A:
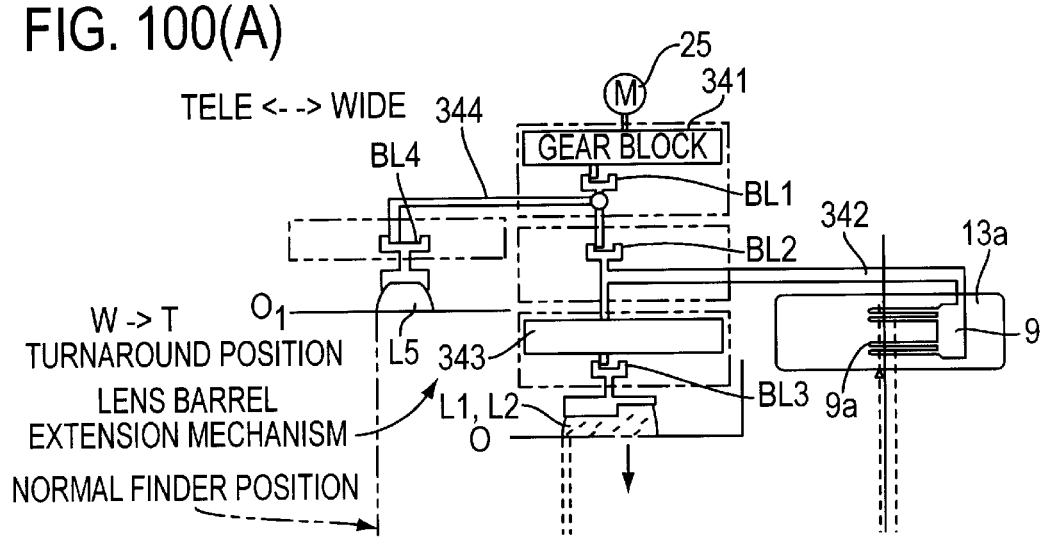
FIG. 100 is a schematic view of the zoom lens camera provided with a zoom finder of the present invention, illustrating the overall structure of the transmission device, from the whole unit driving motor, to the front and rear lens group and a zoom finder optical system, and backlashes of the transmission device.
Figure 100B:
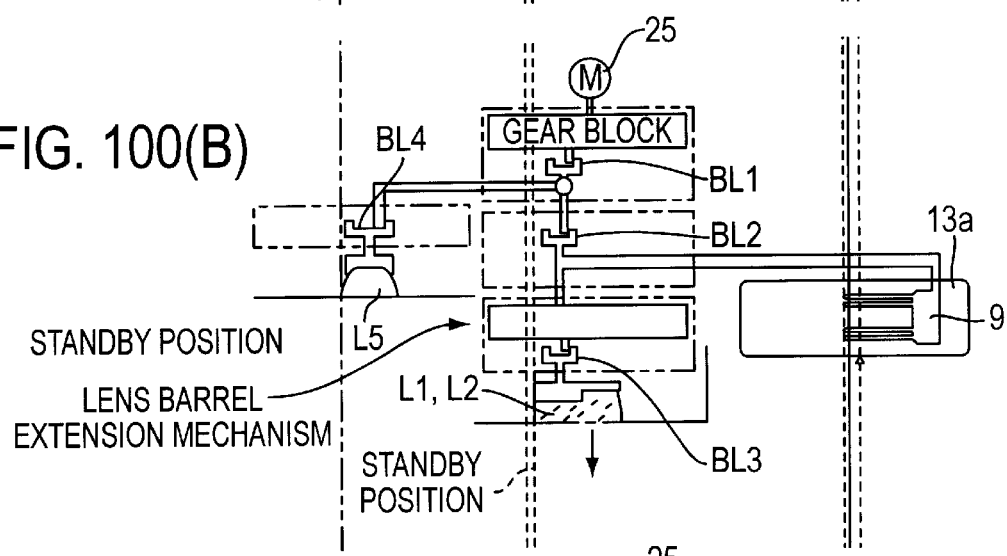
Figure 100C:
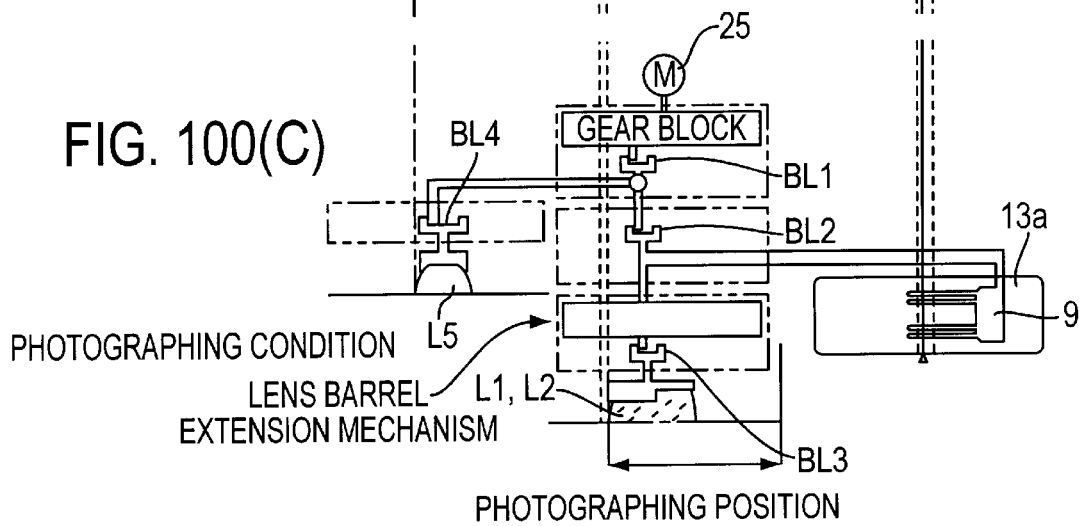
Figure 101:
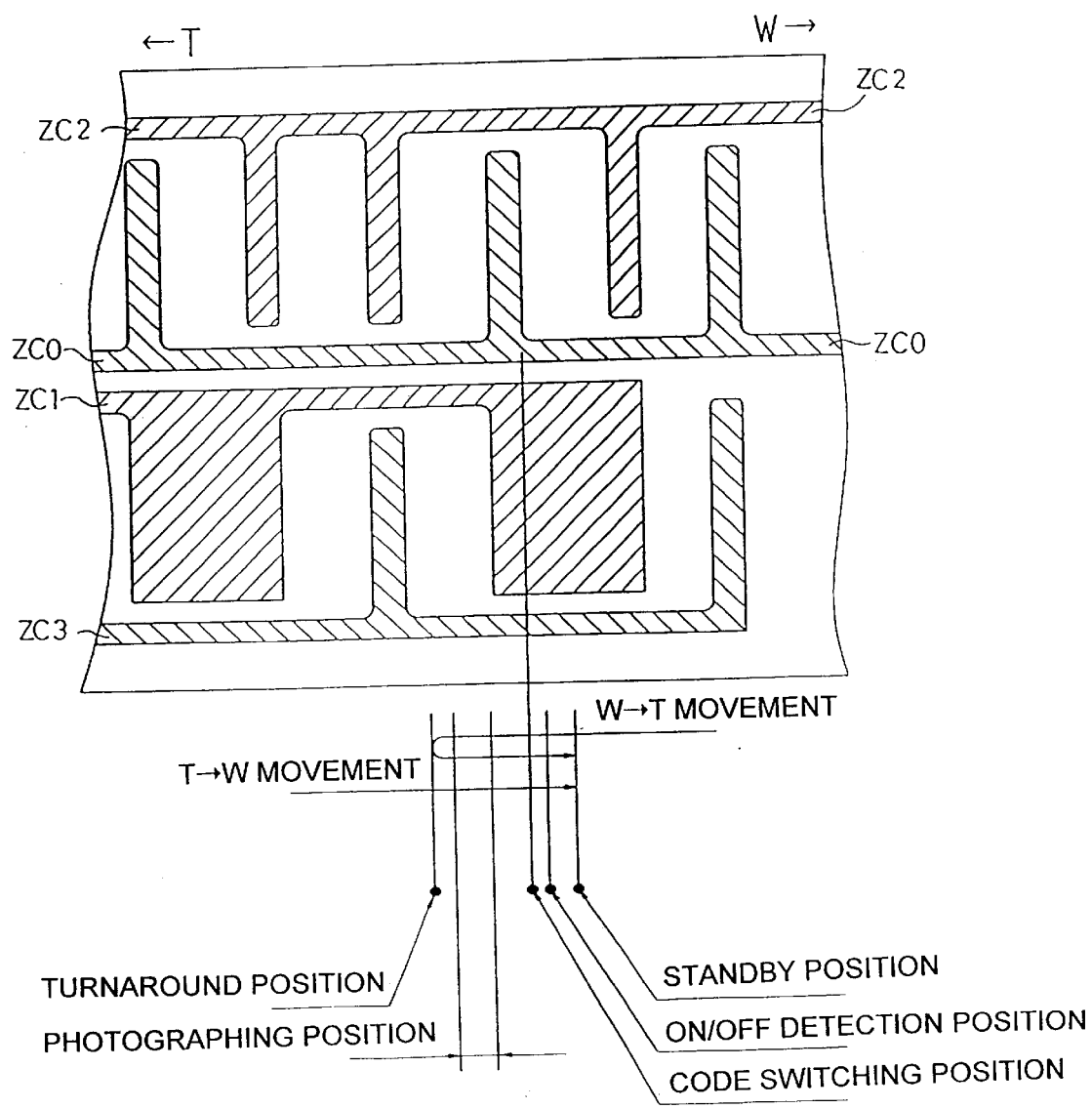
FIG. 101 is a developed view illustrating a relationship between zooming operations and the zoom codes in an embodiment of the present invention.

FIG. 101 illustrates the position of the lens with respect to the tip 9d of the brushes 9a. With reference to FIG. 101 and FIG. 100, the operations during zooming and during focusing of the present embodiment, will now be described.

In the present embodiment, during the photographing standby state where the power is ON, the front lens group L1 and the rear lens group L2 are stopped at the standby position located towards the housed position side of the switching position of the zoom code. For example, when the front and rear lens groups L1 and L2 stop after zooming from the "wide" position to the "tele" position, the whole unit driving motor 25 drives clockwise, and is then stopped after being driven further from the zoom code OFF/ON detecting position at which the brushes 9a contact the zoom code at the position at which the zoom code turns OFF (i.e., by a predetermined zoom pulse number ZP1). This lens position is the turnaround position. From the turnaround position, the whole unit driving motor 25 is driven counterclockwise. The the whole unit driving motor 25 is then driven counterclockwise by an amount corresponding to the value of the second zoom pulse ZP2, from the zoom code ON/OFF detecting position at which the brushes 9a contact and then separate from the zoom code, and the driving is then stopped. This lens position is the lens standby position.

During "tele" zooming, the respective mechanisms 341, 342, 343 and 345 operate in a condition where backlashes BL1 through BL4 have been eliminated by the adequate clockwise driving of the whole unit driving motor 25, and the front and rear lens groups L1 and L2 are moved to the turnaround position, while the variable magnification lens L5 is moved to the position corresponding to the turnaround position, as shown in FIG. 100(A). At this position, when the whole unit driving motor 25 rotates clockwise, the backlashes BL1 through BL4 that occur in the "tele" direction are eliminated.

When the whole unit driving motor 25 is rotated counterclockwise from this turnaround position, the front lens group L1 and the rear lens group L2 move to the standby position since the driving of the gear device 341, the zoom code detecting device 342, and the lens barrel extension device 343 by the amount corresponding to the backlashes BL1, BL2 and BL3 are completed at the initial stage of the counterclockwise driving of the whole unit driving motor 25. However, the backlash of the finder driving device 344, will not be eliminated during the counterclockwise driving of the whole unit driving motor 25. Therefore, at the lens standby position the variable magnification lens L5 will not have moved from the position corresponding to the turnaround position since the variable magnification lens L5 will not move until the whole unit driving motor 25 is rotated counterclockwise by an amount equal to or greater than the finder backlash BL4, as shown in FIG. 100(B). In the present embodiment, the amount of finder backlash BL4 is approximately equal to the amount of rotation by which the whole unit driving motor 25 rotates when the front lens group L1 and the rear lens group L2 are moved from the turnaround position to the standby position.

When the lens stops after zooming from the "tele" position to the "wide" position, the whole unit driving motor 25 is driven counterclockwise, and is then further driven counterclockwise by a predetermined zoom pulse number (ZP2) from the zoom code ON/OFF detecting position at which the brushes 9a contact and then separate from the zoom code, so that the front lens group L1 and the rear lens group L2 are moved to and stopped at the lens standby position, as shown in FIG. 100(B). This standby condition is the same as the standby condition in the tele-zooming process.

Through the above operations, when tele-zooming or wide-zooming is operated, the lens stops at the same lens standby position and under the same backlash conditions.

During photographing, the front lens group L1 and the rear lens group L2 are moved from the standby position in the "tele" direction according to the subject distance, as shown in FIG. 100(C), and after completion of photography, return to the standby position. The amount of movement is set with respect to the zoom code OFF/ON detecting position. In this case, the amount of movement of the front lens group L1 and the rear lens group L2 is an amount by which the turnaround position will not be passed. Therefore, even if the whole unit driving motor 25 moves by a predetermined amount during photography, the variable magnification lens L5 of the finder is prevented from moving due to the finder backlash BL4, and therefore the visual field of the finder remains stable.

As above described, in the present embodiment, during zooming, the whole unit driving motor 25 is driven to move the front lens group L1 and the rear lens group L2 as a whole, and during focusing, the whole unit driving motor 25 and the rear lens group driving motor 30 are driven to move the front lens group L1 and the rear lens group L2 to the focused position. Therefore during focusing, the front lens group L1 and the rear lens group L2 are surely moved to the focused position regardless of the backlashes, and further the zoom finder will not change in magnification.

In the present invention, as above described, a zoom lens having a front lens group and a rear lens group, a whole unit driving means to move the front lens group and the rear lens group as a whole, a rear lens group driving means to move the rear lens group with respect to the front lens group, a zoom finder, a finder interlocking means, which operates together with the rear lens group driving means to change the magnification of the zoom finder, and a controlling means to drive the whole unit driving means and the rear lens group driving means to set the focus in focusing process, are at least provided. Since the amount by which the controlling means drives the whole unit driving means in the focusing process is set to an amount which will not change the magnification of the zoom finder, the front lens group and the rear lens group will move accurately to the focused position while the zoom finder will not change in magnification in the focusing process to thereby enable accurate focusing and a finder field which is agreeable to the user.

The present invention is applicable to both conventional 35 mm cameras and to the recently introduced Advanced Photo System (i.e., APS) cameras.

Although in the above discussed embodiments of the present invention, the front lens group L1 and the rear lens group L2 are moved to the focus position when the shutter button is fully-depressed, the front lens group L1 and the rear lens group L2 could equally be moved to the focus position when the shutter button is half-depressed. With this arrangement, the release time lag can be reduced, while with the arrangement that the lens groups move when the shutter button is fully-depressed, use of the battery can be minimized.

Further, although the present invention has been specifically described with respect to the drawings attached hereto, and to the embodiments disclosed herein, such embodiments are to be considered illustrative only and not restrictive, and it is intended that various modifications and changes may be made without departing from the scope of the claims appended hereto.

What is claimed is:

1. A zoom lens camera, comprising:
   a zoom lens system having a front lens group and a rear lens group, arranged in this order from an object side;
   means for moving said zoom lens system in an optical axis direction without varying a distance between said front lens group and said rear lens group;
   means for relatively moving one of said front lens group and said rear lens group to vary said distance between said front lens group and said rear lens group;
   means for setting a focal length of said zoom lens system;
   means for performing a focusing operation; and
   means for controlling said focusing operation, said controlling means focusing an image of an object to be photographed by controlling said zoom lens system moving means and said relative moving means upon an operation of said performing means in accordance with a focal length set by said setting means.

2. The zoom lens camera according to claim 1, further comprising a zoom finder, said zoom finder varying a field of view in accordance with said focal length set by said setting means.

3. The zoom lens camera according to claim 1, said controlling means determining lens moving distance information to control said zoom lens system moving means and said relative moving means upon said operation of said performing means, said lens moving distance information being determined based on a first moving distance obtained in accordance with focal length information set by said setting means and second moving distance obtained in accordance with object distance information detected by said object distance detecting means.

4. The zoom lens camera according to claim 1, wherein said controlling means controls said zoom lens system moving means without controlling said relative moving means when said setting means is operated.

5. The zoom lens camera according to claim 1, wherein said controlling means controls both said zoom lens system moving means and said relative moving means when said setting means is; operated.

6. The zoom lens camera according to claim 1, said setting means sets a focal length from a wide end position to a. tele end position as one of a plurality of focal length steps, wherein said focal length varies stepwisely from said wide end. position to said tele end position.

7. The zoom lens camera according to claim 1, wherein said controlling means focuses said image of an object in accordance with a first mode in which focusing is performed by operation of said zoom lens system moving means without operating said relative moving means when said focal length is in a first portion of a focal length range, a second mode in which focusing is performed by operating both said zoom lens system moving means and said relative moving means when said focal length is in a second portion of said focal length range, and a third mode in which focusing is performed by operating said relative moving means without driving said zoom lens system moving means when said focal length is in a third portion of said focal length range.

8. The zoom lens camera according to claim 7, wherein a, relative position of said rear lens group with respect to a camera, body remains fixed when said controlling means operates in said. second mode.

9. The zoom lens camera according to claim 7, wherein said controlling means operates in said first mode when said focal length is set at a wide end position by said setting means.

10. The zoom lens camera according to claim 7, wherein said controlling means operates in said third mode when said focal length is set at a tele end position by said setting means.

11. The zoom lens camera according to claim 7, wherein said controlling means operates in said second mode when said focal length is set at an intermediate position other than a wide end position and a tele end position by said setting means.

12. The zoom lens camera according to claim 1, wherein said controlling means performs said focusing operation by driving both said zoom lens system moving means and said relative moving means during said focusing operation.

13. The zoom lens camera according to claim 12, wherein if said setting means is operated said controlling means drives said zoom lens system moving means to move said front lens group and said rear lens group to stop at one of a plurality of predetermined standby positions.

14. The zoom lens camera according to claim 12, wherein when said front lens group is moved to a predetermined focal length position, and when said rear lens group is moved to a position based on said distance determined by said detecting means and said focal length set by said setting means.

15. The zoom lens camera according to claim 12, further comprising:
   a photometering switch; and
   a release switch, wherein said controlling means controls said detecting means when said photometering switch is turned ON, and said controlling means controls both said zoom lens system moving means and said relative moving means when said release switch is turned ON.

16. The zoom lens camera according to claim 15, wherein when said release switch is turned ON, said front lens group is moved to a predetermined focal length position, and said rear lens group is moved to a position set in accordance with said distance detected by said detecting means and in accordance with said focal length.

17. The zoom lens camera according to claim 13, wherein said setting means comprises a tele switch and a wide switch to be turned ON or OFF operable by an external operation, and wherein said zoom lens system moving means moves said front lens group and said rear lens group in a direction in which a focal length is increased when said tele switch is turned ON, and said controlling means moves said front lens group and said rear lens group in EL direction in which said focal length is decreased when said wide switch is turned ON.

18. The zoom lens camera according to claim 12, wherein said relative moving means comprises means for moving a rear lens group to move said rear lens group relative to said front lens; group.

19. The zoom lens camera according to claim 18, wherein said front lens group is supported by a lens barrel mounted to a. camera body, said lens barrel being movable in said optical axis direction, and wherein said rear lens group moving means comprises, a rear lens group moving motor mounted to said lens barrel, said. rear lens group is supported to be movable by said lens barrel through said rear lens group moving motor, and said zoom lens system moving means comprises a zoom lens system moving motor mounted to said camera body to move said lens barrel.

20. A zoom lens camera, comprising:
   a lens system having a positive front lens group and a negative rear lens group, arranged in this order from an object side;
   means for moving said lens system, said lens system moving means moving said front lens group and said rear lens group in an optical axis direction without changing a distance between said front lens group and said rear lens group;
   means for relatively moving one of said front lens group and said rear lens group to vary said distance between said front lens group and said rear lens group;
   means for setting a focal length defined by said lens system;
   means for controlling at least said lens system moving means so that a focal point of said lens system varies in an optical axis direction of said optical zoom lens system when said setting means is operated; and
   means for focusing an image of an object to be photographed by operating both said lens system moving means and said relative moving means in accordance with a focal length set by the setting means.

21. The zoom lens camera according to claim 20, further comprising a zoom finder which varies a field of view in accordance with said focal length set by said setting means.

22. The zoom lens camera according to claim 20, further comprising means for determining object distance information related to a distance from said camera to an object to be photographed,
   wherein said controlling means controls said lens system moving means and said relative moving means in accordance with lens moving distance information provided by said determining means, said lens moving distance information being determined based on a first moving distance obtained in accordance with focal length information set by said setting means and a second moving distance obtained in accordance with said object distance information detected by said object distance determining means.

23. The zoom lens camera according to claim 22, further comprising:
   a photometering switch; and
   a release switch,
   wherein said determining means is actuated when said photometering switch is turned ON, and said focusing means operates both said lens system moving means and said relative moving means when said release switch is turned ON.

24. The zoom lens camera according to claim 23, wherein when said release switch is turned ON, said front lens group is moved to a predetermined focal length position, and said rear lens group is moved to a position set in accordance with said distance determined by said determining means and by said focal length.

25. The zoom lens camera according to claim 22, wherein said setting means comprises a tele switch and a wide switch to be turned ON or OFF operated by an external operation, and wherein said lens system moving means moves said front lens group and said rear lens group in a direction in which a focal length is increased when said tele switch is turned ON, and said moving means moves said front lens group and said rear lens group in a direction in which said focal length is decreased when said wide switch is turned ON.

26. The zoom lens camera according to claim 20, wherein said relative moving means comprises means for moving a rear lens group relative to said front lens group.

27. The zoom lens camera according to claim 26, further comprising a lens barrel mounted to a camera body, wherein said front lens group is supported by said lens barrel, said lens barrel being movable in said optical axis direction, and wherein said rear lens group moving means comprises a rear lens group moving motor mounted to said lens barrel, said rear lens group is supported to be movable by said lens barrel through said rear lens group moving motor, and said zoom lens system moving means comprises a zoom lens system moving motor mounted to said camera body to move said lens barrel.

28. A zoom lens camera including a zoom lens barrel having a movable front lens group and a movable rear lens group, comprising:
   means for focusing, said focusing means determining a distance to a subject to be photographed during a focusing operation:
   means for moving said front lens group and said rear lens group during a zooming operation, said moving means comprising means for relatively moving one of said front lens group and said rear lens group during aid focusing operation and
   means for controlling said moving means and said relative moving means
   wherein said control means controls said moving means during said zooming operation and controls said relative moving means during said focusing operation, and
   wherein said moving means moves said front lens group and said rear lens group at one of a plurality of predetermined rates in accordance with an amount by which said front lens group and said rear lens group are to be moved during said focusing operation.

29. The zoom lens camera according to claim 28, wherein said moving means comprises lens system moving means for moving both said front lens group and said rear lens group in an optical axis direction.

30. The zoom lens camera according to claim 29, wherein said relative moving means moves said rear lens group at one of a plurality of predetermined rates in accordance with an amount by which said rear lens group is to be moved during said focusing operation.

31. The zoom lens camera according to claim 29, controlling means controls said lens system moving means during said zooming operation and controls said lens system moving means and said relative moving means during said focusing operation.

32. The zoom lens camera according to claim 29, further comprising:
   means for driving said front lens group and said rear lens group to an in-focus position in accordance with said determined subject distance.

33. The zoom lens camera according to claim 32, wherein said driving means drives said lens system moving means and said relative moving means in accordance with said determined subject distance prior to an operation of said focusing operation.

34. The zoom lens camera according to claim 29, further comprising a lens barrel mounted to a camera body, wherein said front lens group is supported by said lens barrel, said lens barrel being movable in said optical axis direction, said relative moving means comprising a rear lens group moving motor mounted to said lens barrel, said rear lens group is supported to be movable by said lens barrel through said rear lens group moving motor, and said lens system moving means comprising a lens system moving motor mounted to said camera body to move said lens barrel.

35. The zoom lens camera according to claim 34, wherein if an amount by which said rear lens group moving motor is to be driven is more than a predetermined amount, said driving means drives said rear lens group moving motor at a high-speed until said amount corresponds to said predetermined amount, and if an amount by which said rear lens group moving motor is to be driven is less than a predetermined amount, said driving means drives said rear lens group moving motor at a low-speed.

36. The zoom lens camera according to claim 32, further comprising zoom operating means, wherein when said zoom operating means is operated, said driving means drives said lens system moving means to move said front lens group and said rear lens group to one of a plurality of predetermined standby positions.

37. The zoom lens camera according to claim 36, wherein said zoom operating means sets a focal length from a wide end position to a tele end position as a plurality of stepwisely varying focal lengths.

38. The zoom lens camera according to claim 29, wherein when said front lens group and said rear lens group are set to EL focal length greater than a predetermined focal length, said moving means maintains a position of said rear lens group at a rear lens group initial position proximate to said front lens group, and when said front lens group and said rear lens group are set to a focal length less than said predetermined focal length, said moving means; moves said rear lens group to a position further away from said front lens group than said rear lens group initial position.

39. The zoom lens camera according to claim 38, wherein when said front lens group and said rear lens group are moved by said moving means, said relative moving means moves said rear lens group in accordance with positions of said front and rear lens groups after said movement by said moving means.

40. A zoom lens camera having at least a movable front lens group and a movable rear lens group, comprising:
   whole unit moving means for moving said front lens group and said rear lens group in an optical axis direction;
   initial position detecting means for detecting whether said rear lens group is positioned at an initial position;
   rear lens group moving means for moving said rear lens group towards or away from said front lens group; and
   driving control means for controlling driving said rear lens group moving means to move said rear lens group to said initial position.

41. The zoom lens camera according to claim 40, wherein said whole unit moving means moves said front lens group and said rear lens group to one of a housed position, a photographing standby position extended from said housed position in said optical axis direction, and one of a plurality of zoom positions extended from said photographing standby position in said optical axis direction.

42. The zoom lens camera according to claim 41, wherein said control means drives said whole unit moving means to move said front lens group and said rear lens group from said housed position to said photographing standby position, and wherein said control means drives said rear lens group moving means to move said rear lens group to said initial position after said whole unit moving means moves said front lens group and said rear lens group from said housed position, but before said front lens group and said rear lens group are moved from said photographing standby position to said one of said plurality of zoom positions.

43. The zoom lens camera according to claim 41, wherein said initial position of said rear lens group is a position closest to said front lens group.

44. The zoom lens camera according to claim 41, wherein said initial position of said rear lens group is an in-focus position of a subject located at infinity.

45. The zoom lens camera according to claim 41, said initial position is a position of said rear lens group when said front lens group and said rear lens group are at a furthest extended position in said optical axis direction.

46. The zoom lens camera according to claim 40, further comprising a lens barrel mounted to a camera body, wherein said front lens group is supported by said lens barrel, said lens barrel moving forwardly and rearwardly in an optical axis direction, and wherein said rear lens group moving means comprises a rear lens group moving motor mounted to said lens barrel, and wherein said rear lens group is supported to be movable by said lens barrel through said rear lens group moving motor, and wherein said whole unit moving means comprises a whole unit moving motor mounted to said camera body to move said lens barrel.

47. The zoom lens camera according to claim 40, wherein said rear lens group moving means moves said rear lens group away from said front lens group during a release operation, and said rear lens group moving means returns said rear lens group to said initial position after completion of said release operation.

48. A zoom lens camera having a movable front lens group and a movable rear lens group, comprising:
   whole unit moving means for moving said front lens group and said rear lens group in an optical axis direction;
   relative moving means for moving one of said front lens group and said rear lens group; and
   control means for controlling said zoom lens camera,
   wherein during a zooming operation said whole unit moving means is controlled by said control means, and during a focus adjusting operation said whole unit moving means is controlled by said control means to move said front lens group and said rear lens group from an initial position to a predetermined position, said, control means also controlling said relative moving means to move said front lens group and said rear lens group to an in-focus position, and
   wherein after completion of a release operation and said front lens group and said rear lens group have been moved to said infocus position, said control means controls said whole unit moving means and said relative moving means to move said front lens group and said rear lens group to said initial position.

49. The zoom lens camera according to claim 48, wherein if a driving amount during said focus adjusting operation of said whole unit moving means to bring a subject to be photographed into focus is less than a predetermined amount, said control means controls a driving of said whole unit moving means by a first amount corresponding to a difference between said predetermined amount and said driving amount, and said control means further controls said driving of said whole unit moving means by a second amount until said front lens group and said rear lens group are returned to said initial position after said focus adjusting operation.

50. The zoom lens camera according to claim 48, further comprising lens position detecting means for detecting a position of said front lens group and said rear lens group using said front lens group as a point of reference, said lens position detecting means comprising detective portions and non-detective portions positioned alternately along a direction in which said front lens groups and said rear lens group move, wherein when said whole unit moving means is driven in a first. direction, said control means further drives said whole unit moving means in said first direction by an amount corresponding to a first: predetermined driving amount, after said lens position detecting means detects a movement of said front lens group and said rear lens group to a lens detected position corresponding to movement from a non-detective portion to a detective portion, and wherein said control means further drives said whole unit moving means in a direction opposite said first direction by an amount corresponding to a second predetermined driving amount after said detecting means detects a movement of said front lens group and said rear lens group from a detective portion to a non-detective portion, and, after said whole unit moving means is driven by said second predetermined amount, said whole unit moving means is stopped.

51. The zoom lens camera according to claim 50, further comprising release operating means for initiating an exposure operation, wherein when said release operating means is operated, said control means drives said whole unit moving means to move said front lens group and said rear lens group to an in-focus position.

52. The zoom lens camera according to claim 50, wherein, after said whole unit moving means is driven by said second predetermined driving amount, said control means further drives said whole unit moving means in said opposite direction by a third predetermined driving amount.

53. The zoom lens camera according to claim 52, wherein said third predetermined driving amount is less than a corresponding amount of backlash occurring when said whole unit moving means switches a driving direction.

54. The zoom lens camera according to claim 48, wherein during said focus adjusting operation, said control means performs said focus adjusting operation by driving said whole unit moving means in a direction such that said front lens group and said rear lens group are moved outwardly with respect to a camera body.

55. The zoom lens camera according to claim 48, further comprising a lens barrel mounted to a camera body, wherein said front lens group is supported by said lens barrel, said lens barrel being movable forwardly and rearwardly in said optical axis direction, and further wherein said relative moving means comprises a rear lens group moving motor mounted to said lens barrel, said rear lens group being supported to be movable by said lens barrel through said rear lens group moving motor, and further wherein said whole unit moving means comprises a whole unit moving motor mounted to said camera body to move said lens barrel.

56. The zoom lens camera according to claim 55, wherein during said focus adjusting operation, said control means drives said rear lens group moving motor to perform said focus adjusting operation.

57. The zoom lens camera according to claim 48, further comprising zoom operating means for setting a focal length, wherein when said zoom operating means is operated, said control means drives said whole unit moving means to move said front lens group and said rear lens group to one of a plurality of predetermined standby positions.

58. The zoom lens camera according to claim 48, wherein said relative moving means comprises a rear lens group moving means to move said rear lens group with respect to said front lens group.

59. The zoom lens camera according to claim 48, wherein during said focus adjusting operation, said control means drives said whole unit moving means to move said front lens group and said rear lens group forwardly with respect to a camera body to a first predetermined position, and said control means driving said relative moving means to move said rear lens group rewardly with respect to said camera body away from said front lens group, wherein when said front lens group and said rear lens group are positioned at a position withdrawn further into said camera body than said first predetermined position, said control means drives said whole unit moving means to move said front lens group and said rear lens group forwardly, and thereafter, drives said relative moving means to move said rear lens group rearwardly.

60. The zoom lens camera according to claim 50, wherein if said whole unit moving means is to be driven in said opposite direction, said control means drives said whole unit moving means in said first direction to detect a position identical to said lens detected position, and after detection of said lens detected position, said control means drives said whole unit moving means in said opposite direction.

61. The zoom lens camera according to claim 50, wherein during driving of said whole unit moving means, if said lens detected position is detected by said lens position detecting means, said control means controls an amount of driving using said lens detected position as a reference.

62. The zoom lens camera according to claim 50, wherein said detective portions of said lens position detecting means are positioned such that a plurality of detecting portions are positioned in series in a predetermined order.

63. The zoom lens camera according to claim 50, further comprising whole unit moving means moving amount detecting means to detect a driving amount of said whole unit moving means.

64. A zoom lens camera having a movable front lens group and a movable rear lens group, comprising:

whole unit moving means for moving said front lens group and said rear lens group in an optical axis direction;

rear lens group moving means for moving said rear lens group relative to said front lens group;

lens position detecting means for detecting positions of said front lens group and said rear lens group, using said front lens group as a reference;

storing means for storing lens positions detected by said lens position detecting means; and control means for driving said whole unit moving means and said rear lens group moving means to move said front lens group and said rear lens group, wherein before an exposure operation said control means drives; said whole unit moving means to detect positions of said front and rear lens groups using said lens position detecting means until detected lens position is equivalent to a stored lens position stored by said storing means.

65. The zoom lens camera according to claim 64, wherein said lens position detecting means detects positions of said front: lens group and said rear lens using said detecting means, said detecting means comprising detective portions and non-detective portions positioned alternately along a direction in which said front and rear lens groups move, and further wherein when said whole unit moving means is driven, said control means stops said front lens group and said rear lens group at a non-detective portion away from a boundary of a respective detective portion by a predetermined amount.

66. The zoom lens camera according to claim 65, wherein before said exposure operation, said lens position detecting means detects whether said control means has driven said whole unit moving means to move said front lens group and said rear lens group to said detective portion, and upon detection, said control means drives said whole unit moving means to move said front lens group and said rear lens group to said non-detective portion.

67. The zoom lens camera according to claim 66, further comprising:

a photometering switch; and a release switch operated through external operations, wherein if said photometering switch is turned ON, said control means drives said whole unit moving means to detect lens positions stored by said storing means.

68. The zoom lens camera according to claim 67, wherein when a lens position stored by said storing means is not detected after said control means has driven said whole unit moving means to detect lens positions, an exposure operation is not performed.

69. A zoom lens camera having lens groups being movable forwardly and rearwardly in an optical axis direction, comprising:

means for moving said lens groups; and means for driving said moving means, wherein if said lens groups are to be driven in a first direction, said driving means drives said lens groups in a reverse direction of said first direction, and thereafter, said driving means drives said lens groups in said first direction.

70. The zoom lens camera according to claim 69, said lens groups comprising a front lens group and a rear lens group, a n d wherein said lens moving means comprises whole unit moving means for moving said front lens group and rear lens group in said optical axis direction, and rear lens group moving means to move said rear lens group.

71. The zoom lens camera according to claim 70, further comprising detecting means for detecting whether said rear lens group moving means is operated, wherein if said detecting means does not detect that said rear lens group moving means is operated when said rear lens group moving means is driven in said reverse direction, said control means drives said rear lens group moving means in said first direction by a predetermined amount or a predetermined time, to detect whether said rear lens group moving means is operated.

72. The zoom lens camera according to claim 71, wherein said control means repeats a process of driving said rear lens group moving means in said reverse direction a predetermined number of times if said detecting means does not detect that said rear lens group moving means is operated, or until said detecting means detects that said rear lens group moving means is operated.

73. The zoom lens camera according to claim 70, wherein said whole unit moving means moves said front lens group and said rear lens group to one of a housed position, a photographing standby position extended from said housed position, and a zoom portion extended from said photographing standby position, and further wherein when said whole unit moving means is driven to move said front lens group and said rear lens group to said housed position, said control means drives said whole unit moving means firstly in a direction opposite to said housed position by a predetermined amount or for a predetermined time, and secondly in a direction of said housed position.

74. The zoom lens camera according to claim 70, further comprising a lens barrel, wherein said front lens group is supported by said lens barrel mounted to a camera body, said lens barrel being movable in said optical axis direction, and further wherein said rear lens group moving means comprises a rear lens group moving motor mounted to said lens barrel, said rear lens group is supported to be movable by said lens barrel through said rear lens group moving motor, and further wherein said whole unit moving means comprises a whole unit moving motor mounted to said camera body to move said lens barrel.

75. The zoom lens camera according to claim 74, further comprising:

a lens barrier apparatus, said lens barrier apparatus position at a front portion of said lens barrel;

a rear lens group gear mechanism for moving said rear lens group; and a switching gear selectively transmitting a rotation of said rear lens group moving motor to said lens barrier apparatus and said rear lens group gear mechanism, wherein said rear lens group gear mechanism is switched to be connected to said lens barrier apparatus when said lens barrel moves to a housed position, and said lens barrier apparatus is switched to be connected to said rear lens group gear mechanism when said lens barrel is extended from said housed position.

76. The zoom lens camera according to claim 75, further comprising: zoom operating means; and release operating means, wherein when said zoom operating means is operated, said control means drives said whole unit moving means to move said front lens group and said rear lens group to one of a plurality of predetermined standby positions, and wherein when said release operating means is operated said control means drives said whole unit moving means to move said front lens group and said rear lens group forwardly from said one standby position, and drives said, rear lens group moving means to move said rear lens group rearwardly.

77. A zoom lens camera having a movable front lens group and a movable rear lens group, comprising:

whole unit moving means for moving said front lens group and said rear lens group in an optical axis direction;

relative moving means for moving one of said front lens group and said rear lens group to vary a distance between said front lens group and said rear lens group;

a zoom finder;

finder interlocking means for varying a magnification of said zoom finder in synchronization with said whole unit moving means; and control means for driving said whole unit moving means and said relative moving means during a focus adjusting operation to bring an image of an object to be photographed into focus, wherein an amount by which said whole unit moving means in driven during said focus adjusting operation is an amount such that a magnification of said zoom finder through said finder interlocking means is not varied.

78. The zoom lens camera according to claim 77, further comprising zoom operating means, wherein when said zoom operating means is operated, said whole unit moving means is driven.

79. The zoom lens camera according to claim 78, wherein during said focus adjusting operation, said control means drives said whole unit moving means in a reverse direction of a driving direction of said whole unit moving means by a predetermined amount before said whole unit moving means is stopped.

80. The zoom lens camera according to claim 78, said zoom operating means setting a focal length from a wide end position to a tele end position as a plurality of stepwisely varying focal lengths.

81. The zoom lens camera according to claim 77, wherein backlash of said finder interlocking means is not less than a maximum amount of driving of said whole unit moving means during said focus adjusting.

82. A zoom lens camera having at least a movable front lens group and a movable rear lens group, comprising:

whole unit moving means for moving said front lens group and said rear lens group in an optical axis direction;

a zoom finder having a variable magnification in synchronization with said whole unit moving means; and control means for control said zoom lens camera, wherein during a zooming operation, said control means drives said whole unit moving means to move said front lens group and said rear lens group to stop at one of a plurality of standby positions, and wherein during a focus adjusting operation, said control means drives said whole unit moving means by a predetermined amount to move said front lens group and said rear lens group to an in-focus position, and thereafter drives said whole unit moving means to return said front lens group and said rear lens group to said one standby position, and wherein a predetermined amount by which said whole unit moving means is driven during said focus adjusting operation is an amount so as not to vary a magnification of said zoom finder.

83. The zoom lens camera according to claim 82, further comprising lens position detecting means for detecting positions of said front lens group and said rear lens group using said front lens group as a reference, said detecting means comprising detective portions and non-detective portions positioned alternately along a direction in which said front and rear lens groups move, wherein when said whole unit moving means is driven in a driving direction to said one standby position, said control means drives said whole unit moving means in a same direction to said driving direction by an amount corresponding to a second predetermined driving amount after said detecting means detects; that said front lens group and said rear lens group have moved froze a detective portion to a non-detective portion, before said whole unit moving means is stopped.

84. The zoom lens camera according to claim 83, wherein when said whole unit moving means is driven in a forward direction with respect to a camera body, said control means further drives said whole unit moving means in said forward direction by a first predetermined driving amount after said lens position detecting means detects that said front lens group and said rear lens group have moved from a non-detective portion to a detective portion, thereafter, said control means further drives said whole unit moving means in a rearward direction with respect to said camera body by said second predetermined driving amount after said detecting means detects that said front lens group and said rear lens group have moved from a detective portion to a non-detective portion, and thereafter, stopping said whole unit moving means.

85. The zoom lens camera according to claim 83, wherein when said whole unit moving means is driven in a rearward direction with respect to a camera body, said control means drives said whole unit moving means in said rearward direction by said second predetermined driving amount after said front lens group is detected to have moved from a detective portion to a non-detective portion, and thereafter, stopping said whole unit moving means.

86. The zoom lens camera according to claim 85, wherein during a focus adjusting operation, said control means drives said whole unit moving means in a forward direction opposite said rearward direction by a first predetermined driving amount after said lens position detecting means detects that said front lens group and said rear lens group have moved to said detective portion, thereafter, said control means further drives said whole unit moving means in said rearward direction by said second predetermined driving amount after said detecting means detects that said front lens group and said rear lens group have moved from a detective portion to a non-detective portion, and thereafter, stopping said whole unit moving means.

87. The zoom lens camera according to claim 83, wherein after said whole unit moving means is driven by said second predetermined driving amount, said control means further drives said whole unit moving means in an opposite direction of said driving direction by a third predetermined driving amount.

88. The zoom lens camera according to claim 87, wherein said third predetermined driving amount is not more than a corresponding amount of backlash between said whole unit moving means and said front lens group and a corresponding amount of backlash between said whole unit moving means and said rear lens group.

89. The zoom lens camera according to claim 84 further comprising a zoom finder having a variable magnification set in synchronization with said whole unit moving means, wherein said zoom finder has a backlash approximately equal to a sum amount of said first predetermined driving amount and said second predetermined driving amount.

90. The zoom lens camera according to claim 89, wherein when said whole unit moving means drives said front lens group and said rear lens group forwardly from a stopped position, a magnification of said zoom finder is varied until said whole unit moving means is driven by said first predetermined driving amount, and wherein when said whole unit moving means drives said front lens group and said rear lens group rearwardly from a stopped position, said variable magnification is varied after said whole unit moving means is driven by a third predetermined driving amount.

91. A zoom lens camera, comprising:

a zoom lens barrel;

a photographing optical system having a front lens group and a rear lens group;

an object distance measuring device;

a photographing optical system driving motor, said photographing optical system driving motor driving said front lens group and said rear lens group along an optical axis direction;

a zoom operating device for setting a focal length of said photographing optical system;

a rear lens group driving motor, said rear lens group driving motor driving said rear lens group in said optical axis direction relative to said front lens group; and a controller electrically connected to said object distance measuring device. said zoom operating device, said photographing optical system driving motor and said rear lens group driving motor.

92. The zoom lens camera according to claim 91, further comprising a zoom finder, said zoom finder varying a field of view in accordance with said focal length set by said zoom operating device.

93. The zoom lens camera according to claim 91, said controller determining lens moving distance information to control said photographing optical system driving motor and said rear lens group driving motor upon said actuation of a release switch, said lens moving distance information being determined based on a first moving distance obtained in accordance with focal length information set by said zoom operating device and a second moving distance obtained in accordance with object distance information determined by said object distance measuring device.

94. The zoom lens camera according to claim 91, wherein said controller controls only said photographing optical system driving motor when said zoom operating device is operated.

95. The zoom lens camera according to claim 91, wherein said controller controls both said photographing optical system driving motor and said rear lens group driving motor when said zoom operating device is operated.

96. The zoom lens camera according to claim 91, wherein said zoom operating device sets a focal length from a wide end position to a tele end position as one of a plurality of focal length steps, the focal length stepwisely varying from said wide end position to said tele end position.

97. The zoom lens camera according to claim 91, wherein said controller focuses said object in accordance with a first mode wherein focusing is performed by driving said photographing optical system driving motor without driving said rear lens group driving motor when said focal length is in a first portion of a focal length range, a second mode to perform focusing by controlling both said photographing optical system driving motor and said rear lens group driving motor when said focal length is in a second portion of said focal length range, and a third mode to perform focusing by driving said rear lens group driving motor without driving said photographing optical system driving motor when said focal length is in a third portion of said focal length range.

98. The zoom lens camera according to claim 97, wherein a relative position of said rear lens group remains fixed with respect to a camera body when said controller operates in said second mode.

99. The zoom lens camera according to claim 97, wherein said controller operates in said first mode when said focal length is set at a wide end position by said zoom operating device.

100. The zoom lens camera according to claim 97, wherein said controller operates in said third mode when said focal length is set at a tele end position by said zoom operating device.

101. The zoom lens camera according to claim 97, wherein said controller operates in said second mode when said focal length is set at an intermediate position other than a wide end position and a tele end position by said zoom operating device.

102. The zoom lens camera according to claim 91, wherein said controller performs said focus operation by driving both said photographing optical system driving motor and said rear lens group driving motor during said focus adjusting operation.

103. The zoom lens camera according to claim 102, wherein while said zoom operating device is operated said controller drives said photographing optical system driving motor to move said front lens group and said rear lens group to stop at one of a plurality of predetermined standby positions.

104. The zoom lens camera according to claim 102, wherein said controller controls said photographing optical system driving motor and said rear lens group driving motor in parallel when said actuating means is turned ON, and wherein said front lens group is moved to a predetermined focal length position, and said rear lens group is moved to a position based on a subject distance determined by said object distance measuring device and said focal length set by said zoom operating device.

105. The zoom lens camera according to claim 102, further comprising:
a photometering switch; and
a release switch,
wherein said controller controls said object distance measuring device when said photometering switch is turned ON, and said controller controls said photographing optical system driving motor and said rear lens group driving motor in parallel when said release switch is turned ON.

106. The zoom lens camera according to claim 102, wherein said front lens group is moved to a predetermined focal length position, and said rear lens group is moved to a position set in accordance with a subject distance detected by said detecting means and said focal length when said release switch is turned ON.

107. The zoom lens camera according to claim 103, wherein said zoom operating device comprises a tele switch and a wide switch operated through an external operation to be turned ON or OFF, and wherein said photographing optical system driving motor moves said front lens group and said rear lens group in a direction in which a focal length is increased when said tele switch is turned ON, and said controller moves said front lens group and said rear lens group in a direction in which said focal length is decreased when said wide switch is turned ON.

108. The zoom lens camera according to claim 91, wherein said front lens group is supported by said zoom lens barrel, said zoom lens barrel mounted to a camera body and being movable in said optical axis direction, and wherein said rear lens group driving motor is mounted to said zoom lens barrel, said rear lens group is supported to be movable by said zoom lens barrel through said real lens group driving motor, and said photographing optical system driving motor being mounted to said camera body to move said zoom lens barrel.

109. The zoom lens camera according to claim 108, said zoom lens barrel comprising a first movable barrel, a second movable barrel and a third movable barrel arrange concentrically about the optical axis, wherein said front lens group is supported by said first movable barrel, and wherein said third lens barrel supported by said camera body.

110. The zoom lens camera according to claim 109, said zoom lens barrel further comprising a linear guide barrel and a linear guide member, wherein when said zoom operating device is operated, said zoom lens barrel is extended or retracted in accordance with said operation of said zoom operating device.

111. The zoom lens camera according to claim 110, wherein said third movable barrel engages said linear guide barrel, said linear guide barrel engages said second movable barrel, said second movable barrel engages said linear guide member, and said linear guide member engages said first movable barrel to extend or retract said zoom lens barrel.

112. The zoom lens camera according to claim 92, wherein a magnification of said zoom finder is varied in synchronization with a driving of said photographing optical system driving motor.

113. The zoom lens camera according to claim 112, wherein said photographing optical system driving motor is driven during a focus adjusting operation such that a magnification of said zoom finder through said zoom finder is not varied.

114. A method of controlling a zoom lens camera, said zoom lens camera comprising an zoom lens system having at least a front lens group and a rear lens group arranged in this order from an object side, a lens system moving motor for moving said zoom lens system without varying a distance between said front lens group and said rear lens group, a relative lens group moving motor for moving one of said front lens group and said rear lens group relatively to vary said distance between said front lens group and said rear lens group, a zoom operating device for setting focal length of said optical zoom lens system, a focus operating device for performing a focusing operation, and a controller, said method comprising the steps of:

setting a focal length of said zoom lens;

commencing a focusing operation; and focusing an image of an object to be photographed by operating said zoom lens moving motor and operating said relative lens moving motor.

115. The method according to claim 114, wherein said step of focusing an image comprises the step of determining displacement amounts of said lens system moving motor and said relative lens group moving motor upon said operation of said focus operating device in the form of composite information based on a displacement amount obtained only by focal length information and a displacement amount obtained by object distance information.

116. The method according to claim 114, wherein in said step of setting a focal length of said zoom lens, only said lens system moving motor is actuated when said zoom operating means is operated.

117. The method according to claim 114, wherein in said step of setting a focal length of said zoom lens comprises the step of moving both said lens system moving motor and said relative lens group moving motor when said zoom operating device is operated.

118. A method of controlling a zoom lens camera, said camera comprising an optical zoom lens system having at least a front lens group and a rear lens group, arranged in this order from an object side, a lens system moving motor to move said optical zoom lens system without changing a distance between said front lens group and said rear lens group, a rear lens group moving motor to move said rear lens group relatively to vary said distance between said front lens group and said rear lens group, and a zoom operating device to set a focal length of said optical zoom lens system, said method comprising the steps of:

operating at least said lens system moving motor so that a focal point of said optical zoom lens system varies in an optical axis direction of said optical zoom lens system when said zoom operating means is operated; and operating both said lens system moving motor and said rear lens group moving motor to focus an image of an object to be photographed.

119. A method of controlling a zoom lens camera, said camera comprising a positive front lens group and a negative rear lens group arranged in this order from an object side, a lens system moving motor to move said front lens group and said rear lens group in an optical axis direction without changing a distance between said front lens group and said rear lens group, a rear lens group moving motor to move said rear lens group relatively to vary said distance between said front lens group and said rear lens group, a zoom operating device to set a focal length of an optical zoom lens system consisting of said front lens group and said rear lens group, and a focus operating device for performing a focusing operation, said method comprising the steps of:

setting a focal length of said zoom lens;

commencing a focusing operation; and focusing an image of an object to be photographed by operating both said lens system moving motor and said rear lens group moving motor upon operation of said focus operating device in accordance with a focal length set by said zoom operating device.

120. A method of controlling a zoom lens camera, said camera comprising a positive front lens group and a negative rear lens group arranged in this order from an object side, a lens system moving motor to move said front lens group and said rear lens group in an optical axis direction without changing a distance between said front lens group and said rear lens group, a rear lens group moving motor to move said front lens group and said rear lens group relatively to vary said distance between said front lens group and said rear lens group, and a zoom operating device to set a focal length of an optical zoom lens system consisting of said front lens group and said rear lens group, said method comprising the steps of:

operating at least said lens system moving motor so that a focal point of said optical zoom lens system varies in an optical axis direction of said optical zoom lens system when said zoom operating device is operated; and operating both said lens system moving motor and said rear lens group moving motor in accordance with a focal length set by said zoom operating device to focus an image of an object to be photographed.

121. A zoom lens camera having a movable front lens group and a movable rear lens group, comprising:

a whole unit moving motor which moves said front lens group and said rear lens group in an optical axis direction;

a relative moving motor which moves one of said front lens group and said rear lens group; and a controller which controls said zoom lens camera, wherein, during a zooming operation said whole unit moving motor is controlled by said controller, and during a focus adjusting operation said whole unit moving motor is controlled by said controller to move said front lens group and said rear lens group from an initial position to a predetermined position, said controller also controlling said relative moving motor to move said front lens group and said rear lens group to an in-focus position, and wherein, after completion of a release operation and movement of said front lens group and said rear lens group to said in-focus position, said controller controls said whole unit moving motor and said relative moving motor to move said front lens group and said rear lens group to said initial position.

122. The zoom lens camera according to claim 121, wherein if a driving amount during said focus adjusting operation of said whole unit moving motor to bring a subject to be photographed into focus is less than a predetermined amount, said controller controls a driving of said whole unit moving motor by a first amount corresponding to a difference between said predetermined amount and said driving amount, and said controller further controls said driving of said whole unit moving motor by a second amount until said front lens group and said rear lens group are returned to said initial position after said focus adjusting operation.

123. The zoom lens camera according to claim 121, further comprising a lens position detecting device which detects a position of said front lens group and said rear lens group using said front lens group as a point of reference, said lens position detecting device comprising detecting portions and non-detecting portions positioned alternately along a direction in which said front lens groups and said rear lens group move,
- wherein, when said whole unit moving motor is driven in a first direction, said controller further drives said whole unit moving motor in said first direction by an amount corresponding to a first predetermined driving amount, after said lens position detecting device detects a movement of said front lens group and said rear lens group to a lens detected position corresponding to movement from a non-detective portion to a detective portion, and
- wherein said controller further drives said whole unit moving motor in a direction opposite said first direction by an amount corresponding to a second predetermined driving amount after said lens position detecting device detects a movement of said front lens group and said rear lens group from a detective portion to a non-detective portion, and, after said whole unit moving motor is driven by said second predetermined amount, said whole unit moving motor is stopped.

124. The zoom lens camera according to claim 123, further comprising a release operating switch which initiates an exposure operation, wherein, when said release operating switch is operated, said controller drives said whole unit moving motor to move said front lens group and said rear lens group to an in-focus position.

125. The zoom lens camera according to claim 123, wherein after said whole unit moving motor is driven by said second predetermined driving amount, said controller further drives said whole unit moving motor in said opposite direction by a third predetermined driving amount.

126. The zoom lens camera according to claim 125, wherein said third predetermined driving amount is less than a corresponding amount of backlash occurring when said whole unit moving motor switches a driving direction.

127. The zoom lens camera according to claim 121, wherein during said focus adjusting operation, said controller performs said focus adjusting operation by driving said whole unit moving motor in a direction such that said front lens group and said rear lens group are moved outwardly with respect to a camera body.

128. The zoom lens camera according to claim 121, further comprising a lens barrel mounted to a camera body, wherein said front lens group is supported by said lens barrel, said lens barrel is movable forwardly and rearwardly in said optical axis direction, said relative moving motor is mounted to said lens barrel, said rear lens group is supported to be movable by said lens barrel through said relative moving motor, and said whole unit moving motor is mounted to said camera body to move said lens barrel.

129. The zoom lens camera according to claim 128, wherein during said focus adjusting operation, said controller drives said relative moving motor to perform said focus adjusting operation.

130. The zoom lens camera according to claim 121, further comprising a zoom operating switch that sets a focal length, wherein, when said zoom operating switch is operated, said controller drives said whole unit moving motor to move said front lens group and said rear lens group to one of a plurality of predetermined standby positions.

131. The zoom lens camera according to claim 121, wherein said relative moving motor moves said rear lens group with respect to said front lens group.

132. The zoom lens camera according to claim 121, wherein during said focus adjusting operation, said controller drives said whole unit moving motor to move said front lens group and said rear lens group forwardly with respect to a camera body to a first predetermined position, and said controller drives said relative moving motor to move said rear lens group rewardly with respect to said camera body away from said front lens group,
- wherein when said front lens group and said rear lens group are positioned at a position withdrawn further into said camera body than said first predetermined position, said controller drives said whole unit moving motor to move said front lens group and said rear lens group forwardly, and thereafter, drives said relative moving motor to move said rear lens group rearwardly.

133. The zoom lens camera according to claim 123, wherein if said whole unit moving motor is to be driven in said opposite direction, said controller drives said whole unit moving motor in said first direction to detect a position identical to said lens detected position, and after detection of said lens detected position, said controller drives said whole unit moving motor in said opposite direction.

134. The zoom lens camera according to claim 123, wherein during driving of said whole unit moving motor, if said lens detected position is detected by said lens position detecting device, said controller controls an amount of driving using said lens detected position as a reference.

135. The zoom lens camera according to claim 123, wherein said detecting portions of said lens position detecting device are positioned such that a plurality of detecting portions are positioned in series in a predetermined order.

136. The zoom lens camera according to claim 123, further comprising whole unit moving motor moving amount detecting device to detect a driving amount of said whole unit moving motor.

137. A zoom lens camera having a movable front lens group and a movable rear lens group, comprising:
- a whole unit moving motor which moves said front lens group and said rear lens group in an optical axis direction;
- a relative moving motor which moves one of said front lens group and said rear lens group to vary a distance between said front lens group and said rear lens group;
- a zoom finder;
- a finder interlocking device which varies a magnification of said zoom finder in synchronization with said whole unit moving motor; and
- a controller which controls driving of said whole unit moving motor and said relative moving motor during a focus adjusting operation to bring an image of an object to be photographed into focus,
- wherein an amount by which said whole unit moving motor is driven during said focus adjusting operation is an amount such that a magnification of said zoom finder through said finder interlocking device is not varied.

138. The zoom lens camera according to claim 137, further comprising a zoom operating switch, wherein when said zoom operating switch is operated, said whole unit moving motor is driven.

139. The zoom lens camera according to claim 138, wherein during said focus adjusting operation, said controller drives said whole unit moving motor in a direction opposite to a driving direction of said whole unit moving motor by a predetermined amount before said whole unit moving motor is stopped.

140. The zoom lens camera according to claim 138, said zoom operating switch setting a focal length from a wide end position to a tele end position as a plurality of stepwisely varying focal lengths.

141. The zoom lens camera according to claim 137, wherein backlash of said finder interlocking device is not less than a maximum amount of driving of said whole unit moving motor during said focus adjusting.

142. A zoom lens camera having a movable front lens group and a movable rear lens group, comprising:

an object distance detecting device which detects a distance to an object to be photographed during a focusing operation;

a moving motor system which moves said front lens group and said rear lens group during a zooming operation, said moving motor system comprising a relative moving motor which moves one of said front lens group and said rear lens group during a focusing operation;

a controller which controls said moving motor system and said relative moving motor;

wherein said controller controls said moving motor system during said zooming operation and controls said relative moving motor during said focusing operation, and wherein said moving motor system moves said front lens group and said rear lens group at one of a plurality of predetermined rates in accordance with an amount by which said front lens group and said rear lens group are to be moved during said focusing operation.

143. The zoom lens camera according to claim 142, wherein said moving motor system comprises a lens system whole unit motor for moving both said front lens group and said rear lens group in an optical axis direction.

144. The zoom lens camera according to claim 143, wherein said relative moving motor moves said rear lens group at one of a plurality of predetermined rates in accordance with an amount by which said rear lens group is to be moved during said focusing operation.

145. The zoom lens camera according to claim 143, wherein said controller controls said lens system whole unit motor during said zooming operation and controls said relative moving motor during said focusing operation.

146. The zoom lens camera according to claim 143, wherein said controller drives said front lens group and said rear lens group to an in-focus position in accordance with said detected subject distance.

147. The zoom lens camera according to claim 146, wherein said controller drives said lens system whole unit motor and said relative moving motor in accordance with said detected subject distance prior to an operation of said focusing operation.

148. The zoom lens camera according to claim 143, further comprising a lens barrel mounted to a camera body, wherein said front lens group is supported by said lens barrel, said lens barrel being movable in said optical axis direction, said relative moving motor mounted to said lens barrel and said rear lens group is supported to be movable by said lens barrel through said relative moving motor, and said lens system whole unit motor comprising a lens system moving motor mounted to said camera body to move said lens barrel.

149. The zoom lens camera according to claim 148, wherein if an amount by which said relative moving motor is to be driven is more than a predetermined amount, said controller drives said relative moving motor at a high-speed until said amount corresponds to said predetermined amount, and if an amount by which said relative moving motor is to be driven is less than a predetermined amount, said controller drives said relative moving motor at a low-speed.

150. The zoom lens camera according to claim 146, further comprising a zoom operating switch, wherein when said zoom operating switch is operated, said controller drives said lens system whole unit motor to move said front lens group and said rear lens group to one of a plurality of predetermined standby positions.

151. The zoom lens camera according to claim 145, wherein said zoom operating switch sets a focal length from a wide end position to a tele end position as a plurality of stepwisely varying focal lengths.

152. The zoom lens camera according to claim 143, wherein when said front lens group and said rear lens group are set to a focal length greater than a predetermined focal length, said moving motor system maintains a position of said rear lens group at a rear lens group initial position proximate to said front lens group, and when said front lens group and said rear lens group are set to a focal length less than said predetermined focal length, said moving motor system moves said rear lens group to a position further away from said front lens group than said rear lens group initial position.

153. The zoom lens camera according to claim 152, wherein when said front lens group and said rear lens group are moved by said moving motor system, said relative moving motor moves said rear lens group in accordance with positions of said front and rear lens groups after said movement by said moving motor system.

\* \* \* \* \*

UNITED STATES PATENT AND TRADEMARK OFFICE
CERTIFICATE OF CORRECTION

PATENT NO. : 5,774,748
DATED : June 30, 1998
INVENTOR(S) : Takayuki ITO et al

It is certified that error appears in the above-identified patent and that said Letters Patent is hereby corrected as shown below:

On the title page: Item [54] and Column 1, line 3 TITLE, change second occurrence of "BARRET" to --BARREL--.

item [30], Foreign Application Priority Data, change "8-38333" to --8-28333--.

At column 91, line 52 (claim 5, line 4) of the printed patent, delete ",".

At column 91, line 54 (claim 6, line 2) of the printed patent, after "a" delete ".".

At column 92, line 5 (claim 8, line 1) of the printed patent, after "a" delete ".".

At column 92, line 8 (claim 8, line 3) of the printed patent, " after "camera" delete ".".

At column 92, line 9 (claim 8, line 4) of the printed patent, after "said" delete ".".

At column 92, line 58 (claim 17, line 8) of the printed patent, delete "EL", and replace with --a--.

At column 92, line 67 (claim 19, line 3) of the printed patent, after "a" delete ".".

UNITED STATES PATENT AND TRADEMARK OFFICE
CERTIFICATE OF CORRECTION

PATENT NO. : 5774,748
DATED : June 30, 1998
INVENTOR(S) : Takayuki Ito et al

It is certified that error appears in the above-identified patent and that said Letters Patent is hereby corrected as shown below:

At column 93, line 2 (claim 19, line 5) of the printed patent, after "comprises" delete ",".

At column 93, line 3 (claim 19, line 6) of the printed patent, after "barrel" delete "," and after "said" delete ",".

At column 94, line 30 (claim 28, line 10) of the printed patent, "aid" should be ---said---.

At column 94, line 31 (claim 28, line 11) of the printed patent, after "operation", insert ---;---.

At column 94, line 33 (claim 28, line 13) of the printed patent, after "means", insert ---,---.

At column 94, line 51 (claim 31, line 1) of the printed patent, after "29", insert ---wherein said---.

At column 95, line 29 (claim 38, line 3) of the printed patent, delete "EL", and replace with ---a---.

At column 95, line 34 (claim 38, line 8) of the printed patent, after "means" delete ";".

At column 96, line 13 (claim 45, line 1) of the printed patent,

UNITED STATES PATENT AND TRADEMARK OFFICE
CERTIFICATE OF CORRECTION

PATENT NO.   : 5,774,748
DATED        : June 30, 1998
INVENTOR(S)  : TAKAYUKI Ito et al It is certified that error appears in the above-identified patent and that said Letters Patent is hereby corrected as shown below:

"41" should be —44—.

At column 96, line 47 (claim 48, line 15) of the printed patent, after "said", delete ",".

At column 97, line 9 (claim 50, line 9) of the printed patent, after "first" delete ".".

At column 97, line 11 (claim 50, line 11) of the printed patent, after "first" delete ":".

At column 98, line 56 (claim 64, line 17) of the printed patent, after "drives" delete ";".

At column 98, line 58, (claim 64, line 19) of the printed patent, after "until" insert —a—.

At column 98, line 63 (claim 65, line 3) of the printed patent, after "front", delete ":".

At column 101, line 51 (claim 83, line 13) of the printed patent, after "detects", delete ";".

UNITED STATES PATENT AND TRADEMARK OFFICE
CERTIFICATE OF CORRECTION

PATENT NO.   : 5,774,748
DATED        : June 30, 1998
INVENTOR(S)  : Takayiki Ito et al It is certified that error appears in the above-identified patent and that said Letters Patent is hereby corrected as shown below:

At column 101, line 53 (claim 83, line 15) of the printed patent, "froze" should be ---from---.

At column 110, line 32 (claim 151, line 1) of the printed patent, "145" should be ---146---.

At column 108, line 15, (claim 132, line 7) of the printed patent, "rewardly" should be ---rearwardly---.

Signed and Sealed this

Seventh Day of November, 2000

Q. TODD DICKINSON

Attest:

Attesting Officer

Director of Patents and Trademarks